US011757834B2

(12) United States Patent
Dawes et al.

(10) Patent No.: US 11,757,834 B2
(45) Date of Patent: *Sep. 12, 2023

(54) COMMUNICATION PROTOCOLS IN INTEGRATED SYSTEMS

(71) Applicant: iControl Networks, Inc., Philadelphia, PA (US)

(72) Inventors: Paul Dawes, Redwood City, CA (US); Marc Baum, Redwood City, CA (US); Aaron Wood, Redwood City, CA (US)

(73) Assignee: iControl Networks, Inc., Philadelphia, PA (US)

( * ) Notice: Subject to any disclaimer, the term of this patent is extended or adjusted under 35 U.S.C. 154(b) by 233 days.

This patent is subject to a terminal disclaimer.

(21) Appl. No.: 17/065,841

(22) Filed: Oct. 8, 2020

(65) Prior Publication Data

US 2021/0152517 A1 May 20, 2021

Related U.S. Application Data

(63) Continuation of application No. 16/257,706, filed on Jan. 25, 2019, now Pat. No. 11,184,322, which is a (Continued)

(51) Int. Cl.

*G08B 13/00* (2006.01)
*H04L 9/40* (2022.01)

(Continued)

(52) U.S. Cl.

CPC ............ *H04L 63/02* (2013.01); *G06F 3/0412* (2013.01); *G06F 3/04842* (2013.01); (Continued)

(58) Field of Classification Search

CPC ......... H04L 63/02; H04L 67/01; H04L 67/10; G06F 3/0412; G06F 3/04842; H04W 4/38; H04W 12/086

(Continued)

(56) References Cited

U.S. PATENT DOCUMENTS

| | | | |
|---|---|---|---|
| 686,838 | A | 11/1901 | Appel |
| 1,738,540 | A | 12/1929 | Replogle et al. |

(Continued)

FOREIGN PATENT DOCUMENTS

| | | | |
|---|---|---|---|
| AU | 2005223267 | B2 | 12/2010 |
| AU | 2010297957 | A1 | 5/2012 |

(Continued)

OTHER PUBLICATIONS

US Patent Application filed on Sep. 11, 2020, entitled "Management Of Applications For A Device Located At A Premises", U.S. Appl. No. 17/018,901.

(Continued)

*Primary Examiner* — Anh V La
(74) *Attorney, Agent, or Firm* — BakerHostetler

(57) ABSTRACT

Systems and methods comprise a gateway that includes a processor coupled to a security system at a premises via a channel. The channel comprises a protocol of the security system that is a proprietary bus protocol of the control panel of the security system. A touchscreen at the premises is coupled to the gateway and presents user interfaces. The user interfaces include a security interface that provides control of functions of the security system and access to data collected by the security system, and a network interface that provides access to network devices. A camera is located at the premises and coupled to the gateway. A security server at a remote location is coupled to the gateway. The security server comprises a client interface through which remote client devices exchange data with the gateway and the security system.

20 Claims, 108 Drawing Sheets

Related U.S. Application Data continuation of application No. 14/203,219, filed on Mar. 10, 2014, now Pat. No. 10,237,237, which is a continuation-in-part of application No. 13/932,837, filed on Jul. 1, 2013, now Pat. No. 9,621,408, and a continuation-in-part of application No. 13/925,181, filed on Jun. 24, 2013, now Pat. No. 10,339,791, and a continuation-in-part of application No. 13/718,851, filed on Dec. 18, 2012, now Pat. No. 10,156,831, and a continuation-in-part of application No. 13/531,757, filed on Jun. 25, 2012, now abandoned, and a continuation-in-part of application No. 13/335,279, filed on Dec. 22, 2011, now Pat. No. 11,113,950, said application No. 13/932,837 is a continuation-in-part of application No. 13/311,365, filed on Dec. 5, 2011, now Pat. No. 9,141,276, said application No. 14/203, 219 is a continuation-in-part of application No. 13/104,932, filed on May 10, 2011, now abandoned, and a continuation-in-part of application No. 12/750, 470, filed on Mar. 30, 2010, now Pat. No. 9,191,228, said application No. 13/932,837 is a continuation of application No. 12/637,671, filed on Dec. 14, 2009, now Pat. No. 8,478,871, said application No. 14/203, 219 is a continuation-in-part of application No. 12/539,537, filed on Aug. 11, 2009, now Pat. No. 10,156,959, said application No. 13/335,279 is a continuation of application No. 12/269,767, filed on Nov. 12, 2008, now Pat. No. 8,086,703, said application No. 13/531,757 is a continuation-in-part of application No. 12/269,735, filed on Nov. 12, 2008, now Pat. No. 8,996,665, said application No. 12/539, 537 is a continuation-in-part of application No. 12/269,585, filed on Nov. 12, 2008, now Pat. No. 8,086,702, said application No. 13/335,279 is a continuation of application No. 12/197,895, filed on Aug. 25, 2008, now Pat. No. 8,073,931, said application No. 13/531,757 is a continuation of application No. 12/198,023, filed on Aug. 25, 2008, now Pat. No. 8,209,400, and a continuation-in-part of application No. 12/197,931, filed on Aug. 25, 2008, now Pat. No. 9,172,553, said application No. 14/203,219 is a continuation-in-part of application No. 12/197,946, filed on Aug. 25, 2008, now Pat. No. 8,612,591, said application No. 13/925,181 is a continuation of application No. 12/189,757, filed on Aug. 11, 2008, now Pat. No. 8,473,619, said application No. 14/203,219 is a continuation-in-part of application No. 12/019, 568, filed on Jan. 24, 2008, now Pat. No. 10,142,392, said application No. 12/197,946 is a continuation-in-part of application No. 12/019,554, filed on Jan. 24, 2008, now Pat. No. 7,911,341, and a continuation-in-part of application No. 11/761,718, filed on Jun. 12, 2007, now Pat. No. 7,711,796, said application No. 14/203,219 is a continuation-in-part of application No. 11/761,745, filed on Jun. 12, 2007, now Pat. No. 8,635,350, said application No. 12/197,946 is a continuation-in-part of application No. 11/084,232, filed on Mar. 16, 2005, now Pat. No. 8,335,842.

(60) Provisional application No. 61/802,077, filed on Mar. 15, 2013, provisional application No. 61/781,401, filed on Mar. 14, 2013, provisional application No. 61/782,345, filed on Mar. 14, 2013, provisional application No. 61/781,713, filed on Mar. 14, 2013, provisional application No. 61/778,853, filed on Mar. 13, 2013, provisional application No. 61/779,028, filed on Mar. 13, 2013, provisional application No. 61/780,290, filed on Mar. 13, 2013, provisional application No. 61/780,637, filed on Mar. 13, 2013, provisional application No. 61/780,092, filed on Mar. 13, 2013, provisional application No. 61/780,538, filed on Mar. 13, 2013, provisional application No. 61/779,753, filed on Mar. 13, 2013, provisional application No. 61/780,435, filed on Mar. 13, 2013, provisional application No. 61/777,061, filed on Mar. 12, 2013, provisional application No. 61/333,130, filed on May 10, 2010, provisional application No. 61/164,877, filed on Mar. 30, 2009, provisional application No. 61/087,967, filed on Aug. 11, 2008, provisional application No. 61/023,496, filed on Jan. 25, 2008, provisional application No. 61/023,489, filed on Jan. 25, 2008, provisional application No. 61/023,493, filed on Jan. 25, 2008, provisional application No. 61/019,162, filed on Jan. 4, 2008, provisional application No. 61/019,167, filed on Jan. 4, 2008, provisional application No. 60/987,366, filed on Nov. 12, 2007, provisional application No. 60/987,359, filed on Nov. 12, 2007, provisional application No. 60/968,005, filed on Aug. 24, 2007, provisional application No. 60/957,997, filed on Aug. 24, 2007, provisional application No. 60/955,172, filed on Aug. 10, 2007, provisional application No. 60/886,439, filed on Jan. 24, 2007, provisional application No. 60/886,435, filed on Jan. 24, 2007, provisional application No. 60/804,550, filed on Jun. 12, 2006, provisional application No. 60/652,475, filed on Feb. 11, 2005, provisional application No. 60/553,932, filed on Mar. 16, 2004, provisional application No. 60/553,934, filed on Mar. 16, 2004.

(51) Int. Cl.

| | |
|---|---|
| ***H04L 67/10*** | (2022.01) |
| ***H04W 4/38*** | (2018.01) |
| ***H04W 12/086*** | (2021.01) |
| ***H04L 67/01*** | (2022.01) |
| ***G06F 3/041*** | (2006.01) |
| ***G06F 3/04842*** | (2022.01) |

(52) U.S. Cl.
CPC .............. *H04L 67/01* (2022.05); *H04L 67/10* (2013.01); *H04W 4/38* (2018.02); *H04W 12/086* (2021.01)

(58) Field of Classification Search
USPC .................. 340/541, 540, 506; 455/411, 433
See application file for complete search history.

(56) References Cited

U.S. PATENT DOCUMENTS

| | | | |
|---|---|---|---|
| 3,803,576 | A | 4/1974 | Dobrzanski et al. |
| 3,852,541 | A | 12/1974 | Altenberger |
| 4,006,460 | A | 2/1977 | Hewitt et al. |
| 4,141,006 | A | 2/1979 | Braxton |
| 4,206,449 | A | 6/1980 | Apsell et al. |
| 4,257,038 | A | 3/1981 | Rounds et al. |
| 4,286,331 | A | 8/1981 | Anderson et al. |
| 4,304,970 | A | 12/1981 | Fahey et al. |
| 4,351,023 | A | 9/1982 | Richer |
| 4,363,031 | A | 12/1982 | Reinowitz |
| 4,459,582 | A | 7/1984 | Sheahan et al. |
| 4,520,503 | A | 5/1985 | Kirst et al. |
| 4,559,526 | A | 12/1985 | Tani et al. |
| 4,559,527 | A | 12/1985 | Kirby |

(56) References Cited

U.S. PATENT DOCUMENTS 4,567,557 A 1/1986 Burns
4,574,305 A 3/1986 Campbell et al.
4,581,606 A 4/1986 Mallory
4,591,834 A 5/1986 Kyle
D284,084 S 6/1986 Ferrara, Jr.
4,641,127 A 2/1987 Hogan et al.
4,652,859 A 3/1987 Van Wienen
4,670,739 A 6/1987 Kelly, Jr.
4,683,460 A 7/1987 Nakatsugawa
4,694,282 A 9/1987 Tamura et al.
4,716,973 A 1/1988 Cobern
4,730,184 A 3/1988 Bach
4,754,261 A 6/1988 Marino
4,755,792 A 7/1988 Pezzolo et al.
4,779,007 A 10/1988 Schlanger et al.
4,785,289 A 11/1988 Chen
4,801,924 A 1/1989 Burgmann et al.
4,812,820 A 3/1989 Chatwin
4,818,970 A 4/1989 Natale et al.
4,833,449 A 5/1989 Gaffigan
4,855,713 A 8/1989 Brunius
4,860,185 A 8/1989 Brewer et al.
4,887,064 A 12/1989 Drori et al.
4,897,630 A 1/1990 Nykerk
4,918,623 A 4/1990 Lockitt et al.
4,918,717 A 4/1990 Bissonnette et al.
4,951,029 A 8/1990 Severson
4,959,713 A 9/1990 Morotomi et al.
4,962,473 A 10/1990 Crain
4,980,666 A 12/1990 Hwang
4,993,059 A 2/1991 Smith et al.
4,994,787 A 2/1991 Kratt et al.
4,996,646 A 2/1991 Farrington
5,023,901 A 6/1991 Sloan et al.
5,083,106 A 1/1992 Kostusiak et al.
5,086,385 A 2/1992 Launey et al.
5,091,780 A 2/1992 Pomerleau
5,109,278 A 4/1992 Erickson et al.
5,132,968 A 7/1992 Cephus
5,134,644 A 7/1992 Garton et al.
5,159,315 A 10/1992 Schultz et al.
5,160,879 A 11/1992 Tortola et al.
5,164,703 A 11/1992 Rickman
5,164,979 A 11/1992 Choi
D337,569 S 7/1993 Kando
5,227,776 A 7/1993 Starefoss
5,237,305 A 8/1993 Ishikuro et al.
5,245,694 A 9/1993 Zwern
5,247,232 A 9/1993 Lin
5,280,527 A 1/1994 Gullman et al.
5,283,816 A 2/1994 Gomez Diaz
5,299,971 A 4/1994 Hart
5,319,394 A 6/1994 Dukek
5,319,698 A 6/1994 Glidewell et al.
5,334,974 A 8/1994 Simms et al.
5,400,011 A 3/1995 Sutton
5,400,246 A 3/1995 Wilson et al.
5,406,260 A 4/1995 Cummings et al.
5,410,343 A 4/1995 Coddington et al.
5,412,708 A 5/1995 Katz
5,414,409 A 5/1995 Voosen et al.
5,414,833 A 5/1995 Hershey et al.
5,428,293 A 6/1995 Sinclair et al.
5,438,607 A 8/1995 Przygoda et al.
5,446,445 A 8/1995 Bloomfield et al.
5,448,290 A 9/1995 Vanzeeland
5,452,344 A 9/1995 Larson
5,465,081 A 11/1995 Todd
5,471,194 A 11/1995 Guscott
5,481,312 A 1/1996 Cash et al.
5,483,224 A 1/1996 Rankin et al.
5,486,812 A 1/1996 Todd
5,499,014 A 3/1996 Greenwaldt
5,499,196 A 3/1996 Pacheco
5,510,975 A 4/1996 Ziegler, Jr.
5,519,878 A 5/1996 Dolin, Jr.
RE35,268 E 6/1996 Frolov et al.
5,525,966 A 6/1996 Parish
5,526,428 A 6/1996 Arnold
5,534,845 A 7/1996 Issa et al.
5,541,585 A 7/1996 Duhame et al.
5,543,778 A 8/1996 Stouffer
5,546,072 A 8/1996 Creuseremee et al.
5,546,074 A 8/1996 Bernal et al.
5,546,447 A 8/1996 Skarbo et al.
5,548,646 A 8/1996 Aziz et al.
5,550,984 A 8/1996 Gelb
5,557,254 A 9/1996 Johnson et al.
5,565,843 A 10/1996 Meyvis
5,570,079 A 10/1996 Dockery
5,572,438 A 11/1996 Ehlers et al.
5,578,989 A 11/1996 Pedtke
5,579,197 A 11/1996 Mengelt et al.
5,579,221 A 11/1996 Mun
D377,034 S 12/1996 Matsushita
5,586,254 A 12/1996 Kondo et al.
5,587,705 A 12/1996 Morris
5,598,086 A 1/1997 Somerville
5,602,918 A 2/1997 Chen et al.
5,604,493 A 2/1997 Behlke
5,606,615 A 2/1997 Lapointe et al.
5,621,662 A 4/1997 Humphries et al.
5,623,601 A 4/1997 Vu
5,625,338 A 4/1997 Pildner et al.
5,625,410 A 4/1997 Washino et al.
5,629,687 A 5/1997 Sutton et al.
5,630,216 A 5/1997 McEwan
5,631,630 A 5/1997 McSweeney
5,638,046 A 6/1997 Malinowski
5,650,773 A 7/1997 Chiarello
5,651,070 A 7/1997 Blunt
5,652,567 A 7/1997 Traxler
5,654,694 A 8/1997 Newham
5,675,321 A 10/1997 McBride
5,680,131 A 10/1997 Utz
5,682,133 A 10/1997 Johnson et al.
5,686,885 A 11/1997 Bergman
5,686,896 A 11/1997 Bergman
5,689,235 A 11/1997 Sugimoto et al.
5,689,708 A 11/1997 Regnier et al.
5,691,697 A 11/1997 Carvalho et al.
5,694,335 A 12/1997 Hollenberg
5,694,595 A 12/1997 Jacobs et al.
5,696,486 A 12/1997 Poliquin et al.
5,696,898 A 12/1997 Baker et al.
D389,501 S 1/1998 Mascarenas et al.
5,706,191 A 1/1998 Bassett et al.
5,712,679 A 1/1998 Coles
5,714,933 A 2/1998 Le Van Suu
5,715,394 A 2/1998 Jabs
5,717,378 A 2/1998 Malvaso et al.
5,717,379 A 2/1998 Peters
5,717,578 A 2/1998 Afzal
5,719,551 A 2/1998 Flick
5,726,912 A 3/1998 Krall et al.
5,731,756 A 3/1998 Roddy
5,736,927 A 4/1998 Stebbins et al.
5,737,391 A 4/1998 Dame et al.
5,748,084 A 5/1998 Isikoff
5,748,089 A 5/1998 Sizemore
5,757,616 A 5/1998 May et al.
5,761,206 A 6/1998 Kackman
5,774,051 A 6/1998 Kostusiak
5,777,551 A 7/1998 Hess
5,784,461 A 7/1998 Shaffer et al.
5,784,463 A 7/1998 Chen et al.
5,790,531 A 8/1998 Ellebracht et al.
5,793,028 A 8/1998 Wagener et al.
5,793,763 A 8/1998 Mayes et al.
5,794,128 A 8/1998 Brockel et al.
5,796,401 A 8/1998 Winer
5,798,701 A 8/1998 Bernal et al.
5,801,618 A 9/1998 Jenkins
5,805,056 A 9/1998 Mueller et al.

(56) References Cited

U.S. PATENT DOCUMENTS

| | | | |
|---|---|---|---|
| 5,805,064 | A | 9/1998 | Yorkey |
| 5,809,013 | A | 9/1998 | Kackman |
| 5,809,265 | A | 9/1998 | Blair et al. |
| 5,812,054 | A | 9/1998 | Cohen |
| 5,819,124 | A | 10/1998 | Somner et al. |
| 5,821,937 | A | 10/1998 | Tonelli |
| 5,838,226 | A | 11/1998 | Houggy et al. |
| 5,844,599 | A | 12/1998 | Hildin |
| 5,845,070 | A | 12/1998 | Ikudome |
| 5,845,081 | A | 12/1998 | Rangarajan et al. |
| 5,854,588 | A | 12/1998 | Dockery |
| 5,859,966 | A | 1/1999 | Hayman et al. |
| 5,861,804 | A | 1/1999 | Fansa et al. |
| 5,864,614 | A | 1/1999 | Farris et al. |
| 5,867,484 | A | 2/1999 | Shaunfield |
| 5,867,495 | A | 2/1999 | Elliott et al. |
| 5,874,952 | A | 2/1999 | Morgan |
| 5,875,395 | A | 2/1999 | Holmes |
| 5,877,696 | A | 3/1999 | Powell |
| 5,877,957 | A | 3/1999 | Bennett |
| 5,880,775 | A | 3/1999 | Ross |
| 5,881,226 | A | 3/1999 | Veneklase |
| 5,886,697 | A | 3/1999 | Naughton et al. |
| 5,886,894 | A | 3/1999 | Rakoff |
| 5,892,442 | A | 4/1999 | Ozery |
| 5,898,831 | A | 4/1999 | Hall et al. |
| 5,905,438 | A | 5/1999 | Weiss et al. |
| 5,907,279 | A | 5/1999 | Bruins et al. |
| 5,909,183 | A | 6/1999 | Borgstahl et al. |
| 5,914,655 | A | 6/1999 | Clifton et al. |
| 5,924,069 | A | 7/1999 | Kowalkowski et al. |
| 5,926,209 | A | 7/1999 | Glatt |
| 5,933,098 | A | 8/1999 | Haxton |
| 5,940,387 | A | 8/1999 | Humpleman |
| 5,943,394 | A | 8/1999 | Ader et al. |
| 5,952,815 | A | 9/1999 | Rouillard et al. |
| 5,955,946 | A | 9/1999 | Beheshti et al. |
| 5,958,053 | A | 9/1999 | Denker |
| 5,959,528 | A | 9/1999 | Right et al. |
| 5,959,529 | A | 9/1999 | Kail, IV |
| 5,963,916 | A | 10/1999 | Kaplan |
| 5,967,975 | A | 10/1999 | Ridgeway |
| 5,974,547 | A | 10/1999 | Klimenko |
| D416,910 | S | 11/1999 | Vasquez |
| 5,982,418 | A | 11/1999 | Ely |
| 5,991,795 | A | 11/1999 | Howard et al. |
| 5,995,838 | A | 11/1999 | Oda et al. |
| 5,999,525 | A | 12/1999 | Krishnaswamy et al. |
| 6,002,430 | A | 12/1999 | McCall et al. |
| 6,009,320 | A | 12/1999 | Dudley |
| 6,011,321 | A | 1/2000 | Stancu et al. |
| 6,011,921 | A | 1/2000 | Takahashi et al. |
| 6,032,036 | A | 2/2000 | Maystre et al. |
| 6,037,991 | A | 3/2000 | Thro et al. |
| 6,038,289 | A | 3/2000 | Sands |
| 6,040,770 | A | 3/2000 | Britton |
| 6,049,272 | A | 4/2000 | Lee et al. |
| 6,049,273 | A | 4/2000 | Hess |
| 6,049,598 | A | 4/2000 | Peters et al. |
| 6,052,052 | A | 4/2000 | Delmonaco |
| 6,058,115 | A | 5/2000 | Sawyer et al. |
| 6,060,994 | A | 5/2000 | Chen |
| 6,067,346 | A | 5/2000 | Akhteruzzaman |
| 6,067,440 | A | 5/2000 | Diefes |
| 6,069,655 | A | 5/2000 | Seeley et al. |
| 6,078,253 | A | 6/2000 | Fowler |
| 6,078,257 | A | 6/2000 | Ferraro |
| 6,078,649 | A | 6/2000 | Small et al. |
| 6,085,030 | A | 7/2000 | Whitehead et al. |
| 6,085,238 | A | 7/2000 | Yuasa et al. |
| 6,091,771 | A | 7/2000 | Seeley et al. |
| 6,094,134 | A | 7/2000 | Cohen |
| 6,097,429 | A | 8/2000 | Seeley et al. |
| 6,104,785 | A | 8/2000 | Chen |
| 6,107,918 | A | 8/2000 | Klein et al. |
| 6,107,930 | A | 8/2000 | Behlke et al. |
| 6,108,034 | A | 8/2000 | Kim |
| 6,112,015 | A | 8/2000 | Planas et al. |
| 6,112,237 | A | 8/2000 | Donaldson et al. |
| 6,117,182 | A | 9/2000 | Alpert et al. |
| 6,124,882 | A | 9/2000 | Voois et al. |
| 6,128,653 | A | 10/2000 | Del et al. |
| 6,134,303 | A | 10/2000 | Chen |
| 6,134,591 | A | 10/2000 | Nickles |
| 6,138,249 | A | 10/2000 | Nolet |
| 6,139,177 | A | 10/2000 | Venkatraman et al. |
| 6,140,987 | A | 10/2000 | Stein et al. |
| 6,144,993 | A | 11/2000 | Fukunaga et al. |
| 6,154,133 | A | 11/2000 | Ross et al. |
| 6,157,649 | A | 12/2000 | Peirce et al. |
| 6,157,943 | A | 12/2000 | Meyer |
| 6,161,182 | A | 12/2000 | Nadooshan |
| 6,167,186 | A | 12/2000 | Kawasaki et al. |
| 6,167,253 | A | 12/2000 | Farris et al. |
| 6,181,341 | B1 | 1/2001 | Shinagawa |
| 6,192,282 | B1 | 2/2001 | Smith et al. |
| 6,192,418 | B1 | 2/2001 | Hale et al. |
| 6,198,475 | B1 | 3/2001 | Kunimatsu et al. |
| 6,198,479 | B1 | 3/2001 | Humpleman et al. |
| 6,208,247 | B1 | 3/2001 | Agre et al. |
| 6,208,952 | B1 | 3/2001 | Goertzel et al. |
| 6,209,011 | B1 | 3/2001 | Vong et al. |
| 6,211,783 | B1 | 4/2001 | Wang |
| 6,215,404 | B1 | 4/2001 | Morales |
| 6,218,938 | B1 | 4/2001 | Lin |
| 6,219,677 | B1 | 4/2001 | Howard |
| 6,226,031 | B1 | 5/2001 | Barraclough et al. |
| 6,229,429 | B1 | 5/2001 | Horon |
| 6,230,271 | B1 | 5/2001 | Wadlow et al. |
| 6,239,892 | B1 | 5/2001 | Davidson |
| 6,243,683 | B1 | 6/2001 | Peters |
| 6,246,320 | B1 | 6/2001 | Monroe |
| 6,252,883 | B1 | 6/2001 | Schweickart et al. |
| 6,259,440 | B1 | 7/2001 | Vaughan et al. |
| 6,268,789 | B1 | 7/2001 | Diamant et al. |
| 6,271,752 | B1 | 8/2001 | Vaios |
| 6,275,227 | B1 | 8/2001 | DeStefano |
| 6,281,790 | B1 | 8/2001 | Kimmel et al. |
| 6,282,569 | B1 | 8/2001 | Wallis et al. |
| 6,286,038 | B1 | 9/2001 | Reichmeyer et al. |
| 6,288,716 | B1 | 9/2001 | Humpleman et al. |
| 6,289,382 | B1 | 9/2001 | Bowman-Amuah |
| 6,292,766 | B1 | 9/2001 | Mattos et al. |
| 6,292,827 | B1 | 9/2001 | Raz |
| 6,295,346 | B1 | 9/2001 | Markowitz et al. |
| 6,314,425 | B1 | 11/2001 | Serbinis et al. |
| 6,320,506 | B1 | 11/2001 | Ferraro |
| 6,323,897 | B1 | 11/2001 | Kogane et al. |
| D451,529 | S | 12/2001 | Vasquez |
| 6,327,044 | B1 | 12/2001 | Shima |
| 6,331,122 | B1 | 12/2001 | Wu |
| 6,332,193 | B1 | 12/2001 | Glass et al. |
| 6,341,274 | B1 | 1/2002 | Leon |
| 6,347,393 | B1 | 2/2002 | Alpert et al. |
| 6,351,213 | B1 | 2/2002 | Hirsch et al. |
| 6,351,271 | B1 | 2/2002 | Mainwaring et al. |
| 6,351,595 | B1 | 2/2002 | Kim |
| 6,351,829 | B1 | 2/2002 | Dupont et al. |
| 6,353,853 | B1 | 3/2002 | Gravlin |
| 6,353,891 | B1 | 3/2002 | Borella et al. |
| 6,359,560 | B1 | 3/2002 | Budge et al. |
| 6,363,417 | B1 | 3/2002 | Howard et al. |
| 6,363,422 | B1 | 3/2002 | Hunter et al. |
| 6,366,211 | B1 | 4/2002 | Parker |
| 6,369,695 | B2 | 4/2002 | Horon |
| 6,369,705 | B1 | 4/2002 | Kennedy |
| 6,370,436 | B1 | 4/2002 | Howard et al. |
| 6,374,079 | B1 | 4/2002 | Hsu |
| 6,377,861 | B1 | 4/2002 | York |
| 6,378,109 | B1 | 4/2002 | Young et al. |
| 6,385,772 | B1 | 5/2002 | Courtney |
| 6,392,538 | B1 | 5/2002 | Shere |
| 6,396,531 | B1 | 5/2002 | Gerszberg et al. |
| 6,400,265 | B1 | 6/2002 | Saylor et al. |

(56) References Cited

U.S. PATENT DOCUMENTS 6,405,348 B1 6/2002 Fallah-Tehrani et al.
6,411,802 B1 6/2002 Cardina et al.
D460,472 S 7/2002 Wang
6,418,037 B1 7/2002 Zhang
6,421,080 B1 7/2002 Lambert
6,430,629 B1 8/2002 Smyers
6,433,683 B1 8/2002 Robinson
6,434,604 B1 8/2002 Harada et al.
6,434,700 B1 8/2002 Alonso et al.
6,437,692 B1 8/2002 Petite et al.
6,441,723 B1 8/2002 Mansfield et al.
6,441,731 B1 8/2002 Hess
6,442,241 B1 8/2002 Tsumpes
6,445,291 B2 9/2002 Addy et al.
6,446,111 B1 9/2002 Lowery
6,446,192 B1 9/2002 Narasimhan et al.
6,452,490 B1 9/2002 Garland et al.
6,452,923 B1 9/2002 Gerszberg et al.
6,452,924 B1 9/2002 Golden et al.
6,453,687 B2 9/2002 Sharood et al.
D464,328 S 10/2002 Vasquez et al.
D464,948 S 10/2002 Vasquez et al.
6,462,507 B2 10/2002 Fisher, Jr.
6,462,663 B1 10/2002 Wilson et al.
6,467,084 B1 10/2002 Howard et al.
6,473,407 B1 10/2002 Ditmer et al.
6,476,858 B1 11/2002 Ramirez et al.
6,480,901 B1 11/2002 Weber et al.
6,486,896 B1 11/2002 Ubillos
6,493,020 B1 12/2002 Stevenson et al.
6,496,927 B1 12/2002 McGrane et al.
6,499,131 B1 12/2002 Savithri et al.
6,504,479 B1 1/2003 Lemons et al.
6,507,589 B1 1/2003 Ramasubramani et al.
6,508,709 B1 1/2003 Karmarkar
6,515,968 B1 2/2003 Combar et al.
6,526,581 B1 2/2003 Edson
6,529,230 B1 3/2003 Chong
6,529,589 B1 3/2003 Nelson et al.
6,529,723 B1 3/2003 Bentley
6,535,110 B1 3/2003 Arora et al.
6,542,992 B1 4/2003 Peirce et al.
6,549,130 B1 4/2003 Joao
6,552,647 B1 4/2003 Thiessen et al.
6,553,336 B1 4/2003 Johnson et al.
6,559,769 B2 5/2003 Anthony et al.
6,563,800 B1 5/2003 Salo et al.
6,567,122 B1 5/2003 Anderson et al.
6,567,502 B2 5/2003 Zellner et al.
6,574,234 B1 6/2003 Myer et al.
6,580,424 B1 6/2003 Krumm
6,580,950 B1 6/2003 Johnson et al.
6,587,046 B2 7/2003 Joao
6,587,235 B1 7/2003 Chaudhuri et al.
6,587,455 B1 7/2003 Ray et al.
6,587,736 B2 7/2003 Howard et al.
6,587,739 B1 7/2003 Abrams et al.
6,591,094 B1 7/2003 Bentley
6,593,856 B1 7/2003 Madau
6,597,703 B1 7/2003 Li et al.
6,601,086 B1 7/2003 Howard et al.
6,603,488 B2 8/2003 Humpleman et al.
6,609,127 B1 8/2003 Lee et al.
6,611,206 B2 8/2003 Eshelman et al.
6,615,088 B1 9/2003 Myer et al.
6,621,827 B1 9/2003 Rezvani et al.
6,624,750 B1 9/2003 Marman et al.
6,636,893 B1 10/2003 Fong
6,643,355 B1 11/2003 Tsumpes
6,643,652 B2 11/2003 Helgeson et al.
6,643,669 B1 11/2003 Novak et al.
6,643,795 B1 11/2003 Sicola et al.
6,648,682 B1 11/2003 Wu
6,658,091 B1 12/2003 Naidoo et al.
6,661,340 B1 12/2003 Saylor et al.
6,662,340 B2 12/2003 Rawat et al.
6,665,004 B1 12/2003 Paff
6,667,688 B1 12/2003 Menard et al.
6,674,767 B1 1/2004 Kadyk et al.
6,675,365 B2 1/2004 Elzinga
6,680,730 B1 1/2004 Shields et al.
6,680,935 B1 1/2004 Kung et al.
6,686,838 B1 2/2004 Rezvani et al.
6,690,411 B2 2/2004 Naidoo et al.
6,690,719 B1 2/2004 Raphaeli et al.
6,693,530 B1 2/2004 Dowens et al.
6,693,545 B2 2/2004 Brown et al.
6,697,103 B1 2/2004 Fernandez et al.
6,704,786 B1 3/2004 Gupta et al.
6,716,101 B1 4/2004 Meadows et al.
6,720,990 B1 4/2004 Walker et al.
6,721,689 B2 4/2004 Markle et al.
6,721,740 B1 4/2004 Skinner et al.
6,721,747 B2 4/2004 Lipkin
6,721,802 B1 4/2004 Wright et al.
6,727,811 B1 4/2004 Fendis
6,728,233 B1 4/2004 Park et al.
6,728,688 B1 4/2004 Hirsch et al.
6,738,824 B1 5/2004 Blair
6,741,171 B2 5/2004 Palka et al.
6,741,977 B1 5/2004 Nagaya et al.
6,754,181 B1 6/2004 Elliott et al.
6,754,717 B1 6/2004 Day et al.
6,756,896 B2 6/2004 Ford
6,756,988 B1 6/2004 Wang et al.
6,756,998 B1 6/2004 Bilger
6,759,956 B2 7/2004 Menard et al.
6,762,686 B1 7/2004 Tabe
6,763,377 B1 7/2004 Belknap et al.
6,766,353 B1 7/2004 Lin et al.
6,771,181 B1 8/2004 Hughen, Jr.
6,778,085 B2 8/2004 Faulkner et al.
6,779,019 B1 8/2004 Mousseau et al.
6,781,509 B1 8/2004 Oppedahl et al.
6,785,542 B1 8/2004 Blight et al.
6,789,147 B1 9/2004 Kessler et al.
6,795,322 B2 9/2004 Aihara et al.
6,795,863 B1 9/2004 Doty, Jr.
6,798,344 B2 9/2004 Faulkner et al.
6,804,638 B2 10/2004 Fiedler
6,810,409 B1 10/2004 Fry et al.
6,810,420 B1 10/2004 Buse et al.
6,823,223 B2 11/2004 Gonzales et al.
6,826,173 B1 11/2004 Kung et al.
6,826,233 B1 11/2004 Hajime
6,829,478 B1 12/2004 Layton et al.
6,834,208 B2 12/2004 Gonzales et al.
6,836,214 B2 12/2004 Choi
6,850,252 B1 2/2005 Hoffberg
6,856,236 B2 2/2005 Christensen et al.
6,857,026 B1 2/2005 Cain
6,859,831 B1 2/2005 Gelvin et al.
6,865,690 B2 3/2005 Kocin
6,871,193 B1 3/2005 Campbell et al.
6,873,256 B2 3/2005 Lemelson et al.
6,885,362 B2 4/2005 Suomela
D504,889 S 5/2005 Andre et al.
6,891,838 B1 5/2005 Petite et al.
6,912,429 B1 6/2005 Bilger
6,914,533 B2 7/2005 Petite
6,918,112 B2 7/2005 Bourke-Dunphy et al.
6,920,502 B2 7/2005 Araujo et al.
6,920,615 B1 7/2005 Campbell et al.
6,922,701 B1 7/2005 Ananian et al.
6,928,148 B2 8/2005 Simon et al.
6,930,599 B2 8/2005 Naidoo et al.
6,930,730 B2 8/2005 Maxson et al.
6,931,445 B2 8/2005 Davis
6,941,258 B2 9/2005 Van et al.
6,943,681 B2 9/2005 Rezvani et al.
6,956,477 B2 10/2005 Chun
6,957,075 B1 10/2005 Iverson
6,957,186 B1 10/2005 Guheen et al.
6,957,275 B1 10/2005 Sekiguchi

(56) References Cited

U.S. PATENT DOCUMENTS

| | | | | |
|---|---|---|---|---|
| 6,959,341 | B1 | 10/2005 | Leung | |
| 6,959,393 | B2 | 10/2005 | Hollis et al. | |
| 6,963,908 | B1 | 11/2005 | Lynch et al. | |
| 6,963,981 | B1 | 11/2005 | Bailey et al. | |
| 6,965,294 | B1 | 11/2005 | Elliott et al. | |
| 6,965,313 | B1 | 11/2005 | Saylor et al. | |
| 6,970,183 | B1 | 11/2005 | Monroe | |
| 6,971,063 | B1 | 11/2005 | Rappaport et al. | |
| 6,971,076 | B2 | 11/2005 | Chen | |
| 6,972,676 | B1 | 12/2005 | Kimmel et al. | |
| 6,975,220 | B1 | 12/2005 | Foodman et al. | |
| 6,977,485 | B1 | 12/2005 | Wei | |
| 6,983,432 | B2 | 1/2006 | Hayes | |
| 6,990,591 | B1 | 1/2006 | Pearson | |
| 6,993,658 | B1 | 1/2006 | Engberg et al. | |
| 6,999,562 | B2 | 2/2006 | Winick | |
| 6,999,992 | B1 | 2/2006 | Deen et al. | |
| 7,015,806 | B2 * | 3/2006 | Naidoo | H04N 7/181 348/E7.086 |
| 7,016,970 | B2 | 3/2006 | Harumoto et al. | |
| 7,019,639 | B2 | 3/2006 | Stilp | |
| 7,020,697 | B1 | 3/2006 | Goodman et al. | |
| 7,020,701 | B1 | 3/2006 | Gelvin et al. | |
| 7,023,913 | B1 | 4/2006 | Monroe | |
| 7,023,914 | B2 | 4/2006 | Furukawa et al. | |
| 7,023,975 | B2 | 4/2006 | Mansfield et al. | |
| 7,024,676 | B1 | 4/2006 | Klopfenstein | |
| 7,028,328 | B2 | 4/2006 | Kogane et al. | |
| 7,030,752 | B2 | 4/2006 | Tyroler | |
| 7,032,002 | B1 | 4/2006 | Rezvani et al. | |
| 7,035,907 | B1 | 4/2006 | Decasper et al. | |
| 7,039,391 | B2 | 5/2006 | Rezvani et al. | |
| 7,042,880 | B1 | 5/2006 | Voit et al. | |
| 7,043,537 | B1 | 5/2006 | Pratt | |
| 7,047,088 | B2 | 5/2006 | Nakamura et al. | |
| 7,047,092 | B2 | 5/2006 | Wimsatt | |
| 7,047,180 | B1 | 5/2006 | Mathews et al. | |
| 7,050,388 | B2 | 5/2006 | Kim et al. | |
| 7,053,764 | B2 | 5/2006 | Stilp | |
| 7,053,765 | B1 | 5/2006 | Clark | |
| 7,068,164 | B1 | 6/2006 | Duncan et al. | |
| 7,072,934 | B2 | 7/2006 | Helgeson et al. | |
| 7,073,140 | B1 | 7/2006 | Li et al. | |
| 7,075,429 | B2 | 7/2006 | Marshall | |
| 7,079,020 | B2 | 7/2006 | Stilp | |
| 7,080,046 | B1 | 7/2006 | Rezvani et al. | |
| 7,082,460 | B2 | 7/2006 | Hansen et al. | |
| 7,085,814 | B1 | 8/2006 | Gandhi et al. | |
| 7,085,937 | B1 | 8/2006 | Rezvani et al. | |
| 7,086,018 | B2 | 8/2006 | Ito | |
| 7,099,944 | B1 | 8/2006 | Anschutz et al. | |
| 7,099,994 | B2 | 8/2006 | Thayer et al. | |
| 7,103,152 | B2 | 9/2006 | Naidoo et al. | |
| 7,106,176 | B2 | 9/2006 | La et al. | |
| 7,107,322 | B1 | 9/2006 | Freeny, Jr. | |
| 7,110,774 | B1 | 9/2006 | Davis et al. | |
| 7,111,072 | B1 | 9/2006 | Matthews et al. | |
| 7,113,090 | B1 | 9/2006 | Saylor et al. | |
| 7,113,099 | B2 | 9/2006 | Tyroler et al. | |
| 7,114,554 | B2 | 10/2006 | Bergman et al. | |
| 7,119,609 | B2 | 10/2006 | Naidoo et al. | |
| 7,119,674 | B2 | 10/2006 | Sefton | |
| 7,120,139 | B1 | 10/2006 | Kung et al. | |
| 7,120,232 | B2 | 10/2006 | Naidoo et al. | |
| 7,120,233 | B2 | 10/2006 | Naidoo et al. | |
| 7,126,473 | B1 | 10/2006 | Powell | |
| 7,130,383 | B2 | 10/2006 | Naidoo et al. | |
| 7,130,585 | B1 | 10/2006 | Ollis et al. | |
| 7,134,138 | B2 | 11/2006 | Scherr | |
| 7,136,711 | B1 | 11/2006 | Duncan et al. | |
| 7,142,503 | B1 | 11/2006 | Grant et al. | |
| 7,145,898 | B1 | 12/2006 | Elliott | |
| 7,147,147 | B1 | 12/2006 | Enright et al. | |
| 7,148,810 | B2 | 12/2006 | Bhat | |
| 7,149,798 | B2 | 12/2006 | Rezvani et al. | |
| 7,149,814 | B2 | 12/2006 | Neufeld et al. | |
| 7,158,776 | B1 | 1/2007 | Estes et al. | |
| 7,158,920 | B2 | 1/2007 | Ishikawa | |
| 7,164,883 | B2 | 1/2007 | Rappaport et al. | |
| 7,164,907 | B2 | 1/2007 | Cochran et al. | |
| 7,166,987 | B2 | 1/2007 | Lee et al. | |
| 7,171,686 | B1 | 1/2007 | Jansen et al. | |
| 7,174,018 | B1 | 2/2007 | Patil et al. | |
| 7,174,564 | B1 | 2/2007 | Weatherspoon et al. | |
| 7,180,889 | B1 | 2/2007 | Kung et al. | |
| 7,181,207 | B1 | 2/2007 | Chow et al. | |
| 7,181,517 | B1 | 2/2007 | Iavergne et al. | |
| 7,181,571 | B2 | 2/2007 | Jiang et al. | |
| 7,181,716 | B1 | 2/2007 | Dahroug | |
| 7,183,907 | B2 | 2/2007 | Simon et al. | |
| 7,184,428 | B1 | 2/2007 | Gerszberg et al. | |
| 7,184,848 | B2 | 2/2007 | Krzyzanowski et al. | |
| 7,187,986 | B2 | 3/2007 | Johnson et al. | |
| 7,194,003 | B2 | 3/2007 | Danner et al. | |
| 7,194,446 | B1 | 3/2007 | Bromley et al. | |
| 7,197,125 | B1 | 3/2007 | Prasad et al. | |
| 7,203,486 | B2 | 4/2007 | Patel | |
| 7,209,945 | B2 | 4/2007 | Hicks et al. | |
| 7,212,570 | B2 | 5/2007 | Akiyama et al. | |
| 7,213,061 | B1 | 5/2007 | Hite et al. | |
| 7,218,217 | B2 | 5/2007 | Adonailo et al. | |
| 7,222,359 | B2 * | 5/2007 | Freund | H04L 63/20 709/227 |
| 7,229,012 | B1 | 6/2007 | Enright et al. | |
| 7,237,267 | B2 | 6/2007 | Rayes et al. | |
| 7,240,327 | B2 | 7/2007 | Singh et al. | |
| 7,246,044 | B2 | 7/2007 | Imamura et al. | |
| 7,248,150 | B2 | 7/2007 | Mackjust et al. | |
| 7,248,161 | B2 | 7/2007 | Spoltore et al. | |
| 7,249,177 | B1 | 7/2007 | Miller | |
| 7,249,317 | B1 | 7/2007 | Nakagawa et al. | |
| 7,250,854 | B2 | 7/2007 | Rezvani et al. | |
| 7,250,859 | B2 | 7/2007 | Martin et al. | |
| 7,254,779 | B1 | 8/2007 | Rezvani et al. | |
| 7,254,833 | B1 | 8/2007 | Cornelius et al. | |
| 7,262,690 | B2 | 8/2007 | Heaton et al. | |
| 7,277,010 | B2 | 10/2007 | Joao | |
| 7,292,142 | B2 | 11/2007 | Simon et al. | |
| 7,293,083 | B1 | 11/2007 | Ranous et al. | |
| 7,298,253 | B2 | 11/2007 | Petricoin et al. | |
| 7,305,461 | B2 | 12/2007 | Ullman | |
| 7,310,115 | B2 | 12/2007 | Tanimoto | |
| 7,313,102 | B2 | 12/2007 | Stephenson et al. | |
| 7,313,231 | B2 | 12/2007 | Reid | |
| D558,460 | S | 1/2008 | Yu et al. | |
| D558,756 | S | 1/2008 | Andre et al. | |
| 7,315,886 | B1 | 1/2008 | Meenan et al. | |
| 7,337,217 | B2 | 2/2008 | Wang | |
| 7,337,473 | B2 | 2/2008 | Chang et al. | |
| 7,339,895 | B2 | 3/2008 | Ozaki et al. | |
| 7,340,314 | B1 | 3/2008 | Duncan et al. | |
| 7,343,619 | B2 | 3/2008 | Ofek et al. | |
| 7,345,580 | B2 | 3/2008 | Akamatsu et al. | |
| 7,346,338 | B1 | 3/2008 | Calhoun et al. | |
| 7,349,682 | B1 | 3/2008 | Bennett et al. | |
| 7,349,761 | B1 | 3/2008 | Cruse | |
| 7,349,967 | B2 | 3/2008 | Wang | |
| 7,356,372 | B1 | 4/2008 | Duncan et al. | |
| 7,359,843 | B1 | 4/2008 | Keller et al. | |
| 7,362,221 | B2 | 4/2008 | Katz | |
| 7,367,045 | B2 | 4/2008 | Ofek et al. | |
| 7,370,115 | B2 | 5/2008 | Bae et al. | |
| 7,383,339 | B1 | 6/2008 | Meenan et al. | |
| 7,383,522 | B2 | 6/2008 | Murgai et al. | |
| 7,391,298 | B1 | 6/2008 | Campbell et al. | |
| 7,403,838 | B2 | 7/2008 | Deen et al. | |
| 7,409,045 | B2 | 8/2008 | Naidoo et al. | |
| 7,409,451 | B1 | 8/2008 | Meenan et al. | |
| 7,412,447 | B2 | 8/2008 | Hilbert et al. | |
| 7,425,101 | B2 | 9/2008 | Cheng | |
| 7,428,585 | B1 | 9/2008 | Owens et al. | |
| 7,430,614 | B2 | 9/2008 | Shen et al. | |
| 7,437,753 | B2 | 10/2008 | Nahum | |
| 7,440,434 | B2 | 10/2008 | Chaskar et al. | |

(56) References Cited

U.S. PATENT DOCUMENTS

| | | | |
|---|---|---|---|
| 7,440,767 | B2 | 10/2008 | Ballay et al. |
| 7,447,775 | B1 | 11/2008 | Zhu et al. |
| 7,454,731 | B2 | 11/2008 | Oh et al. |
| 7,457,869 | B2 | 11/2008 | Kernan |
| 7,466,223 | B2 | 12/2008 | Sefton |
| 7,469,139 | B2 | 12/2008 | Van De Groenendaal |
| 7,469,294 | B1 | 12/2008 | Luo et al. |
| 7,469,381 | B2 | 12/2008 | Ording |
| 7,469,391 | B2 | 12/2008 | Carrere et al. |
| D584,738 | S | 1/2009 | Kim et al. |
| D585,399 | S | 1/2009 | Hwang |
| 7,477,629 | B2 | 1/2009 | Tsirtsis et al. |
| 7,479,949 | B2 | 1/2009 | Jobs et al. |
| 7,480,713 | B2 | 1/2009 | Ullman |
| 7,480,724 | B2 | 1/2009 | Zimler et al. |
| 7,483,958 | B1 | 1/2009 | Elabbady et al. |
| 7,490,350 | B1 | 2/2009 | Murotake et al. |
| 7,498,695 | B2 | 3/2009 | Gaudreau et al. |
| 7,502,672 | B1 | 3/2009 | Kolls |
| 7,506,052 | B2 | 3/2009 | Qian et al. |
| 7,509,687 | B2 | 3/2009 | Ofek et al. |
| 7,512,965 | B1 | 3/2009 | Amdur et al. |
| 7,526,539 | B1 | 4/2009 | Hsu |
| 7,526,762 | B1 | 4/2009 | Astala et al. |
| 7,528,723 | B2 | 5/2009 | Fast et al. |
| 7,535,880 | B1 | 5/2009 | Hinman et al. |
| 7,542,721 | B1 | 6/2009 | Bonner et al. |
| 7,549,134 | B1 | 6/2009 | Li et al. |
| 7,551,071 | B2 | 6/2009 | Bennett et al. |
| 7,554,934 | B2 | 6/2009 | Abraham et al. |
| 7,558,379 | B2 | 7/2009 | Winick |
| 7,558,862 | B1 | 7/2009 | Tyukasz et al. |
| 7,558,903 | B2 | 7/2009 | Kinstler |
| 7,562,323 | B1 | 7/2009 | Bai et al. |
| 7,564,855 | B1 | 7/2009 | Georgiou |
| 7,568,018 | B1 | 7/2009 | Hove et al. |
| 7,571,459 | B2 | 8/2009 | Ganesh et al. |
| 7,577,420 | B2 | 8/2009 | Srinivasan et al. |
| 7,583,191 | B2 | 9/2009 | Zinser |
| 7,584,263 | B1 | 9/2009 | Hicks et al. |
| 7,587,464 | B2 | 9/2009 | Moorer et al. |
| 7,590,953 | B2 | 9/2009 | Chang |
| 7,595,816 | B1 | 9/2009 | Enright et al. |
| 7,596,622 | B2 | 9/2009 | Owen et al. |
| D602,014 | S | 10/2009 | Andre et al. |
| D602,015 | S | 10/2009 | Andre et al. |
| D602,017 | S | 10/2009 | Andre et al. |
| D602,486 | S | 10/2009 | Andre et al. |
| D602,487 | S | 10/2009 | Maskatia |
| 7,606,767 | B1 | 10/2009 | Couper et al. |
| 7,610,555 | B2 | 10/2009 | Klein et al. |
| 7,610,559 | B1 | 10/2009 | Humpleman et al. |
| 7,619,512 | B2 | 11/2009 | Trundle et al. |
| 7,620,427 | B2 | 11/2009 | Shanahan |
| 7,627,665 | B2 | 12/2009 | Barker et al. |
| 7,633,385 | B2 | 12/2009 | Cohn et al. |
| 7,634,519 | B2 | 12/2009 | Creamer et al. |
| 7,639,157 | B1 | 12/2009 | Whitley et al. |
| 7,651,530 | B2 | 1/2010 | Winick |
| 7,653,911 | B2 | 1/2010 | Doshi et al. |
| 7,671,729 | B2 | 3/2010 | Hershkovitz et al. |
| 7,679,503 | B2 | 3/2010 | Mason et al. |
| 7,681,201 | B2 | 3/2010 | Dale et al. |
| 7,684,418 | B2 | 3/2010 | Scott et al. |
| 7,696,873 | B2 | 4/2010 | Sharma et al. |
| 7,697,028 | B1 | 4/2010 | Johnson |
| 7,701,970 | B2 | 4/2010 | Krits et al. |
| 7,702,421 | B2 | 4/2010 | Sullivan et al. |
| 7,702,782 | B1 | 4/2010 | Pai |
| D615,083 | S | 5/2010 | Andre et al. |
| 7,720,654 | B2 | 5/2010 | Hollis |
| 7,730,223 | B1 | 6/2010 | Bavor et al. |
| 7,733,371 | B1 | 6/2010 | Monroe |
| 7,734,020 | B2 | 6/2010 | Elliot et al. |
| 7,734,286 | B2 | 6/2010 | Almeda et al. |
| 7,734,906 | B2 | 6/2010 | Orlando et al. |
| 7,739,596 | B2 | 6/2010 | Clarke-Martin et al. |
| 7,739,658 | B2 | 6/2010 | Watson et al. |
| 7,747,975 | B2 | 6/2010 | Dinter et al. |
| 7,751,409 | B1 | 7/2010 | Carolan |
| 7,755,506 | B1 | 7/2010 | Clegg et al. |
| 7,756,928 | B1 | 7/2010 | Meenan et al. |
| 7,761,275 | B2 | 7/2010 | Chopra et al. |
| 7,787,863 | B2 | 8/2010 | van De Groenendaal |
| 7,804,760 | B2 | 9/2010 | Schmukler et al. |
| D624,896 | S | 10/2010 | Park et al. |
| D626,437 | S | 11/2010 | Lee et al. |
| 7,825,793 | B1 | 11/2010 | Spillman et al. |
| 7,827,252 | B2 | 11/2010 | Hopmann et al. |
| 7,844,699 | B1 | 11/2010 | Horrocks et al. |
| 7,847,675 | B1 | 12/2010 | Thyen et al. |
| 7,855,635 | B2 | 12/2010 | Cohn et al. |
| 7,859,404 | B2 | 12/2010 | Chul et al. |
| 7,882,466 | B2 | 2/2011 | Ishikawa |
| 7,882,537 | B2 | 2/2011 | Okajo et al. |
| 7,884,855 | B2 | 2/2011 | Ortiz |
| 7,890,612 | B2 | 2/2011 | Todd et al. |
| 7,890,915 | B2 | 2/2011 | Celik et al. |
| 7,899,732 | B2 | 3/2011 | Van et al. |
| 7,904,074 | B2 | 3/2011 | Karaoguz et al. |
| 7,904,187 | B2 | 3/2011 | Hoffberg et al. |
| 7,917,624 | B2 | 3/2011 | Gidwani |
| D636,769 | S | 4/2011 | Wood et al. |
| 7,921,686 | B2 | 4/2011 | Bagepalli et al. |
| 7,928,840 | B2 | 4/2011 | Kim et al. |
| 7,930,365 | B2 | 4/2011 | Dixit et al. |
| D637,596 | S | 5/2011 | Akana et al. |
| 7,949,960 | B2 | 5/2011 | Roessler et al. |
| D639,805 | S | 6/2011 | Song et al. |
| D640,663 | S | 6/2011 | Arnholt et al. |
| 7,956,736 | B2 | 6/2011 | Cohn et al. |
| 7,957,326 | B1 | 6/2011 | Christie, IV |
| 7,970,863 | B1 | 6/2011 | Fontaine |
| D641,018 | S | 7/2011 | Lee et al. |
| 7,974,235 | B2 | 7/2011 | Ghozati et al. |
| D642,563 | S | 8/2011 | Akana et al. |
| 8,001,219 | B2 | 8/2011 | Moorer et al. |
| D645,015 | S | 9/2011 | Lee et al. |
| D645,435 | S | 9/2011 | Kim et al. |
| D645,833 | S | 9/2011 | Seflic et al. |
| 8,022,833 | B2 | 9/2011 | Cho |
| 8,028,041 | B2 | 9/2011 | Olliphant et al. |
| 8,032,881 | B2 | 10/2011 | Holmberg et al. |
| 8,042,049 | B2 | 10/2011 | Killian et al. |
| 8,046,411 | B2 | 10/2011 | Hayashi et al. |
| 8,046,721 | B2 | 10/2011 | Chaudhri et al. |
| 8,069,194 | B1 | 11/2011 | Manber et al. |
| D650,381 | S | 12/2011 | Park et al. |
| D654,460 | S | 2/2012 | Kim et al. |
| D654,497 | S | 2/2012 | Lee |
| 8,125,184 | B2 | 2/2012 | Raji et al. |
| D656,137 | S | 3/2012 | Chung et al. |
| 8,140,658 | B1 | 3/2012 | Gelvin et al. |
| 8,144,836 | B2 | 3/2012 | Naidoo et al. |
| 8,159,519 | B2 | 4/2012 | Kurtz et al. |
| 8,159,945 | B2 | 4/2012 | Muro et al. |
| 8,160,425 | B2 | 4/2012 | Kisliakov |
| 8,196,064 | B2 | 6/2012 | Krzyzanowski et al. |
| 8,200,827 | B1 | 6/2012 | Hunyady et al. |
| 8,205,181 | B1 | 6/2012 | Singla et al. |
| 8,209,400 | B2 | 6/2012 | Baum et al. |
| D663,298 | S | 7/2012 | Song et al. |
| D664,540 | S | 7/2012 | Kim et al. |
| 8,214,494 | B1 | 7/2012 | Slavin |
| 8,219,254 | B2 | 7/2012 | O'Connor |
| 8,229,812 | B2 | 7/2012 | Raleigh |
| D664,954 | S | 8/2012 | Kim et al. |
| D666,198 | S | 8/2012 | Van et al. |
| 8,239,477 | B2 | 8/2012 | Sharma et al. |
| 8,244,550 | B2 | 8/2012 | Sim et al. |
| D667,395 | S | 9/2012 | Lee |
| D667,396 | S | 9/2012 | Koh |
| D667,397 | S | 9/2012 | Koh |
| D667,398 | S | 9/2012 | Koh |

(56) References Cited

U.S. PATENT DOCUMENTS

| | | | |
|---|---|---|---|
| D667,399 S | 9/2012 | Koh | |
| 8,269,623 B2 | 9/2012 | Addy | |
| 8,271,629 B1 | 9/2012 | Winters et al. | |
| 8,272,053 B2 | 9/2012 | Markham et al. | |
| 8,275,830 B2 | 9/2012 | Raleigh | |
| D668,650 S | 10/2012 | Han | |
| D668,651 S | 10/2012 | Kim et al. | |
| D668,652 S | 10/2012 | Kim et al. | |
| D669,469 S | 10/2012 | Kang | |
| D670,692 S | 11/2012 | Akana et al. | |
| D671,514 S | 11/2012 | Kim et al. | |
| 8,311,526 B2 | 11/2012 | Forstall et al. | |
| D671,938 S | 12/2012 | Hsu et al. | |
| D672,344 S | 12/2012 | Li | |
| D672,345 S | 12/2012 | Li | |
| D672,739 S | 12/2012 | Sin | |
| D672,768 S | 12/2012 | Huang et al. | |
| 8,335,854 B2 | 12/2012 | Eldering | |
| 8,336,010 B1 | 12/2012 | Chang et al. | |
| D673,561 S | 1/2013 | Hyun et al. | |
| D673,948 S | 1/2013 | Andre et al. | |
| D673,950 S | 1/2013 | Li et al. | |
| D674,369 S | 1/2013 | Jaewoong | |
| D675,203 S | 1/2013 | Yang | |
| 8,350,694 B1 | 1/2013 | Trundle et al. | |
| 8,363,791 B2 | 1/2013 | Gupta et al. | |
| D675,588 S | 2/2013 | Park | |
| D675,612 S | 2/2013 | Andre et al. | |
| D676,443 S | 2/2013 | Canizares et al. | |
| D676,819 S | 2/2013 | Choi | |
| D677,255 S | 3/2013 | McManigal et al. | |
| D677,640 S | 3/2013 | Kim et al. | |
| D677,659 S | 3/2013 | Akana et al. | |
| D677,660 S | 3/2013 | Groene et al. | |
| D678,271 S | 3/2013 | Chiu | |
| D678,272 S | 3/2013 | Groene et al. | |
| D678,877 S | 3/2013 | Groene et al. | |
| 8,396,766 B1 | 3/2013 | Enright et al. | |
| 8,400,767 B2 | 3/2013 | Yeom et al. | |
| D679,706 S | 4/2013 | Tang et al. | |
| D680,151 S | 4/2013 | Katori | |
| D680,524 S | 4/2013 | Feng et al. | |
| D681,032 S | 4/2013 | Akana et al. | |
| 8,413,204 B2 | 4/2013 | White et al. | |
| D681,583 S | 5/2013 | Park | |
| D681,591 S | 5/2013 | Sung | |
| D681,632 S | 5/2013 | Akana et al. | |
| D682,239 S | 5/2013 | Yeh et al. | |
| 8,451,986 B2 | 5/2013 | Cohn et al. | |
| D684,553 S | 6/2013 | Kim et al. | |
| D684,968 S | 6/2013 | Smith et al. | |
| 8,456,293 B1 | 6/2013 | Trundle et al. | |
| D685,778 S | 7/2013 | Fahrendorff et al. | |
| D685,783 S | 7/2013 | Bryan et al. | |
| 8,478,450 B2 | 7/2013 | Lu et al. | |
| 8,483,853 B1 | 7/2013 | Lambourne | |
| 8,493,202 B1 | 7/2013 | Trundle et al. | |
| 8,499,038 B1 | 7/2013 | Vucurevich | |
| 8,520,072 B1 | 8/2013 | Slavin et al. | |
| 8,525,664 B2 | 9/2013 | Hadizad et al. | |
| 8,543,665 B2 | 9/2013 | Ansari et al. | |
| D692,042 S | 10/2013 | Dawes et al. | |
| 8,554,478 B2 | 10/2013 | Hartman | |
| 8,560,041 B2 | 10/2013 | Flaherty et al. | |
| 8,570,993 B2 | 10/2013 | Austin et al. | |
| 8,584,199 B1 | 11/2013 | Chen et al. | |
| 8,595,377 B1 | 11/2013 | Apgar et al. | |
| D695,735 S | 12/2013 | Kitchen et al. | |
| 8,599,018 B2 | 12/2013 | Kellen et al. | |
| 8,634,533 B2 | 1/2014 | Strasters | |
| 8,635,499 B2 | 1/2014 | Cohn et al. | |
| 8,638,211 B2 | 1/2014 | Cohn et al. | |
| 8,649,386 B2 | 2/2014 | Ansari et al. | |
| 8,650,320 B1 | 2/2014 | Merrick et al. | |
| 8,666,560 B2 | 3/2014 | Lu et al. | |
| 8,675,071 B1 | 3/2014 | Slavin et al. | |
| 8,700,769 B2 | 4/2014 | Alexander et al. | |
| 8,704,821 B2 | 4/2014 | Kulkarni et al. | |
| 8,723,671 B2 | 5/2014 | Foisy et al. | |
| 8,730,834 B2 | 5/2014 | Marusca et al. | |
| 8,738,765 B2 | 5/2014 | Wyatt et al. | |
| 8,812,654 B2 | 8/2014 | Gelvin et al. | |
| 8,817,809 B2 | 8/2014 | Gage | |
| 8,832,244 B2 | 9/2014 | Gelvin et al. | |
| 8,836,467 B1 | 9/2014 | Cohn et al. | |
| 8,885,552 B2 | 11/2014 | Bedingfield et al. | |
| 8,902,740 B2 | 12/2014 | Hicks, III | |
| 8,914,526 B1 | 12/2014 | Lindquist et al. | |
| 8,914,837 B2 | 12/2014 | Ahmed et al. | |
| 8,935,236 B2 | 1/2015 | Morita et al. | |
| 8,937,539 B2 | 1/2015 | Sharma et al. | |
| 8,937,658 B2 | 1/2015 | Hicks et al. | |
| 8,953,479 B2 | 2/2015 | Hall et al. | |
| 8,953,749 B2 | 2/2015 | Naidoo et al. | |
| 8,963,713 B2 | 2/2015 | Dawes et al. | |
| 8,976,763 B2 | 3/2015 | Shrestha et al. | |
| 8,983,534 B2 | 3/2015 | Patel | |
| 8,988,217 B2 | 3/2015 | Piccolo, III | |
| 8,988,221 B2 | 3/2015 | Raji et al. | |
| 8,989,922 B2 | 3/2015 | Jones et al. | |
| 9,047,753 B2 | 6/2015 | Dawes et al. | |
| 9,059,863 B2 | 6/2015 | Baum et al. | |
| 9,064,394 B1 | 6/2015 | Trundle | |
| 9,094,407 B1 | 7/2015 | Matthieu et al. | |
| 9,141,276 B2 | 9/2015 | Dawes et al. | |
| 9,144,143 B2 | 9/2015 | Raji et al. | |
| 9,146,548 B2 | 9/2015 | Chambers et al. | |
| 9,147,337 B2 | 9/2015 | Cohn et al. | |
| 9,160,784 B2 | 10/2015 | Jeong et al. | |
| 9,164,669 B1 | 10/2015 | Yaksick et al. | |
| 9,170,707 B1 | 10/2015 | Laska et al. | |
| 9,172,532 B1 | 10/2015 | Fuller et al. | |
| 9,172,533 B2 | 10/2015 | Fielder | |
| 9,172,605 B2 | 10/2015 | Hardy et al. | |
| 9,189,934 B2 | 11/2015 | Jentoft et al. | |
| 9,191,228 B2 | 11/2015 | Fulker et al. | |
| 9,202,362 B2 | 12/2015 | Hyland et al. | |
| 9,246,921 B1 | 1/2016 | Vlaminck et al. | |
| 9,286,772 B2 | 3/2016 | Shapiro et al. | |
| 9,287,727 B1 | 3/2016 | Egan et al. | |
| 9,300,921 B2 | 3/2016 | Naidoo et al. | |
| 9,310,864 B1 | 4/2016 | Klein et al. | |
| 9,373,014 B1 | 6/2016 | Mehranfar | |
| 9,412,248 B1 | 8/2016 | Cohn et al. | |
| 9,426,720 B2 | 8/2016 | Cohn et al. | |
| 9,462,041 B1 | 10/2016 | Hagins et al. | |
| 9,510,065 B2 | 11/2016 | Cohn et al. | |
| 9,529,344 B1 | 12/2016 | Hagins et al. | |
| 9,531,593 B2 | 12/2016 | Baum et al. | |
| 9,600,945 B2 | 3/2017 | Naidoo et al. | |
| 9,609,003 B1 | 3/2017 | Chmielewski et al. | |
| 9,613,524 B1 | 4/2017 | Lamb et al. | |
| 9,621,408 B2 | 4/2017 | Gutt et al. | |
| 9,721,461 B2 | 8/2017 | Zeng et al. | |
| 9,729,342 B2 | 8/2017 | Cohn et al. | |
| 9,779,595 B2 | 10/2017 | Thibault | |
| 9,805,587 B2 | 10/2017 | Lamb | |
| 9,824,234 B2 | 11/2017 | Cho et al. | |
| 9,843,458 B2 | 12/2017 | Cronin | |
| 9,876,651 B2 | 1/2018 | Cho et al. | |
| 9,882,985 B1 | 1/2018 | Esam et al. | |
| 9,978,238 B2 | 5/2018 | Fadell et al. | |
| 9,979,625 B2 | 5/2018 | McLaughlin et al. | |
| 10,002,507 B2 | 6/2018 | Wilson et al. | |
| 10,025,473 B2 | 7/2018 | Sarao et al. | |
| 10,079,839 B1 | 9/2018 | Bryan et al. | |
| 10,108,272 B1 | 10/2018 | Debates et al. | |
| 10,120,354 B1 | 11/2018 | Rolston et al. | |
| 10,237,237 B2 * | 3/2019 | Dawes | H04W 4/38 |
| 10,237,757 B2 | 3/2019 | Raleigh et al. | |
| 10,257,474 B2 | 4/2019 | Nadathur et al. | |
| 10,264,138 B2 | 4/2019 | Raleigh et al. | |
| 10,354,517 B1 | 7/2019 | King | |
| 10,375,253 B2 | 8/2019 | Dawes | |

(56) References Cited

U.S. PATENT DOCUMENTS 10,380,873 B1 8/2019 Halverson
10,430,887 B1 10/2019 Parker et al.
10,523,689 B2 12/2019 Decenzo et al.
10,674,428 B2 6/2020 Cohn
10,687,270 B2 6/2020 Ishii
10,692,356 B2 6/2020 Sundermeyer et al.
10,741,057 B2 8/2020 Cohn et al.
10,754,304 B2 8/2020 Raji et al.
10,782,681 B1 9/2020 Slavin
10,868,712 B1 12/2020 Hutz
10,890,881 B2 1/2021 Raji et al.
11,184,322 B2 * 11/2021 Dawes .................... H04L 67/01
11,417,159 B2 8/2022 Li et al.
2001/0012775 A1 8/2001 Modzelesky et al.
2001/0016501 A1 8/2001 King
2001/0022836 A1 9/2001 Bremer et al.
2001/0025349 A1 9/2001 Sharood et al.
2001/0029585 A1 10/2001 Simon et al.
2001/0030597 A1 10/2001 Inoue et al.
2001/0034209 A1 10/2001 Tong et al.
2001/0034754 A1 10/2001 Elwahab et al.
2001/0034759 A1 10/2001 Chiles et al.
2001/0036192 A1 11/2001 Chiles et al.
2001/0042137 A1 11/2001 Ota et al.
2001/0044835 A1 11/2001 Schober et al.
2001/0046366 A1 11/2001 Susskind
2001/0047474 A1 11/2001 Takagi et al.
2001/0048030 A1 12/2001 Sharood et al.
2001/0053207 A1 12/2001 Jeon et al.
2001/0054115 A1 12/2001 Ferguson et al.
2002/0000913 A1 1/2002 Hamamoto et al.
2002/0003575 A1 1/2002 Marchese
2002/0004828 A1 1/2002 Davis et al.
2002/0005894 A1 1/2002 Foodman et al.
2002/0016639 A1 2/2002 Smith et al.
2002/0018057 A1 2/2002 Sano
2002/0018478 A1 2/2002 Takeyama et al.
2002/0019751 A1 2/2002 Rothschild et al.
2002/0026476 A1 2/2002 Miyazaki et al.
2002/0026531 A1 2/2002 Keane et al.
2002/0027504 A1 3/2002 Davis et al.
2002/0028696 A1 3/2002 Hirayama et al.
2002/0029276 A1 3/2002 Bendinelli et al.
2002/0031120 A1 3/2002 Rakib
2002/0032853 A1 3/2002 Preston et al.
2002/0035633 A1 3/2002 Bose et al.
2002/0037004 A1 3/2002 Bossemeyer et al.
2002/0038380 A1 3/2002 Brawn et al.
2002/0046280 A1 4/2002 Fujita
2002/0046301 A1 4/2002 Shannon et al.
2002/0052719 A1 5/2002 Alexander et al.
2002/0052913 A1 5/2002 Yamada et al.
2002/0055977 A1 5/2002 Nishi
2002/0059078 A1 5/2002 Valdes et al.
2002/0059148 A1 5/2002 Rosenhaft et al.
2002/0059637 A1 5/2002 Rakib
2002/0068558 A1 6/2002 Janik
2002/0068984 A1 6/2002 Alexander et al.
2002/0072868 A1 6/2002 Bartone et al.
2002/0075153 A1 6/2002 Dahl
2002/0080771 A1 6/2002 Krumel
2002/0083342 A1 6/2002 Webb et al.
2002/0085488 A1 7/2002 Kobayashi
2002/0091815 A1 7/2002 Anderson et al.
2002/0095490 A1 7/2002 Barker et al.
2002/0099809 A1 7/2002 Lee
2002/0099829 A1 7/2002 Richards et al.
2002/0099854 A1 7/2002 Jorgensen
2002/0101858 A1 8/2002 Stuart et al.
2002/0103898 A1 8/2002 Moyer et al.
2002/0103927 A1 8/2002 Parent
2002/0107910 A1 8/2002 Zhao
2002/0109580 A1 8/2002 Shreve et al.
2002/0111698 A1 8/2002 Graziano et al.
2002/0114439 A1 8/2002 Dunlap
2002/0116117 A1 8/2002 Martens et al.
2002/0118107 A1 8/2002 Yamamoto et al.
2002/0118796 A1 8/2002 Menard et al.
2002/0119800 A1 8/2002 Jaggers et al.
2002/0120696 A1 8/2002 Mousseau et al.
2002/0120698 A1 8/2002 Tamargo
2002/0120790 A1 8/2002 Schwalb
2002/0126009 A1 9/2002 Oyagi et al.
2002/0128728 A1 9/2002 Murakami et al.
2002/0131404 A1 9/2002 Mehta et al.
2002/0133539 A1 9/2002 Monday
2002/0133578 A1 9/2002 Wu
2002/0136167 A1 9/2002 Steele et al.
2002/0143805 A1 10/2002 Hayes et al.
2002/0143923 A1 10/2002 Alexander
2002/0147982 A1 10/2002 Naidoo et al.
2002/0150086 A1 10/2002 Bailey et al.
2002/0152298 A1 10/2002 Kikta et al.
2002/0152432 A1 10/2002 Fleming
2002/0156564 A1 10/2002 Preston et al.
2002/0156899 A1 10/2002 Sekiguchi
2002/0161885 A1 10/2002 Childers et al.
2002/0163534 A1 11/2002 Choi et al.
2002/0163997 A1 11/2002 Bergman et al.
2002/0164953 A1 11/2002 Curtis
2002/0164997 A1 11/2002 Parry
2002/0165006 A1 11/2002 Haller et al.
2002/0166125 A1 11/2002 Fulmer
2002/0174367 A1 11/2002 Kimmel et al.
2002/0174434 A1 11/2002 Lee et al.
2002/0177428 A1 11/2002 Menard et al.
2002/0177482 A1 11/2002 Cheong et al.
2002/0178100 A1 11/2002 Koveos
2002/0178211 A1 11/2002 Singhal et al.
2002/0180579 A1 12/2002 Nagaoka et al.
2002/0184301 A1 12/2002 Parent
2002/0184527 A1 12/2002 Chun et al.
2002/0186683 A1 12/2002 Buck et al.
2002/0188723 A1 12/2002 Choi et al.
2002/0191636 A1 12/2002 Hallenbeck
2003/0004088 A1 1/2003 Ushio et al.
2003/0005030 A1 1/2003 Sutton et al.
2003/0006879 A1 1/2003 Kang et al.
2003/0009552 A1 1/2003 Benfield et al.
2003/0009553 A1 1/2003 Benfield et al.
2003/0010243 A1 1/2003 Roller
2003/0023839 A1 1/2003 Burkhardt et al.
2003/0025599 A1 2/2003 Monroe
2003/0028294 A1 2/2003 Yanagi
2003/0028398 A1 2/2003 Yamashita et al.
2003/0030548 A1 2/2003 Kovacs et al.
2003/0031165 A1 2/2003 O'Brien
2003/0038730 A1 2/2003 Imafuku et al.
2003/0038849 A1 2/2003 Craven et al.
2003/0039242 A1 2/2003 Moore
2003/0040813 A1 2/2003 Gonzales et al.
2003/0041137 A1 2/2003 Horie et al.
2003/0041167 A1 2/2003 French et al.
2003/0046557 A1 3/2003 Miller et al.
2003/0050731 A1 3/2003 Rosenblum
2003/0050737 A1 3/2003 Robert
2003/0051009 A1 3/2003 Shah et al.
2003/0051026 A1 3/2003 Carter et al.
2003/0052905 A1 3/2003 Gordon et al.
2003/0052923 A1 3/2003 Porter
2003/0056012 A1 3/2003 Modeste et al.
2003/0056014 A1 3/2003 Verberkt et al.
2003/0060900 A1 3/2003 Lo et al.
2003/0061344 A1 3/2003 Monroe
2003/0061615 A1 3/2003 Van Der Meulen
2003/0061621 A1 3/2003 Petty et al.
2003/0062997 A1 4/2003 Naidoo et al.
2003/0065757 A1 4/2003 Mentze et al.
2003/0065784 A1 4/2003 Herrod
2003/0065791 A1 4/2003 Garg et al.
2003/0067923 A1 4/2003 Ju et al.
2003/0069854 A1 4/2003 Hsu et al.
2003/0069948 A1 4/2003 Ma et al.
2003/0071724 A1 4/2003 D Amico

(56) References Cited

U.S. PATENT DOCUMENTS

2003/0071840 A1 4/2003 Huang et al.
2003/0073406 A1 4/2003 Benjamin et al.
2003/0074088 A1 4/2003 Gonzales et al.
2003/0074090 A1 4/2003 Becka et al.
2003/0081768 A1 5/2003 Caminschi
2003/0084165 A1 5/2003 Kjellberg et al.
2003/0090473 A1 5/2003 Joshi
2003/0096590 A1 5/2003 Satoh
2003/0101243 A1 5/2003 Donahue et al.
2003/0101459 A1 5/2003 Edson
2003/0103088 A1 6/2003 Dresti et al.
2003/0105850 A1 6/2003 Lean et al.
2003/0110262 A1 6/2003 Hasan et al.
2003/0110302 A1 6/2003 Hodges et al.
2003/0112866 A1 6/2003 Yu et al.
2003/0113100 A1 6/2003 Hecht et al.
2003/0115345 A1 6/2003 Chien et al.
2003/0120593 A1 6/2003 Bansal et al.
2003/0123419 A1 7/2003 Rangnekar et al.
2003/0123634 A1 7/2003 Chee
2003/0126236 A1 7/2003 Marl et al.
2003/0128114 A1 7/2003 Quigley
2003/0128115 A1 7/2003 Giacopelli et al.
2003/0132018 A1 7/2003 Okita et al.
2003/0134590 A1 7/2003 Suda et al.
2003/0137426 A1 7/2003 Anthony et al.
2003/0137991 A1 7/2003 Doshi et al.
2003/0147534 A1 8/2003 Ablay et al.
2003/0149671 A1 8/2003 Yamamoto et al.
2003/0153325 A1 8/2003 Veerepalli et al.
2003/0155757 A1 8/2003 Larsen et al.
2003/0158609 A1 8/2003 Chiu
2003/0158635 A1 8/2003 Pillar et al.
2003/0159135 A1 8/2003 Hiller et al.
2003/0163514 A1 8/2003 Waldschmidt
2003/0169728 A1 9/2003 Choi
2003/0172145 A1 9/2003 Nguyen
2003/0174154 A1 9/2003 Yukie et al.
2003/0174648 A1 9/2003 Wang et al.
2003/0174717 A1 9/2003 Zabarski et al.
2003/0177236 A1 9/2003 Goto et al.
2003/0182396 A1 9/2003 Reich et al.
2003/0182640 A1 9/2003 Alani et al.
2003/0184436 A1 10/2003 Seales et al.
2003/0187920 A1 10/2003 Redkar
2003/0187938 A1 10/2003 Mousseau et al.
2003/0189509 A1 10/2003 Hayes et al.
2003/0193991 A1 10/2003 Lansford
2003/0196115 A1 10/2003 Karp
2003/0197847 A1 10/2003 Shinoda
2003/0198938 A1 10/2003 Murray et al.
2003/0200325 A1 10/2003 Krishnaswamy et al.
2003/0201889 A1 10/2003 Zulkowski
2003/0208610 A1 11/2003 Rochetti et al.
2003/0210126 A1 11/2003 Kanazawa
2003/0214775 A1 11/2003 Fukuta
2003/0216143 A1 11/2003 Roese et al.
2003/0217110 A1 11/2003 Weiss
2003/0217136 A1 11/2003 Cho et al.
2003/0225883 A1 12/2003 Greaves et al.
2003/0227382 A1 12/2003 Breed
2003/0227439 A1 12/2003 Lee et al.
2003/0229779 A1 12/2003 Morais et al.
2003/0230934 A1 12/2003 Cordelli et al.
2003/0233155 A1 12/2003 Slemmer et al.
2003/0233332 A1 12/2003 Keeler et al.
2003/0233429 A1 12/2003 Matte et al.
2003/0233549 A1 12/2003 Hatakeyama et al.
2003/0233583 A1 12/2003 Carley
2003/0233594 A1 12/2003 Earl
2003/0236841 A1 12/2003 Epshteyn
2004/0003051 A1 1/2004 Krzyzanowski et al.
2004/0003241 A1 1/2004 Sengodan et al.
2004/0005039 A1 1/2004 White et al.
2004/0008724 A1 1/2004 Devine et al.
2004/0015572 A1 1/2004 Kang
2004/0034697 A1 2/2004 Fairhurst et al.
2004/0034798 A1 2/2004 Yamada et al.
2004/0036615 A1 2/2004 Candela
2004/0037295 A1 2/2004 Tanaka et al.
2004/0039459 A1 2/2004 Daugherty et al.
2004/0049321 A1 3/2004 Lehr et al.
2004/0054789 A1 3/2004 Breh et al.
2004/0056665 A1 3/2004 Iwanaga et al.
2004/0064351 A1 4/2004 Mikurak
2004/0068583 A1 4/2004 Monroe et al.
2004/0068657 A1 4/2004 Alexander et al.
2004/0068668 A1 4/2004 Lor et al.
2004/0075738 A1 4/2004 Burke et al.
2004/0078825 A1 4/2004 Murphy
2004/0083015 A1 4/2004 Patwari
2004/0086093 A1 5/2004 Schranz
2004/0093492 A1 5/2004 Daude et al.
2004/0095943 A1 5/2004 Korotin
2004/0102859 A1 5/2004 Bennett
2004/0103308 A1 5/2004 Paller
2004/0107027 A1 6/2004 Boudrieau
2004/0107299 A1 6/2004 Lee et al.
2004/0111294 A1 6/2004 McNally et al.
2004/0113770 A1 6/2004 Falk et al.
2004/0113778 A1 6/2004 Script et al.
2004/0113937 A1 6/2004 Sawdey et al.
2004/0117068 A1 6/2004 Lee
2004/0117330 A1 6/2004 Ehlers et al.
2004/0117462 A1 6/2004 Bodin et al.
2004/0117465 A1 6/2004 Bodin et al.
2004/0125146 A1 7/2004 Gerlach et al.
2004/0125782 A1 7/2004 Chang
2004/0125931 A1 7/2004 Archer
2004/0133689 A1 7/2004 Vasisht
2004/0136386 A1 7/2004 Miller et al.
2004/0137915 A1 7/2004 Diener et al.
2004/0139227 A1 7/2004 Takeda
2004/0143428 A1 7/2004 Rappaport et al.
2004/0143602 A1 7/2004 Ruiz et al.
2004/0143749 A1 7/2004 Tajalli et al.
2004/0153171 A1 8/2004 Brandt et al.
2004/0155757 A1 8/2004 Litwin et al.
2004/0160309 A1 8/2004 Stilp
2004/0163073 A1 8/2004 Krzyzanowski et al.
2004/0163118 A1 8/2004 Mottur
2004/0163705 A1 8/2004 Uhler
2004/0169288 A1 9/2004 Hsieh et al.
2004/0170120 A1 9/2004 Reunamaki et al.
2004/0170155 A1 9/2004 Omar et al.
2004/0172396 A1 9/2004 Vanska et al.
2004/0172657 A1 9/2004 Phillips et al.
2004/0177163 A1 9/2004 Casey et al.
2004/0181693 A1 9/2004 Milliot et al.
2004/0183756 A1 9/2004 Freitas et al.
2004/0189471 A1 9/2004 Ciarcia et al.
2004/0189871 A1 9/2004 Kurosawa et al.
2004/0196844 A1 10/2004 Hagino
2004/0198386 A1 10/2004 Dupray
2004/0199645 A1 10/2004 Rouhi
2004/0201472 A1 10/2004 McGunn et al.
2004/0202351 A1 10/2004 Park et al.
2004/0212494 A1 10/2004 Stilp
2004/0212503 A1 10/2004 Stilp
2004/0212687 A1 10/2004 Patwari
2004/0213150 A1 10/2004 Krause et al.
2004/0215694 A1 10/2004 Podolsky
2004/0215700 A1 10/2004 Shenfield et al.
2004/0215750 A1 10/2004 Stilp
2004/0215955 A1 10/2004 Tamai et al.
2004/0218591 A1 11/2004 Ogawa et al.
2004/0220830 A1 11/2004 Moreton et al.
2004/0223605 A1 11/2004 Donnelly
2004/0225516 A1 11/2004 Bruskotter et al.
2004/0225719 A1 11/2004 Kisley et al.
2004/0225878 A1 11/2004 Costa-Requena et al.
2004/0229569 A1 11/2004 Franz
2004/0243714 A1 12/2004 Wynn et al.
2004/0243835 A1 12/2004 Terzis et al.

(56) References Cited

U.S. PATENT DOCUMENTS

| | | | |
|---|---|---|---|
| 2004/0243996 | A1 | 12/2004 | Sheehy et al. |
| 2004/0246339 | A1 | 12/2004 | Ooshima et al. |
| 2004/0249613 | A1 | 12/2004 | Sprogis et al. |
| 2004/0249922 | A1 | 12/2004 | Hackman et al. |
| 2004/0253926 | A1 | 12/2004 | Gross |
| 2004/0257433 | A1 | 12/2004 | Lia et al. |
| 2004/0258032 | A1 | 12/2004 | Kawamura |
| 2004/0260407 | A1 | 12/2004 | Wimsatt |
| 2004/0260527 | A1 | 12/2004 | Stanculescu |
| 2004/0263314 | A1 | 12/2004 | Dorai et al. |
| 2004/0263625 | A1 | 12/2004 | Ishigami et al. |
| 2004/0263626 | A1 | 12/2004 | Piccionelli |
| 2004/0266493 | A1 | 12/2004 | Bahl et al. |
| 2004/0267385 | A1 | 12/2004 | Lingemann |
| 2004/0267937 | A1 | 12/2004 | Klemets |
| 2004/0268298 | A1 | 12/2004 | Miller et al. |
| 2005/0002335 | A1 | 1/2005 | Adamczyk et al. |
| 2005/0002408 | A1 | 1/2005 | Lee |
| 2005/0002417 | A1 | 1/2005 | Kelly et al. |
| 2005/0007967 | A1 | 1/2005 | Keskar et al. |
| 2005/0010866 | A1 | 1/2005 | Humpleman et al. |
| 2005/0015458 | A1 | 1/2005 | La |
| 2005/0015805 | A1 | 1/2005 | Iwamura |
| 2005/0021309 | A1 | 1/2005 | Alexander et al. |
| 2005/0021626 | A1 | 1/2005 | Prajapat et al. |
| 2005/0022210 | A1 | 1/2005 | Zintel et al. |
| 2005/0023858 | A1 | 2/2005 | Single et al. |
| 2005/0024203 | A1 | 2/2005 | Wolfe |
| 2005/0030928 | A1 | 2/2005 | Virtanen et al. |
| 2005/0031108 | A1 | 2/2005 | Eshun et al. |
| 2005/0033513 | A1 | 2/2005 | Gasbarro |
| 2005/0038325 | A1 | 2/2005 | Moll |
| 2005/0038326 | A1 | 2/2005 | Mathur |
| 2005/0044061 | A1 | 2/2005 | Klemow |
| 2005/0048957 | A1 | 3/2005 | Casey et al. |
| 2005/0049746 | A1 | 3/2005 | Rosenblum |
| 2005/0050214 | A1 | 3/2005 | Nishiyama et al. |
| 2005/0052831 | A1 | 3/2005 | Chen |
| 2005/0055575 | A1 | 3/2005 | Evans et al. |
| 2005/0055716 | A1 | 3/2005 | Louie et al. |
| 2005/0057361 | A1 | 3/2005 | Giraldo et al. |
| 2005/0060163 | A1 | 3/2005 | Barsness et al. |
| 2005/0060411 | A1 | 3/2005 | Coulombe et al. |
| 2005/0066045 | A1 | 3/2005 | Johnson et al. |
| 2005/0066912 | A1 | 3/2005 | Korbitz et al. |
| 2005/0069098 | A1 | 3/2005 | Kalervo et al. |
| 2005/0071483 | A1 | 3/2005 | Motoyama |
| 2005/0075764 | A1 | 4/2005 | Horst et al. |
| 2005/0079855 | A1 | 4/2005 | Jethi |
| 2005/0079863 | A1 | 4/2005 | Macaluso |
| 2005/0081161 | A1 | 4/2005 | MacInnes et al. |
| 2005/0086093 | A1 | 4/2005 | Hammad et al. |
| 2005/0086126 | A1 | 4/2005 | Patterson |
| 2005/0086211 | A1 | 4/2005 | Mayer |
| 2005/0086366 | A1 | 4/2005 | Luebke et al. |
| 2005/0088983 | A1 | 4/2005 | Wesslen et al. |
| 2005/0089023 | A1 | 4/2005 | Barkley et al. |
| 2005/0090915 | A1 | 4/2005 | Geiwitz |
| 2005/0091435 | A1 | 4/2005 | Han et al. |
| 2005/0091696 | A1 | 4/2005 | Wolfe et al. |
| 2005/0096753 | A1 | 5/2005 | Arling et al. |
| 2005/0101314 | A1 | 5/2005 | Levi |
| 2005/0102152 | A1 | 5/2005 | Hodges |
| 2005/0102497 | A1 | 5/2005 | Buer |
| 2005/0105530 | A1 | 5/2005 | Kono |
| 2005/0108091 | A1 | 5/2005 | Sotak et al. |
| 2005/0108369 | A1 | 5/2005 | Sather et al. |
| 2005/0111660 | A1 | 5/2005 | Hosoda |
| 2005/0114432 | A1 | 5/2005 | Hodges et al. |
| 2005/0114528 | A1 | 5/2005 | Suito |
| 2005/0114900 | A1 | 5/2005 | Ladd et al. |
| 2005/0117602 | A1 | 6/2005 | Carrigan et al. |
| 2005/0117732 | A1 | 6/2005 | Arpin |
| 2005/0119767 | A1 | 6/2005 | Kiwimagi et al. |
| 2005/0119913 | A1 | 6/2005 | Hornreich et al. |
| 2005/0120082 | A1 | 6/2005 | Hesselink et al. |
| 2005/0125083 | A1 | 6/2005 | Kiko |
| 2005/0128068 | A1 | 6/2005 | Winick et al. |
| 2005/0128083 | A1 | 6/2005 | Puzio et al. |
| 2005/0128093 | A1 | 6/2005 | Genova et al. |
| 2005/0128314 | A1 | 6/2005 | Ishino |
| 2005/0144044 | A1 | 6/2005 | Godschall et al. |
| 2005/0144312 | A1 | 6/2005 | Kadyk et al. |
| 2005/0144645 | A1 | 6/2005 | Casey et al. |
| 2005/0148356 | A1 | 7/2005 | Ferguson et al. |
| 2005/0149639 | A1 | 7/2005 | Vrielink et al. |
| 2005/0149746 | A1 | 7/2005 | Lu et al. |
| 2005/0154494 | A1 | 7/2005 | Ahmed |
| 2005/0154774 | A1 | 7/2005 | Giaffreda et al. |
| 2005/0155757 | A1 | 7/2005 | Paton |
| 2005/0156568 | A1 | 7/2005 | Yueh |
| 2005/0156737 | A1 | 7/2005 | Al-Khateeb |
| 2005/0159823 | A1 | 7/2005 | Hayes et al. |
| 2005/0159911 | A1 | 7/2005 | Funk et al. |
| 2005/0169288 | A1 | 8/2005 | Kamiwada et al. |
| 2005/0174229 | A1 | 8/2005 | Feldkamp et al. |
| 2005/0177515 | A1 | 8/2005 | Kalavade et al. |
| 2005/0179531 | A1 | 8/2005 | Tabe |
| 2005/0182681 | A1 | 8/2005 | Bruskotter et al. |
| 2005/0184865 | A1 | 8/2005 | Han |
| 2005/0185618 | A1 | 8/2005 | Friday et al. |
| 2005/0187677 | A1 | 8/2005 | Walker |
| 2005/0188315 | A1 | 8/2005 | Campbell et al. |
| 2005/0197847 | A1 | 9/2005 | Smith |
| 2005/0198216 | A1 | 9/2005 | Behera et al. |
| 2005/0200474 | A1 | 9/2005 | Behnke |
| 2005/0204076 | A1 | 9/2005 | Cumpson et al. |
| 2005/0207429 | A1 | 9/2005 | Akita et al. |
| 2005/0216302 | A1 | 9/2005 | Raji et al. |
| 2005/0216580 | A1 | 9/2005 | Raji et al. |
| 2005/0220123 | A1 | 10/2005 | Wybenga et al. |
| 2005/0222820 | A1 | 10/2005 | Chung |
| 2005/0222933 | A1 | 10/2005 | Wesby |
| 2005/0229016 | A1 | 10/2005 | Addy |
| 2005/0232242 | A1 | 10/2005 | Karaoguz et al. |
| 2005/0232284 | A1 | 10/2005 | Karaoguz et al. |
| 2005/0234568 | A1 | 10/2005 | Chung et al. |
| 2005/0237182 | A1 | 10/2005 | Wang |
| 2005/0246119 | A1 | 11/2005 | Koodali |
| 2005/0246408 | A1 | 11/2005 | Chung |
| 2005/0249199 | A1 | 11/2005 | Albert et al. |
| 2005/0253709 | A1 | 11/2005 | Baker |
| 2005/0256608 | A1 | 11/2005 | King et al. |
| 2005/0257013 | A1 | 11/2005 | Ma |
| 2005/0257260 | A1 | 11/2005 | Lenoir et al. |
| 2005/0259673 | A1 | 11/2005 | Lu et al. |
| 2005/0262241 | A1 | 11/2005 | Gubbi et al. |
| 2005/0266826 | A1 | 12/2005 | Vlad |
| 2005/0267605 | A1 | 12/2005 | Lee et al. |
| 2005/0270151 | A1 | 12/2005 | Winick |
| 2005/0273831 | A1 | 12/2005 | Slomovich et al. |
| 2005/0276389 | A1 | 12/2005 | Hinkson et al. |
| 2005/0277434 | A1 | 12/2005 | Tuomi et al. |
| 2005/0280964 | A1 | 12/2005 | Richmond et al. |
| 2005/0281196 | A1 | 12/2005 | Tornetta et al. |
| 2005/0282557 | A1 | 12/2005 | Mikko et al. |
| 2005/0285934 | A1 | 12/2005 | Carter |
| 2005/0285941 | A1 | 12/2005 | Haigh et al. |
| 2005/0286518 | A1 | 12/2005 | Park et al. |
| 2006/0007005 | A1 | 1/2006 | Yui et al. |
| 2006/0009863 | A1 | 1/2006 | Lingemann |
| 2006/0015943 | A1 | 1/2006 | Mahieu |
| 2006/0018328 | A1 | 1/2006 | Mody et al. |
| 2006/0018479 | A1 | 1/2006 | Chen |
| 2006/0022816 | A1 | 2/2006 | Yukawa |
| 2006/0023847 | A1 | 2/2006 | Tyroler et al. |
| 2006/0026017 | A1 | 2/2006 | Walker |
| 2006/0026301 | A1 | 2/2006 | Maeda et al. |
| 2006/0028997 | A1 | 2/2006 | McFarland |
| 2006/0031426 | A1 | 2/2006 | Mesarina et al. |
| 2006/0031436 | A1 | 2/2006 | Sakata et al. |
| 2006/0031852 | A1 | 2/2006 | Chu et al. |
| 2006/0036750 | A1 | 2/2006 | Ladd et al. |
| 2006/0041655 | A1 | 2/2006 | Holloway et al. |

(56) References Cited

U.S. PATENT DOCUMENTS

| | | | |
|---|---|---|---|
| 2006/0045074 | A1 | 3/2006 | Lee |
| 2006/0050692 | A1 | 3/2006 | Petrescu et al. |
| 2006/0050862 | A1 | 3/2006 | Shen et al. |
| 2006/0051122 | A1 | 3/2006 | Kawazu et al. |
| 2006/0052884 | A1 | 3/2006 | Staples et al. |
| 2006/0053447 | A1 | 3/2006 | Krzyzanowski et al. |
| 2006/0053459 | A1 | 3/2006 | Simerly et al. |
| 2006/0053491 | A1 | 3/2006 | Khuti et al. |
| 2006/0058923 | A1 | 3/2006 | Kruk |
| 2006/0063534 | A1 | 3/2006 | Kokkonen et al. |
| 2006/0064305 | A1 | 3/2006 | Alonso |
| 2006/0064478 | A1 | 3/2006 | Sirkin |
| 2006/0067344 | A1 | 3/2006 | Sakurai |
| 2006/0067356 | A1 | 3/2006 | Kim et al. |
| 2006/0067484 | A1 | 3/2006 | Elliot et al. |
| 2006/0071773 | A1 | 4/2006 | Ahmed et al. |
| 2006/0072470 | A1 | 4/2006 | Moore et al. |
| 2006/0075235 | A1 | 4/2006 | Renkis |
| 2006/0077254 | A1 | 4/2006 | Shu et al. |
| 2006/0078344 | A1 | 4/2006 | Kawazu et al. |
| 2006/0080380 | A1 | 4/2006 | Aizu et al. |
| 2006/0080465 | A1 | 4/2006 | Conzola et al. |
| 2006/0088092 | A1 | 4/2006 | Chen et al. |
| 2006/0093365 | A1 | 5/2006 | Dybsetter et al. |
| 2006/0094400 | A1 | 5/2006 | Beachem et al. |
| 2006/0101062 | A1 | 5/2006 | Godman et al. |
| 2006/0103510 | A1 | 5/2006 | Chen et al. |
| 2006/0104312 | A1 | 5/2006 | Friar |
| 2006/0105713 | A1 | 5/2006 | Zheng et al. |
| 2006/0106933 | A1 | 5/2006 | Huang et al. |
| 2006/0109113 | A1 | 5/2006 | Reyes et al. |
| 2006/0109860 | A1 | 5/2006 | Matsunaga et al. |
| 2006/0109966 | A1 | 5/2006 | Sasakura et al. |
| 2006/0111095 | A1 | 5/2006 | Weigand |
| 2006/0114842 | A1 | 6/2006 | Miyamoto et al. |
| 2006/0121924 | A1 | 6/2006 | Rengaraj et al. |
| 2006/0123212 | A1 | 6/2006 | Yagawa |
| 2006/0129837 | A1 | 6/2006 | Im et al. |
| 2006/0130004 | A1 | 6/2006 | Hughes et al. |
| 2006/0132302 | A1 | 6/2006 | Stilp |
| 2006/0133412 | A1 | 6/2006 | Callaghan |
| 2006/0136558 | A1 | 6/2006 | Sheehan et al. |
| 2006/0142968 | A1 | 6/2006 | Han et al. |
| 2006/0142978 | A1 | 6/2006 | Suenbuel et al. |
| 2006/0143268 | A1 | 6/2006 | Chatani |
| 2006/0145842 | A1 | 7/2006 | Stilp |
| 2006/0153122 | A1 | 7/2006 | Hinman et al. |
| 2006/0154642 | A1 | 7/2006 | Scannell, Jr. |
| 2006/0155851 | A1 | 7/2006 | Ma et al. |
| 2006/0159032 | A1 | 7/2006 | Iz et al. |
| 2006/0161270 | A1 | 7/2006 | Luskin et al. |
| 2006/0161662 | A1 | 7/2006 | Ng et al. |
| 2006/0161960 | A1 | 7/2006 | Benoit |
| 2006/0167784 | A1 | 7/2006 | Hoffberg |
| 2006/0167919 | A1 | 7/2006 | Hsieh |
| 2006/0168013 | A1 | 7/2006 | Wilson et al. |
| 2006/0168095 | A1 | 7/2006 | Sharma et al. |
| 2006/0168178 | A1 | 7/2006 | Hwang et al. |
| 2006/0168190 | A1 | 7/2006 | Johan et al. |
| 2006/0171307 | A1 | 8/2006 | Gopalakrishnan et al. |
| 2006/0176146 | A1 | 8/2006 | Krishan et al. |
| 2006/0176167 | A1 | 8/2006 | Dohrmann |
| 2006/0181406 | A1 | 8/2006 | Petite et al. |
| 2006/0182100 | A1 | 8/2006 | Li et al. |
| 2006/0187900 | A1 | 8/2006 | Akbar |
| 2006/0189311 | A1 | 8/2006 | Cromer et al. |
| 2006/0190458 | A1 | 8/2006 | Mishina et al. |
| 2006/0190529 | A1 | 8/2006 | Morozumi et al. |
| 2006/0197660 | A1 | 9/2006 | Luebke et al. |
| 2006/0200845 | A1 | 9/2006 | Foster et al. |
| 2006/0206220 | A1 | 9/2006 | Amundson |
| 2006/0206246 | A1 | 9/2006 | Walker |
| 2006/0208872 | A1 | 9/2006 | Yu et al. |
| 2006/0208880 | A1 | 9/2006 | Funk et al. |
| 2006/0209857 | A1 | 9/2006 | Hicks |
| 2006/0215650 | A1 | 9/2006 | Wollmershauser et al. |
| 2006/0217115 | A1 | 9/2006 | Cassett et al. |
| 2006/0218244 | A1 | 9/2006 | Rasmussen et al. |
| 2006/0218593 | A1 | 9/2006 | Afshary et al. |
| 2006/0221184 | A1 | 10/2006 | Vallone et al. |
| 2006/0222153 | A1 | 10/2006 | Tarkoff et al. |
| 2006/0226972 | A1 | 10/2006 | Smith |
| 2006/0229746 | A1 | 10/2006 | Ollis et al. |
| 2006/0230270 | A1 | 10/2006 | Goffin |
| 2006/0233372 | A1 | 10/2006 | Shaheen et al. |
| 2006/0235963 | A1 | 10/2006 | Wetherly et al. |
| 2006/0236050 | A1 | 10/2006 | Sugimoto et al. |
| 2006/0238372 | A1 | 10/2006 | Jung et al. |
| 2006/0238617 | A1 | 10/2006 | Tamir |
| 2006/0242395 | A1 | 10/2006 | Fausak |
| 2006/0244589 | A1 | 11/2006 | Schranz |
| 2006/0245369 | A1 | 11/2006 | Schimmelpfeng et al. |
| 2006/0246886 | A1 | 11/2006 | Benco et al. |
| 2006/0246919 | A1 | 11/2006 | Park et al. |
| 2006/0250235 | A1 | 11/2006 | Astrin |
| 2006/0250578 | A1 | 11/2006 | Pohl et al. |
| 2006/0251255 | A1 | 11/2006 | Batta |
| 2006/0258342 | A1 | 11/2006 | Fok et al. |
| 2006/0259951 | A1 | 11/2006 | Forssell et al. |
| 2006/0265489 | A1 | 11/2006 | Moore |
| 2006/0271695 | A1 | 11/2006 | Lavian |
| 2006/0274764 | A1 | 12/2006 | Mah et al. |
| 2006/0281435 | A1 | 12/2006 | Shearer et al. |
| 2006/0282886 | A1 | 12/2006 | Gaug |
| 2006/0288288 | A1 | 12/2006 | Girgensohn et al. |
| 2006/0291507 | A1 | 12/2006 | Sarosi et al. |
| 2006/0293100 | A1 | 12/2006 | Walter |
| 2006/0294565 | A1 | 12/2006 | Walter |
| 2007/0001818 | A1 | 1/2007 | Small et al. |
| 2007/0002833 | A1 | 1/2007 | Bajic |
| 2007/0005736 | A1 | 1/2007 | Hansen et al. |
| 2007/0005957 | A1 | 1/2007 | Sahita et al. |
| 2007/0006177 | A1 | 1/2007 | Aiber et al. |
| 2007/0008099 | A1 | 1/2007 | Kimmel et al. |
| 2007/0014248 | A1 | 1/2007 | Fowlow |
| 2007/0027987 | A1 | 2/2007 | Tripp et al. |
| 2007/0043478 | A1 | 2/2007 | Ehlers et al. |
| 2007/0043954 | A1 | 2/2007 | Fox |
| 2007/0046462 | A1 | 3/2007 | Fancella |
| 2007/0047585 | A1 | 3/2007 | Gillespie et al. |
| 2007/0052675 | A1 | 3/2007 | Chang |
| 2007/0055770 | A1 | 3/2007 | Karmakar et al. |
| 2007/0058627 | A1 | 3/2007 | Smith et al. |
| 2007/0061018 | A1 | 3/2007 | Callaghan et al. |
| 2007/0061020 | A1 | 3/2007 | Bovee et al. |
| 2007/0061266 | A1 | 3/2007 | Moore et al. |
| 2007/0061430 | A1 | 3/2007 | Kim |
| 2007/0061878 | A1 | 3/2007 | Hagiu et al. |
| 2007/0063836 | A1 | 3/2007 | Hayden et al. |
| 2007/0063866 | A1 | 3/2007 | Webb |
| 2007/0064714 | A1 | 3/2007 | Bi et al. |
| 2007/0067780 | A1 | 3/2007 | Kumar et al. |
| 2007/0079012 | A1 | 4/2007 | Walker |
| 2007/0079151 | A1 | 4/2007 | Connor et al. |
| 2007/0079385 | A1 | 4/2007 | Williams et al. |
| 2007/0083668 | A1 | 4/2007 | Kelsey et al. |
| 2007/0090944 | A1 | 4/2007 | Du Breuil |
| 2007/0094716 | A1 | 4/2007 | Farino et al. |
| 2007/0096981 | A1 | 5/2007 | Abraham |
| 2007/0101345 | A1 | 5/2007 | Takagi |
| 2007/0105072 | A1 | 5/2007 | Koljonen |
| 2007/0106124 | A1 | 5/2007 | Kuriyama et al. |
| 2007/0106536 | A1 | 5/2007 | Moore |
| 2007/0106547 | A1 | 5/2007 | Agrawal |
| 2007/0109975 | A1 | 5/2007 | Reckamp et al. |
| 2007/0116020 | A1 | 5/2007 | Cheever et al. |
| 2007/0117464 | A1 | 5/2007 | Freeman |
| 2007/0118609 | A1 | 5/2007 | Mullan et al. |
| 2007/0126875 | A1 | 6/2007 | Miyamaki |
| 2007/0127510 | A1 | 6/2007 | Bossemeyer et al. |
| 2007/0132576 | A1 | 6/2007 | Kolavennu et al. |
| 2007/0136759 | A1 | 6/2007 | Zhang et al. |
| 2007/0140267 | A1 | 6/2007 | Yang |
| 2007/0142022 | A1 | 6/2007 | Madonna et al. |

(56) References Cited

U.S. PATENT DOCUMENTS

2007/0142044 A1 6/2007 Fitzgerald et al.
2007/0143400 A1 6/2007 Kelley et al.
2007/0143440 A1 6/2007 Reckamp et al.
2007/0146127 A1 6/2007 Stilp et al.
2007/0146484 A1 6/2007 Horton et al.
2007/0147419 A1 6/2007 Tsujimoto et al.
2007/0150616 A1 6/2007 Baek et al.
2007/0154010 A1 7/2007 Wong
2007/0155325 A1 7/2007 Bambic et al.
2007/0155423 A1 7/2007 Carmody et al.
2007/0156689 A1 7/2007 Meek et al.
2007/0160017 A1 7/2007 Meier et al.
2007/0161372 A1 7/2007 Rogalski et al.
2007/0162228 A1 7/2007 Mitchell
2007/0162680 A1 7/2007 Mitchell
2007/0164779 A1 7/2007 Weston et al.
2007/0168860 A1 7/2007 Takayama et al.
2007/0176766 A1 8/2007 Cheng
2007/0182543 A1 8/2007 Luo
2007/0182819 A1 8/2007 Monroe
2007/0183345 A1 8/2007 Fahim et al.
2007/0185989 A1 8/2007 Corbett et al.
2007/0192486 A1 8/2007 Wilson et al.
2007/0192863 A1 8/2007 Kapoor et al.
2007/0197236 A1 8/2007 Ahn et al.
2007/0198698 A1 8/2007 Boyd et al.
2007/0200658 A1 8/2007 Yang
2007/0208521 A1 9/2007 Petite et al.
2007/0214262 A1 9/2007 Buchbinder et al.
2007/0214264 A1 9/2007 Koister
2007/0216764 A1 9/2007 Kwak
2007/0216783 A1 9/2007 Ortiz et al.
2007/0218895 A1 9/2007 Saito et al.
2007/0223465 A1 9/2007 Wang et al.
2007/0223500 A1 9/2007 Lee et al.
2007/0226182 A1 9/2007 Sobotka et al.
2007/0230415 A1 10/2007 Malik
2007/0230744 A1 10/2007 Dronge
2007/0245223 A1 10/2007 Siedzik et al.
2007/0249323 A1 10/2007 Lee et al.
2007/0253361 A1 11/2007 Pristas et al.
2007/0255856 A1 11/2007 Reckamp et al.
2007/0256105 A1 11/2007 Tabe
2007/0257986 A1 11/2007 Ivanov et al.
2007/0260713 A1 11/2007 Moorer et al.
2007/0262857 A1 11/2007 Jackson
2007/0263782 A1 11/2007 Stock et al.
2007/0265866 A1 11/2007 Fehling et al.
2007/0271398 A1 11/2007 Manchester et al.
2007/0275703 A1 11/2007 Lim et al.
2007/0277111 A1 11/2007 Bennett et al.
2007/0282665 A1 12/2007 Buehler et al.
2007/0283001 A1 12/2007 Spiess et al.
2007/0283004 A1 12/2007 Buehler
2007/0286210 A1 12/2007 Gutt et al.
2007/0286369 A1 12/2007 Gutt et al.
2007/0287405 A1 12/2007 Radtke
2007/0288849 A1 12/2007 Moorer et al.
2007/0288858 A1 12/2007 Pereira
2007/0290830 A1 12/2007 Gurley
2007/0291118 A1 12/2007 Shu et al.
2007/0296814 A1 12/2007 Cooper et al.
2007/0298772 A1 12/2007 Owens et al.
2008/0001734 A1 1/2008 Stilp et al.
2008/0013531 A1 1/2008 Elliott et al.
2008/0013957 A1 1/2008 Akers et al.
2008/0025487 A1 1/2008 Johan et al.
2008/0027587 A1 1/2008 Nickerson et al.
2008/0040272 A1 2/2008 Eskin
2008/0042826 A1 2/2008 Hevia et al.
2008/0043107 A1 2/2008 Coogan et al.
2008/0046593 A1 2/2008 Ando et al.
2008/0048975 A1 2/2008 Leibow
2008/0052348 A1 2/2008 Adler et al.
2008/0056212 A1 3/2008 Karaoguz et al.
2008/0056261 A1 3/2008 Osborn et al.
2008/0059533 A1 3/2008 Krikorian
2008/0059622 A1 3/2008 Hite et al.
2008/0065681 A1 3/2008 Fontijn et al.
2008/0065685 A1 3/2008 Frank
2008/0069121 A1 3/2008 Adamson et al.
2008/0072244 A1 3/2008 Eker et al.
2008/0074258 A1 3/2008 Bennett et al.
2008/0074993 A1 3/2008 Vainola
2008/0082186 A1 4/2008 Hood et al.
2008/0084294 A1 4/2008 Zhiying et al.
2008/0084296 A1 4/2008 Kutzik et al.
2008/0086564 A1 4/2008 Putman et al.
2008/0091793 A1 4/2008 Diroo et al.
2008/0094204 A1 4/2008 Kogan et al.
2008/0095339 A1 4/2008 Elliott et al.
2008/0100705 A1 5/2008 Kister et al.
2008/0102845 A1 5/2008 Zhao
2008/0103608 A1 5/2008 Gough et al.
2008/0104215 A1 5/2008 Excoffier et al.
2008/0104516 A1 5/2008 Lee
2008/0109302 A1 5/2008 Salokannel et al.
2008/0109650 A1 5/2008 Shim et al.
2008/0112340 A1 5/2008 Luebke
2008/0112405 A1 5/2008 Cholas et al.
2008/0117029 A1 5/2008 Dohrmann et al.
2008/0117201 A1 5/2008 Martinez et al.
2008/0117922 A1 5/2008 Cockrell et al.
2008/0120405 A1 5/2008 Son et al.
2008/0122575 A1 5/2008 Lavian et al.
2008/0126535 A1 5/2008 Zhu et al.
2008/0128444 A1 6/2008 Schininger et al.
2008/0129484 A1 6/2008 Dahl et al.
2008/0129821 A1 6/2008 Howarter et al.
2008/0130949 A1 6/2008 Ivanov et al.
2008/0133725 A1 6/2008 Shaouy
2008/0134165 A1 6/2008 Anderson et al.
2008/0134343 A1 6/2008 Pennington et al.
2008/0137572 A1 6/2008 Park et al.
2008/0140868 A1 6/2008 Kalayjian et al.
2008/0141303 A1 6/2008 Walker et al.
2008/0141341 A1 6/2008 Mnogradov et al.
2008/0144884 A1 6/2008 Habibi
2008/0147834 A1 6/2008 Quinn et al.
2008/0151037 A1 6/2008 Kumarasamy et al.
2008/0155080 A1 6/2008 Marlow et al.
2008/0155470 A1 6/2008 Khedouri et al.
2008/0162637 A1 7/2008 Adamczyk et al.
2008/0163355 A1 7/2008 Chu
2008/0165787 A1 7/2008 Ku et al.
2008/0170511 A1 7/2008 Shorty et al.
2008/0180240 A1 7/2008 Raji et al.
2008/0181239 A1 7/2008 Wood et al.
2008/0183483 A1 7/2008 Hart
2008/0183842 A1 7/2008 Raji et al.
2008/0189609 A1 8/2008 Larson et al.
2008/0201468 A1 8/2008 Titus
2008/0201723 A1 8/2008 Bottaro et al.
2008/0208399 A1 8/2008 Pham
2008/0209505 A1 8/2008 Ghai et al.
2008/0209506 A1 8/2008 Ghai et al.
2008/0215450 A1 9/2008 Gates et al.
2008/0215613 A1 9/2008 Grasso
2008/0219239 A1 9/2008 Bell et al.
2008/0221715 A1 9/2008 Krzyzanowski et al.
2008/0227460 A1 9/2008 David et al.
2008/0229415 A1 9/2008 Kapoor et al.
2008/0235326 A1 9/2008 Parsi et al.
2008/0235600 A1 9/2008 Harper et al.
2008/0239075 A1 10/2008 Mehrotra et al.
2008/0240372 A1 10/2008 Frenette
2008/0240696 A1 10/2008 Kucharyson
2008/0259818 A1 10/2008 Balassanian
2008/0261540 A1 10/2008 Rohani et al.
2008/0262990 A1 10/2008 Kapoor et al.
2008/0262991 A1 10/2008 Kapoor et al.
2008/0263150 A1 10/2008 Childers et al.
2008/0266080 A1 10/2008 Leung et al.
2008/0266257 A1 10/2008 Chiang

(56) References Cited

U.S. PATENT DOCUMENTS

2008/0271150 A1 10/2008 Boerger et al.
2008/0284580 A1 11/2008 Babich et al.
2008/0284587 A1 11/2008 Saigh et al.
2008/0284592 A1 11/2008 Collins et al.
2008/0288639 A1 11/2008 Ruppert et al.
2008/0294588 A1 11/2008 Morris et al.
2008/0295172 A1 11/2008 Bohacek
2008/0297599 A1 12/2008 Donovan et al.
2008/0303903 A1 12/2008 Bentley et al.
2008/0313316 A1 12/2008 Hite et al.
2008/0316024 A1 12/2008 Chantelou et al.
2009/0003172 A1 1/2009 Yahata et al.
2009/0003252 A1 1/2009 Salomone et al.
2009/0003820 A1 1/2009 Law et al.
2009/0007596 A1 1/2009 Goldstein et al.
2009/0013210 A1 1/2009 McIntosh et al.
2009/0018850 A1 1/2009 Abhyanker
2009/0019141 A1 1/2009 Bush et al.
2009/0022362 A1 1/2009 Gagvani et al.
2009/0036142 A1 2/2009 Yan
2009/0036159 A1 2/2009 Chen
2009/0041467 A1 2/2009 Carleton et al.
2009/0042649 A1 2/2009 Hsieh et al.
2009/0046664 A1 2/2009 Aso
2009/0049094 A1 2/2009 Howell et al.
2009/0049488 A1 2/2009 Stransky
2009/0051769 A1 2/2009 Kuo et al.
2009/0055760 A1 2/2009 Whatcott et al.
2009/0057427 A1 3/2009 Geadelmann et al.
2009/0063582 A1 3/2009 Anna et al.
2009/0066534 A1 3/2009 Sivakkolundhu
2009/0066789 A1 3/2009 Baum et al.
2009/0067395 A1 3/2009 Curtis et al.
2009/0070436 A1 3/2009 Dawes et al.
2009/0070477 A1 3/2009 Baum et al.
2009/0070681 A1 3/2009 Dawes et al.
2009/0070682 A1 3/2009 Dawes et al.
2009/0070692 A1 3/2009 Dawes et al.
2009/0072988 A1 3/2009 Haywood
2009/0074184 A1 3/2009 Baum et al.
2009/0076211 A1 3/2009 Yang et al.
2009/0076879 A1 3/2009 Sparks et al.
2009/0077167 A1 3/2009 Baum et al.
2009/0077622 A1 3/2009 Baum et al.
2009/0077623 A1 3/2009 Baum et al.
2009/0077624 A1 3/2009 Baum et al.
2009/0079547 A1 3/2009 Oksanen et al.
2009/0083167 A1 3/2009 Subbloie
2009/0086660 A1 4/2009 Sood et al.
2009/0086740 A1 4/2009 Al-Bakri et al.
2009/0089822 A1 4/2009 Wada
2009/0092283 A1 4/2009 Whillock et al.
2009/0094671 A1 4/2009 Kurapati et al.
2009/0100176 A1 4/2009 Hicks, III et al.
2009/0100329 A1 4/2009 Espinoza
2009/0100460 A1 4/2009 Hicks et al.
2009/0100492 A1 4/2009 Hicks et al.
2009/0109959 A1 4/2009 Elliott et al.
2009/0113344 A1 4/2009 Nesse et al.
2009/0119397 A1 5/2009 Neerdaels
2009/0125708 A1 5/2009 Woodring et al.
2009/0128365 A1 5/2009 Laskin
2009/0134998 A1 5/2009 Baum et al.
2009/0138600 A1 5/2009 Baum et al.
2009/0138958 A1 5/2009 Baum et al.
2009/0144237 A1 6/2009 Branam et al.
2009/0146846 A1 6/2009 Grossman
2009/0158189 A1 6/2009 Itani
2009/0158292 A1 6/2009 Rattner et al.
2009/0161609 A1 6/2009 Bergstrom
2009/0165114 A1 6/2009 Baum et al.
2009/0172443 A1 7/2009 Rothman et al.
2009/0177298 A1 7/2009 McFarland et al.
2009/0177906 A1 7/2009 Paniagua et al.
2009/0180430 A1 7/2009 Fadell
2009/0182868 A1 7/2009 McFate et al.
2009/0187297 A1 7/2009 Kish et al.
2009/0189981 A1 7/2009 Siann et al.
2009/0193373 A1 7/2009 Abbaspour et al.
2009/0197539 A1 8/2009 Shiba
2009/0202250 A1 8/2009 Dizechi et al.
2009/0204693 A1 8/2009 Andreev et al.
2009/0221368 A1 9/2009 Yen et al.
2009/0224875 A1 9/2009 Rabinowitz et al.
2009/0228445 A1 9/2009 Gangal
2009/0240353 A1 9/2009 Songkakul et al.
2009/0240730 A1 9/2009 Wood
2009/0240787 A1 9/2009 Denny
2009/0240814 A1 9/2009 Brubacher et al.
2009/0240946 A1 9/2009 Yeap et al.
2009/0254960 A1 10/2009 Yarom et al.
2009/0256708 A1 10/2009 Hsiao et al.
2009/0259515 A1 10/2009 Belimpasakis et al.
2009/0260052 A1 10/2009 Bathula et al.
2009/0260083 A1 10/2009 Szeto et al.
2009/0260430 A1 10/2009 Zamfes
2009/0265042 A1 10/2009 Mollenkopf et al.
2009/0265193 A1 10/2009 Collins et al.
2009/0270090 A1 10/2009 Kawamura
2009/0271042 A1 10/2009 Voysey
2009/0289787 A1 11/2009 Dawson et al.
2009/0289788 A1 11/2009 Leblond
2009/0292909 A1 11/2009 Feder et al.
2009/0303100 A1 12/2009 Zemany
2009/0307255 A1 12/2009 Park
2009/0307307 A1 12/2009 Igarashi
2009/0313693 A1 12/2009 Rogers
2009/0316671 A1 12/2009 Rolf et al.
2009/0319361 A1 12/2009 Conrady
2009/0322510 A1 12/2009 Berger et al.
2009/0324010 A1 12/2009 Hou
2009/0327483 A1 12/2009 Thompson et al.
2009/0327510 A1 12/2009 Edelman et al.
2010/0000791 A1 1/2010 Alberty
2010/0001812 A1 1/2010 Kausch
2010/0004949 A1 1/2010 O'Brien
2010/0008274 A1 1/2010 Kneckt et al.
2010/0009758 A1 1/2010 Twitchell, Jr.
2010/0011298 A1 1/2010 Campbell et al.
2010/0013917 A1 1/2010 Hanna et al.
2010/0023865 A1 1/2010 Fulker et al.
2010/0026481 A1 2/2010 Oh et al.
2010/0026487 A1 2/2010 Hershkovitz
2010/0030578 A1 2/2010 Siddique et al.
2010/0030810 A1 2/2010 Marr
2010/0039958 A1 2/2010 Ge et al.
2010/0041380 A1 2/2010 Hewes et al.
2010/0042954 A1 2/2010 Rosenblatt et al.
2010/0067371 A1 3/2010 Gogic et al.
2010/0070618 A1 3/2010 Kim et al.
2010/0071053 A1 3/2010 Ansari et al.
2010/0074112 A1 3/2010 Derr et al.
2010/0077111 A1 3/2010 Holmes et al.
2010/0077347 A1 3/2010 Kirtane et al.
2010/0082744 A1 4/2010 Raji et al.
2010/0095111 A1 4/2010 Gutt et al.
2010/0095369 A1 4/2010 Gutt et al.
2010/0100269 A1 4/2010 Ekhaguere et al.
2010/0102951 A1 4/2010 Rutledge
2010/0121521 A1 5/2010 Kiribayashi
2010/0122091 A1 5/2010 Huang et al.
2010/0138758 A1 6/2010 Mizumori et al.
2010/0138764 A1 6/2010 Hatambeiki et al.
2010/0141762 A1 6/2010 Siann et al.
2010/0145485 A1 6/2010 Duchene et al.
2010/0150170 A1 6/2010 Lee et al.
2010/0159898 A1 6/2010 Krzyzanowski et al.
2010/0159967 A1 6/2010 Pounds et al.
2010/0164736 A1 7/2010 Byers et al.
2010/0165897 A1 7/2010 Sood
2010/0174643 A1 7/2010 Schaefer et al.
2010/0177749 A1 7/2010 Essinger et al.
2010/0177750 A1 7/2010 Essinger et al.
2010/0185857 A1 7/2010 Neitzel et al.

(56) References Cited

U.S. PATENT DOCUMENTS

2010/0191352 A1 7/2010 Quail
2010/0197219 A1 8/2010 Issa et al.
2010/0204839 A1 8/2010 Behm et al.
2010/0210240 A1 8/2010 Mahaffey et al.
2010/0212012 A1 8/2010 Touboul et al.
2010/0218104 A1 8/2010 Lewis
2010/0222069 A1 9/2010 Abraham et al.
2010/0238286 A1 9/2010 Boghossian et al.
2010/0241711 A1 9/2010 Ansari et al.
2010/0241748 A1 9/2010 Ansari et al.
2010/0248681 A1 9/2010 Phills
2010/0267390 A1 10/2010 Lin et al.
2010/0274366 A1 10/2010 Fata et al.
2010/0275018 A1 10/2010 Pedersen
2010/0277302 A1 11/2010 Cohn et al.
2010/0279649 A1 11/2010 Thomas
2010/0280635 A1 11/2010 Cohn et al.
2010/0280637 A1 11/2010 Cohn et al.
2010/0281135 A1 11/2010 Cohn et al.
2010/0281161 A1 11/2010 Cohn et al.
2010/0298024 A1 11/2010 Choi
2010/0299556 A1 11/2010 Taylor et al.
2010/0308990 A1 12/2010 Simon et al.
2010/0321151 A1 12/2010 Matsuura et al.
2010/0325107 A1 12/2010 Kenton et al.
2010/0332164 A1 12/2010 Msa et al.
2011/0000521 A1 1/2011 Tachibana
2011/0018998 A1 1/2011 Guzik
2011/0029875 A1 2/2011 Milch
2011/0030056 A1 2/2011 Tokunaga
2011/0037593 A1 2/2011 Foisy et al.
2011/0040415 A1 2/2011 Nickerson et al.
2011/0040877 A1 2/2011 Foisy
2011/0046792 A1 2/2011 Imes et al.
2011/0051638 A1 3/2011 Jeon et al.
2011/0058034 A1 3/2011 Grass
2011/0061011 A1 3/2011 Hoguet
2011/0068921 A1 3/2011 Shafer
2011/0080267 A1 4/2011 Clare et al.
2011/0087988 A1 4/2011 Ray et al.
2011/0093799 A1 4/2011 Hatambeiki et al.
2011/0096678 A1 4/2011 Ketonen
2011/0102588 A1 5/2011 Trundle et al.
2011/0107436 A1 5/2011 Cholas et al.
2011/0125333 A1 5/2011 Gray
2011/0125846 A1 5/2011 Ham et al.
2011/0128378 A1 6/2011 Raji
2011/0130112 A1 6/2011 Saigh et al.
2011/0131226 A1 6/2011 Chandra et al.
2011/0148572 A1 6/2011 Ku
2011/0156914 A1 6/2011 Sheharri et al.
2011/0169637 A1 7/2011 Siegler et al.
2011/0187497 A1 8/2011 Chin
2011/0197327 A1 8/2011 McElroy et al.
2011/0200052 A1 8/2011 Mungo et al.
2011/0208359 A1 8/2011 Duchene et al.
2011/0212706 A1 9/2011 Uusilehto
2011/0213869 A1 9/2011 Korsunsky et al.
2011/0214157 A1 9/2011 Korsunsky et al.
2011/0218777 A1 9/2011 Chen et al.
2011/0219035 A1 9/2011 Korsunsky et al.
2011/0230139 A1 9/2011 Nakahara
2011/0230160 A1 9/2011 Felgate
2011/0231510 A1 9/2011 Korsunsky et al.
2011/0231564 A1 9/2011 Korsunsky et al.
2011/0234392 A1 9/2011 Cohn et al.
2011/0238660 A1 9/2011 Riggs
2011/0238855 A1 9/2011 Korsunsky et al.
2011/0246762 A1 10/2011 Adams et al.
2011/0257953 A1 10/2011 Li et al.
2011/0261195 A1 10/2011 Martin et al.
2011/0276699 A1 11/2011 Pedersen
2011/0283006 A1 11/2011 Ramamurthy
2011/0289517 A1 11/2011 Sather et al.
2011/0299546 A1 12/2011 Prodan et al.
2011/0302497 A1 12/2011 Garrett et al.
2011/0309929 A1 12/2011 Myers
2011/0314515 A1 12/2011 Hernoud et al.
2012/0001436 A1 1/2012 Sami et al.
2012/0005276 A1 1/2012 Guo et al.
2012/0014363 A1 1/2012 Hassan et al.
2012/0016607 A1 1/2012 Cottrell et al.
2012/0017268 A9 1/2012 Dispensa
2012/0020060 A1 1/2012 Myer et al.
2012/0023151 A1 1/2012 Bennett et al.
2012/0030130 A1 2/2012 Smith et al.
2012/0062370 A1 3/2012 Feldstein et al.
2012/0066608 A1 3/2012 Sundermeyer et al.
2012/0066632 A1 3/2012 Sundermeyer et al.
2012/0075469 A1 3/2012 Oskin et al.
2012/0081842 A1 4/2012 Ewing et al.
2012/0084184 A1 4/2012 Raleigh et al.
2012/0086552 A1 4/2012 Fast et al.
2012/0143383 A1 6/2012 Cooperrider et al.
2012/0150966 A1 6/2012 Fan et al.
2012/0154126 A1 6/2012 Cohn et al.
2012/0172027 A1 7/2012 Partheesh et al.
2012/0182245 A1 7/2012 Hutton
2012/0209951 A1 8/2012 Enns et al.
2012/0214502 A1 8/2012 Qiang
2012/0232788 A1 9/2012 Diao
2012/0240185 A1 9/2012 Kapoor et al.
2012/0242788 A1 9/2012 Chuang et al.
2012/0257061 A1 10/2012 Edwards et al.
2012/0259722 A1 10/2012 Mikurak
2012/0265892 A1 10/2012 Ma et al.
2012/0269199 A1 10/2012 Chan et al.
2012/0278877 A1 11/2012 Baum et al.
2012/0280790 A1 11/2012 Gerhardt et al.
2012/0290740 A1 11/2012 Tewari et al.
2012/0296486 A1 11/2012 Marriam et al.
2012/0307646 A1 12/2012 Xia et al.
2012/0309354 A1 12/2012 Du
2012/0313781 A1 12/2012 Barker et al.
2012/0314901 A1 12/2012 Hanson et al.
2012/0315848 A1 12/2012 Smith et al.
2012/0324566 A1 12/2012 Baum et al.
2012/0327242 A1 12/2012 Barley et al.
2012/0331109 A1 12/2012 Baum et al.
2013/0002880 A1 1/2013 Levinson et al.
2013/0007871 A1 1/2013 Meenan et al.
2013/0038730 A1 2/2013 Peterson et al.
2013/0038800 A1 2/2013 Yoo
2013/0047123 A1 2/2013 May et al.
2013/0057695 A1 3/2013 Huisking
2013/0062951 A1 3/2013 Raji et al.
2013/0073746 A1 3/2013 Singh et al.
2013/0082835 A1 4/2013 Shapiro et al.
2013/0082836 A1 4/2013 Watts
2013/0085615 A1 4/2013 Barker
2013/0086618 A1 4/2013 Klein et al.
2013/0091213 A1 4/2013 Diab et al.
2013/0094538 A1 4/2013 Wang
2013/0103207 A1 4/2013 Ruff et al.
2013/0111576 A1 5/2013 Devine et al.
2013/0115972 A1 5/2013 Ziskind et al.
2013/0120131 A1 5/2013 Hicks, III
2013/0125157 A1 5/2013 Sharif-Ahmadi et al.
2013/0136102 A1 5/2013 Macwan et al.
2013/0147799 A1 6/2013 Hoguet
2013/0154822 A1 6/2013 Kumar et al.
2013/0155229 A1 6/2013 Thornton et al.
2013/0162571 A1 6/2013 Tamegai
2013/0163491 A1 6/2013 Singh et al.
2013/0163757 A1 6/2013 Bellovin et al.
2013/0173797 A1 7/2013 Poirer et al.
2013/0174239 A1 7/2013 Kim et al.
2013/0183924 A1 7/2013 Saigh et al.
2013/0184874 A1 7/2013 Frader-Thompson et al.
2013/0185026 A1 7/2013 Vanker et al.
2013/0191755 A1 7/2013 Balog et al.
2013/0205016 A1 8/2013 Dupre et al.
2013/0218959 A1 8/2013 Sa et al.
2013/0222133 A1 8/2013 Schultz et al.

(56) References Cited

U.S. PATENT DOCUMENTS

2013/0223279 A1 8/2013 Tinnakornsrisuphap et al.
2013/0245837 A1 9/2013 Grohman
2013/0257611 A1 10/2013 Lamb et al.
2013/0258119 A1 10/2013 Kim et al.
2013/0261821 A1 10/2013 Lu et al.
2013/0266193 A1 10/2013 Tiwari et al.
2013/0271270 A1 10/2013 Jamadagni et al.
2013/0286942 A1 10/2013 Bonar et al.
2013/0311146 A1 11/2013 Miller et al.
2013/0314542 A1 11/2013 Jackson
2013/0318231 A1 11/2013 Raji et al.
2013/0318443 A1 11/2013 Bachman et al.
2013/0325935 A1 12/2013 Kiley et al.
2013/0331109 A1 12/2013 Dhillon et al.
2013/0344875 A1 12/2013 Chowdhury
2013/0346921 A1 12/2013 Shiplacoff et al.
2014/0006660 A1 1/2014 Frei et al.
2014/0024361 A1 1/2014 Poon et al.
2014/0032034 A1 1/2014 Raptopoulos et al.
2014/0033136 A1 1/2014 St. Clair
2014/0035726 A1 2/2014 Schoner et al.
2014/0053246 A1 2/2014 Huang et al.
2014/0068486 A1 3/2014 Sellers et al.
2014/0075464 A1 3/2014 McCrea
2014/0095630 A1 4/2014 Wohlert et al.
2014/0098247 A1 4/2014 Rao et al.
2014/0108151 A1 4/2014 Bookstaff
2014/0109130 A1 4/2014 Sugimoto et al.
2014/0112405 A1 4/2014 Jafarian et al.
2014/0126425 A1 5/2014 Burd et al.
2014/0136242 A1 5/2014 Weekes et al.
2014/0136847 A1 5/2014 Huang
2014/0136936 A1 5/2014 Patel et al.
2014/0140575 A1 5/2014 Wolf
2014/0143695 A1 5/2014 Sundermeyer et al.
2014/0143851 A1 5/2014 Baum et al.
2014/0143854 A1 5/2014 Lopez et al.
2014/0146171 A1 5/2014 Brady et al.
2014/0153695 A1 6/2014 Yanagisawa et al.
2014/0167928 A1 6/2014 Burd
2014/0172957 A1 6/2014 Baum et al.
2014/0176797 A1 6/2014 Silva et al.
2014/0180968 A1 6/2014 Song et al.
2014/0188290 A1 7/2014 Steinberg et al.
2014/0188729 A1 7/2014 Hong
2014/0201291 A1 7/2014 Russell
2014/0208214 A1 7/2014 Stern
2014/0218517 A1 8/2014 Kim et al.
2014/0233951 A1 8/2014 Cook
2014/0236325 A1 8/2014 Sasaki et al.
2014/0245014 A1 8/2014 Tuck et al.
2014/0245160 A1 8/2014 Bauer et al.
2014/0254896 A1 9/2014 Zhou et al.
2014/0265359 A1 9/2014 Cheng et al.
2014/0266678 A1 9/2014 Shapiro et al.
2014/0266736 A1 9/2014 Cretu-Petra
2014/0278281 A1 9/2014 Vaynriber et al.
2014/0282048 A1 9/2014 Shapiro et al.
2014/0282934 A1 9/2014 Miasnik et al.
2014/0289384 A1 9/2014 Kao et al.
2014/0289388 A1 9/2014 Ghosh et al.
2014/0293046 A1 10/2014 Ni
2014/0298467 A1 10/2014 Bhagwat et al.
2014/0316616 A1 10/2014 Kugelmass
2014/0317660 A1 10/2014 Cheung et al.
2014/0319232 A1 10/2014 Gourlay et al.
2014/0328161 A1 11/2014 Haddad et al.
2014/0340216 A1 11/2014 Puskarich
2014/0359101 A1 12/2014 Dawes et al.
2014/0359524 A1 12/2014 Sasaki et al.
2014/0368331 A1 12/2014 Cohn et al.
2014/0369584 A1 12/2014 Fan et al.
2014/0372599 A1 12/2014 Gutt et al.
2014/0372811 A1 12/2014 Cohn et al.
2014/0378110 A1 12/2014 Chingon et al.
2015/0009325 A1 1/2015 Kardashov
2015/0019714 A1 1/2015 Shaashua et al.
2015/0022666 A1 1/2015 Kay et al.
2015/0026796 A1 1/2015 Alan et al.
2015/0054947 A1 2/2015 Dawes
2015/0058250 A1 2/2015 Stanzione et al.
2015/0074206 A1 3/2015 Baldwin
2015/0074259 A1 3/2015 Ansari et al.
2015/0077553 A1 3/2015 Dawes
2015/0082414 A1 3/2015 Dawes
2015/0088982 A1 3/2015 Johnson et al.
2015/0097680 A1 4/2015 Fadell et al.
2015/0097949 A1 4/2015 Ure et al.
2015/0097961 A1 4/2015 Ure et al.
2015/0100167 A1 4/2015 Sloo et al.
2015/0106721 A1 4/2015 Cha et al.
2015/0140954 A1 5/2015 Maier et al.
2015/0142991 A1 5/2015 Zaloom
2015/0143395 A1 5/2015 Reisman
2015/0161875 A1 6/2015 Cohn et al.
2015/0170447 A1 6/2015 Buzhardt
2015/0192940 A1 7/2015 Silva et al.
2015/0193127 A1 7/2015 Chai et al.
2015/0205297 A1 7/2015 Stevens et al.
2015/0205465 A1 7/2015 Robison et al.
2015/0222601 A1 8/2015 Metz et al.
2015/0227118 A1 8/2015 Wong
2015/0256355 A1 9/2015 Pera et al.
2015/0261427 A1 9/2015 Sasaki
2015/0266577 A1 9/2015 Jones et al.
2015/0287310 A1 10/2015 Deiiuliis et al.
2015/0304804 A1 10/2015 Lotito
2015/0319006 A1 11/2015 Plummer et al.
2015/0319046 A1 11/2015 Plummer et al.
2015/0325106 A1 11/2015 Dawes et al.
2015/0331662 A1 11/2015 Lambourne
2015/0334087 A1 11/2015 Dawes
2015/0348554 A1 12/2015 Orr et al.
2015/0350031 A1 12/2015 Burks et al.
2015/0350735 A1 12/2015 Crone
2015/0358359 A1 12/2015 Ghai et al.
2015/0365217 A1 12/2015 Scholten et al.
2015/0365933 A1 12/2015 Lee et al.
2015/0371512 A1 12/2015 Bennei, I et al.
2015/0373149 A1 12/2015 Lyons
2015/0379355 A1 12/2015 Kanga et al.
2016/0004820 A1 1/2016 Moore
2016/0012715 A1 1/2016 Raji et al.
2016/0019763 A1 1/2016 Raji et al.
2016/0019778 A1 1/2016 Raji et al.
2016/0023475 A1 1/2016 Bevier et al.
2016/0027295 A1 1/2016 Raji et al.
2016/0036944 A1 2/2016 Kitchen et al.
2016/0037389 A1 2/2016 Tagg et al.
2016/0042637 A1 2/2016 Cahill
2016/0055573 A1 2/2016 Chen et al.
2016/0062624 A1 3/2016 Sundermeyer et al.
2016/0063642 A1 3/2016 Luciani et al.
2016/0065413 A1 3/2016 Sundermeyer et al.
2016/0065414 A1 3/2016 Sundermeyer et al.
2016/0065653 A1 3/2016 Chen et al.
2016/0068264 A1 3/2016 Ganesh et al.
2016/0077935 A1 3/2016 Zheng et al.
2016/0080365 A1 3/2016 Baker et al.
2016/0087933 A1 3/2016 Johnson et al.
2016/0094421 A1 3/2016 Bali et al.
2016/0100348 A1 4/2016 Cohn et al.
2016/0107749 A1 4/2016 Mucci
2016/0116914 A1 4/2016 Mucci
2016/0127641 A1 5/2016 Gove
2016/0147919 A1 5/2016 Yabe et al.
2016/0150433 A1 5/2016 Bergquist et al.
2016/0156941 A9 6/2016 Alao et al.
2016/0161277 A1 6/2016 Park et al.
2016/0163185 A1 6/2016 Ramasubbu et al.
2016/0164923 A1 6/2016 Dawes
2016/0171853 A1 6/2016 Naidoo et al.
2016/0180719 A1 6/2016 Wouhaybi et al.
2016/0183073 A1 6/2016 Saito et al.

(56) References Cited

U.S. PATENT DOCUMENTS

2016/0187995 A1 6/2016 Rosewall
2016/0189509 A1 6/2016 Malhotra et al.
2016/0189524 A1 6/2016 Poder et al.
2016/0189527 A1 6/2016 Peterson et al.
2016/0189549 A1 6/2016 Marcus
2016/0191265 A1 6/2016 Cohn et al.
2016/0191621 A1 6/2016 Oh et al.
2016/0192461 A1 6/2016 Minsky
2016/0196734 A1 7/2016 Hicks, III
2016/0202695 A1 7/2016 Deroos et al.
2016/0209072 A1 7/2016 Golden et al.
2016/0225240 A1 8/2016 Voddhi et al.
2016/0226732 A1 8/2016 Kim et al.
2016/0231916 A1 8/2016 Dawes
2016/0232780 A1 8/2016 Cohn et al.
2016/0234075 A1 8/2016 Sirpal et al.
2016/0241633 A1 8/2016 Overby et al.
2016/0260135 A1 9/2016 Zomet et al.
2016/0261932 A1 9/2016 Fadell et al.
2016/0266579 A1 9/2016 Chen et al.
2016/0267751 A1 9/2016 Fulker et al.
2016/0274759 A1 9/2016 Dawes
2016/0323731 A1 11/2016 Mohammed et al.
2016/0363337 A1 12/2016 Steinberg et al.
2016/0364089 A1 12/2016 Blackman et al.
2016/0371961 A1 12/2016 Narang et al.
2016/0371967 A1 12/2016 Narang et al.
2016/0373453 A1 12/2016 Ruffner et al.
2016/0378109 A1 12/2016 Raffa et al.
2017/0004714 A1 1/2017 Rhee
2017/0005818 A1 1/2017 Gould
2017/0006107 A1 1/2017 Dawes et al.
2017/0019644 A1 1/2017 K V et al.
2017/0026440 A1 1/2017 Cockrell et al.
2017/0039413 A1 2/2017 Nadler
2017/0052513 A1 2/2017 Raji
2017/0054570 A1 2/2017 Hagins et al.
2017/0054571 A1 2/2017 Kitchen et al.
2017/0054594 A1 2/2017 Decenzo et al.
2017/0063967 A1 3/2017 Kitchen et al.
2017/0063968 A1 3/2017 Kitchen et al.
2017/0068419 A1 3/2017 Sundermeyer et al.
2017/0070361 A1 3/2017 Sundermeyer et al.
2017/0070563 A1 3/2017 Sundermeyer et al.
2017/0078298 A1 3/2017 Vlaminck et al.
2017/0092138 A1 3/2017 Trundle et al.
2017/0109999 A1 4/2017 Cohn et al.
2017/0111227 A1 4/2017 Papageorgiou et al.
2017/0118037 A1 4/2017 Kitchen et al.
2017/0124987 A1 5/2017 Kim et al.
2017/0127124 A9 5/2017 Wilson et al.
2017/0154507 A1 6/2017 Dawes et al.
2017/0155545 A1 6/2017 Baum et al.
2017/0180198 A1 6/2017 Baum et al.
2017/0180306 A1 6/2017 Gutt et al.
2017/0185277 A1 6/2017 Sundermeyer et al.
2017/0185278 A1 6/2017 Sundermeyer et al.
2017/0185281 A1 6/2017 Park et al.
2017/0187993 A1 6/2017 Martch et al.
2017/0192402 A1 7/2017 Karp et al.
2017/0225336 A1 8/2017 Deyle et al.
2017/0227965 A1 8/2017 Decenzo et al.
2017/0244573 A1 8/2017 Baum et al.
2017/0255452 A1 9/2017 Barnes et al.
2017/0257257 A1 9/2017 Dawes
2017/0278407 A1 9/2017 Lemmey et al.
2017/0279629 A1 9/2017 Raji
2017/0289323 A1 10/2017 Gelvin et al.
2017/0289360 A1 10/2017 Baum et al.
2017/0301216 A1 10/2017 Cohn et al.
2017/0302469 A1 10/2017 Cohn et al.
2017/0303257 A1 10/2017 Yamada et al.
2017/0310500 A1 10/2017 Dawes
2017/0330466 A1 11/2017 Demetriades et al.
2017/0331781 A1 11/2017 Gutt
2017/0332055 A1 11/2017 Henderson
2017/0337806 A1 11/2017 Cohn et al.
2017/0353324 A1 12/2017 Baum et al.
2018/0004377 A1 1/2018 Kitchen et al.
2018/0012460 A1 1/2018 Heitz, III et al.
2018/0019890 A1 1/2018 Dawes
2018/0027517 A9 1/2018 Noonan
2018/0045159 A1 2/2018 Patel
2018/0054774 A1 2/2018 Cohn et al.
2018/0063248 A1 3/2018 Dawes et al.
2018/0063259 A1 3/2018 Connelly et al.
2018/0069862 A1 3/2018 Cholas et al.
2018/0069932 A1 3/2018 Tiwari et al.
2018/0082575 A1 3/2018 El-Mankabady
2018/0083831 A1 3/2018 Baum et al.
2018/0092046 A1 3/2018 Egan et al.
2018/0095155 A1 4/2018 Soni et al.
2018/0096568 A1 4/2018 Cohn et al.
2018/0107196 A1 4/2018 Bian et al.
2018/0152342 A1 5/2018 Karaoguz et al.
2018/0183668 A1 6/2018 Caldwell et al.
2018/0191720 A1 7/2018 Dawes
2018/0191740 A1 7/2018 Decenzo et al.
2018/0191741 A1 7/2018 Dawes et al.
2018/0191742 A1 7/2018 Dawes
2018/0191807 A1 7/2018 Dawes
2018/0197387 A1 7/2018 Dawes
2018/0198688 A1 7/2018 Dawes
2018/0198755 A1 7/2018 Domangue et al.
2018/0198756 A1 7/2018 Dawes
2018/0198788 A1 7/2018 Helen et al.
2018/0198802 A1 7/2018 Dawes
2018/0198841 A1 7/2018 Chmielewski et al.
2018/0278701 A1 9/2018 Diem
2018/0307223 A1 10/2018 Peeters et al.
2018/0322759 A1 11/2018 Devdas et al.
2019/0014413 A1 1/2019 Kallai et al.
2019/0041547 A1 2/2019 Rolf et al.
2019/0058720 A1 2/2019 Lindquist et al.
2019/0073193 A1 3/2019 Krispin
2019/0073534 A1 3/2019 Dvir et al.
2019/0103030 A1 4/2019 Banga et al.
2019/0176985 A1 6/2019 Mucci
2019/0197256 A1 6/2019 Lehnhardt et al.
2019/0204836 A1 7/2019 Rezvani
2019/0239008 A1 8/2019 Lambourne
2019/0245798 A1 8/2019 Short et al.
2019/0265694 A1 8/2019 Chen et al.
2019/0347924 A1 11/2019 Trundle et al.
2019/0386892 A1 12/2019 Sundermeyer et al.
2019/0391545 A1 12/2019 Trundle et al.
2020/0014675 A1 1/2020 Helms et al.
2020/0026285 A1 1/2020 Perrone
2020/0029339 A1 1/2020 Suzuki
2020/0032887 A1 1/2020 McBurney et al.
2020/0036635 A1 1/2020 Ohuchi
2020/0076858 A1 3/2020 Apsangi et al.
2020/0094963 A1 3/2020 Myslinski
2020/0127891 A9 4/2020 Johnson et al.
2020/0137125 A1 4/2020 Patnala et al.
2020/0142574 A1 5/2020 Sundermeyer et al.
2020/0159399 A1 5/2020 Sundermeyer et al.
2020/0162890 A1 5/2020 Spencer et al.
2020/0186612 A1 6/2020 Saint Clair
2020/0196213 A1 6/2020 Cheng et al.
2020/0257721 A1 8/2020 McKinnon et al.
2020/0273277 A1 8/2020 Kerning et al.
2020/0279626 A1 9/2020 Ansari et al.
2020/0322577 A1 10/2020 Raffa et al.
2020/0328880 A1 10/2020 Bolotin et al.
2020/0328887 A1 10/2020 Kostiainen et al.
2020/0329136 A1 10/2020 Gerhardt et al.
2020/0333780 A1 10/2020 Kerzner
2020/0349786 A1 11/2020 Ho et al.
2020/0380851 A1 12/2020 Farrand et al.
2021/0021710 A1 1/2021 Stepanian
2021/0029547 A1 1/2021 Beachem et al.
2021/0053136 A1 2/2021 Rappl et al.
2021/0068034 A1 3/2021 Juhasz et al.

(56) References Cited

U.S. PATENT DOCUMENTS

| | | | |
|---|---|---|---|
| 2021/0081553 | A1 | 3/2021 | Lemmey et al. |
| 2021/0099753 | A1 | 4/2021 | Connelly et al. |
| 2021/0153001 | A1 | 5/2021 | Eisner |
| 2021/0180815 | A1 | 6/2021 | Shamoon et al. |
| 2021/0250726 | A1 | 8/2021 | Jones |
| 2021/0326451 | A1 | 10/2021 | Nunez Di Croce |
| 2021/0335123 | A1 | 10/2021 | Trundle et al. |
| 2022/0021552 | A1 | 1/2022 | Ansari et al. |
| 2022/0027051 | A1 | 1/2022 | Kant et al. |
| 2022/0029994 | A1 | 1/2022 | Choyi et al. |
| 2022/0038440 | A1 | 2/2022 | Boynton et al. |
| 2022/0073052 | A1 | 3/2022 | Zhou et al. |
| 2022/0159334 | A1 | 5/2022 | Wang et al. |
| 2022/0247624 | A1 | 8/2022 | Johnson et al. |
| 2022/0415104 | A1 | 12/2022 | McLachlan et al. |
| 2023/0057193 | A1 | 2/2023 | Ansari et al. |

FOREIGN PATENT DOCUMENTS

| | | | |
|---|---|---|---|
| AU | 2011250886 | A1 | 1/2013 |
| AU | 2013284428 | A1 | 2/2015 |
| AU | 2011305163 | B2 | 12/2016 |
| AU | 2017201365 | A1 | 3/2017 |
| AU | 2017201585 | A1 | 3/2017 |
| BE | 1008939 | A6 | 10/1996 |
| CA | 2203813 | A1 | 6/1996 |
| CA | 2174482 | A1 | 10/1997 |
| CA | 2346638 | A1 | 4/2000 |
| CA | 2389958 | A1 | 3/2003 |
| CA | 2878117 | A1 | 1/2014 |
| CA | 2559842 | C | 5/2014 |
| CA | 2992429 | A1 | 12/2016 |
| CA | 2976682 | A1 | 2/2018 |
| CA | 2976802 | A1 | 2/2018 |
| CN | 1599999 | A | 3/2005 |
| DE | 102004027893 | A1 | 1/2006 |
| EP | 0295146 | A2 | 12/1988 |
| EP | 0308046 | A2 | 3/1989 |
| EP | 0591585 | A1 | 4/1994 |
| EP | 1117214 | A2 | 7/2001 |
| EP | 1119837 | A1 | 8/2001 |
| EP | 0978111 | | 11/2001 |
| EP | 1738540 | A2 | 1/2007 |
| EP | 1881716 | A1 | 1/2008 |
| EP | 2112784 | A1 | 10/2009 |
| EP | 2868039 | A2 | 5/2015 |
| EP | 3031206 | A2 | 6/2016 |
| EP | 3285238 | A2 | 2/2018 |
| EP | 3308222 | A1 | 4/2018 |
| FR | 2584217 | A1 | 1/1987 |
| FR | 2661023 | A1 | 10/1991 |
| FR | 2793334 | A1 | 11/2000 |
| GB | 2222288 | A | 2/1990 |
| GB | 2273593 | A | 6/1994 |
| GB | 2286423 | A | 8/1995 |
| GB | 2291554 | A | 1/1996 |
| GB | 2319373 | A | 5/1998 |
| GB | 2320644 | A | 6/1998 |
| GB | 2324630 | A | 10/1998 |
| GB | 2325548 | A | 11/1998 |
| GB | 2335523 | A | 9/1999 |
| GB | 2349293 | A | 10/2000 |
| GB | 2370400 | A | 6/2002 |
| GB | 2442628 | A | 4/2008 |
| GB | 2442633 | A | 4/2008 |
| GB | 2442640 | A | 4/2008 |
| GB | 2428821 | B | 6/2008 |
| IN | 45/2015 | | 11/2015 |
| IN | 04/2016 | | 1/2016 |
| JP | 63-033088 | A | 2/1988 |
| JP | 05-167712 | A | 7/1993 |
| JP | 06-339183 | A | 12/1993 |
| JP | 08-227491 | | 9/1996 |
| JP | 10-004451 | A | 1/1998 |
| JP | 11-234277 | A | 8/1999 |
| JP | 2000-006343 | A | 1/2000 |
| JP | 2000-023146 | A | 1/2000 |
| JP | 2000-278671 | A | 10/2000 |
| JP | 2001-006088 | A | 1/2001 |
| JP | 2001-006343 | A | 1/2001 |
| JP | 2001-069209 | A | 3/2001 |
| JP | 2002-055895 | | 2/2002 |
| JP | 2002-185629 | | 6/2002 |
| JP | 2003-085258 | A | 3/2003 |
| JP | 2003-141659 | A | 5/2003 |
| JP | 2003-281647 | A | 10/2003 |
| JP | 2004-192659 | A | 7/2004 |
| JP | 2006-094394 | A | 4/2006 |
| JP | 2007-529826 | A | 10/2007 |
| JP | 2009-213107 | A | 9/2009 |
| JP | 2010-140091 | A | 6/2010 |
| KR | 10-2005-0051577 | A | 6/2005 |
| KR | 10-2005-0052826 | A | 6/2005 |
| KR | 10-2006-0021605 | A | 3/2006 |
| KR | 10-0771941 | B1 | 10/2007 |
| TW | 340934 | B | 9/1998 |
| TW | I239176 | B | 9/2005 |
| TW | 201101243 | A | 1/2011 |
| TW | 201102976 | A | 1/2011 |
| TW | 201102978 | A | 1/2011 |
| TW | I340934 | B | 4/2011 |
| TW | 201117141 | A | 5/2011 |
| TW | I480839 | B | 4/2015 |
| TW | I480840 | B | 4/2015 |
| TW | I509579 | B | 11/2015 |
| TW | I517106 | B | 1/2016 |
| WO | 89/07855 | A1 | 8/1989 |
| WO | 89/11187 | A1 | 11/1989 |
| WO | 94/03881 | A1 | 2/1994 |
| WO | 95/13944 | A1 | 5/1995 |
| WO | 96/36301 | A1 | 11/1996 |
| WO | 97/13230 | A2 | 4/1997 |
| WO | 98/25243 | A1 | 6/1998 |
| WO | 98/49663 | A1 | 11/1998 |
| WO | 98/52343 | A1 | 11/1998 |
| WO | 98/59256 | A2 | 12/1998 |
| WO | 99/34339 | A2 | 7/1999 |
| WO | 00/21053 | A1 | 4/2000 |
| WO | 00/36812 | A1 | 6/2000 |
| WO | 00/72598 | A1 | 11/2000 |
| WO | 01/11586 | A1 | 2/2001 |
| WO | 01/52478 | A2 | 7/2001 |
| WO | 01/71489 | A1 | 9/2001 |
| WO | 01/86622 | A1 | 11/2001 |
| WO | 01/99078 | A2 | 12/2001 |
| WO | 02/11444 | A1 | 2/2002 |
| WO | 02/21300 | A1 | 3/2002 |
| WO | 02/97584 | A2 | 12/2002 |
| WO | 2002/100083 | | 12/2002 |
| WO | 2003/026305 | A1 | 3/2003 |
| WO | 03/40839 | A1 | 5/2003 |
| WO | 03049379 | A1 | 6/2003 |
| WO | 03/98908 | A1 | 11/2003 |
| WO | 2004/004222 | A1 | 1/2004 |
| WO | 2004/077307 | A1 | 9/2004 |
| WO | 2004/098127 | A1 | 11/2004 |
| WO | 2004/107710 | A1 | 12/2004 |
| WO | 2005/047990 | A2 | 5/2005 |
| WO | 2005/091218 | A2 | 9/2005 |
| WO | 2007/038872 | A1 | 4/2007 |
| WO | 2007/124453 | A2 | 11/2007 |
| WO | 2008/056320 | A1 | 5/2008 |
| WO | 2009/006670 | A1 | 1/2009 |
| WO | 2009/023647 | A1 | 2/2009 |
| WO | 2009/029590 | A1 | 3/2009 |
| WO | 2009/029597 | A1 | 3/2009 |
| WO | 2009/064795 | A1 | 5/2009 |
| WO | 2009/145747 | A1 | 12/2009 |
| WO | 2010/019624 | A1 | 2/2010 |
| WO | 2010/025468 | A1 | 3/2010 |
| WO | 2010/127009 | A1 | 11/2010 |
| WO | 2010/127194 | A2 | 11/2010 |
| WO | 2010/127200 | A1 | 11/2010 |
| WO | 2010/127203 | A1 | 11/2010 |

(56) References Cited

FOREIGN PATENT DOCUMENTS

| | | | |
|---|---|---|---|
| WO | 2011/038409 | A1 | 3/2011 |
| WO | 2011/063354 | A1 | 5/2011 |
| WO | 2011/143273 | A1 | 11/2011 |
| WO | 2012/040653 | A1 | 3/2012 |
| WO | 2014/004911 | A2 | 1/2014 |
| WO | 2015/021469 | A2 | 2/2015 |
| WO | 2015/134520 | A1 | 9/2015 |
| WO | 2015/176775 | A1 | 11/2015 |
| WO | 2016/201033 | A1 | 12/2016 |
| ZA | 201302668 | | 6/2014 |

OTHER PUBLICATIONS

US Patent Application filed on Sep. 17, 2018, entitled "Integrated Security System With Parallel Processing Architecture", U.S. Appl. No. 16/133,135.
US Patent Application filed on Sep. 27, 2019, entitled "Control System User Interface", U.S. Appl. No. 16/585,481.
US Patent Application filed on Sep. 28, 2018, entitled "Control System User Interface", U.S. Appl. No. 16/146,715.
US Patent Application filed on Sep. 28, 2018, entitled "Forming a Security Network Including Integrated Security System Componentsand Network Devices", U.S. Appl. No. 16/147,044.
US Patent Application filed on Sep. 11, 2018, entitled "Premises Management Networking", U.S. Appl. No. 16/128,089.
US Patent Application filed on Oct. 1, 2018, entitled "Integrated Security System With Parallel Processing Architecture", U.S. Appl. No. 16/148,387.
US Patent Application filed on Oct. 1, 2018, entitled "Integrated Security System with Parallel Processing Architecture", U.S. Appl. No. 16/148,411.
US Patent Application filed on Oct. 1, 2018, entitled "User Interface In A Premises Network", U.S. Appl. No. 16/148,572.
US Patent Application filed on Oct. 3, 2018, entitled "Activation of a Home Automation Controller", U.S. Appl. No. 16/150,973.
US Patent Application filed on Oct. 10, 2018, entitled "Method and System for Providing Alternate Network Access", U.S. Appl. No. 16/156,448.
US Patent Application filed on Oct. 12, 2020, entitled "Integrated Security System With Parallel Processing Architecture", U.S. Appl. No. 17/068,584.
US Patent Application filed on Oct. 13, 2017, entitled "Notification of Event Subsequent To Communication Failure With Security System", U.S. Appl. No. 15/783,858.
US Patent Application filed on Oct. 18, 2018, entitled "Generating Risk Profile Using Data Of Home Monitoring And Security System", U.S. Appl. No. 16/164,114.
US Patent Application filed on Oct. 18, 2019, entitled "WIFI-To-Serial Encapsulation in Systems", U.S. Appl. No. 16/656,874.
US Patent Application filed on Oct. 27, 2017, entitled "Security System With Networked Touchscreen", U.S. Appl. No. 15/796,421.
US Patent Application filed on Nov. 10, 2020, entitled "Integrated Cloud System for Premises Automation", U.S. Appl. No. 17/094,120.
US Patent Application filed on Nov. 19, 2019, entitled "Integrated Cloud System With Lightweight Gateway for Premises Automation", U.S. Appl. No. 16/688,717.
US Patent Application filed on Nov. 25, 2020, entitled "Premises Management Networking", U.S. Appl. No. 17/105,235.
US Patent Application filed on Nov. 26, 2019, entitled "Communication Protocols Over Internet Protocol (IP) Networks", U.S. Appl. No. 16/696,657.
US Patent Application filed on Nov. 28, 2017, entitled "Forming A Security Network Including Integrated Security System Components", U.S. Appl. No. 15/824,503.
US Patent Application filed on Nov. 29, 2018, entitled "Premise Management Systems And Methods", U.S. Appl. No. 16/204,442.
US Patent Application filed on Nov. 30, 2017, entitled "Controller and Interface for Home Security, Monitoring and Automation Having Customizable Audio Alerts for SMA Events", U.S. Appl. No. 15/828,030.
US Patent Application filed on Dec. 9, 2020, entitled "Integrated Security System With Parallel Processing Architecture", U.S. Appl. No. 17/115,936.
US Patent Application filed on Dec. 14, 2018, entitled "Communication Protocols Over Internet Protocol (IP) Networks", U.S. Appl. No. 16/221,299.
US Patent Application filed on Dec. 27, 2018, entitled "Communication Protocols in Integrated Systems", U.S. Appl. No. 16/233,913.
US Patent Application filed on Dec. 27, 2019, entitled "Premises Management Systems", U.S. Appl. No. 16/728,608.
US Patent Application filed on Aug. 9, 18, entitled "Method and Systems for Processing Security Event Data", U.S. Appl. No. 16/059,833.
Valtchev, D., and I. Frankov. "Service gateway architecture fora smart home." Communications Magazine, IEEE 40.4 (2002): 126-132.
Visitalk, Communication with Vision, http://www.visitalk.jimbo.com; website accessed Jan. 10, 2018.
Visitalk.com-communication with vision, http://www.visitalk.com (date unknown).
Wang et al, "A Large Scale Video Surveillance System with Heterogeneous Information Fusion and Visualization for Wide Area Monitoring," 2012 Eighth International Conference on Intelligent Information Hiding and Multimedia Signal Processing, Piraeus, 2012, pp. 178-181.
Wilkinson, S: "Logitech Harmony One Universal Remote" Ultimate AV magazine May 2008 (May 2008), XP002597782 Retrieved from the Internet: Original URL: http://www.ultimateavmag.com/remotecontrols/508logi) [retrieved on Aug. 23, 2010] the whole document; Updated URL: https://www.soundandvision.com/content/logitech-harmony-one-universal-remote, Retrieved from internet on Jan. 11, 2018.
Windows Telecom Dictionary, Mar. 2005, pp. 937-938.
Windows, Newton's Telecom Dictionary, 21st Edition, Mar. 2005, 937-938.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.
Yanni Zhai et al., Design of Smart Home Remote Monitoring System Based on Embedded System, 2011 IEEE 2nd International Conference on Computing, Control and Industrial Engineering, vol. 2, pp. 41-44.
3rd Generation Partnership Project! Technical Specification Group Services and System Aspects! Architecture enhancements to facilitate communications with packet data networks and application, Mar. 2015, 3GPP TS 23.682 V12.3.0, pp. 8-10. (Year: 2015).
Chapter 6, Securing TCP/IP, pp. 135-164, Oct. 12, 2004.
Oxford Dictionary, Definition of "application", 2021, 2 pages (Year: 2021).
US Patent Application filed on Mar. 15, 2021, entitled "Automation System User Interface", U.S. Appl. No. 17/202,279.
US Patent Application filed on Mar. 17, 2021, entitled "Communication Protocols Over Internet Protocol (IP) Networks", U.S. Appl. No. 17/204,068.
US Patent Application filed on Mar. 22, 2021, entitled "Premises Management Configuration and Control", U.S. Appl. No. 17/208,866.
US Patent Application filed on Apr. 8, 2021, entitled "System For Data Routing In Networks", U.S. Appl. No. 17/301,605.
"Associate". Merriaim-Webster.com Dictionary, Merriam-Webster, https://web.archive.org/web/20061209213742/https://www.merriam-webster.com/dictionary/associate. Dec. 9, 2006.
"Dragging" The Authoritative Dictionary of IEEE Standard Terms. 7th ed. 2000, p. 337.
"File", The Authoritative Dictionary of IEEE Standard Terms. 7th ed. 2000, pp. 432.
"Indicate". Merriam-Webster.com Dictionary, Merriam-Webster, https://web.archive.org/web/20061209080613/https://www.merriam-webster.com/dictionary/indicate. Dec. 9, 2006.
"Application" The Authoritative Dictionary of IEEE Standard Terms. 7th ed. 2000.

(56) References Cited

OTHER PUBLICATIONS

"Icon", Newton's Telecom Dictionary, 21st ed., Mar. 2005.
"Modular programming", The Authoritative Dictionary of IEEE Standard Terms. 7th ed. 2000.
"Windows". Newton's Telecom Dictionary, 21st ed., Mar. 2005.
6270 Touch Screen Keypad Notes, Honeywell, Sep. 2006.
Alarm.com—Interactive Security Systems, Elders [retrieved on Nov. 4, 2003], 1 page.
Alarm.com—Interactive Security Systems, Frequently Asked Questions [retrieved on Nov. 4, 2003], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Condry M et al., Open Service Gateway architecture overview, Industrial Electronics Society, 1999, IECON '99 Proceedings, The 25th Annual Conference of the IEEE, San Jose, CA, USA, Nov. 29-Dec. 3, 1999, Piscataway, NJ, USA, IEEE, US, vol. 2, Nov. 29, 1999 (Nov. 29, 1999), pp. 735-742, XP010366642.
Control Panel Standard—Features for False Alarm Reduction, The Security Industry Association, SIA 2009, pp. 1-48.
CorAccess Systems, Companion 6 User Guide, Jun. 17, 2002.
Court action filed for U.S. Patents Nos. 7262690; 7911341; 8073931; 8335842; 8473619; 8478844 in U.S. District Court, Estern District of Virginia, Case No. 1:13-CV-00834, between *iControl Networks, Inc.* (Plaintiff) vs *Alarm.com Incorporated et al.* (Defendant) on Jul. 10, 2013.
Diaz, Redondo R P et al., Enhancing Residential Gateways: OSGI Service Composition, IEEE Transactions on Consumer Electronics, IEEE Service Center, New York, NY, US, vol. 53, No. 1, Feb. 1, 2007 (Feb. 1, 2007), pp. 87-95, XP011381790.
Elwahab et al. ; Device, System and . . . Customer Premises Gateways, Sep. 27, 2001; WO 01/71489.
EP application filed on Jun. 9, 2016, entitled, "Data Model for Home Automation", 16808247.7.
EP application filed on Aug. 16, 2017, entitled, "Automation System User Interface", 17186497.8.
Examination Report under Section 18(3) re for UK Patent Application No. GB0620362.4, dated Aug. 13, 2007.
Examination Report under Section 18(3) re for UK Patent Application No. GB0724248.0, dated Jun. 4, 2008.
Examination Report under Section 18(3) re for UK Patent Application No. GB0724248.0, dated Jan. 30, 2008.
Examination Report under Section 18(3) re for UK Patent Application No. GB0724760.4, dated Jan. 30, 2008.
Examination Report under Section 18(3) re for UK Patent Application No. GB0800040.8, dated Jan. 30, 2008.
Faultline, "AT&T Targets video home security as next broadband market"; Nov. 2, 2006; The Register; 2 Pages.
Final Office Action dated Aug. 1, 2011 for U.S. Appl. No. 12/630,092, filed Dec. 3, 2009.
Final Office Action dated Jun. 1, 2009 for U.S. Appl. No. 11/084,232, filed Mar. 16, 2005.
Final Office Action dated Jun. 5, 2012 for U.S. Appl. No. 12/771,071, filed Apr. 30, 2010.
Final Office Action dated May 9, 2013 for U.S. Appl. No. 12/189,780, filed Aug. 11, 2008.
Final Office Action dated May 9, 2013 for U.S. Appl. No. 12/952,080, filed Nov. 22, 2010.
Final Office Action dated Jan. 10, 2011 for U.S. Appl. No. 12/189,785, filed Aug. 11, 2008.
Final Office Action dated Jun. 10, 2011 for U.S. Appl. No. 11/084,232, filed Mar. 16, 2005.
Final Office Action dated Jan. 13, 2011 for U.S. Appl. No. 12/189,780, filed Aug. 11, 2008.
Final Office Action dated Oct. 17, 2012 for U.S. Appl. No. 12/637,671, filed Dec. 14, 2009.
Final Office Action dated Sep. 17, 2012 for U.S. Appl. No. 12/197,958, filed Aug. 25, 2008.
Final Office Action dated Mar. 21, 2013 for U.S. Appl. No. 12/691,992, filed Jan. 22, 2010.
Final Office Action dated Jul. 23, 2013 for U.S. Appl. No. 13/531,757, filed Jun. 25, 2012.
Final Office Action dated Feb. 26, 2013 for U.S. Appl. No. 12/771,471, filed Apr. 30, 2010.
Final Office Action dated Jun. 29, 2012 for U.S. Appl. No. 12/539,537, filed Aug. 11, 2009.
Final Office Action dated Dec. 31, 2012 for U.S. Appl. No. 12/770,365, filed Apr. 29, 2010.
Final Office Action dated Oct. 31, 2012 for U.S. Appl. No. 12/771,624, filed Apr. 30, 2010.
Final Office Action dated Feb. 16, 2011 for U.S. Appl. No. 12/019,568, filed Jan. 24, 2008.
Final Office Action dated Jul. 12, 2010 for U.S. Appl. No. 12/019,554, filed Jan. 24, 2008.
Final Office Action dated Sep. 14, 2011 for U.S. Appl. No. 12/197,931, filed Aug. 25, 2008.
Foreign communication from a related counterpart application—International Preliminary Examination Report, App No. PCT/US02/14450, dated Mar. 2, 2004, 4 pgs.
Foreign communication from a related counterpart application—International Search Report, App No. PCT/US02/14450, dated Dec. 17, 2002, 6 pgs.
Form PCT/ISA/210, "PCT International Search Report for the Application No. PCT/US11/34858," dated Oct. 3, 2011, 2 pages.
Non-Final Office Action dated Aug. 18, 2011 for U.S. Appl. No. 12/197,958, filed Aug. 25, 2008.
Non-Final Office Action dated Feb. 18, 2011 for U.S. Appl. No. 12/630,092, filed Dec. 3, 2009.
Non-Final Office Action dated Jan. 18, 2012 for U.S. Appl. No. 12/771,071, filed Apr. 30, 2010.
Non-Final Office Action dated Jul. 21, 2010 for U.S. Appl. No. 12/630,092, filed Dec. 3, 2009.
Non-Final Office Action dated Dec. 22, 2010 for U.S. Appl. No. 12/197,931, filed Aug. 25, 2008.
Non-Final Office Action dated Jul. 22, 2013 for U.S. Appl. No. 12/630,092, filed Dec. 3, 2009.
Non-Final Office Action dated Jan. 26, 2012 for U.S. Appl. No. 12/019,568, filed Jan. 24, 2008.
Non-Final Office Action dated Nov. 26, 2010 for U.S. Appl. No. 12/197,958, filed Aug. 25, 2008.
Non-Final Office Action dated Jun. 27, 2013 for U.S. Appl. No. 12/019,568, filed Jan. 24, 2008.
Non-Final Office Action dated Dec. 30, 2009 for U.S. Appl. No. 11/084,232, filed Mar. 16, 2005.
Non-Final Office Action dated May 30, 2008 for U.S. Appl. No. 11/084,232, filed Mar. 16, 2005.
Non-Final Office Action dated Apr. 13, 2010 for U.S. Appl. No. 11/761,745, filed Jun. 12, 2007.
Non-Final Office Action dated Feb. 21, 2013 for U.S. Appl. No. 12/771,372, filed Apr. 30, 2010.
Non-Final Office Action dated Jan. 5, 2010 for U.S. Appl. No. 12/019,554, filed Jan. 24, 2008.
Non-Final Office Action dated May 23, 2013 for U.S. Appl. No. 13/104,932, filed May 10, 2011.
Non-Final Office Action dated May 23, 2013 for U.S. Appl. No. 13/104,936, filed May 10, 2011.
Notice of Allowance dated May 14, 2013 for U.S. Appl. No. 12/637,671, filed Dec. 14, 2009.
Notice of Allowance dated Oct. 25, 2012 for U.S. Appl. No. 11/084,232, filed Mar. 16, 2005.
PCT Application filed on Jun. 9, 2016, entitled "Virtual Device Systems and Methods", PCT/US2016/036674.
PCT Application filed on Jun. 29, 2016, entitled "Integrated Cloud System for Premises Automation", PCT/US2016/040046.
PCT Application filed on Jun. 30, 2016, entitled "Integrated Cloud System with Lightweight Gateway for Premises Automation", PCT/US2016/040451.
PCT Application filed on Jul. 7, 2016, entitled "Automation System User Interface with Three-Dimensional Display", PCT/US2016/041353.

(56) References Cited

OTHER PUBLICATIONS

PCT Application filed on Aug. 16, 2016, entitled "Automation System User Interface", PCT/US2016/047172.
PCT Application filed on Aug. 17, 2016, entitled "Automation System User Interface", PCT/US2016/047262.
PCT Application filed on Oct. 13, 2016, entitled "Coordinated Control of Connected Devices in a Premise", PCT/US2016/056842.
PCT Application filed on Nov. 17, 2016, entitled "Mobile Premises Automation Platform", PCT/US2016/062519.
Requirement for Restriction/Election dated Jan. 22, 2013 for U.S. Appl. No. 13/104,932, filed May 10, 2011.
Requirement for Restriction/Election dated Jan. 22, 2013 for U.S. Appl. No. 13/104,936, filed May 10, 2011.
Requirement for Restriction/Election dated Oct. 24, 2012 for U.S. Appl. No. 12/750,470, filed Mar. 30, 2010.
Security For The Future, Introducing 5804BO—Advanced two-way wireless remote technology, Advertisement, ADEMCO Group, Syosset, NY, circa 1997.
Shang, Wei-lai, Study on Application of Embedded Intelligent Area System, Journal of Anyang Institute of Technology, vol. 9, No. 6, pp. 56-57 and 65.
South African Patent App. No. 2013/02668, corresponds to WO2012/040653.
Supplemental European Search Report for Application No. EP05725743.8 dated Sep. 14, 2010, 2 pages.
Supplementary European Search Report for Application No. EP10819658, dated Mar. 10, 2015, 2 pages.
Supplementary European Search Report for Application No. EP11827671, dated Mar. 10, 2015, 2 pages.
Supplementary Partial European Search Report for Application No. EP09807196, dated Nov. 17, 2014, 5 pages.
Supplementary European Search Report for Application No. EP2191351, dated Jun. 23, 2014, 2 pages.
Supplementary Non-Final Office Action dated Oct. 28, 2010 for U.S. Appl. No. 12/630,092, filed Dec. 3, 2009.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
United States Patent and Trademark Office—Before the Patent Trial and Appeal Board, *Alarm.com* (U.S. Pat. No. 8,350,694B1) (inventors Stephen Scott Trundle & Alison Jane Slavin) V *iControl Networks, Inc.* (U.S. Appl. No. 13/311,365) (Inventors. Poul j. Dawes, Jim Fulker, Carolyn Wales, Reza Raji, And Gerald Gutt), Patent Interference 106,001 (HHB) (Technology Center 24000), Mar. 31, 2015.
US Patent Application filed on Jan. 3, 2019, entitled "Methods and Systems for Data Communication", U.S. Appl. No. 16/239,114.
US Patent Application filed on Jan. 11, 2021, entitled "Premise Management Systems and Methods", U.S. Appl. No. 17/145,773.
US Patent Application filed on Jan. 22, 2019, entitled "Data Model for Home Automation", U.S. Appl. No. 16/254,535.
US Patent Application filed on Jan. 22, 2019, entitled "Premises System Automation", U.S. Appl. No. 16/254,480.
US Patent Application filed on Jan. 23, 2020, entitled "Forming a Security Network Including Integrated Security System Components and Network Dev", U.S. Appl. No. 16/750,976.
US Patent Application filed on Jan. 25, 2019, entitled Communication Protocols in Integrated Systems, U.S. Appl. No. 16/257,706.
US Patent Application filed on Jan. 28, 2019, entitled "Automation System User Interface With Three-Dimensional Display", U.S. Appl. No. 16/258,858.
US Patent Application filed on Feb. 6, 2020, entitled "Activation Of Gateway Device", U.S. Appl. No. 16/784,159.
US Patent Application filed on Feb. 9, 2021, entitled "Premises Management Networking", U.S. Appl. No. 17/171,398.
US Patent Application filed on Mar. 2, 2017, entitled "Generating Risk Profile Using Data of Home Monitoring and Security System", U.S. Appl. No. 15/447,982.
US Patent Application filed on Jul. 26, 2021, entitled "Notification of Event Subsequent To Communication Failure With Security System", U.S. Appl. No. 17/443,427.
US Patent Application filed on Jul. 30, 2021, entitled "Gateway Integrated With Premises Security System", U.S. Appl. No. 17/390,222.
US Patent Application filed on Aug. 10, 2021, entitled "Media Content Management", U.S. Appl. No. 17/398,939.
US Patent Application filed on Aug. 16, 2021, entitled "Control System User Interface", U.S. Appl. No. 17/403,526.
US Patent Application filed on Aug. 23, 2021, entitled "Method and System for Providing Alternate Network Access", U.S. Appl. No. 17/409,528.
US Patent Application filed on Aug. 31, 2021, entitled "Networked Touchscreen With Integrated Interfaces", U.S. Appl. No. 17/463,267.
US Patent Application filed on Sep. 7, 2021, entitled "Gateway Registry Methods and Systems", U.S. Appl. No. 17/468,188.
US Patent Application filed on Sep. 8, 2021, entitled "User Interface in a Premises Network", U.S. Appl. No. 17/469,417.
US Patent Application filed on Sep. 9, 2021, entitled "Premises System Management Using Status Signal", U.S. Appl. No. 17/470,732.
US Patent Application filed on Feb. 8, 2022, entitled "Server-Based Notification of Alarm Event Subsequent To Communication Failure With Armed Security System", U.S. Appl. No. 17/650,324.
US Patent Application filed on Mar. 10, 2022, entitled "Virtual Device Systems and Methods", U.S. Appl. No. 17/691,774.
US Patent Application filed on Apr. 4, 2022, entitled "Control System User Interface", U.S. Appl. No. 17/712,911.
US Patent Application filed on Apr. 6, 2022, entitled "Hardware Configurable Security, Monitoring and Automation Controller Having Modular Communication Protocol Interfaces", U.S. Appl. No. 17/714,499.
US Patent Application filed on Apr. 14, 2022, entitled "Premises Management Configuration and Control", U.S. Appl. No. 17/659,259.
US Patent Application filed on Apr. 14, 2022, entitled "Premises System Automation", U.S. Appl. No. 17/721,192.
K. Lee, D. Murray, D. Hughes and W. Joosen, "Extending sensor networks into the Cloud using Amazon Web Services," 2010 IEEE International Conference on Networked Embedded Systems for Enterprise Applications, 2010.
US Patent Application filed on May 10, 2021, entitled "Management of a Security System At a Premises", U.S. Appl. No. 17/316,402.
US Patent Application filed on Jun. 9, 2021, entitled "Premises Management Configuration and Control", U.S. Appl. No. 17/343,315.
US Patent Application filed on Jun. 18, 2021, entitled "Controlling Data Routing Among Networks", U.S. Appl. No. 17/304,342.
Form PCT/ISA/210, "PCT International Search Report for the Application No. PCT/US11/53136, (ICON.P014WO)," Jan. 5, 2012, 2 pages.
Form PCT/ISA/220, "PCT Notification of Transmittal of the International Search Report and the Written Opinion of the International Searching Authority, or the Declaration for the Application No. PCT/US10/50585 (ICON.P014WO)," Dec. 30, 2010, 1 page.
Form PCT/ISA/220, "PCT Notification of Transmittal of the International Search Report and the Written Opinion of the International Searching Authority, or the Declaration for the Application No. PCT/US10/57674 (ICON.P015WO)" Mar. 2, 2011, 1 page.
Form PCT/ISA/237,"PCT Written Opinion ofthe International Searching Authority for the Application No. PCT/US05/08766 (ICON.P020)," May 23, 2006, 5 pages.
Form PCT/ISA/237, "PCT Written Opinion of the International Searching Authority for the Application No. PCT/US08/72831 (ICON.P001WO)," Nov. 4, 2008, 6 pages.
Form PCT/ISA/237, "PCT Written Opinion of the International Searching Authority for the Application No. PCT/US08/74246 (ICON.P003WO)," Nov. 14, 2008, 6 pages.
Form PCT/ISA/237, "PCT Written Opinion of the International Searching Authority for the Application No. PCT/US08/74260 (ICON.P002WO)," Nov. 13, 2008, 6 pages.
Form PCT/ISA/237, "PCT Written Opinion of the International Searching Authority for the Application No. PCT/US09/53485 (ICON.P011 WO)," Oct. 22, 2009, 8 pages.

(56) References Cited

OTHER PUBLICATIONS

Form PCT/ISA/237, "PCT Written Opinion of the International Searching Authority for the Application No. PCT/US09/55559 (ICON.P012WO)," Nov. 12, 2009, 6 pages.
Form PCT/ISA/237, "PCT Written Opinion of the International Searching Authority for the Application No. PCT/US11/34858 (ICON.P017WO)," Oct. 3, 2011, 8 pages.
Form PCT/ISA/237, "PCT Written Opinion of the International Searching Authority for the Application No. PCT/US11/35994 (ICON.P016WO)," Sep. 28, 2011, 11 pages.
Form PCT/ISA/237, "PCT Written Opinion of the International Searching Authority for the Application No. PCT/US11/53136 (ICON.P019WO)," Jan. 5, 2012.
Form PCT/ISA/237, "PCT Written Opinion ofthe International Searching Authority ofthe Application No. PCT/US08/83254 (ICON. P005WO)," Jan. 14, 2009, 7 pages.
Gateway Registry Methods and Systems, U.S. Appl. No. 13/486,276, filed Jun. 1, 2012.
Genex OmniEye http://www.qenextech.com/prod01.htm, 1999 5 pages.
Genex Technologies, Genex OmniEye, www.av-iq.com/avcat/images/documents/pdfs/omnieye%20nightwatchbrochure.pdf; webpage accessed Jan. 10, 2018.
Gong, Li, A Software architecture for open service gateways, Internet Computing, IEEE 5.1, Jan.-Feb. 2001, 64-70.
GrayElectronics, "Digitizing TV cameras on TCP/IP Computer Networks," http://www.grayelectronics.com/default.htm, printed on Oct. 12, 1999 (2 pages).
GrayElectronics, http://www.grayelectronics.com; webpage accessed on Jan. 10, 2018.
GTI Genex Technologies, Inc. OmniEye.(Trademark). Product Brochure, Sep. 14, 1999 (5 pages).
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
Indian Patent App. No. 10698/DELNP/2012, corresponds to WO2011/143273.
Indian Patent App. No. 3687/DELNP/2012, corresponds to WO2011/038409 filed on Sep. 28, 2010.
International Search Report for Application No. PCT/US 13/48324, dated Jan. 14, 2014, 2 pages.
International Search Report for Application No. PCT/US2014/050548, dated Mar. 18, 2015, 4 pages.
J. David Eisenberg, SVG Essentials: Producing Scalable Vector Graphics with XML. O'Reilly & Associates, Inc., Sebastopol, CA 2002.
Lagotek Wireless Home Automation System, May 2006 [retrieved on Aug. 22, 2012].
Network Working Group, Request for Comments H.Schulzrinne Apr. 1998.
Non-Final Office Action dated Apr. 4, 2013 for U.S. Appl. No. 12/197,931, filed Aug. 25, 2008.
Non-Final Office Action dated Mar. 4, 2013 for U.S. Appl. No. 13/400,477, filed Feb. 20, 2012.
Non-Final Office Action dated May 5, 2010 for U.S. Appl. No. 12/189,780, filed Aug. 11, 2008.
Non-Final Office Action dated May 5, 2010 for U.S. Appl. No. 12/189,785, filed Aug. 11, 2008.
Non-Final Office Action dated Feb. 7, 2012 for U.S. Appl. No. 12/637,671, filed Dec. 14, 2009.
Non-Final Office Action dated Feb. 7, 2013 for U.S. Appl. No. 12/970,313, filed Dec. 16, 2010.
Non-Final Office Action dated Feb. 8, 2012 for U.S. Appl. No. 12/630,092, filed Dec. 3, 2009.
Non-Final Office Action dated Apr. 9, 2012 for U.S. Appl. No. 12/771,624, filed Apr. 30, 2010.
Non-Final Office Action dated Dec. 9, 2008 for U.S. Appl. No. 11/084,232, filed Mar. 16, 2005.
Non-Final Office Action dated Aug. 10, 2012 for U.S. Appl. No. 12/771,471, filed Apr. 30, 2010.
Non-Final Office Action dated Oct. 11, 2012 for U.S. Appl. No. 12/019,568, filed Jan. 24, 2008.
Non-Final Office Action dated Apr. 12, 2012 for U.S. Appl. No. 12/770,365, filed Apr. 29, 2010.
Non-Final Office Action dated Jul. 12, 2012 for U.S. Appl. No. 12/691,992, filed Jan. 22, 2010.
Non-Final Office Action dated Oct. 12, 2012 for U.S. Appl. No. 12/630,092, filed Dec. 3, 2009.
Non-Final Office Action dated Sep. 12, 2012 for U.S. Appl. No. 12/952,080, filed Nov. 22, 2010.
Non-Final Office Action dated Jul. 13, 2010 for U.S. Appl. No. 12/019,568, filed Jan. 24, 2008.
Non-Final Office Action dated Nov. 14, 2012 for U.S. Appl. No. 13/531,757, filed Jun. 25, 2012.
Non-Final Office Action dated Sep. 14, 2010 for U.S. Appl. No. 11/084,232, filed Mar. 16, 2005.
Non-Final Office Action dated Sep. 16, 2011 for U.S. Appl. No. 12/539,537, filed Aug. 11, 2009.
Non-Final Office Action dated Sep. 17, 2012 for U.S. Appl. No. 12/189,780, filed Aug. 11, 2008.
US Patent Application filed on Jan. 14, 2022, entitled "Mobile Premises Automation Platform", U.S. Appl. No. 17/576,336.
US Patent Application filed on Dec. 3, 2021, entitled "Method and System for Managing Communication Connectivity", U.S. Appl. No. 17/542,310.
US Patent Application filed on Dec. 17, 2021, entitled "Cross-Client Sensor User Interface in an Integrated Security Network", U.S. Appl. No. 17/644,935.
US Patent Application filed on Dec. 23, 2021, entitled "Defining and Implementing Sensor Triggered Response Rules", U.S. Appl. No. 17/645,889.
US Patent Application filed on Apr. 18, 2022, entitled "Method and System for Processing Security Event Data", U.S. Appl. No. 17/723,101.
US Patent Application filed on Apr. 22, 2022, entitled "Communication Protocols in Integrated Systems", U.S. Appl. No. 17/727,470.
US Patent Application filed on May 4, 2022, entitled "Premises Management Configuration and Control", U.S. Appl. No. 17/736,408.
US Patent Application filed on May 16, 2022, entitled "Automation System With Mobile Interface", U.S. Appl. No. 17/744,858.
US Patent Application filed on May 23, 2022, entitled "Premise Management Systems and Methods", U.S. Appl. No. 17/664,524.
US Patent Application filed on Jun. 1, 2022, entitled "Integrated Cloud System for Premises Automation", U.S. Appl. No. 17/804,941.
US Patent Application filed on Jun. 8, 2022, entitled "Methods and Systems for Data Communication", U.S. Appl. No. 17/835,394.
US Patent Application filed on Jun. 10, 2022, entitled "Media Content Management", U.S. Appl. No. 17/838,046.
US Patent Application filed on Jun. 10, 2022, entitled "Method, System and Apparatus for Automated Reporting of Account and Sensor Zone Information To a Central Station", U.S. Appl. No. 17/806,341.
US Patent Application filed on Jun. 22, 2022, entitled "Activation of Gateway Device", U.S. Appl. No. 17/808,146.
US Patent Application filed on Jun. 22, 2022, entitled "Automation System User Interface With Three-Dimensional Display", U.S. Appl. No. 17/808,275.
US Patent Application filed on Jun. 22, 2022, entitled "Communication Protocols in Integrated Systems", U.S. Appl. No. 17/808,118.
US Patent Application filed on Jul. 1, 2022, entitled "Forming a Security Network Including Integrated Security System Components", U.S. Appl. No. 17/856,448.
US Patent Application filed on Aug. 3, 2022, entitled "Premises Management Networking", U.S. Appl. No. 17/817,210.
US Patent Application filed on Aug. 11, 2022, entitled "Security Network Integrating Security System and Network Devices", U.S. Appl. No. 17/819,083.
US Patent Application filed on Oct. 7, 2022, entitled "Security System With Networked Touchscreen", U.S. Appl. No. 18/045,018.
US Patent Application filed on Mar. 2, 2020, entitled "Communication Protocols in Integrated Systems", U.S. Appl. No. 16/807,100.

(56) References Cited

OTHER PUBLICATIONS

US Patent Application filed on Mar. 2, 2020, entitled "Coordinated Control of Connected Devices in a Premise", U.S. Appl. No. 16/807,028.
US Patent Application filed on Mar. 7, 2014, entitled "Activation of Gateway Device", U.S. Appl. No. 14/201,162.
US Patent Application filed on Mar. 7, 2014, entitled "Communication Protocols in Integrated Systems", U.S. Appl. No. 14/200,921.
US Patent Application filed on Mar. 7, 2014, entitled "Device Integration Framework", U.S. Appl. No. 14/201,227.
US Patent Application filed on Mar. 7, 2014, entitled "Integrated Security and Control System With Geofencing", U.S. Appl. No. 14/201,189.
US Patent Application filed on Mar. 7, 2014, entitled "Security System Integrated With Social Media Platform", U.S. Appl. No. 14/201,133.
US Patent Application filed on Mar. 10, 2014, entitled "Communication Protocols in Integrated Systems", U.S. Appl. No. 14/202,573.
US Patent Application filed on Mar. 10, 2014, entitled "Communication Protocols in Integrated Systems", U.S. Appl. No. 14/202,592.
US Patent Application filed on Mar. 10, 2014, entitled "Communication Protocols in Integrated Systems", U.S. Appl. No. 14/202,627.
US Patent Application filed on Mar. 10, 2014, entitled "Communication Protocols in Integrated Systems", U.S. Appl. No. 14/202,685.
US Patent Application filed on Mar. 10, 2014, entitled "Communication Protocols in Integrated Systems", U.S. Appl. No. 14/203,077.
US Patent Application filed on Mar. 10, 2014, entitled "Communication Protocols in Integrated Systems", U.S. Appl. No. 14/203,084.
US Patent Application filed on Mar. 10, 2014, entitled "Communication Protocols in Integrated Systems", U.S. Appl. No. 14/203,128.
US Patent Application filed on Mar. 10, 2014, entitled "Communication Protocols in Integrated Systems", U.S. Appl. No. 14/203,141.
US Patent Application filed on Mar. 10, 2014, entitled "Communication Protocols in Integrated Systems", U.S. Appl. No. 14/203,219.
US Patent Application filed on Mar. 10, 2014, entitled "Communication Protocols Over Internet Protocol (IP) Networks", U.S. Appl. No. 14/202,505.
US Patent Application filed on Mar. 10, 2014, entitled "Communication Protocols Over Internet Protocol (IP) Networks", U.S. Appl. No. 14/202,579.
US Patent Application filed on Mar. 11, 2020, entitled "Management of a Security System at a Premises", U.S. Appl. No. 16/816,134.
US Patent Application filed on Mar. 18, 2019, entitled "Server-Based Notification of Alarm Event Subsequent To Communication Failure With Armed Security System", U.S. Appl. No. 16/356,742.
US Patent Application filed on Mar. 20, 2020, entitled "Security, Monitoring and Automation Controller Access and Use of Legacy Security Control Panel Information", U.S. Appl. No. 16/825,099.
US Patent Application filed on Apr. 17, 2020, entitled "Method and System for Providing Alternate Network Access", U.S. Appl. No. 16/852,072.
US Patent Application filed on Apr. 17, 2020, entitled "Networked Touchscreen With Integrated Interfaces", U.S. Appl. No. 16/852,058.
US Patent Application filed on Apr. 23, 2019, entitled "Control System User Interface", U.S. Appl. No. 16/391,625.
US Patent Application filed on Apr. 26, 2019, entitled "Custom Content for Premises Management", U.S. Appl. No. 16/396,368.
US patent application filed on May 2, 2018, entitled "Automation System With Mobile Interface", U.S. Appl. No. 15/969,514.
US Patent Application filed on May 11, 2020, entitled "Control System User Interface", U.S. Appl. No. 16/871,151.
US Patent Application filed on May 12, 2020, entitled "IP Device Discovery Systems and Methods", U.S. Appl. No. 15/930,029.
US Patent Application filed on May 19, 2020, entitled "User Interface in a Premises Network", U.S. Appl. No. 16/878,099.
US Patent Application filed on May 23, 2018, entitled "Networked Touchscreen With Integrated Interfaces", U.S. Appl. No. 15/987,638.
US Patent Application filed on May 26, 2020, entitled "Premises Management Configuration and Control", U.S. Appl. No. 16/882,876.
US Patent Application filed on Jun. 1, 2012, entitled "Gateway Registry Methods and Systems", U.S. Appl. No. 13/486,276.
US Patent Application filed on Jun. 10, 2020, entitled "Method and System for Communicating With and Controlling an Alarm System From a Remote Server", U.S. Appl. No. 16/898,146.
US Patent Application filed on Jun. 24, 2020, entitled "Method and System for Processing Security Event Data", U.S. Appl. No. 16/910,967.
US Patent Application filed on Jun. 27, 2018, entitled "Activation Of Gateway Device", U.S. Appl. No. 16/020,499.
US Patent Application filed on Jul. 2, 2019, entitled "Communication Protocols in Integrated Systems", U.S. Appl. No. 16/460,712.
US Patent Application filed on Jul. 3, 2018, entitled "WIFI-To-Serial Encapsulation In Systems", U.S. Appl. No. 16/026,703.
US Patent Application filed on Jul. 9, 2020, entitled "Automation System With Mobile Interface", U.S. Appl. No. 16/925,026.
US Patent Application filed on Jul. 12, 2018, entitled "Integrated Security System with Parallel Processing Architecture", U.S. Appl. No. 16/034,132.
US Patent Application filed on Jul. 20, 2018, entitled "Cross-Client Sensor User Interface in an Integrated Security Network", U.S. Appl. No. 16/041,291.
US Patent Application filed on Jul. 26, 2019, entitled "Device Integration Framework", U.S. Appl. No. 16/522,949.
US Patent Application filed on Jul. 28, 2016, entitled "Method and System for Automatically Providing Alternate Network Access for Telecommunications", U.S. Appl. No. 15/222,416.
US Patent Application filed on Aug. 8, 2016, entitled "Security, Monitoring and Automation Controller Access and Use of Legacy Security Control Panel Information", U.S. Appl. No. 15/231,273.
US Patent Application filed on Aug. 9, 2016, entitled "Controller and Interface for Home Security, Monitoring and Automation Having Customizable Audio Alerts for SMA Events", U.S. Appl. No. 15/232,135.
US Patent Application filed on Aug. 9, 2018, entitled "Method and System for Processing Security Event Data", U.S. Appl. No. 16/059,833.
US Patent Application filed on Aug. 21, 2018, entitled "Premises System Management Using Status Signal", U.S. Appl. No. 16/107,568.
US Patent Application filed on Aug. 23, 2019, entitled "Premises System Management Using Status Signal", U.S. Appl. No. 16/549,837.
US Patent Application filed on Aug. 26, 2020, entitled "Automation System User Interface With Three-Dimensional Display", U.S. Appl. No. 17/003,550.
US Patent Application filed on Sep. 6, 2018, entitled "Takeover of Security Network", U.S. Appl. No. 16/123,695.
US Patent Application filed on Sep. 10, 2020, entitled "Security System With Networked Touchscreen", U.S. Appl. No. 17/017,519.
US Patent Application filed on Sep. 22, 2022, entitled "Forming a Security Network Including Integrated Security System Components and Network Devices", U.S. Appl. No. 17/934,443.
US Patent Application filed on Nov. 29, 2022, entitled "Communication Protocols Over Internet Protocol (IP) Networks", U.S. Appl. No. 18/059,604.
US Patent Application filed on Nov. 30, 2022, entitled "Custom Content for Premises Management", U.S. Appl. No. 18/060,374.
US Patent Application filed on Dec. 1, 2022, entitled "Controlling Data Routing in Premises Management Systems", U.S. Appl. No. 18/073,514.
Fujii et al., "Community security platform for individually maintained home computers: The Vigilante Network Project", Proceedings of the 21st IEEE Instrumentation and Measurement Technology Conference, 2004, vol. 2, pp. 891-894.
Kobayashi et al., "Creating worldwide community safety with present technology and privacy protection: The e-JIKEI Network project", Procedia—Social and Behavioral Sciences, 2010, vol. 2, pp. 6-13.
Non-Final Rejection dated Jan. 20, 2023 for U.S. Appl. No. 17/712,911, 8 pages.
Prashyanusorn et al., "Sustainable tourism using security cameras with privacy protecting ability", Journal of Information Security, 2010, vol. 1, pp. 68-73.
US Patent Application filed on Jan. 5, 2023, entitled "Systems and Methods for Device Communication", U.S. Appl. No. 18/150,316.

(56) References Cited

OTHER PUBLICATIONS

US Patent Application filed on Jan. 13, 2023, entitled "Communication Protocols in Integrated Systems", U.S. Appl. No. 18/154,590.
US Patent Application filed on Jan. 19, 2023, entitled "Premises Management Configuration and Control", U.S. Appl. No. 18/157,030.
US Patent Application filed on Jan. 24, 2023, entitled "Server-Based Notification of Alarm Event Subsequent To Communication Failure With Armed Security System", U.S. Appl. No. 18/158,876.
US Patent Application filed on Jan. 26, 2023, entitled "System for Data Routing in Networks", U.S. Appl. No. 18/159,869.
US Patent Application filed on Feb. 8, 2023, entitled "Management of a Security System at a Premises", U.S. Appl. No. 18/166,052.
US Patent Application filed on Feb. 8, 2023, entitled "Premises Management Configuration and Control", U.S. Appl. No. 18/166,046.
US Patent Application filed on Feb. 13, 2023, entitled "Premise Management Systems and Methods", U.S. Appl. No. 18/168,314.

* cited by examiner

600
WAN Network 200
Connection Mgmt Server 210
Central Station Monitoring Client 220
Router/Firewall 221
Phone Client 230
Router/Firewall 231
PC Client 240
Router/Firewall 241
Broadband Modem 251
Premise Router/Firewall 252
Home LAN Network 250
Ethernet IP Camera 254
iHub Security Router 253
WiFi IP Camera 255
RFLink
RFLink
RFLink
Security Panel (IP enabled) 256
Security Touchscreen 257

1) ECP to iHub with low-cost electrical converter connected directly to iHub

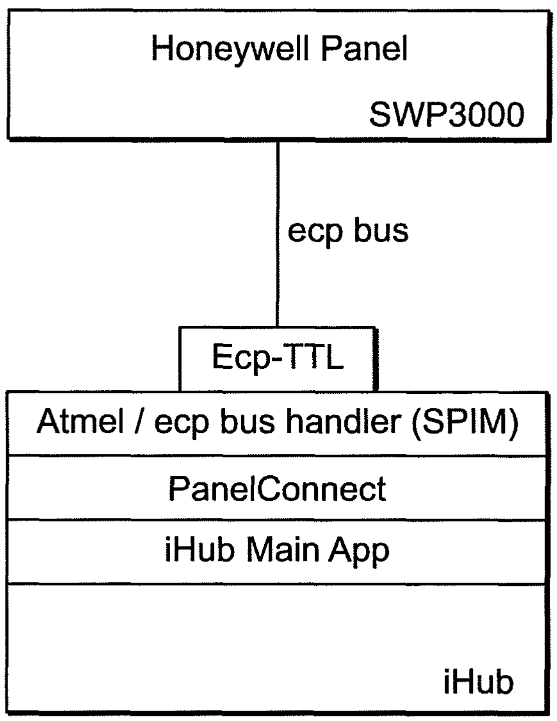

Good:
- Very low cost
- Ecp bus for long reach
- De-coupled bus-level converter allows for simple change-out to other panels Bad:
- Possible ADT perceived issue that converter is at iHub - should be minor issue
- Requires new spin (NA802) of iHub Other Items:
- Note that all options require Honeywell developer/info to implement PannelConnect optimally

*FIG. 25A*

2) ECP to SPIM with RS232 to iHub

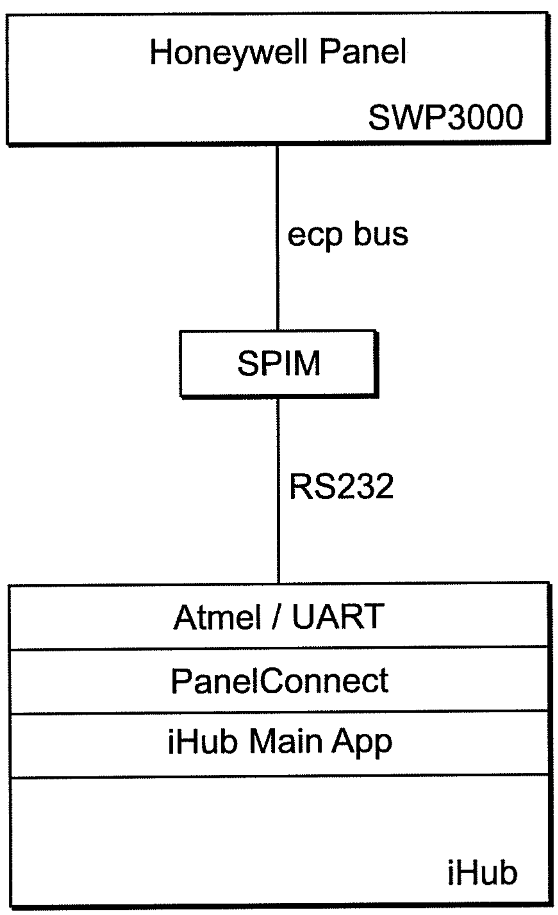

Good:
- Ecp bus for long reach
- De-coupled bus-level and low-layer protocol development - HW IP partially isolated
- Can use existing NA801 rather than NA802 if needed for reduced risk and time Bad:
- Possible ADT perceived issue with RS232 and SPIM locale near iHub Other Items:
- Note that all options require Honeywell developer/info to implement PannelConnect optimally
- 3rd party SPIM not available - will need to have either IC or HW design and produce the SPIM

*FIG. 25B*

3) ECP to SPIM with RS422 to iHub

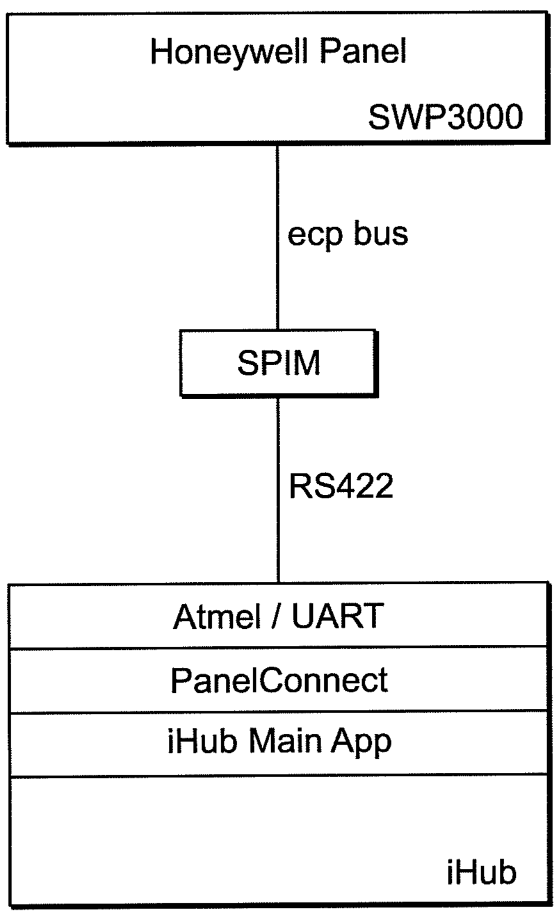

Good:
- Ecp or RS422 bus for long reach
- Can mount SPIM in Panel, inline, or at iHub
- De-coupled bus-level and low-layer protocol development - HW IP partially isolated Bad:
- Requires new spin (NA802) of iHub Other Items:
- Note that all options require Honeywell developer/info to implement PannelConnect optimally
- 3rd party SPIM not available - will need to have either IC or HW design and produce the SPIM

*FIG. 25C*

4) ECP to electrical converter with cable to iHub

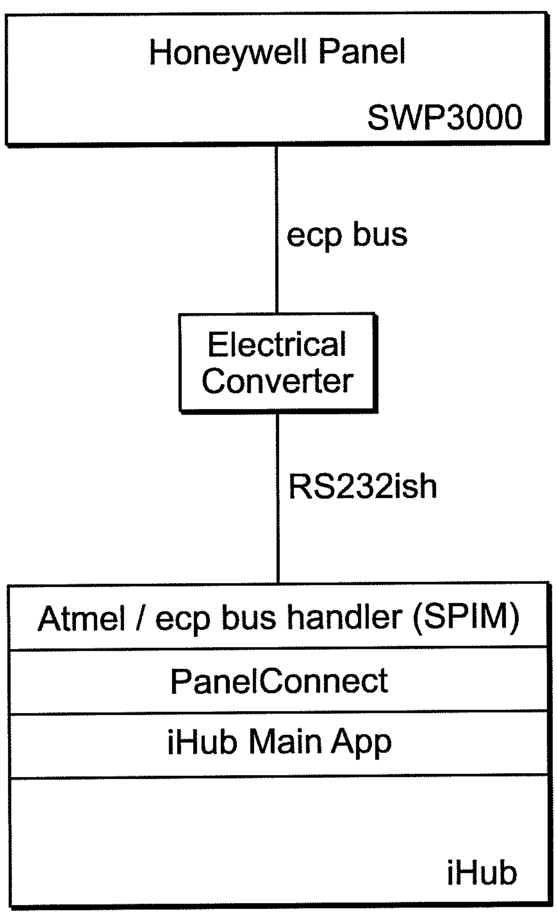

Good:
- Ecp or RS422 bus for long reach
- De-coupled bus-level and low-layer protocol development
- Low-cost converter module Bad:
- Requires new spin (NA802) of iHub
- Possible ADT perceived issue that converter is near iHub - minor issue Other Items:
- Note that all options require Honeywell developer/info to implement PannelConnect optimally

*FIG. 25D*

5) ECP directly to iHub with internal bus conversion and protocol handling

Good:
- Ecp or RS422 bus for long reach
- Low-cost solution as all built-in to iHub
- Ease of firmware updates Bad:
- Requires new spin (NA802) of iHub Other Items:
- Note that all options require Honeywell developer/info to implement PannelConnect optimally

| | | | |
|---|---|---|---|
| 100 | Medical | Zone | A non-specific medical condition exists |
| 101 | Personal Emergency | Zone | Emergency Assistance request |
| 102 | Fail to report in | Zone | A user has failed to activate a monitoring device |
| 110 | Fire | Zone | A non-specific fire alarm condition exists |
| 111 | Smoke | Zone | An alarm has been triggered by a smoke detector |
| 112 | Combustion | Zone | An alarm has been triggered by a combustion detector |
| 113 | Water Flow | Zone | An alarm has been triggered by a water flow detector |
| 114 | Heat | Zone | An alarm has been triggered by a heat detector |
| 115 | Pull Station | Zone | A pull station has been activated |
| 116 | Duct | Zone | An alarm has been triggered by a duct detector |
| 117 | Flame | Zone | An alarm has been triggered by a flame detector |
| 118 | Near Alarm | Zone | A near-alarm condition has been detected on a fire sensor |
| 120 | Panic | Zone | A non-specific hold-up alarm exists |
| 121 | Duress | User | A duress code has been entered by a user |
| 122 | Silent | Zone | A silent hold-up alarm exists |
| 123 | Audible | Zone | An audible hold-up alarm exists |
| 124 | Duress – Access granted | Zone | A duress code has been entered and granted at an entry door |
| 125 | Duress – Egress granted | Zone | A duress code has been entered and granted at an exit door |
| 126 | Hold-up suspicion print | User | A user has activated a trigger to indicate a suspicious condition |
| 130 | Burglary | Zone | A burglary zone has been violated while armed |
| 131 | Perimeter | Zone | A perimeter zone has been violated while armed |
| 132 | Interior | Zone | An interior zone has been violated while armed |
| 133 | 24 Hour (Safe) | Zone | A 24 hour burglary zone has been violated |
| 134 | Entry/Exit | Zone | An Entry/Exit zone has been violated while armed |
| 135 | Day/Night | Zone | An trouble by Day / alarm by Night zone has been violated while armed |
| 136 | Outdoor | Zone | An outdoor burglary zone has been violated while armed |
| 137 | Tamper | Zone | A burglary zone has been tampered with while armed |
| 138 | Near alarm | Zone | A burg sensor has detected a condition which will cause it to go into alarm if the condition worsens |
| 139 | Intrusion Verifier | Zone | The specified zone has verified that an intrusion has occurred |
| 140 | General Alarm | Zone | The specified zone is in an alarm condition |
| 141 | Polling loop open | Zone | An open circuit condition has been detected on a polling loop while the system was armed |
| 142 | Polling loop short | Zone | A short circuit condition has been detected on a polling loop while the system was armed |

FIG. 26A

| | | | |
|---|---|---|---|
| 143 | Expansion module failure | Zone | A general failure condition has been detected on an expansion module while the system was armed |
| 144 | Sensor tamper | Zone | A sensor's tamper has been violated (case opened) |
| 145 | Expansion module tamper | Zone | An expansion module's tamper has been violated (cabinet opened) |
| 146 | Silent Burglary | Zone | A burglary zone has been violated while armed with no audible notification produced |
| 147 | Sensor Supervision Failure | Zone | A sensor's supervisory circuit has reported a failure while the system was armed |
| 150 | 24 Hour Non-Burglary | Zone | A non-burglary zone has been faulted |
| 151 | Gas detected | Zone | The gas detector assigned to the specified zone has reported a fault condition |
| 152 | Refrigeration | Zone | The refrigeration detector assigned to the specified zone has reported a fault condition |
| 153 | Loss of heat | Zone | The temperature detector assigned to the specified zone has reported a fault condition |
| 154 | Water Leakage | Zone | The water leak detector assigned to the specified zone has reported a fault condition |
| 155 | Foil Break | Zone | The specified zone which is assigned to foil used as glass break detection has reported a fault condition |
| 156 | Day Trouble | Zone | The specified zone which monitors trouble by day has reported a fault condition while disarmed |
| 157 | Low bottled gas level | Zone | The gas level detector assigned to the specified zone has reported a fault condition |
| 158 | High temp | Zone | The over-temperature detector assigned to the specified zone has reported a fault condition |
| 159 | Low temp | Zone | The under-temperature detector assigned to the specified zone has reported a fault condition |
| 161 | Loss of air flow | Zone | The air flow detector assigned to the specified zone has reported a fault condition |
| 162 | Carbon Monoxide detected | Zone | The carbon monoxide detector assigned to the specified zone has reported a fault condition |
| 163 | Tank level | Zone | The tank level detector assigned to the specified zone has reported a fault condition |
| 200 | Fire Supervisory | Zone | The supervisory circuit of the specified fire zone has reported a fault condition |

FIG. 26B

| | | | |
|---|---|---|---|
| 201 | Low water pressure | Zone | The water pressure sensor assigned to the specified zone has reported a fault condition |
| 202 | Low CO2 | Zone | The CO2 pressure sensor assigned to the specified zone has reported a fault condition |
| 203 | Gate valve sensor | Zone | The gate valve sensor in the fire sprinkler system assigned to the specified zone has reported a fault condition |
| 204 | Low water level | Zone | The water level sensor assigned to the specified zone has reported a fault condition |
| 205 | Pump activated | Zone | The pump activity detector assigned to the specified zone has reported an active condition |
| 206 | Pump failure | Zone | A pump output monitor assigned to the specified zone has reported a fault condition |
| 300 | System Trouble | Zone | A general system trouble condition has been reported by the specified zone |
| 301 | AC Loss | Zone | AC power loss has been detected at a control or expansion module while the system was disarmed |
| 302 | Low system battery | Zone | A battery has failed a load test while the system was disarmed |
| 303 | RAM Checksum bad | Zone | A test of the system's memory has failed |
| 304 | ROM checksum bad | Zone | A test of the system's executable memory has failed |
| 305 | System reset | Zone | The system has reset and restarted |
| 306 | Panel programming changed | Zone | The programmed configuration of the panel has changed |
| 307 | Self-test failure | Zone | The system has failed a self-test |
| 308 | System shutdown | Zone | The system has been shut down and has stopped functioning |
| 309 | Battery test failure | Zone | The system backup battery has failed a load test while the system was disarmed |
| 310 | Ground fault | Zone | The panel has detected a ground fault condition |
| 311 | Battery Missing/Dead | Zone | The system has detected that the backup battery is either missing or completely discharged. |
| 312 | Power Supply Overcurrent | Zone | The system power supply has reported an excessive current draw condition |
| 313 | Engineer Reset | User | The specified service person has issued a system reset |
| 314 | Primary Power Supply Failure | Zone | The system's primary power supply has failed a supervision test. Radio devices indicate this when the backup battery charging circuit has failed its supervision test |
| 320 | Sounder/Relay | Zone | A trouble condition exists in the system's sounder/relay circuit |
| 321 | Bell 1 | Zone | A trouble condition exists in the primary bell circuit |
| 322 | Bell 2 | Zone | A trouble condition exists in the secondary bell circuit |

FIG. 26C

| | | | |
|---|---|---|---|
| 323 | Alarm relay | Zone | A trouble condition exists in the system's alarm relay circuit |
| 324 | Trouble relay | Zone | A trouble condition exists in the system's trouble relay circuit |
| 325 | Reversing relay | Zone | The specified TELCO reversing relay has reported a trouble condition |
| 326 | Notification Appliance Ckt. # 3 | Zone | A trouble condition exists in the bell #3 circuit |
| 327 | Notification Appliance Ckt. #4 | Zone | A trouble condition exists in the bell #4 circuit |
| 330 | System Peripheral trouble | Zone | A system peripheral device has reported a trouble condition |
| 331 | Polling loop open | Zone | An open circuit condition has been detected on a polling loop while the system was disarmed |
| 332 | Polling loop short | Zone | A short circuit condition has been detected on a polling loop while the system was disarmed |
| 333 | Expansion module failure | Zone | A general failure condition has been detected on an expansion module while the system was disarmed |
| 334 | Repeater failure | Zone | A repeater in the system has reported a failure condition while the system was disarmed |
| 335 | Local printer out of paper | Zone | The printer attached to the panel has reported an Out Of Paper condition |
| 336 | Local printer failure | Zone | The printer attached to the panel has reported a failure condition |
| 337 | Exp. Module DC Loss | Zone | An expansion module has detected a DC power loss |
| 338 | Exp. Module Low Batt. | Zone | An expansion module has detected a low battery condition |
| 339 | Exp. Module Reset | Zone | An expansion module has reset |
| 341 | Exp. Module Tamper | Zone | An expansion module has detected its taper switch has been faulted |
| 342 | Exp. Module AC Loss | Zone | An expansion module has detected the loss of AC power |
| 343 | Exp. Module self-test fail | Zone | An expansion module has failed a self-test |
| 344 | RF Receiver Jam Detect | Zone | An RF receiver has detected the presence of a jamming signal, preventing it from receiving normal signals from the system RF devices |
| 350 | Communication trouble | Zone | The system has experienced difficulties communicating with the central station |
| 351 | Telco 1 fault | Zone | The system has detected a fault on the primary dial-up line |
| 352 | Telco 2 fault | Zone | The system has detected a fault on the secondary dial-up line |
| 353 | Long Range Radio xmitter fault | Zone | A fault has been detected in the long range radio subsystem |
| 354 | Failure to communicate event | Zone | The system was unable to communicate an event to the central station |
| 355 | Loss of Radio supervision | Zone | The radio has not reported in its designated supervision interval |

FIG. 26D

| | | | |
|---|---|---|---|
| 356 | Loss of central polling | Zone | The radio has detected a loss in the polling signal from it's associated receiver |
| 357 | Long Range Radio VSWR problem | Zone | The Long Range Radio has reported a transmitter/antenna problem |
| 358 | Periodic Comm Test Fail /Restore | Zone | A periodic Communication path test has failed |
| 370 | Protection loop | Zone | The specified protection loop has reported a trouble condition |
| 371 | Protection loop open | Zone | The specified protection loop has reported an open-loop trouble condition |
| 372 | Protection loop short | Zone | The specified protection loop has reported a shorted-loop trouble condition |
| 373 | Fire trouble | Zone | A fire sensor has detected a trouble condition on the specified zone while the system was disarmed |
| 374 | Exit error alarm (zone) | Zone | An exit error condition has been reported for the specified alarm zone |
| 375 | Panic zone trouble | Zone | The system has detected a trouble condition on the panic zone |
| 376 | Hold-up zone trouble | Zone | The system has detected a trouble condition on the hold-up zone |
| 377 | Swinger Trouble | Zone | A fault has occurred on a zone that has been shut down due to exessive alarms |
| 378 | Cross-zone Trouble | Zone | The specified zone in a cross-zone configuration has faulted without a fault on its corresponding cross-zone in a specific time period |
| 380 | Sensor trouble | Zone | The specified sensor has reported a trouble condition |
| 381 | Loss of supervision - RF | Zone | The specified zone has failed to report in during its designated supervision period |
| 382 | Loss of supervision - RPM | Zone | An Remote Polled Module assigned to the specified zone has failed supervision |
| 383 | Sensor tamper | Zone | The tamper switch on the specified sensor has been faulted |
| 384 | RF low battery | Zone | The specified battery powered RF zone has reported a low battery condition |
| 385 | Smoke detector Hi sensitivity | Zone | A smoke detector's sensitivity level has drifted to the upper limit |
| 386 | Smoke detector Low sensitivity | Zone | A smoke detector's sensitivity level has drifted to the lower limit |
| 387 | Intrusion detector Hi sensitivity | Zone | An intrusion detector's sensitivity level has drifted to the upper limit |

FIG. 26E

| | | | |
|---|---|---|---|
| 388 | Intrusion detector Low sensitivity | Zone | An intrusion detector's sensitivity level has drifted to the lower limit |
| 389 | Sensor self-test failure | Zone | The specified sensor has failed a self-test |
| 391 | Sensor Watch trouble | Zone | A motion sensor has not been triggered within a pre-defined time interval |
| 392 | Drift Compensation Error | Zone | A smoke detector cannot automatically adjust its sensitivity |
| 393 | Maintenance Alert | Zone | The specified zone requires maintenance |
| 394 | CO Detector needs replacement | Zone | The specified Carbon Monoxide detector has reached end-of-life |
| 400 | Open/Close | User | The specified user has disarmed/armed the system |
| 401 | O/C by user | User | The specified user has disarmed/armed the system |
| 402 | Group O/C | Group | A group of zones has been armed or disarmed |
| 403 | Automatic O/C | User | A partition has been automatically armed or disarmed |
| 404 | Late to O/C (Note: use 453 or 454 instead ) | User | |
| 405 | Deferred O/C (Obsolete- do not use ) | User | |
| 406 | Cancel | User | The specified user has cancelled the previously reported alarm condition |
| 407 | Remote arm/disarm | User | The specified user has armed or disarmed the system from off-premesis |
| 408 | Quick arm | User | The specified user has quick-armed the system |
| 409 | Keyswitch O/C | User | The specified user has armed or disarmed the system using a keyswitch |
| 441 | Armed STAY | User | The specified user has armed the system in STAY mode |
| 442 | Keyswitch Armed STAY | User | The specified user has armed the system in STAY mode using a keyswitch |
| 443 | Armed with System Trouble Override | User | The specified user has armed the system while overriding a trouble condition |
| 450 | Exception O/C | User | The system has been armed or disarmed outside of the configured time window |
| 451 | Early O/C | User | The system has been disarmed/armed by the specified user before the configured time window has started |
| 452 | Late O/C | User | The system has been disarmed/armed by the specified user after the configured time window has ended |
| 453 | Failed to Open | User | The system has failed to have been disarmed during the designated time window |

FIG. 26F

| | | | |
|---|---|---|---|
| 454 | Failed to Close | User | The system has failed to be armed during the designated time window |
| 455 | Auto-arm Failed | User | The system has failed to automatically arm itself at the designated time |
| 456 | Partial Arm | User | The system has been only partially armed by the specified user |
| 457 | Exit Error (user) | User | The specified user has made an error exiting the premeses after arming the system |
| 458 | User on Premises | User | A user has disarmed the system afetr an alarm has occurred |
| 459 | Recent Close | User | The system had been armed within the last xx minutes |
| 461 | Wrong Code Entry | Zone | |
| 462 | Legal Code Entry | User | |
| 463 | Re-arm after Alarm | User | |
| 464 | Auto-arm Time Extended | User | A user has successfully requested that the system delay automatically arming |
| 465 | Panic Alarm Reset | Zone | The specified panic zone has been reset |
| 466 | Service On/Off Premises | User | A service person has entered or left the premises |
| 411 | Callback request made | User | A remote site (central station) has requested the panel call it back |
| 412 | Successful download/access | User | The configuration data of the system has been successfully downloaded |
| 413 | Unsuccessful access | User | A number of failed attempts have been made to remotely access the system |
| 414 | System shutdown command received | User | A central station has sent a system shutdown command to the panel |
| 415 | Dialer shutdown command received | User | A central station has sent a dialer shutdown command to the panel |
| 416 | Successful Upload | Zone | The configuration data of the system has been successfully uploaded |
| 421 | Access denied | User | The access control system has denied access to the specified user |
| 422 | Access report by user | User | |
| 423 | Forced Access | Zone | The specified access control door has been forced open |
| 424 | Egress Denied | User | The access control system has denied egress to the specified user |
| 425 | Egress Granted | User | The access control system has granted egress for the specified user |
| 426 | Access Door propped open | Zone | The specified access control door has been held open |

FIG. 26G

| | | | |
|---|---|---|---|
| 427 | Access point Door Status Monitor trouble | Zone | The specified Access Point's Door Status Monitor has reported a trouble condition to the panel |
| 428 | Access point Request To Exit trouble | Zone | The specified Access Point's Request To Exit zone has reported a trouble condition to the panel |
| 429 | Access program mode entry | User | The access control system has been put into program mode |
| 430 | Access program mode exit | User | The access control system has exited program mode |
| 431 | Access threat level change | User | The access control system's threat level has been changed |
| 432 | Access relay/trigger fail | Zone | The specified access control output device has failed to operate properly |
| 433 | Access RTE shunt | Zone | The specified Request To Exit zone has been shunted and will no longer report activity |
| 434 | Access DSM shunt | Zone | The specified Door Status Monitor zone has been shunted and will no longer report activity |
| 435 | Second Person Access | User | A second person has accessed an access point conforming to Two-Man-Rule requirements |
| 436 | Irregular Access | User | |
| 501 | Access reader disable | Zone | The credential reader on the specified acces point has been disabled |
| 520 | Sounder/Relay Disable | Zone | The specified sounder or relay has been disabled |
| 521 | Bell 1 disable | Zone | The specified output for Bell 1 has been disabled |
| 522 | Bell 2 disable | Zone | The specified output for Bell 2 has been disabled |
| 523 | Alarm relay disable | Zone | The specified alarm relay has been disabled |
| 524 | Trouble relay disable | Zone | The specified trouble relay has been disabled |
| 525 | Reversing relay disable | Zone | The specified reversing relay has been disabled |
| 526 | Notification Appliance Ckt. # 3 disable | Zone | The specified output for Bell 3 has been disabled |
| 527 | Notification Appliance Ckt. # 4 disable | Zone | The specified output for Bell 4 has been disabled |
| 531 | Module Added | Zone | The specified access control module has been added to the system |
| 532 | Module Removed | Zone | The specified access control module has been removed from the system |
| 551 | Dialer disabled | Zone | The specified dialer has been disabled |
| 552 | Radio transmitter disabled | Zone | The specified radio transmitter has been disabled |
| 553 | Remote Upload/Download disabled | Zone | Remote configuration has been enabled |
| 570 | Zone/Sensor bypass | Zone | The specified zone or sensor has been bypassed |

FIG. 26H

| | | | |
|---|---|---|---|
| 571 | Fire bypass | Zone | The specified fire zone has been bypassed |
| 572 | 24 Hour zone bypass | Zone | The specified 24 hour zone has been bypassed |
| 573 | Burg. Bypass | Zone | The specified burglary zone has been bypassed |
| 574 | Group bypass | User | A group of zones has been bypassed |
| 575 | Swinger bypass | Zone | The specified zone which has reported an excessive number of faults/restores in a short period of time has been bypassed |
| 576 | Access zone shunt | Zone | The specified zone in the access control system has been shunted and will no longer report activity |
| 577 | Access point bypass | Zone | The specified access point in the access control system has been bypassed and will allow the door to open (unsecured) |
| 578 | Vault Bypass | Zone | The specified vault zone has been bypassed |
| 579 | Vent Zone Bypass | Zone | The specified vent zone has been bypassed and will no longer report any activity |
| 601 | Manual trigger test report | Zone | A test report has been triggered manually |
| 602 | Periodic test report | Zone | A periodic test report has been triggered |
| 603 | Periodic RF transmission | Zone | A periodic RF path test report has been triggered |
| 604 | Fire test | User | The specified user has initiated a test of the fire alarm zones |
| 605 | Status report to follow | Zone | |
| 606 | Listen-in to follow | Zone | The system is about to activate a 2-way audio session |
| 607 | Walk test mode | User | The specified user has placed the system into the walk-test mode for testing purposes |
| 608 | Periodic test - System Trouble Present | Zone | A periodictest has been triggered but the fire system has a trouble condition present |
| 609 | Video Xmitter active | Zone | A video look-in session is about to begin |
| 611 | Point tested OK | Zone | The specified point tested successfully |
| 612 | Point not tested | Zone | The specified point has not been tested |
| 613 | Intrusion Zone Walk Tested | Zone | The specified intrusion zone has been successfully walk-tested |
| 614 | Fire Zone Walk Tested | Zone | The specified fire zone has been successfully walk-tested |
| 615 | Panic Zone Walk Tested | Zone | The specified panic zone has been successfully walk-tested |
| 616 | Service Request | Zone | A request has been made for system servicing |
| 621 | Event Log reset | Zone | The event log has been reset and all stored events have been discarded |
| 622 | Event Log 50% full | Zone | The event log is 50% full |
| 623 | Event Log 90% full | Zone | The event log is 90% full |
| 624 | Event Log overflow | Zone | The event log has overflowed and events have been lost |
| 625 | Time/Date reset | User | The time and date have been reset to a new value by the specified user |

FIG. 26I

| | | | |
|---|---|---|---|
| 626 | Time/Date inaccurate | Zone | The systemtime and date is known to be in error |
| 627 | Program mode entry | Zone | The system has been placed into program mode |
| 628 | Program mode exit | Zone | The system has exited program mode |
| 629 | 32 Hour Event log marker | Zone | |
| 630 | Schedule change | Zone | The specified fire/burglary schedule has been changed |
| 631 | Exception schedule change | Zone | The time schedule for event reporting by exception has been changed |
| 632 | Access schedule change | Zone | The specified access control schedule has been changed |
| 641 | Senior Watch Trouble | Zone | A person has not activated a motion sensor in a specified period |
| 642 | Latch-key Supervision | User | A child has disarmed the syetm (after school) |
| 651 | Reserved for Ademco Use | Zone | |
| 652 | Reserved for Ademco Use | User | |
| 653 | Reserved for Ademco Use | User | |
| 654 | System Inactivity | Zone | System has not been operated for x days |
| 655 | User Code X modified by Installer | User | The Installer has modified the specified User's code |
| 703 | Auxiliary #3 | Zone | |
| 704 | Installer Test | Zone | |
| 750 | User Assigned | | |
| 751 | User Assigned | | |
| 752 | User Assigned | | |
| 753 | User Assigned | | |
| 754 | User Assigned | | |
| 755 | User Assigned | | |
| 756 | User Assigned | | |
| 757 | User Assigned | | |
| 758 | User Assigned | | |
| 759 | User Assigned | | |
| 760 | User Assigned | | |
| 761 | User Assigned | | |
| 762 | User Assigned | | |
| 763 | User Assigned | | |
| 764 | User Assigned | | |
| 765 | User Assigned | | |
| 766 | User Assigned | | |
| 767 | User Assigned | | |
| 768 | User Assigned | | |

FIG. 26J

| | | | |
|---|---|---|---|
| 769 | User Assigned | | |
| 770 | User Assigned | | |
| 771 | User Assigned | | |
| 772 | User Assigned | | |
| 773 | User Assigned | | |
| 774 | User Assigned | | |
| 775 | User Assigned | | |
| 776 | User Assigned | | |
| 777 | User Assigned | | |
| 778 | User Assigned | | |
| 779 | User Assigned | | |
| 780 | User Assigned | | |
| 781 | User Assigned | | |
| 782 | User Assigned | | |
| 783 | User Assigned | | |
| 784 | User Assigned | | |
| 785 | User Assigned | | |
| 786 | User Assigned | | |
| 787 | User Assigned | | |
| 788 | User Assigned | | |
| 789 | User Assigned | | |
| 796 | Unable to output signal (Derived Channel) | Zone | |
| 798 | STU Controller down (Derived Channel) | Zone | |
| 900 | Download Abort | Downloader ID | The specified Downloader ID has aborted a download sequence in progress |
| 901 | Download Start/End | Downloader ID | Downloader has started or ended a download sequence to the panel |
| 902 | Download Interrupted | Downloader ID | A download sequence has been interrupted |
| 910 | Auto-close with Bypass | Zone | An auto-close sequence has been started and the specified zone has been bypassed |
| 911 | Bypass Closing | Zone | |

FIG. 26K

| | | | |
|---|---|---|---|
| 912 | Fire Alarm Silence | | The fire alarm has been silenced |
| 913 | Supervisory Point test Start/End | User | A fire supervisory device has been tested |
| 914 | Hold-up test Start/End | User | The specified user has started or ended a hold-up test |
| 915 | Burg. Test Print Start/End | | The printed progress of a burglary test has been started or ended |
| 916 | Supervisory Test Print Start/End | | The printed progress of a supervisory test has been started or ended |
| 917 | Burg. Diagnostics Start/End | Zone | A burglary system diagnostic test has been started or ended |
| 918 | Fire Diagnostics Start/End | Zone | A fire system diagnostic test has been started or ended |
| 919 | Untyped diagnostics | Zone | |
| 920 | Trouble Closing (closed with burg. during exit) | User | |
| 921 | Access Denied Code Unknown | User | Access has been deied because the system did not recognize the supplied access code as valid |
| 922 | Supervisory Point Alarm | Zone | The specified supervisory point has reported an alarm condition |
| 923 | Supervisory Point Bypass | Zone | The specified supervisory point has been bypassed |
| 924 | Supervisory Point Trouble | Zone | The specified supervisory point has reported a trouble condition |
| 925 | Hold-up Point Bypass | Zone | The specified hold-up point has been bypassed |
| 926 | AC Failure for 4 hours | Zone | There has been a loss of AC power for at least four hours |
| 927 | Output Trouble | Zone | The specified output has reported a trouble condition |
| 928 | User code for event | User | This message contains the ID of the user who triggered the previous event |
| 929 | Log-off | User | The specified user has logged-off of the system |

FIG. 26L

| Description | Byte 0 | Byte 1 | Byte 2 | Byte 3 | Byte 4 | Byte 2 | | | | Byte 3 | | | | | | | | Byte 4 | | | | | | | |
|---|---|---|---|---|---|---|---|---|---|---|---|---|---|---|---|---|---|---|---|---|---|---|---|---|---|
| Zone 1 open, "01 Not ready" displayed | HC | 1 | 10 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| Zone 1 open, "fault ..." spoken | | 1 | 10 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| zone 1 open - kp pwd down | | 8 | 0 | 0C | 8 | 0 | 0 | 0 | 0 | 0 | 0 | 0 | 0 | 1 | 1 | 0 | 0 | 0 | 0 | 0 | 0 | 1 | 0 | 0 | 0 |
| zone 1 restored - kp pwd down | | 8 | 10 | 1C | 8 | 0 | 0 | 0 | 0 | 0 | 0 | 0 | 1 | 1 | 1 | 0 | 0 | 0 | 0 | 0 | 0 | 1 | 0 | 0 | 0 |
| zone 1 open - kp pwd | | 1 | 10 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| zone 1 restored - kp pwd | | 1 | 0 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| zone 2 open | | 8 | 20 | 0c | 8 | 0 | 0 | 0 | 0 | 0 | 0 | 0 | 0 | 1 | 1 | 0 | 0 | 0 | 0 | 0 | 0 | 1 | 0 | 0 | 0 |
| zone2 closed | | 8 | 30 | 1c | 8 | 0 | 0 | 0 | 0 | 0 | 0 | 0 | 1 | 1 | 1 | 0 | 0 | 0 | 0 | 0 | 0 | 1 | 0 | 0 | 0 |
| z2 open | | 2 | 20 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| | | 8 | 30 | 1c | 8 | 0 | 0 | 0 | 0 | 0 | 0 | 0 | 1 | 1 | 1 | 0 | 0 | 0 | 0 | 0 | 0 | 1 | 0 | 0 | 0 |
| | | | | | | | | | | | | | | | | | | | | | | | | | |
| z4 tamper alarm | | 4 | 14 | 2 | 8 | 0 | 1 | 0 | 0 | 0 | 0 | 0 | 0 | 0 | 0 | 1 | 0 | 0 | 0 | 0 | 0 | 1 | 0 | 0 | 0 |
| z4 tamper - alarm has been cancelled | | 4 | 31 | 2 | 8 | 0 | 0 | 0 | 1 | 0 | 0 | 0 | 0 | 0 | 0 | 1 | 0 | 0 | 0 | 0 | 0 | 1 | 0 | 0 | 0 |
| tamper restored | | 8 | 11 | 1c | 8 | 0 | 0 | 0 | 1 | 0 | 0 | 0 | 1 | 1 | 1 | 0 | 0 | 0 | 0 | 0 | 0 | 1 | 0 | 0 | 0 |
| z25 tamper | | 25 | 14 | 2 | 8 | 0 | 1 | 0 | 0 | 0 | 0 | 0 | 0 | 0 | 0 | 1 | 0 | 0 | 0 | 0 | 0 | 1 | 0 | 0 | 0 |
| | | | | | | | | | | | | | | | | | | | | | | | | | |
| Power up | | D1 | 10 | 0 | 8 | 0 | 0 | 0 | 1 | 0 | 0 | 0 | 1 | 0 | 0 | 0 | 0 | 0 | 0 | 0 | 0 | 1 | 0 | 0 | 0 |
| Away exit delay - 60 seconds | | 60 | 32 | 0 | 0C | 0 | 0 | 1 | 0 | 0 | 0 | 0 | 0 | 0 | 0 | 0 | 0 | 0 | 0 | 0 | 0 | 1 | 1 | 0 | 0 |
| Away exit delay - 54 seconds | | 54 | 20 | 0 | 0C | 0 | 0 | 0 | 0 | 0 | 0 | 0 | 0 | 0 | 0 | 0 | 0 | 0 | 0 | 0 | 0 | 1 | 1 | 0 | 0 |
| | | | | | | | | | | | | | | | | | | | | | | | | | |
| alarm zone 52 - burg | | 52 | 10 | 0 | 0F | 0 | 0 | 0 | 0 | 0 | 0 | 0 | 0 | 0 | 0 | 0 | 0 | 0 | 0 | 0 | 0 | 1 | 1 | 1 | 1 |
| | | | | | | | | | | | | | | | | | | | | | | | | | |
| fire alarm zone 7 | | 7 | 10 | 31 | 0A | 0 | 0 | 0 | 0 | 0 | 0 | 1 | 1 | 0 | 0 | 0 | 1 | 0 | 0 | 0 | 0 | 1 | 0 | 1 | 0 |
| alarm zone 2 burg | | 2 | 10 | 0 | 0F | 0 | 0 | 0 | 0 | 0 | 0 | 0 | 1 | 0 | 0 | 0 | 0 | 0 | 0 | 0 | 0 | 1 | 1 | 1 | 1 |
| | | | | | | | | | | | | | | | | | | | | | | | | | |

FIG. 27A

| Description | Byte 0 | Byte 1 | Byte 2 | Byte 3 | Byte 4 | Byte 2 | | | | Byte 3 | | | | | | | | Byte 4 | | | | | | | |
|---|---|---|---|---|---|---|---|---|---|---|---|---|---|---|---|---|---|---|---|---|---|---|---|---|---|
| alarm cancelled | | CA | 10 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| | | | | | | | | | | | | | | | | | | | | | | | | | |
| Fail to comm, LB, disarmed | | FC | 0 | 50 | 8 | 0 | 0 | 0 | 0 | 0 | 1 | 0 | 1 | 0 | 0 | 0 | 0 | 0 | 0 | 0 | 0 | 1 | 0 | 0 | 0 |
| | | | | | | | | | | | | | | | | | | | | | | | | | |
| Zone 1 open | | 1 | 20 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| Zone 3 tamper | | 3 | 30 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| Zone 1 tamper | | 1 | | | | | | | | | | | | | | | | | | | | | | | |
| Zone 25 tamper | | 25 | 14 | 2 | 8 | 0 | 1 | 0 | 0 | 0 | 0 | 0 | 0 | 0 | 0 | 1 | 0 | 0 | 0 | 0 | 0 | 1 | 0 | 0 | 0 |
| | | | | | | | | | | | | | | | | | | | | | | | | | |
| disarmed, not ready to arm | | 8 | 1 | C | 8 | 0 | 0 | 0 | 1 | 0 | 0 | 0 | 0 | 1 | 1 | 0 | 0 | 0 | 0 | 0 | 0 | 1 | 0 | 0 | 0 |
| disarmed, ready to arm | | 8 | 20 | 1C | 8 | 0 | 0 | 0 | 0 | 0 | 0 | 0 | 1 | 1 | 1 | 0 | 0 | 0 | 0 | 0 | 0 | 1 | 0 | 0 | 0 |
| armed to Stay | | 8 | 20 | 8C | 8 | 0 | 0 | 0 | 0 | 1 | 0 | 0 | 0 | 1 | 1 | 0 | 0 | 0 | 0 | 0 | 0 | 1 | 0 | 0 | 0 |
| armed to Away | | 8 | 20 | 0C | 0C | 0 | 0 | 0 | 0 | 0 | 0 | 0 | 0 | 1 | 1 | 0 | 0 | 0 | 0 | 0 | 0 | 1 | 1 | 0 | 0 |
| zone 25 burg alarm, armed to away | | 25 | 0 | 0 | 0F | 0 | 0 | 0 | 0 | 0 | 0 | 0 | 0 | 0 | 0 | 0 | 0 | 0 | 0 | 0 | 0 | 1 | 1 | 1 | 1 |
| zone 25 burg alarm disarmed once, still in memory | | 25 | 0 | 0 | 0A | 0 | 0 | 0 | 0 | 0 | 0 | 0 | 0 | 0 | 0 | 0 | 0 | 0 | 0 | 0 | 0 | 1 | 0 | 1 | 0 |
| Note for above: 5828 speaks "alarm zone 25" | | | | | | | | | | | | | | | | | | | | | | | | | |
| zone 4 tamper-"check zone 4" | | 4 | 20 | 2 | 8 | 0 | 0 | 0 | 0 | 0 | 0 | 0 | 0 | 0 | 0 | 1 | 0 | 0 | 0 | 0 | 0 | 1 | 0 | 0 | 0 |
| | | | | | | | | | | | | | | | | | | | | | | | | | |
| fire alarm zone 7 | | 7 | 30 | 21 | 0A | 0 | 0 | 0 | 0 | 0 | 0 | 1 | 0 | 0 | 0 | 0 | 1 | 0 | 0 | 0 | 0 | 1 | 0 | 1 | 0 |
| still in fire alarm | | 25 | 0 | 1 | 8 | 0 | 0 | 0 | 0 | 0 | 0 | 0 | 0 | 0 | 0 | 0 | 1 | 0 | 0 | 0 | 0 | 1 | 0 | 0 | 0 |
| 5828 quieted | | FC | 10 | 0 | 8 | 0 | 0 | 0 | 0 | 0 | 0 | 0 | 0 | 0 | 0 | 0 | 0 | 0 | 0 | 0 | 0 | 1 | 0 | 0 | 0 |
| disarmed - still speaks "fire garage" but not beeping | | 7 | 21 | 20 | 0A | 0 | 0 | 0 | 1 | 0 | 0 | 1 | 0 | 0 | 0 | 0 | 0 | 0 | 0 | 0 | 0 | 1 | 0 | 1 | 0 |
| | | | | | | | | | | | | | | | | | | | | | | | | | |
| | | | | | | | | | | | | | | | | | | | | | | | | | |
| Zone 7 fire alarm, 5828 started beeping | | FC | 20 | 1 | 8 | 0 | 0 | 0 | 0 | 0 | 0 | 0 | 0 | 0 | 0 | 0 | 1 | 0 | 0 | 0 | 0 | 1 | 0 | 0 | 0 |
| fire beeps stopped on 5828 after pressed key on hw kp | | 7 | 30 | 20 | 0A | 0 | 0 | 0 | 0 | 0 | 0 | 1 | 0 | 0 | 0 | 0 | 0 | 0 | 0 | 0 | 0 | 1 | 0 | 1 | 0 |

FIG. 27B

| Description | Byte 0 | Byte 1 | Byte 2 | Byte 3 | Byte 4 | Byte 2 | | | | Byte 3 | | | | | | | | Byte 4 | | | | | | | |
|---|---|---|---|---|---|---|---|---|---|---|---|---|---|---|---|---|---|---|---|---|---|---|---|---|---|
| | | | | | | | | | | | | | | | | | | | | | | | | | |
| zone 6 24 hour aux alarm | | 6 | 0 | 0 | 0B | 0 | 0 | 0 | 0 | 0 | 0 | 0 | 0 | 0 | 0 | 0 | 0 | 0 | 0 | 0 | 0 | 1 | 0 | 1 | 1 |
| alarm quieted with disarm - still speaks "alarm" on zone ( | | 6 | 11 | 0 | 0A | 0 | 0 | 0 | 1 | 0 | 0 | 0 | 0 | 0 | 0 | 0 | 0 | 0 | 0 | 0 | 0 | 1 | 0 | 1 | 0 |
| walk test zone 25(displays 25,AC, not ready, and sounds | | 25 | 23 | 0 | 8 | 0 | 0 | 1 | 1 | 0 | 0 | 0 | 0 | 0 | 0 | 0 | 0 | 0 | 0 | 0 | 0 | 1 | 0 | 0 | 0 |
| | | | | | | | | | | | | | | | | | | | | | | | | | |
| | | | | | | | | | | | | | | | | | | | | | | | | | |
| | | | | | | | | | | | | | | | | | | | | | | | | | |
| | | | | | | | | | | | | | | | | | | | | | | | | | |
| | | | | | | | | | | | | | | | | | | | | | | | | | |
| fast beeps started | | FC | 24 | 0 | 8 | 0 | 1 | 0 | 0 | 0 | 0 | 0 | 0 | 0 | 0 | 0 | 0 | 0 | 0 | 0 | 0 | 1 | 0 | 0 | 0 |

Figure 27D:
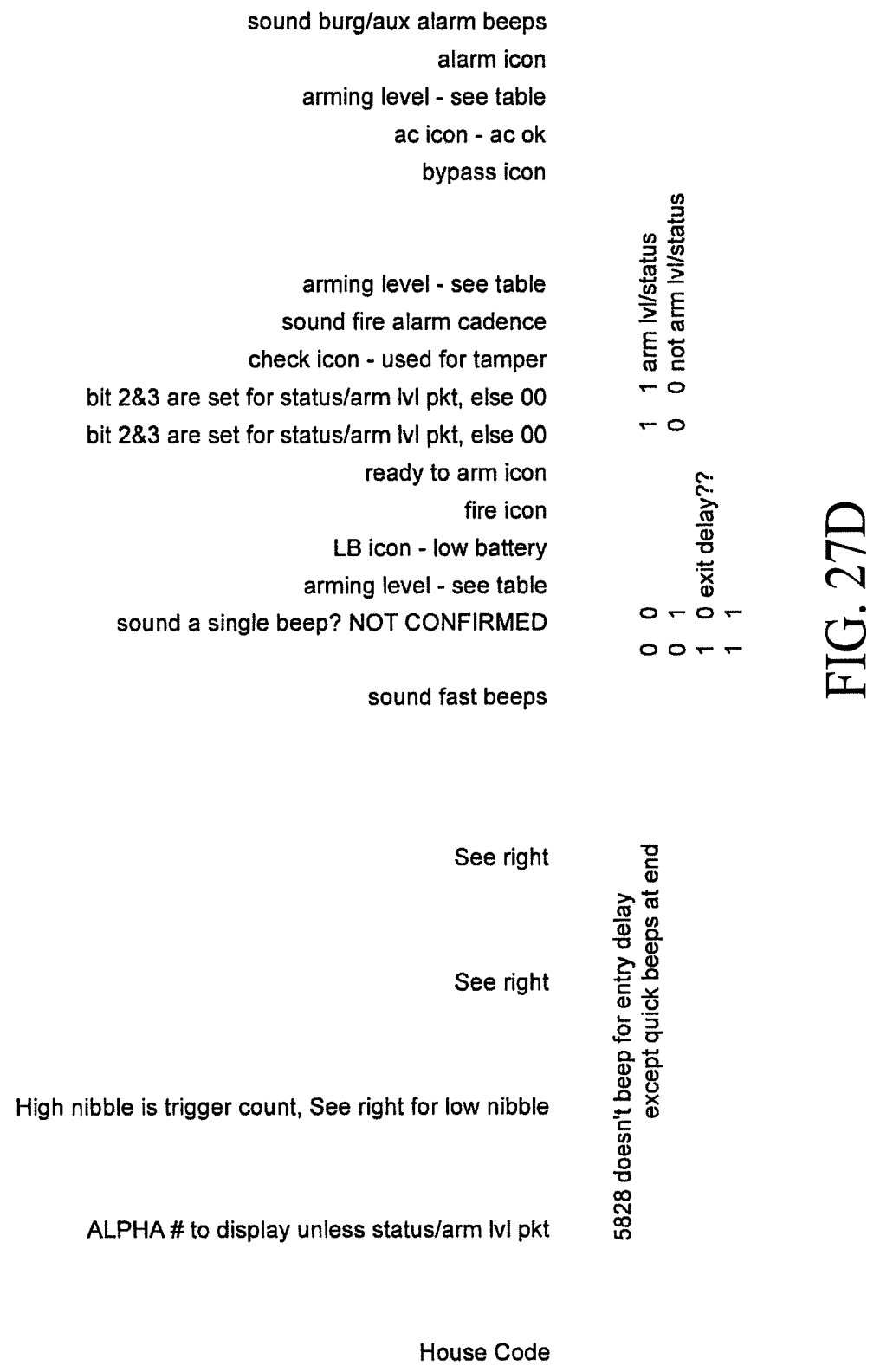

FIG. 27C sound burg/aux alarm beeps
alarm icon
arming level - see table
ac icon - ac ok
bypass icon arming level - see table
sound fire alarm cadence
check icon - used for tamper
bit 2&3 are set for status/arm lvl pkt, else 00
bit 2&3 are set for status/arm lvl pkt, else 00
ready to arm icon
fire icon
LB icon - low battery
arming level - see table
sound a single beep? NOT CONFIRMED sound fast beeps 1 1 arm lvl/status
0 0 not arm lvl/status 0 0
0 1
1 0 exit delay??
1 1

See right

See right

High nibble is trigger count, See right for low nibble

ALPHA # to display unless status/arm lvl pkt

House Code 5828 doesn't beep for entry delay
except quick beeps at end

| Byte 5 | Byte 6 | Byte 7 | Byte 8 | Byte 9 | Byte 10 | Byte 11 | Byte 12 |
|---|---|---|---|---|---|---|---|
| CRC | CRC | | | | | CRC | CRC |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

| Byte 5 | Byte 6 | Byte 7 | Byte 8 | Byte 9 | Byte 10 | Byte 11 | Byte 12 |
|---|---|---|---|---|---|---|---|
| | | 80 | | | | | |
| | | | | | | | |
| 0 | 65 | 0 | A0 | A0 | A0 | CB | A5 |
| | | | | | | | |
| 32 | C8 | 0 | 57 | 2C | A0 | EF | 76 |
| 1B | 88 | 0 | 0 | A0 | A0 | C3 | E5 |
| | | | | | | | |
| 6D | 57 | 0 | A0 | A0 | A0 | CB | A5 |
| | | | | | | | |
| AC | 5C | 0 | A0 | A0 | A0 | CB | A5 |
| 4E | CB | 0 | A0 | A0 | A0 | CB | A5 |
| 2E | C1 | 0 | A0 | A0 | A0 | CB | A5 |
| 2E | D3 | 0 | A0 | A0 | A0 | CB | A5 |
| 60 | 55 | 0 | A0 | A0 | A0 | CB | A5 |
| 60 | 4B | 0 | A0 | A0 | A0 | CB | A5 |
| | | | | | | | |
| FA | CB | 0 | A0 | A0 | A0 | CB | A5 |
| | | | | | | | |
| 8D | 84 | 0 | 17 | A0 | A0 | C2 | F3 |
| 66 | 47 | 0 | A0 | A0 | A0 | CB | A5 |
| 95 | 23 | 0 | A0 | A0 | A0 | CB | A5 |
| 0A | D3 | 0 | 17 | A0 | A0 | C2 | F3 |
| | | | | | | | |
| | | | | | | | |
| 10 | E0 | 0 | A0 | A0 | A0 | CB | A5 |
| 0B | 87 | | 17 | A0 | A0 | C2 | F3 |

FIG. 27F

| Byte 5 | Byte 6 | Byte 7 | Byte 8 | Byte 9 | Byte 10 | Byte 11 | Byte 12 |
|---|---|---|---|---|---|---|---|
| | | | | | | | |
| 5C | 42 | 0 | 45 | 46 | 88 | 12 | 38 |
| DD | 13 | 0 | 45 | 46 | 88 | 12 | 38 |
| 62 | FB | 0F | A0 | A0 | A0 | 7 | A5 |
| | | | | | | | |
| | | | | | | | |
| | | | | | | | |
| | | | | | | | |
| | | | | | | | |
| | | | | | | | |

| Byte 5 | Byte 6 | Byte 7 | Byte 8 | Byte 9 | Byte 10 | Byte 11 | Byte 12 |
|---|---|---|---|---|---|---|---|
| CRC | CRC | | zone text tokens | zone text tokens | zone text tokens | CRC | CRC |

80 for alarm cancel
0F for alarm cancel
5 for exit delay
0F for zone xx in walk test

FIG. 27G

| Wireless | Hardwire | Report |
|---|---|---|
| Y | Y | 110 Fire Zone A non-specific fire alarm condition exists |
| ? | Y | 121 Duress User A duress code has been entered by a user |
| ? | ? | 122 Silent Zone A silent hold-up alarm exists |
| ? | ? | 123 Audible Zone An audible hold-up alarm exists |
| NOTE 1 | NOTE 1 | 131 Perimeter Zone A perimeter zone has been violated while armed |
| NOTE 1 | NOTE 1 | 132 Interior Zone An interior zone has been violated while armed |
| NOTE 1 | NOTE 1 | 134 Entry/Exit Zone An Entry/Exit zone has been violated while armed |
| NOTE 1 | NOTE 1 | 135 Day/Night Zone An trouble by Day / alarm by Night zone has been violated while armed |
| ? | Y | 143 Expansion module failure Zone A general failure condition has been detected on an expansion module while the system was armed |
| ? | Y | 145 Expansion module tamper Zone An expansion module's tamper has been violated (cabinet opened) |
| Y | Y | 146 Silent Burglary Zone A burglary zone has been violated while armed with no audible notification produced |
| Y | Y | 150 24 Hour Non-Burglary Zone A non-burglary zone has been faulted |
| ? | ? | 162 Carbon Monoxide detected Zone The carbon monoxide detector assigned to the specified zone has reported a fault condition |
| Y | Y | 301 AC Loss Zone AC power loss has been detected at a control or expansion module while the system was disarmed |
| Y | Y | 302 Low system battery Zone A battery has failed a load test while the system was disarmed |
| Y | Y | 305 System reset Zone The system has reset and restarted |
| Y | Y | 309 Battery test failure Zone The system backup battery has failed a load test while the system was disarmed |
| ? | ? | 321 Bell 1 Zone A trouble condition exists in the primary bell circuit |
| NOTE 2 | NOTE 2 | 333 Expansion module failure Zone A general failure condition has been detected on an expansion module while the system was disarmed |
| NOTE 2 | NOTE 2 | 341 Exp. Module Tamper Zone An expansion module has detected its taper switch has been faulted |
| Y | Y | 344 RF Receiver Jam Detect Zone An RF receiver has detected the presence of a jamming signal, preventing it from receiving normal signals from the system RF device |
| Y | Y | 351 Telco 1 fault Zone The system has detected a fault on the primary dial-up line |
| ? | ? | 353 Long Range Radio xmitter fault Zone A fault has been detected in the long range radio subsystem |
| ? | ? | 373 Fire trouble Zone A fire sensor has detected a trouble condition on the specified zone while the system was disarmed |

*FIG. 28A*

| Wireless | Hardwire | Report |
|---|---|---|
| ? | ? | 374 Exit error alarm (zone) Zone An exit error condition has been reported for the specified alarm zone |
| ? | Y | 380 Sensor trouble Zone The specified sensor has reported a trouble condition |
| Y | Y | 381 Loss of supervision - RF Zone The specified zone has failed to report in during its designated supervision period |
| ? | ? | 382 Loss of supervision - RPM Zone An Remote Polled Module assigned to the specified zone has failed supervision |
| Y | Y | 383 Sensor tamper Zone The tamper switch on the specified sensor has been faulted |
| ? | Y | 384 RF low battery Zone The specified battery powered RF zone has reported a low battery condition |
| ? | ? | 393 Maintenance Alert Zone The specified zone requires maintenance |
| ? | ? | 401 O/C by user User The specified user has disarmed/armed the system |
| N | N | 403 Automatic O/C User A partition has been automatically armed or disarmed |
| N | N | 406 Cancel User The specified user has cancelled the previously reported alarm condition |
| N | N | 407 Remote arm/disarm User The specified user has armed or disarmed the system from offpremesis |
| ? | ? | 408 Quick arm User The specified user has quick-armed the system |
| N | N | 409 Keyswitch O/C User The specified user has armed or disarmed the system using a keyswitch |
| Y | Y | 441 Armed STAY User The specified user has armed the system in STAY mode |
| N | N | 442 Keyswitch Armed STAY User The specified user has armed the system in STAY mode using a keyswitch |
| ? | ? | 459 Recent Close User The system had been armed within the last xx minutes |
| Y | Y | 570 Zone/Sensor bypass Zone The specified zone or sensor has been bypassed |
| ? | ? | 601 Manual trigger test report Zone A test report has been triggered manually |
| ? | ? | 602 Periodic test report Zone A periodic test report has been triggered |
| N | N | 606 Listen-in to follow Zone The system is about to activate a 2-way audio session |
| ? | ? | 607 Walk test mode User The specified user has placed the system into the walk-test mode |
| N | N | 623 Event Log 90% full Zone The event log is 90% full |
| ? | ? | 625 Time/Date reset User The time and date have been reset to a new value by the specified user |
| ? | ? | 627 Program mode entry Zone The system has been placed into program mode |
| ? | ? | 628 Program mode exit Zone The system has exited program mode |
| ? | ? | 642 Latch-key Supervision User A child has disarmed the syetm (after school) |
| ? | ? | 750-789 User Assigned |

NOTE 1: The interface will indicate the zone # and alarm type (fire or burglary). In order to determine more information about the alarm, you would need to program the gateway with additional information about each zone number specific to each install.

NOTE 2: The interface will indicate the zone #, but might not indicate the zone type (hardwired, wireless, or expansion). In order to determine the zone type, you may need to program the gateway with additional information about each zone number specific to each install.

*FIG. 28B*

Packet Descriptions

| Tx Source | Bit Time(uS) | # Synch Bits | # start Bits | # ID Bytes | # Status Bytes | # of CRC Bytes | Total Bits/ transmission | Total Bytes not including Sync/start bits |
|---|---|---|---|---|---|---|---|---|
| Sensor | 300 | 14 | 1 | 3 | 1 | 2 | 63 | 6 |
| | | | | | | | | |
| 5828 KeyPad | 266 | 14 | 1 | 3 | 1 | 2 | 63 | 6 |
| | | | | | | | | |
| 5839 Keypad | 244 | 14 | 1 | 3 | 7 | 2 | 111 | 12 |
| | | | | | | | | |
| 5800TM 7 Byte | ~250 | 14 | 1 | 1 | 4 | 2 | 71 | 7 |
| | | | | | | | | |
| Vista 13 Byte | 244 | 14 | 1 | | 13 | | 119 | 13 |
| | | | | | | | | |
| Lynx 13 Byte | 256 | 14 | 1 | | 13 | | 119 | 13 |
| | | | | | | | | |
| Vista 53 Byte | 100 | 14 | 1 | 3 | 48 | 2 | 439 | 53 |

Notes:

The above bit times are measured values and may vary from device to device.

The Tranceiver (connected to a Vista 20) transmits 2 different packet types. I labeled the 2 different packet types Vista 13 Byte and the Vista 53 Byte Vista 53 Byte:

The Vista Long Pkt appears to be transmitted for the 5839 Keypad.

Vista 13 Byte:

The Vista Short Pkt appears to be transmitted for the 5828 Keypad.

5800TM 7 Byte:

The 5800TM 7 byte packet appears to be transmitted to the 5804 and maybe others.

*FIG. 29*

5828 Keypad Transmissions

Compatible with Lynx and Vista panels

Data Packet

Packet format

Data below is preceded by 14 synch bits and 1 start bit.
14 Sync bits are all ones.
Start bit is a zero.

| bit description | Data Bytes | 16 bit CRC |
|---|---|---|
| byte # | 1-4 | 5-6 |

| Data Bytes | Note: bits 0-14 are sync/start bits | |
|---|---|---|
| | bit number | Notes |
| | 15-18 | 0x0F for transmissions initiated by keypresses 0x01 for automatically generated transmissions such as auto generated "status request" messages after a keypress transmission. According to preliminary testing done by Mike Kinney, it appears that messages that have this nibble set to 1 cause the panel to slow down or stop transmitting messages to the 5828. |
| | 19-38 | Buffered Keys - see keycode chart below |
| | 39 | Trigger Count, toggle with each new message |
| | 40-46 | House Code with offset - see HouseCode chart below |

| 16 bit CRC | | |
|---|---|---|
| | 47-62 | 16 bit CRC with seed value of 0X8005 |

| key code chart | | | | |
|---|---|---|---|---|
| key | value | | key | value |
| 0 | 0 | | 8 | 8 |
| 1 | 1 | | 9 | 9 |
| 2 | 2 | | * | A |
| 3 | 3 | | # | B |
| 4 | 4 | | A | ? |
| 5 | 5 | | B | ? |
| 6 | 6 | | C | ? |
| 7 | 7 | | D | ? |

*FIG. 30A*

| Data Packet HouseCode Chart | | | | |
|---|---|---|---|---|
| RF HouseCode | Transmitted HouseCode | | RF HouseCode | Transmitted HouseCode |
| 1 | 3 | | 17 | 23 |
| 2 | 5 | | 18 | 25 |
| 3 | 7 | | 19 | 27 |
| 4 | 9 | | 20 | 29 |
| 5 | B | | 21 | 2B |
| 6 | D | | 22 | 2D |
| 7 | F | | 23 | 2F |
| 8 | 11 | | 24 | 31 |
| 9 | 13 | | 25 | 33 |
| 10 | 15 | | 26 | 35 |
| 11 | 17 | | 27 | 37 |
| 12 | 19 | | 28 | 39 |
| 13 | 1B | | 29 | 3B |
| 14 | 1D | | 30 | 3D |
| 15 | 1F | | 31 | 3F |
| 16 | 21 | | | |

*FIG. 30B*

Example transmissions (HC = 01)

| keypress | 14 Synch Bits | Start Bit | Data Bytes | | | | CRC Bytes | | Notes |
|---|---|---|---|---|---|---|---|---|---|
| * | | | FF | FF | FA | 83 | 1F | 22 | Trigger count = 1, HC = 01 |
| * | | | FF | FF | FA | 3 | 9C | 21 | Trigger count = 0, HC = 1 |
| 12342 | | | F1 | 23 | 42 | 95 | D9 | EF | Trigger count = 1, HC = 10 |
| | | | F1 | 23 | 42 | 15 | 5A | EC | Trigger count = 0, HC = 10 |
| 3,4,5,6 | | | FF | 34 | 56 | 83 | 78 | B7 | Trigger count = 1, HC = 01 |
| 3,4,5,6 | | | FF | 34 | 56 | 3 | FB | B4 | Trigger count = 0, HC = 1 |

Notes:
The 5828 Keypad does not need to be learned into the panel. It will work with a Lynx or Vista panel as long as it's programmed housecode matches the RF Housecode programmed into the panel. When a key is pressed, the keypad waits for further keypresses before transmitting the data. It will transmit the data after it's key buffer is full(5 keys) or it times out. This is done to reduce transmissions and conserve power since it is a battery powered device.
The 5828 Keypad sometimes automatically generates a status request transmissions ("*" key) after keypresses are transmitted. This is done to cause the panel to update the keypad with the current status.

*FIG. 30C*

5839 Keypad Transmissions

Compatible with Vista panels

Data below is preceded by 14 synch bits and 1 start bit.
14 Sync bits are all ones.
Start bit is a zero.

Packet format

| byte description | ID Bytes | Data Bytes | 16 bit CRC |
|---|---|---|---|
| byte # | 1-3 | 4-10 | 11-12 |

ID Bytes

Transceiver ID. Normally transferred to Wireless Keypad at Keypad enrollment into panel.

Data Bytes

| bit number | |
|---|---|
| 39-46 | Keypad ECN Address (0-7) |
| 47-54 | status bits - see status bit chart below |
| 55-58 | always seem to be 0xF, except for enrollment |
| 59-78 | Buffered Keys - see keycode chart below, all zeros for enrollment |
| 79-86 | always seem to be zero |
| 87-94 | trigger count, incremented with each different transmission |

16 bit CRC

Standard 16 bit CRC with seed value of 0X8005

*FIG. 31A* status bit chart

| bit # | description |
|---|---|
| 0 | ?? |
| 1 | Power Up |
| 2 | ?? |
| 3 | ?? |
| 4 | initial enrollment packet?? |
| 5 | AC Power Present |
| 6 | ?? |
| 7 | ?? |

key code chart

| key | value |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| * | A |
| # | B |
| A | ? |
| B | ? |
| C | ? |
| D | ? |

*FIG. 31B*

Example transmissions (ID = 0x81A783, ECN Address = 01)

| keypress | 14 Synch Bits | Start Bit | | ID bits | | | data bits | | | | | | | CRC Bits | |
|---|---|---|---|---|---|---|---|---|---|---|---|---|---|---|---|
| * | | | | 81 | A7 | 83 | 1 | 2 | FF | FF | FA | 0 | 0 | 6F | FC |
| * | | | | 81 | A7 | 83 | 1 | 0 | FF | FF | FA | 0 | 1 | 9F | FA |
| * | | | | 81 | A7 | 83 | 1 | 0 | FF | FF | FA | 0 | 2 | 9F | F0 |
| * | | | | 81 | A7 | 83 | 1 | 0 | FF | FF | FA | 0 | 3 | 1F | F5 |
| * | | | | 81 | A7 | 83 | 1 | 0 | FF | FF | FA | 0 | 4 | 9F | E4 |
| | | | | | | | | | | | | | | | |
| 9 | | | | 81 | A7 | 83 | 1 | 0 | FF | FF | 99 | 0 | 1 | 98 | 46 |
| 9 | | | | 81 | A7 | 83 | 1 | 0 | FF | FF | F9 | 0 | 2 | 9F | CC |
| | | | | | | | | | | | | | | | |
| 8 | | | | 81 | A7 | 83 | 1 | 0 | FF | FF | 88 | 0 | 1 | 99 | 12 |
| 8 | | | | 81 | A7 | 83 | 1 | 0 | FF | FF | F8 | 0 | 2 | 1F | DB |
| | | | | | | | | | | | | | | | |
| 7 | | | | 81 | A7 | 83 | 1 | 0 | FF | FF | 77 | 0 | 1 | 95 | 1E |
| 7 | | | | 81 | A7 | 83 | 1 | 0 | FF | FF | F7 | 0 | 2 | 1F | 17 |
| 7 | | | | 81 | A7 | 83 | 1 | 0 | FF | FF | F7 | 0 | 3 | 9F | 12 |
| 7 | | | | 81 | A7 | 83 | 1 | 0 | FF | FF | F7 | 0 | 4 | 1F | 3 |
| 7 | | | | 81 | A7 | 83 | 1 | 0 | FF | FF | F7 | 0 | 5 | 9F | 6 |
| 7 | | | | 81 | A7 | 83 | 1 | 0 | FF | FF | F7 | 0 | 6 | 9F | 0C |
| 7 | | | | 81 | A7 | 83 | 1 | 0 | FF | FF | F7 | 0 | 7 | 1F | 9 |
| 7 | | | | 81 | A7 | 83 | 1 | 0 | FF | FF | F7 | 0 | 8 | 1F | 2B |
| 7 | | | | 81 | A7 | 83 | 1 | 0 | FF | FF | F7 | 0 | 9 | 9F | 2E |
| | | | | | | | | | | | | | | | |
| 6 | | | | 81 | A7 | 83 | 1 | 0 | FF | FF | 66 | 0 | 1 | 94 | 4A |
| 6 | | | | 81 | A7 | 83 | 1 | 0 | FF | FF | F6 | 0 | 2 | 9F | 0 |
| 6,6,6,6,6 | | | | 81 | A7 | 83 | 1 | 0 | F6 | 66 | 66 | 0 | 1 | E3 | CB |
| | | | | | | | | | | | | | | | |
| 5 | | | | 81 | A7 | 83 | 1 | 0 | FF | FF | 55 | 0 | 1 | 97 | B6 |
| 5 | | | | 81 | A7 | 83 | 1 | 0 | FF | FF | F5 | 0 | 2 | 9F | 3C |
| | | | | | | | | | | | | | | | |
| 4 | | | | 81 | A7 | 83 | 1 | 0 | FF | FF | 44 | 0 | 1 | 96 | E2 |
| | | | | | | | | | | | | | | | |
| 3 | | | | 81 | A7 | 83 | 1 | 0 | FF | FF | 32 | 0 | 1 | 10 | 59 |
| | | | | | | | | | | | | | | | |
| 0 | | | | 81 | A7 | 83 | 1 | 0 | FF | FF | F0 | 0 | 3 | 1F | 7D |
| | | | | | | | | | | | | | | | |
| 3,4,5,6 | | | | 81 | A7 | 83 | 1 | 0 | FF | 34 | 56 | 0 | 2 | 8B | A1 |

Example transmissions (ID = 0x81A783, ECN Address # = 07)

| | | | | | | | | | | | | | | | |
|---|---|---|---|---|---|---|---|---|---|---|---|---|---|---|---|
| * | | | | 81 | A7 | 83 | 7 | 20 | FF | FF | FA | 0 | 12 | 99 | D2 |

*FIG. 31C*

Keypad ID to transmit

Follow the installation instructions to learn the keypad into the Ademco panel. When you complete step 4d of the Ademco 5839 Wireless Keypad instructions, you will see "ID:nnnnnn" on the hardwired keypad, where nnnnnn is the 3 byte ID. Use this ID when generating Keypad transmissions that you will use to control the Honeywell panel.

Enrollment. For complete enrollment information, see the 5839 Enrollment tab of this spreadsheet.

Example Enrollment transmissions (transcevier ID = 0x8E6305)

| | 14 Synch Bits | Start Bit | | ID bits | | | data bits | | | | | | | CRC Bits | |
|---|---|---|---|---|---|---|---|---|---|---|---|---|---|---|---|
| Request ID pkt | | | | 00 | 0 | 0 | 1 | 30 | 0 | 0 | 0 | 0 | 6 | 81 | 34 |
| ID rcvd pkt | | | | 8E | 63 | 5 | 1 | 30 | 0 | 0 | 0 | 0 | 6 | 85 | F8 |

FIG. 31D

5839 Enrollment Procedure

Below is a captured example of a 5839 enrollment sequence.

////////////////////////////////////////////////////////////////////////////////////////

////////////5839 enrollment sequence (kp at device address 23, ECP Address 7)

////////////////////////////////////////////////////////////////////////////////////////

Keypad transmits 00 0 0 7 30 0 0 0 0 15 7 3D

Panel transmits the following message twice about 500mS after Keypad transmit (2 panel messages are about 450mS apart)

81 A7 83 1 81 0 DD 0 10 8 10 0 0 CC 89 0D 2 0 0 45 56 37 47 2 94 E6 2 5 27 F6 76 27 56 37 37 2 2 2 2 2 2 2 2 2 2 2 2 2 2 2 2 A9 CC keypad responds with the following message about 15mS after receiving the second panel packet

81 A7 83 7 30 0 0 0 0 15 B1 99

Panel transmits the following message three times starting about 500mS after keypad transmission (3 panel messages are about 450mS apart)

81 A7 83 0 81 0 DD 0 10 8 10 0 0 CD 9C 4B 2 0 0 45 56 37 47 2 94 E6 2 5 27 F6 76 27 56 37 37 2 2 2 2 2 2 2 2 2 2 2 2 2 2 2 2 A9 CC

Panel transmits the following message three times starting about 900mS after the last previous panel transmission ((3 panel messages are about 450mS apart)

81 A7 83 0 81 0 DD 0 10 8 10 0 0 CE 9C 41 2 0 0 45 56 37 47 2 94 E6 2 5 27 F6 76 27 56 37 37 2 2 2 2 2 2 2 2 2 2 2 2 2 2 2 2 A9 CC

/////////////////end of enrollment sequence/////////

FIG. 32

Vista 13 Byte Transmission Protocol

| Byte # / Packet Type | 1 | 2 | 3 4 5 | 6 7 | 8 | 9 | 10 | 11 | 12 13 |
|---|---|---|---|---|---|---|---|---|---|
| Panel Status | HouseCode | 8 | Message Data bits - See Table 1 | CRC1 - See Table 3 | See Table 5 | A0? | A0? | A0? | CRC2 - See Table 4 |
| Zone Packet | HouseCode | zone # | Message Data bits - See Table 1 | CRC1 - See Table 3 | See Table 5 | Word Tokens. See Tables 7&8. | | | CRC2 - See Table 4 |
| Exit Delay | HouseCode | delay time | Message Data bits - See Table 1 | CRC1 - See Table 3 | See Table 5 | A0? | A0? | A0? | CRC2 - See Table 4 |
| Panel Status-Entry Delay | HouseCode | 8 | Message Data bits - See Table 1 | CRC1 - See Table 3 | See Table 5 | A0? | A0? | A0? | CRC2 - See Table 4 |
| PowerUp | HouseCode | D1 | Message Data bits - See Table 1 | CRC1 - See Table 3 | See Table 5 | A0? | A0? | A0? | CRC2 - See Table 4 |
| Program Mode Entry | HouseCode | 20 | Message Data bits - See Table 1 | CRC1 - See Table 3 | See Table 5 | A0? | A0? | A0? | CRC2 - See Table 4 |
| Alarm cancelled | HouseCode | CA | Message Data bits - See Table 1 | CRC1 - See Table 3 | See Table 5 | A0 | A0 | A0 | CRC2 - See Table 4 |
| Fail to Communicate | HouseCode | FC | Message Data bits - See Table 1 | CRC1 - See Table 3 | See Table 5 | A0 | A0 | A0 | CRC2 - See Table 4 |
| test mode go-no-go/walk | HouseCode | dd | Message Data bits - See Table 1 | CRC1 - See Table 3 | See Table 5 | A0 | A0 | A0 | CRC2 - See Table 4 |
| RF Jam Detect | HouseCode | 90 | Message Data bits - See Table 1 | CRC1 - See Table 3 | See Table 5 | A0 | A0 | A0 | CRC2 - See Table 4 |
| Fire - initiated by keypad | HouseCode | 95 | Message Data bits - See Table 1 | CRC1 - See Table 3 | See Table 5 | Word Tokens. See Tables 7&8. | | | CRC2 - See Table 4 |
| Panic Alarm - initiated at keypad | HouseCode | 99 | Message Data bits - See Table 1 | CRC1 - See Table 3 | See Table 5 | Word Tokens. See Tables 7&8. | | | CRC2 - See Table 4 |
| | | | | | | | | | |
| other potential types listed in user manual, but not tested | | | | | | | | | |
| Modem Comm | | CC | | | | | | | |
| Bell Failure | | 70 | | | | | | | |
| Telco Fault | | 94 | | | | | | | |
| ... | | | | | | | | | |
| | | | | | | | | | |

FIG. 33A

Table 1. 13 Byte Packet Message Data Bits

| Byte # | Bit # | Description |
|---|---|---|
| | 7 | not defined - always seems to be zero |
| | 6 | not defined - always seems to be zero |
| | 5 | Trigger Count MSB - See Table 7 |
| | 4 | Trigger Count LSB - See Table 7 |
| | 3 | not defined - always seems to be zero |
| | 2 | Low Level Beep Sequence, see table 2 |
| | 1 | Low Level Beep Sequence, see table 2 |
| 3 | 0 | Low Level Beep Sequence, see table 2 |
| | 7 | Arming Level Bit #1 - See table 8 |
| | 6 | BAT icon on (on = low battery) - ignore if alarm packet |
| | 5 | FIRE icon on |
| | 4 | READY TO ARM LED on |
| | 3 | bit 2&3 are set if Panel Status type packet, else 00 |
| | 2 | bit 2&3 are set if Panel Status type packet, else 00 |
| | 1 | CHECK icon on - used for tamper (not sure where else used) |
| 4 | 0 | Fire Alarm beeps sounding |
| | 7 | Arming Level Bit #2 - See table 8 |
| | 6 | Panel in Installer Program Mode - transmitted when entering pgm mode |
| | 5 | CHIME icon on |
| | 4 | BYPASS icon on |
| | 3 | AC icon on (on = ac ok) |
| | 2 | Arming Level Bit #3 - See table 8 |
| | 1 | ALARM icon on |
| 5 | 0 | General alarm Beeps sounding |

Table 2. Low Level Beep Sequence

| Byte 3 | | | |
|---|---|---|---|
| bit 2 | bit 1 | bit 0 | Beep Sequence |
| 0 | 0 | 0 | no beeps |
| 0 | 0 | 1 | 1 beep |
| 0 | 1 | 0 | 2 beeps |
| 0 | 1 | 1 | 3 beeps |
| 1 | 0 | 0 | rapid beeping |
| 1 | 0 | 1 | slow beeping |
| 1 | 1 | 0 | ?? |
| 1 | 1 | 1 | ?? |

*FIG. 33B*

Table 3. CRC1

| | |
|---|---|
| Byte 6 | 0x24 XOR'd with most significant byte of CRC of transmission bytes 1-5 |
| Byte 7 | Least significant byte of the CRC of transmission bytes 1-5. |

Table 4. CRC2

| | |
|---|---|
| Byte 12 | Most significant byte of the CRC of transmission bytes 8-11. |
| Byte 13 | Least significant byte of the CRC of transmission bytes 8-11. |

Table 5 - Byte #8 Description

| Byte # | Bit # | Description |
|---|---|---|
| | 7 | not defined - always seems to be zero, but likely cases where it is not. |
| | 6 | not defined |
| | 5 | not defined - always seems to be zero, but likely cases where it is not. |
| | 4 | not defined - always seems to be zero, but likely cases where it is not. |
| | 3 | packet type - see table 6. |
| | 2 | packet type - see table 6. |
| | 1 | packet type - see table 6. |
| 8 | 0 | packet type - see table 6. |

Table 6. Defined Packet Types - more types likely exist

| Byte 8 | | | | |
|---|---|---|---|---|
| bit 3 | bit 2 | bit 1 | bit 0 | Beep Sequence |
| 0 | 1 | 0 | 1 | exit delay |
| 0 | 1 | 1 | 0 | entry delay |
| 1 | 1 | 1 | 1 | test mode go-no-go/walk |

Table 7 - Trigger Count

Bits 4 & 5 of Byte #3 increase in value with every new message transmitted.
The value of bit 4 & 5 will go from 0 to 3, then rollover to 0 again.
The table below shows the how the bits increment with each new message.

| | Byte # 3 | |
|---|---|---|
| Message # | bit #5 | bit #4 |
| 1 | 0 | 0 |
| 2 | 0 | 1 |
| 3 | 1 | 0 |
| 4 | 1 | 1 |
| 5 | 0 | 0 |
| 6 | 0 | 1 |

*FIG. 33C*

Table 8. Arming Level

Bit 7 of byte 4, bit 7 of byte 5, and bit 2 of byte 5 are used to indicate arming level.
The following table shows the arming level bit values for each arming level.

| Arming Level | Byte 4, Bit 7 | Byte 5, Bit 7 | Byte 5, Bit 2 | Byte 8, Bit6 |
|---|---|---|---|---|
| Disarmed | 0 | 0 | 0 | x |
| Away | 0 | 0 | 1 | x |
| | 0 | 1 | 0 | x |
| Maximum | 0 | 1 | 1 | x |
| Stay | 1 | 0 | 0 | x |
| Night Stay | 1 | 0 | 0 | 1 |
| | 1 | 0 | 1 | x |
| Instant | 1 | 1 | 0 | x |
| | 1 | 1 | 1 | x |

Note:
It is possible that there are more arming levels that are not current defined in Table 8.

Table 7. Word Token Bytes

| Transmit Byte # | | |
|---|---|---|
| 8 | 9 | 10 |
| WT#1 | WT#2 | WT#3 |

Table 8. Word Token Numbers

Note: The data below was tested with the Vista 20 only. To complete the RF Token # list, the remaining undefined tokens will have to be transmitted by the Lynx panel and recorded.

| Token Name | RF Token # | Vista 20 token# | Lynx token #s | Notes |
|---|---|---|---|---|
| | Hex | decimal | decimal | |
| 0 | 45 | 226 | 81 | |
| 1 | 46 | 227 | 60 | |
| 2 | 47 | 229 | 77 | |
| 3 | 48 | 231 | 75 | |
| 4 | 49 | 233 | 46 | |
| 5 | 4A | 235 | 45 | |
| 6 | 4B | 237 | 68 | |
| 7 | 4C | 239 | 65 | |
| 8 | 4D | 241 | 41 | |
| 9 | 4E | 243 | 57 | |

*FIG. 33D*

| | | | | |
|---|---|---|---|---|
| 1ST | 88 | 228 | 29 | |
| 2ND | 38 | 230 | 30 | |
| 3RD | 9F | 232 | 31 | |
| 4TH | | 234 | NA | |
| 5TH | | 236 | NA | |
| 6TH | | 238 | NA | |
| 7TH | | 240 | NA | |
| 8TH | | 242 | NA | |
| 9TH | | 244 | NA | |
| ALARM | 0 | 2 | 82 | |
| ATTIC | 77 | 9 | 32 | |
| AWAY | | NA | NA | |
| BABY | 78 | 12 | 1 | |
| BACK | 79 | 13 | 33 | |
| BASEMENT | 15 | 16 | 34 | |
| BATHROOM | 0A | 17 | 35 | |
| BEDROOM | 0F | 19 | 36 | |
| BYPASSED | | NA | NA | |
| CHECK | | NA | 83 | |
| CHIME | | NA | NA | |
| CLOSED | 7E | 40 | NA | |
| DEN | 34 | 50 | 38 | |
| DETECTOR | 80 | 52 | 2 | |
| DINING | 1F | 53 | 3 | |
| DOOR | 10 | 57 | 4 | |
| EMERGENCY | 20 | 67 | 42 | |
| EXIT | 4 | 71 | NA | |
| FAULT | | NA | NA | |
| FIRE | 28 | 79 | 87 | |
| FLOOR | 1D | 80 | 8 | |
| FRONT | 57 | 85 | 47 | |
| GARAGE | 17 | 89 | 48 | |
| GUN | 2C | 94 | 9 | |
| HALL | 32 | 95 | NA | |

*FIG. 33E*

| | | | | |
|---|---|---|---|---|
| INSIDE | 53 | 101 | 10 | |
| INSTANT | | NA | NA | |
| KITCHEN | 16 | 105 | 51 | |
| LAUNDRY | 8C | 106 | 11 | |
| LIBRARY | 8D | 109 | 12 | |
| LIVING | 1E | 113 | 13 | |
| MAIN | 81 | 122 | 14 | |
| MASTER | 90 | 123 | 15 | |
| MEDICAL | 0E | 125 | 55 | |
| MESSAGE | | NA | 84 | |
| MOTION | 91 | 131 | NA | |
| NOT | | NA | NA | |
| NOW | | NA | NA | |
| OFFICE | 93 | 136 | 59 | |
| OPEN | 94 | 138 | NA | |
| PANIC | 0D | 144 | NA | |
| PATIO | 95 | 146 | 61 | |
| POLICE | | 151 | 62 | Vista doesn't transmit a token for this word. |
| POOL | 56 | 152 | 18 | |
| READY | | NA | NA | |
| ROOM | 12 | 162 | 19 | |
| SHED | 97 | 168 | 20 | |
| SHOP | 98 | 170 | 21 | |
| SIDE | 99 | 173 | 66 | |
| SLIDING | 5D | 175 | 69 | |
| SMOKE | 18 | 176 | 22 | |
| SUPERVISED | | 190 | | |
| STAY | | NA | NA | |
| STORAGE | 9D | 185 | 24 | |
| SYSTEM | | NA | 85 | |
| UPSTAIRS | E6 | 207 | 78 | |
| UTILITY | 6F | 208 | 26 | |
| WINDOW | 11 | 217 | 80 | |
| YARD | 5F | 223 | 28 | |
| ZONE | 2 | 224 | NA | |

*FIG. 33F*

| | | | |
|---|---|---|---|
| FIG. 34A | FIG. 34B | FIG. 34C | FIG. 34D |
| FIG. 34E | FIG. 34F | FIG. 34G | FIG. 34H |
| FIG. 34I | FIG. 34J | FIG. 34K | FIG. 34L |
| FIG. 34M | FIG. 34N | FIG. 34O | FIG. 34P |
| FIG. 34Q | FIG. 34R | FIG. 34S | FIG. 34T |

FIG. 34

Vista 13 Byte Example Data

| Sounds | Spoken | Displayed |
|---|---|---|
| BLANK | BLANK | BLANK |

FIG. 34A

| Panel Conditions/activity | Byte 1 | Byte 2 | Byte 3 | Byte 4 | Byte 5 |
|---|---|---|---|---|---|
| Zone 1 open, "01 Not ready" displayed | HC | 1 | 10 | 0 | 8 |
| Zone 1 open, "fault ..." spoken | | 1 | 10 | 0 | 8 |
| zone 1 open - kp pwd down | | 8 | 0 | 0C | 8 |
| zone 1 restored - kp pwd down | | 8 | 10 | 1C | 8 |
| zone 1 open - kp pwd | | 1 | 10 | 0 | 8 |
| zone 1 restored - kp pwd | | 1 | 0 | 0 | 8 |
| zone 2 open | | 8 | 20 | 0c | 8 |
| zone2 closed | | 8 | 30 | 1c | 8 |
| z2 open | | 2 | 20 | 0 | 8 |
| | | 8 | 30 | 1c | 8 |
| | | | | | |
| z4 tamper alarm | | 4 | 14 | 2 | 8 |
| z4 tamper - alarm has been cancelled | | 4 | 31 | 2 | 8 |
| tamper restored | | 8 | 11 | 1c | 8 |
| z25 tamper | | 25 | 14 | 2 | 8 |
| | | | | | |
| Power up | | D1 | 10 | 0 | 8 |
| Away exit delay - 60 seconds | | 60 | 32 | 0 | 0C |
| Away exit delay - 54 seconds | | 54 | 20 | 0 | 0C |
| | | | | | |
| alarm zone 52 - burg | | 52 | 10 | 0 | 0F |
| | | | | | |
| fire alarm zone 7 | | 7 | 10 | 31 | 0A |
| alarm zone 2 burg | | 2 | 10 | 0 | 0F |
| | | | | | |
| alarm cancelled | | CA | 10 | 0 | 8 |
| | | | | | |
| Fail to comm, LB, disarmed | | FC | 0 | 50 | 8 |
| | | | | | |
| Zone 1 open | | 1 | 20 | 0 | 8 |
| Zone 3 tamper | | 3 | 30 | 0 | 8 |
| Zone 1 tamper | | 1 | | | |
| Zone 25 tamper | | 25 | 14 | 2 | 8 |

*FIG. 34B*

| Byte 3 Low nibble | | | | Byte 4 | | | | | | | | Byte 5 | | | | | | | |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 1 | 1 | 0 | 0 | 0 | 0 | 0 | 0 | 1 | 0 | 0 | 0 |
| 0 | 0 | 0 | 0 | 0 | 0 | 0 | 1 | 1 | 1 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 1 | 1 | 0 | 0 | 0 | 0 | 0 | 0 | 1 | 0 | 0 | 0 |
| 0 | 0 | 0 | 0 | 0 | 0 | 0 | 1 | 1 | 1 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 1 | 1 | 1 | 0 | 0 | 0 | 0 | 0 | 0 | 1 | 0 | 0 | 0 |
| 0 | 1 | 0 | 0 | 0 | 0 | 0 | 0 | 0 | 0 | 1 | 0 | 0 | 0 | 0 | 0 | 1 | 0 | 0 | 0 |
| 0 | 0 | 0 | 1 | 0 | 0 | 0 | 0 | 0 | 0 | 1 | 0 | 0 | 0 | 0 | 0 | 1 | 0 | 0 | 0 |
| 0 | 0 | 0 | 1 | 0 | 0 | 0 | 1 | 1 | 1 | 0 | 0 | 0 | 0 | 0 | 0 | 1 | 0 | 0 | 0 |
| 0 | 1 | 0 | 0 | 0 | 0 | 0 | 0 | 0 | 0 | 1 | 0 | 0 | 0 | 0 | 0 | 1 | 0 | 0 | 0 |
| 0 | 0 | 0 | 1 | 0 | 0 | 0 | 1 | 0 | 0 | 0 | 0 | 0 | 0 | 0 | 0 | 1 | 0 | 0 | 0 |
| 0 | 0 | 1 | 0 | 0 | 0 | 0 | 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 0 | 0 | 0 | 0 | 0 | 0 | 0 | 1 | 1 | 1 | 1 |
| 0 | 0 | 0 | 0 | 0 | 0 | 1 | 1 | 0 | 0 | 0 | 1 | 0 | 0 | 0 | 0 | 1 | 0 | 1 | 0 |
| 0 | 0 | 0 | 0 | 0 | 0 | 0 | 1 | 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 1 | 0 | 1 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 1 | 0 | 0 | 0 | 0 | 0 | 0 | 0 | 0 | 1 | 0 | 0 | 0 | 0 | 0 | 1 | 0 | 0 | 0 |

*FIG. 34C*

| Byte 6 | Byte 7 | Byte 8 | Byte 9 | Byte 10 | Byte 11 | Byte 12 | Byte 13 |
|---|---|---|---|---|---|---|---|
| CRC | CRC | | | | | CRC | CRC |
| | | 80 | | | | | |
| 0 | 65 | 0 | A0 | A0 | A0 | CB | A5 |
| 32 | C8 | 0 | 57 | 2C | A0 | EF | 76 |
| 1B | 88 | 0 | 0 | A0 | A0 | C3 | E5 |
| 6D | 57 | 0 | A0 | A0 | A0 | CB | A5 |

*FIG. 34D*

| Sounds | Spoken | Displayed |
|---|---|---|
| BLANK | BLANK | BLANK |

FIG. 34E

| Panel Conditions/activity | Byte 1 | Byte 2 | Byte 3 | Byte 4 | Byte 5 |
|---|---|---|---|---|---|
| disarmed, not ready to arm | | 8 | 1 | C | 8 |
| disarmed, ready to arm | | 8 | 20 | 1C | 8 |
| armed to Stay | | 8 | 20 | 8C | 8 |
| armed to Away | | 8 | 20 | 0C | 0C |
| zone 25 burg alarm, armed to away | | 25 | 0 | 0 | 0F |
| zone 25 burg alarm disarmed once, still in memory | | 25 | 0 | 0 | 0A |
| Note for above: 5828 speaks "alarm zone 25" | | | | | |
| zone 4 tamper-"check zone 4" | | 4 | 20 | 2 | 8 |
| fire alarm zone 7 | | 7 | 30 | 21 | 0A |
| still in fire alarm | | 25 | 0 | 1 | 8 |
| 5828 quieted | | FC | 10 | 0 | 8 |
| disarmed - still speaks "fire garage" but not beeping | | 7 | 21 | 20 | 0A |
| Zone 7 fire alarm, 5828 started beeping | | FC | 20 | 1 | 8 |
| fire beeps stopped on 5828 after pressed key on hw kp | | 7 | 30 | 20 | 0A |
| zone 6 24 hour aux alarm | | 6 | 0 | 0 | 0B |
| alarm quieted with disarm - still speaks "alarm" on zone 6 | | 6 | 11 | 0 | 0A |
| walk test zone 25 (displays 25,AC, not ready, and sounds a single beep) | | 25 | 23 | 0 | 8 |
| Armed to Level 2 (exit delay pkt) | | 60 | 32 | 0 | 0C |
| Zone 25 fault ("fault spoken") | 0A | 25 | 10 | 0 | 8 |
| enter installer program mode | 0A | 20 | 30 | 0 | 48 |
| zone 1 fault "window yard 0" | 0A | 1 | 10 | 0 | 8 |
| "Bypassed Zone 2" spoken and displayed | 0A | 2 | 1 | 10 | 18 |

*FIG. 34F*

| Byte 3 Low nibble | | | | Byte 4 | | | | | | | | Byte 5 | | | | | | | |
|---|---|---|---|---|---|---|---|---|---|---|---|---|---|---|---|---|---|---|---|
| 0 | 0 | 0 | 1 | 0 | 0 | 0 | 0 | 1 | 1 | 0 | 0 | 0 | 0 | 0 | 0 | 1 | 0 | 0 | 0 |
| 0 | 0 | 0 | 0 | 0 | 0 | 0 | 1 | 1 | 1 | 0 | 0 | 0 | 0 | 0 | 0 | 1 | 0 | 0 | 0 |
| 0 | 0 | 0 | 0 | 1 | 0 | 0 | 0 | 1 | 1 | 0 | 0 | 0 | 0 | 0 | 0 | 1 | 0 | 0 | 0 |
| 0 | 0 | 0 | 0 | 0 | 0 | 0 | 0 | 1 | 1 | 0 | 0 | 0 | 0 | 0 | 0 | 1 | 1 | 0 | 0 |
| 0 | 0 | 0 | 0 | 0 | 0 | 0 | 0 | 0 | 0 | 0 | 0 | 0 | 0 | 0 | 0 | 1 | 1 | 1 | 1 |
| 0 | 0 | 0 | 0 | 0 | 0 | 0 | 0 | 0 | 0 | 0 | 0 | 0 | 0 | 0 | 0 | 1 | 0 | 1 | 0 |
| 0 | 0 | 0 | 0 | 0 | 0 | 0 | 0 | 0 | 0 | 1 | 0 | 0 | 0 | 0 | 0 | 1 | 0 | 0 | 0 |
| 0 | 0 | 0 | 0 | 0 | 0 | 1 | 0 | 0 | 0 | 0 | 1 | 0 | 0 | 0 | 0 | 1 | 0 | 1 | 0 |
| 0 | 0 | 0 | 0 | 0 | 0 | 0 | 0 | 0 | 0 | 0 | 1 | 0 | 0 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 1 | 0 | 0 | 1 | 0 | 0 | 0 | 0 | 0 | 0 | 0 | 0 | 0 | 1 | 0 | 1 | 0 |
| 0 | 0 | 0 | 0 | 0 | 0 | 0 | 0 | 0 | 0 | 0 | 1 | 0 | 0 | 0 | 0 | 1 | 0 | 0 | 0 |
| 0 | 0 | 0 | 0 | 0 | 0 | 1 | 0 | 0 | 0 | 0 | 0 | 0 | 0 | 0 | 0 | 1 | 0 | 1 | 0 |
| 0 | 0 | 0 | 0 | 0 | 0 | 0 | 0 | 0 | 0 | 0 | 0 | 0 | 0 | 0 | 0 | 1 | 0 | 1 | 1 |
| 0 | 0 | 0 | 1 | 0 | 0 | 0 | 0 | 0 | 0 | 0 | 0 | 0 | 0 | 0 | 0 | 1 | 0 | 1 | 0 |
| 0 | 0 | 1 | 1 | 0 | 0 | 0 | 0 | 0 | 0 | 0 | 0 | 0 | 0 | 0 | 0 | 1 | 0 | 0 | 0 |
| 0 | 0 | 1 | 0 | 0 | 0 | 0 | 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 1 | 0 | 0 | 1 | 0 | 0 | 0 |
| 0 | 0 | 0 | 0 | 0 | 0 | 0 | 0 | 0 | 0 | 0 | 0 | 0 | 0 | 0 | 0 | 1 | 0 | 0 | 0 |
| 0 | 0 | 0 | 1 | 0 | 0 | 0 | 1 | 0 | 0 | 0 | 0 | 0 | 0 | 0 | 1 | 1 | 0 | 0 | 0 |

*FIG. 34G*

| Byte 6 | Byte 7 | Byte 8 | Byte 9 | Byte 10 | Byte 11 | Byte 12 | Byte 13 |
|---|---|---|---|---|---|---|---|
| AC | 5C | 0 | A0 | A0 | A0 | CB | A5 |
| 4E | CB | 0 | A0 | A0 | A0 | CB | A5 |
| 2E | C1 | 0 | A0 | A0 | A0 | CB | A5 |
| 2E | D3 | 0 | A0 | A0 | A0 | CB | A5 |
| 60 | 55 | 0 | A0 | A0 | A0 | CB | A5 |
| 60 | 4B | 0 | A0 | A0 | A0 | CB | A5 |
| FA | CB | 0 | A0 | A0 | A0 | CB | A5 |
| 8D | 84 | 0 | 17 | A0 | A0 | C2 | F3 |
| 66 | 47 | 0 | A0 | A0 | A0 | CB | A5 |
| 95 | 23 | 0 | A0 | A0 | A0 | CB | A5 |
| 0A | D3 | 0 | 17 | A0 | A0 | C2 | F3 |
| 10 | E0 | 0 | A0 | A0 | A0 | CB | A5 |
| 0B | 87 | | 17 | A0 | A0 | C2 | F3 |
| 5C | 42 | 0 | 45 | 46 | 88 | 12 | 38 |
| DD | 13 | 0 | 45 | 46 | 88 | 12 | 38 |
| 62 | FB | 0F | A0 | A0 | A0 | 7 | A5 |
| A4 | E2 | 5 | A0 | A0 | A0 | 8F | 4A |
| E2 | 4C | 0 | A0 | A0 | A0 | CB | 4A |
| A5 | 4C | 0 | A0 | A0 | A0 | CB | 4A |
| B2 | 43 | 0 | 11 | 5F | 45 | C2 | CC |
| EF | 77 | 0 | A0 | A0 | A0 | CB | 4A |

*FIG. 34H*

| Sounds | Spoken | Displayed |
|---|---|---|
| | disarmed, ready to arm, low battery, check zone 25 | 25, bat, ac |
| | check zone 25 | check, 25, ac |
| | don't know, 5828 was powered down | |
| | disarmed, ready to arm, low battery | bat, ac |
| | Fault window, yard, zero | 01, not ready, ac |
| | disarmed, ready to arm, bypassed zone 2 | 02, bypass, ac |
| | fault "window, yard, zero" | 01, bypass,ac, not ready |
| | disarmed, ready to arm, bypassed, zone 1 | 01, bypass, ac |
| | disarmed, ready to arm, bypassed | bypass, ac |
| | Armed away | Away, ac |
| no beeps | Disarm system now | away, ac |
| fast beeps | ???????? | |
| General Alarm | alarm "window,yard, zero" | alarm, 01 away |
| 1 beep | alarm "window,yard, zero" | alarm, 01 ac |
| no beeps | armed away, exit now | 47, away, ac |

*FIG. 34I*

| Panel Conditions/activity | Byte 1 | Byte 2 | Byte 3 | Byte 4 | Byte 5 |
|---|---|---|---|---|---|
| Power up | 0A | D1 | 10 | 0 | 8 |
| zone 25 low batt, panel batt ok | 0A | 25 | 0 | 50 | 8 |
| zone 25 tamper, panel batt ok | 0A | 25 | 0 | 2 | 8 |
| Panel just detected a low panel batt | 0A | 8 | 34 | 5C | 8 |
| panel low batt, transmitted after "*" keypress on 5828 | 0A | 8 | 10 | 5C | 8 |
| panel has a low bat, zone 1 open "fault, window, zero" - zone text | 0A | 1 | 0 | 0 | 8 |
| bypassed zone 2 | 0A | 2 | 31 | 10 | 18 |
| zone 2 bypassed, zone 1 open | 0A | 1 | 20 | 0 | 18 |
| zone 1 bypassed | 0A | 1 | 11 | 10 | 18 |
| zone 1 bypassed, Vista response to "*" keypress on 5828 | 0A | 8 | 30 | 1C | 18 |
| armed to Away, Vista response to "*" keypress on 5828 | 0A | 8 | 20 | 0C | 0C |
| entry delay | 0A | 8 | 25 | 0C | 0C |
| end of entry delay, panel sound quick beeps | 0A | 8 | 14 | 0C | 0C |
| zone 1 alarm | 0A | 1 | 10 | 0 | 0F |
| zone 1 alarm disarmed once | 0A | 1 | 31 | 0 | 0A |
| exit delay, 47 seconds left, Vista response to "*" keypress on 5828 | 0A | 47 | 0 | 0 | 0C |

FIG. 34J

| Byte 3 Low nibble | Byte 4 | Byte 5 |
|---|---|---|
| 0 0 0 0 | 0 0 0 0 0 0 0 0 | 0 0 0 0 1 0 0 0 |
| 0 0 0 0 | 0 1 0 1 0 0 0 0 | 0 0 0 0 1 0 0 0 |
| 0 0 0 0 | 0 0 0 0 0 0 1 0 | 0 0 0 0 1 0 0 0 |
| 0 1 0 0 | 0 1 0 1 1 1 0 0 | 0 0 0 0 1 0 0 0 |
| 0 0 0 0 | 0 1 0 1 1 1 0 0 | 0 0 0 0 1 0 0 0 |
| 0 0 0 0 | 0 0 0 0 0 0 0 0 | 0 0 0 0 1 0 0 0 |
| 0 0 0 1 | 0 0 0 1 0 0 0 0 | 0 0 0 1 1 0 0 0 |
| 0 0 0 0 | 0 0 0 0 0 0 0 0 | 0 0 0 1 1 0 0 0 |
| 0 0 0 1 | 0 0 0 1 0 0 0 0 | 0 0 0 1 1 0 0 0 |
| 0 0 0 0 | 0 0 0 1 1 1 0 0 | 0 0 0 1 1 0 0 0 |
| 0 0 0 0 | 0 0 0 0 1 1 0 0 | 0 0 0 0 1 1 0 0 |
| 0 1 0 1 | 0 0 0 0 1 1 0 0 | 0 0 0 0 1 1 0 0 |
| 0 1 0 0 | 0 0 0 0 1 1 0 0 | 0 0 0 0 1 1 0 0 |
| 0 0 0 0 | 0 0 0 0 0 0 0 0 | 0 0 0 0 1 1 1 1 |
| 0 0 0 1 | 0 0 0 0 0 0 0 0 | 0 0 0 0 1 0 1 0 |
| 0 0 0 0 | 0 0 0 0 0 0 0 0 | 0 0 0 0 1 1 0 0 |

FIG. 34K

| Byte 6 | Byte 7 | Byte 8 | Byte 9 | Byte 10 | Byte 11 | Byte 12 | Byte 13 |
|---|---|---|---|---|---|---|---|
| F2 | 67 | 0 | A0 | A0 | A0 | CB | 4A |
| 3 | 0A | 0 | A0 | A0 | A0 | CB | 4A |
| EF | 0C | 0 | A0 | A0 | A0 | CB | 4A |
| 4C | 96 | 0 | A0 | A0 | A0 | CB | 4A |
| 4E | 46 | 0 | A0 | A0 | A0 | CB | 4A |
| 33 | 0 | 0 | 11 | 5F | C2 | CC | CC |
| EC | B7 | 0 | A0 | A0 | A0 | CB | 4A |
| 31 | E0 | 0 | 11 | 5F | 45 | C2 | CC |
| 52 | 34 | 0 | A0 | A0 | A0 | CB | 4A |
| CC | A0 | 0 | A0 | A0 | A0 | CB | 4A |
| AD | 98 | 0 | A0 | A0 | A0 | CB | 4A |
| AD | DC | 6 | A0 | A0 | A0 | B3 | 4A |
| 2E | 0B | 6 | A0 | A0 | A0 | B3 | 4A |
| 5B | 6 | 5 | A0 | A0 | A0 | 8F | 47 |

*FIG. 34L*

| Sounds | Spoken | Displayed |
|---|---|---|
| no beeps | armed away, exit now | 11, away, ac |
| no beeps | disarm system now | away, ac |
| fast beeps | disarm system now | away, ac |
| General Alarm | alarm "..." | alarm, 01, away |
| fast beeps | check zone 25 | check 25, ac |
| 2 beeps | armed stay instant exit now | 60, stay, instant, ac |
| no beeps | armed stay instant | stay, instant, ac |
| no beeps | nothing spoken | dd, ac |
| 2 beeps | nothing spoken | 01,not ready, ac |
| 1 beep | disarmed, ready to arm | chime,ac |
| fire alarm cadence | alarm zone 1 | alarm, 01, ac |
| General Alarm | alarm zone 1 | alarm, 01, ac |
| 2 beeps | nothing spoken | dd, ac |
| fast beeps | disarm, ready to arm, check zone 90 | 90,check, ac |
| fire alarm cadence | Fire zone 95 (note:I removed default zone text) | 95, fire, alarm, ac |
| General Alarm | alarm master panic | 99, alarm, ac |

*FIG. 34M*

| Panel Conditions/activity | Byte 1 | Byte 2 | Byte 3 | Byte 4 | Byte 5 |
|---|---|---|---|---|---|
| exit delay,11 seconds left, Vista response to "*" keypress on 5828 | 0A | 11 | 10 | 0 | 0C |
| entry delay, zone 1 open | 0A | 8 | 35 | 0C | 0C |
| end of entry delay, zone 1 open | 0A | 8 | 14 | 0C | 0C |
| alarm zone 1 | 0A | 1 | 10 | 0 | 0F |
| zone 25 tampered | 0A | 25 | 4 | 2 | 8 |
| armed to instant | 0A | 60 | 3 | 80 | 88 |
| armed to instant, Vista response to "*" keypress on 5828 | 0A | 8 | 30 | 8C | 88 |
| go-no-go test mode | 0A | DD | 10 | 10 | 8 |
| tripped zone 1 in go-no-go test mode | 0A | 1 | 13 | 0 | 8 |
| turned chime on | 0A | 8 | 11 | 1C | 28 |
| Carbon Monoxide Alarm | 0A | 1 | 10 | 11 | 0A |
| 24 Hour Aux Alarm | 0A | 1 | 10 | 0 | 0B |
| walk test mode | 0A | DD | 12 | 10 | 8 |
| RF Jam detected | 0A | 90 | 24 | 12 | 8 |
| Fire alarm initiate from keypad | 0A | 95 | 10 | 31 | 0A |
| alarm | 0A | 99 | 20 | 0 | 0B |
| Fail to Communicate, fast beeps | | FC | 24 | 0 | 8 |

*FIG. 34N*

| Byte 3 Low nibble | Byte 4 | Byte 5 |
|---|---|---|
| 0 0 0 0 | 0 0 0 0 0 0 0 0 | 0 0 0 0 1 1 0 0 |
| 0 1 0 1 | 0 0 0 0 1 1 0 0 | 0 0 0 0 1 1 0 0 |
| 0 1 0 0 | 0 0 0 0 1 1 0 0 | 0 0 0 0 1 1 0 0 |
| 0 0 0 0 | 0 0 0 0 0 0 0 0 | 0 0 0 0 1 1 1 1 |
| 0 1 0 0 | 0 0 0 0 0 0 1 0 | 0 0 0 0 1 0 0 0 |
| 0 0 1 1 | 1 0 0 0 0 0 0 0 | 1 0 0 0 1 0 0 0 |
| 0 0 0 0 | 1 0 0 0 1 1 0 0 | 1 0 0 0 1 0 0 0 |
| 0 0 0 0 | 0 0 0 1 0 0 0 0 | 0 0 0 0 1 0 0 0 |
| 0 0 1 1 | 0 0 0 0 0 0 0 0 | 0 0 0 0 1 0 0 0 |
| 0 0 0 1 | 0 0 0 1 1 1 0 0 | 0 0 1 0 1 0 0 0 |
| 0 0 0 0 | 0 0 0 1 0 0 0 1 | 0 0 0 0 1 0 1 0 |
| 0 0 0 0 | 0 0 0 0 0 0 0 0 | 0 0 0 0 1 0 1 1 |
| 0 0 1 0 | 0 0 0 1 0 0 0 0 | 0 0 0 0 1 0 0 0 |
| 0 1 0 0 | 0 0 0 1 0 0 1 0 | 0 0 0 0 1 0 0 0 |
| 0 0 0 0 | 0 0 1 1 0 0 0 1 | 0 0 0 0 1 0 1 0 |
| 0 0 0 0 | 0 0 0 0 0 0 0 0 | 0 0 0 0 1 0 1 1 |
| 0 1 0 0 | 0 0 0 0 0 0 0 0 | 0 0 0 0 1 0 0 0 |

*FIG. 34O*

| Byte 6 | Byte 7 | Byte 8 | Byte 9 | Byte 10 | Byte 11 | Byte 12 | Byte 13 |
|---|---|---|---|---|---|---|---|
| 72 | 5E | 5 | A0 | A0 | A0 | 8F | 4A |
| 2C | 9F | 6 | A0 | A0 | A0 | B3 | 4A |
| 2E | 0B | 6 | A0 | A0 | A0 | B3 | 4A |
| 32 | 52 | 0 | 11 | 5F | 45 | C2 | CC |
| 6F | 5F | 0 | A0 | A0 | A0 | CB | 4A |
| A4 | 24 | 5 | A0 | A0 | A0 | 8F | 4A |
| AF | CE | 0 | A0 | A0 | A0 | CB | 4A |
| E2 | 64 | 0F | A0 | A0 | A0 | 7 | 4A |
| B2 | 7F | 0F | 11 | 5F | 45 | 0E | CC |
| CE | 94 | 0 | A0 | A0 | A0 | CB | 4A |
| 54 | 4C | 0 | A0 | A0 | A0 | CB | 4A |
| B2 | 49 | 0 | A0 | A0 | A0 | CB | 4A |
| 62 | 4F | 0F | A0 | A0 | A0 | 7 | 4A |
| 9 | EA | 0 | A0 | A0 | A0 | CB | 4A |
| 4 | 75 | 0 | A0 | A0 | A0 | CB | 4A |
| 51 | B3 | 0 | 90 | 0D | 0A | A6 | 83 |

*FIG. 34P*

| Sounds | Spoken | Displayed | Panel Conditions/activity | Byte 1 | Byte 2 | Byte 3 | Byte 4 | Byte 5 |
|---|---|---|---|---|---|---|---|---|
| Sounds | Spoken | Displayed | | House Code | ALPHA # to display unless status/arm lvl pkt | High nibble is trigger count, See right for low nibble | See right | See right |
| BLANK | | | | | | | | |
| | | | | | | | | |

FIG. 34Q

| Byte 3 Low nibble | | | | Byte 4 | | | | | | | |
|---|---|---|---|---|---|---|---|---|---|---|---|
| undefined at this time | Low Level Beep Sequence | Low Level Beep Sequence | Low Level Beep Sequence | arming level - see table below | BAT icon - low battery - ignore if alarm packet | fire icon | ready to arm LED | bit 2&3 are set for Panel Status type packet, else 00 | bit 2&3 are set for Panel Status type packet, else 00 | check icon - used for tamper(what else?) | sound fire alarm cadence |
| | | | | 0 | 1 | 0 | 0 | 1 | 1 | 0 | 0 |
| | 0 | 0 | 0 | no beeps | | | | | | | |
| | 0 | 0 | 1 | 1 beep | | | | | | | |
| | 0 | 1 | 0 | should be 2 beeps, (I hear 1 loud beep) | | | | | | | |
| | 0 | 1 | 1 | should be 3 beeps, I only hear 2 | | | | | | | |
| | 1 | 0 | 0 | fast continous beeps | | | | | | | |
| | 1 | 0 | 1 | should be slow beeps, I don't hear any | | | | | | | |
| | 1 | 1 | 0 | | | | | | | | |
| | 1 | 1 | 1 | | | | | | | | |
| Arming Level/Status Packet Indicator | | | | | | | | | | | |
| arm lvl/status | | | | | | | | 1 | 1 | | |
| not arm lvl/status | | | | | | | | 0 | 0 | | |
| Arming Level | | | | | | | | | | | |
| Disarmed | | | | 0 | | | | | | | |
| Away | | | | 0 | | | | | | | |
| Stay | | | | 1 | | | | | | | |
| Maximum | | | | 0 | | | | | | | |
| Instant | | | | 1 | | | | | | | |

*FIG. 34R*

| Byte 5 | | | | | | | |
|---|---|---|---|---|---|---|---|
| arming level - see table below | Panel in Installer Program Mode - sent when entering | CHIME icon | bypass icon | ac icon - ac ok | arming level - see table below | alarm icon | sound General alarm beeps |
| 0 | 0 | 0 | 0 | 1 | 0 | 0 | 0 |
| | | | | | | | |
| 0 | | | | | 0 | | |
| 0 | | | | | 1 | | |
| 0 | | | | | 0 | | |
| 1 | | | | | 1 | | |
| 1 | | | | | 0 | | |

*FIG. 34S*

| Byte 6 | Byte 7 | Byte 8 | Byte 9 | Byte 10 | Byte 11 | Byte 12 | Byte 13 |
|---|---|---|---|---|---|---|---|
| CRC | CRC | undefined at this time | zone text tokens | zone text tokens | zone text tokens | CRC | CRC |
| | | 0F | 5 exit delay<br>6 entry delay<br>test mode (walk test, go-no-go test) | | | | |
| | | 0F | go-no-go??? | | | | |
| | | | | | | | |

FIG. 34T

Vista 53 Byte Transmissions Protocol

| Byte# | 1-3 | 4 | 5 | 6 | 7 | 8 | 9 | 10 | 11 | 12 | 13 | 14 | 15 | 16 | 17 | 18 | 19 | 20-51 | 52 | 53 |
|---|---|---|---|---|---|---|---|---|---|---|---|---|---|---|---|---|---|---|---|---|
| **Packet Type** | | | | | | | | | | | | | | | | | | | | |
| Panel Status | Transceiver ID | 0 | Keypad # - Table 1 | 0 | 8 | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| Zone Packet | Transceiver ID | 0 | Keypad # - Table 1 | 0 | zone # | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| Exit Delay | Transceiver ID | 0 | Keypad # - Table 1 | 0 | delay time | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| Entry Delay | Transceiver ID | 0 | Keypad # - Table 1 | 0 | 8 | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| PowerUp | Transceiver ID | 0 | Keypad # - Table 1 | 0 | D1 | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| Program Mode Entry | Transceiver ID | 0 | Keypad # - Table 1 | 0 | 20 | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| test mode go-no-go/walk | Transceiver ID | 0 | Keypad # - Table 1 | 0 | DD | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| Fire - initiated by keypad | Transceiver ID | 0 | Keypad # - Table 1 | 0 | 95 | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| Panic Alarm - initiated at keypad | Transceiver ID | 0 | Keypad # - Table 1 | 0 | 99 | Message Data bits - See Table 2 | | | 0 | 0 | 0 | Trigger Count | CRC1 - See Table 4 | | 2 | 0 | 0 | Display characters - see Table 7 | CRC2 - See Table 5 | |
| | | | | | | | | | | | | | | | | | | | | |
| other potential types listed in user manual, but not tested | | | | | | | | | | | | | | | | | | | | |
| Alarm cancelled | | | | | CA | | | | | | | | | | | | | | | |
| Fail to Communicate | | | | | FC | | | | | | | | | | | | | | | |
| RF Jam Detect | | | | | 90 | | | | | | | | | | | | | | | |
| Modem Comm | | | | | CC | | | | | | | | | | | | | | | |
| Bell Failure | | | | | 70 | | | | | | | | | | | | | | | |
| Telco Fault | | | | | 94 | | | | | | | | | | | | | | | |
| ... | | | | | | | | | | | | | | | | | | | | |
| | | | | | | | | | | | | | | | | | | | | |
| Enrollment Pkt #1 | Transceiver ID | 1 | Keypad # - Table 1 | 0 | DD | Message Data bits - See Table 2 | | | 10 | 0 | 0 | Trigger Count | CRC1 - See Table 4 | | 2 | 0 | 0 | Display characters - see Table 7 | CRC2 - See Table 5 | |
| Enrollment Pkt #2 | Transceiver ID | 0 | Keypad # - Table 1 | 0 | DD | Message Data bits - See Table 2 | | | 10 | 0 | 0 | Trigger Count | CRC1 - See Table 4 | | 2 | 0 | 0 | Display characters - see Table 7 | CRC2 - See Table 5 | |
| | | | | | | | | | | | | | | | | | | | | |
| | | | | | | | | | | | | | | | | | | | | |

Note: The Trigger count will be the same for all rounds of the same transmission. It will increase in value by 0x01 with every new message transmitted.
The value of the Trigger count will go from 0x00 to 0xFF, then roll over to 0x00 again.
See the "5839 Enrollment" tab of this spreadsheet for more information on the Enrollment Packets.

*FIG. 35A*

Table 1. Keypad Number

Byte 5 of the 53 byte packet indicates which keypad addresses should accept the message.
Each of the 8 keypad addresses has a corresponding bit in byte 5.
The correlation between the bits and keypad addresses is shown below.
A message can be transmitted for as little as one keypad address or as many as 8 keypad addresses.

| Byte 5, bit # | Keypad ECP Address | Panel Device Address |
|---|---|---|
| 0 | 0 | 16 |
| 1 | 1 | 17 |
| 2 | 2 | 18 |
| 3 | 3 | 19 |
| 4 | 4 | 20 |
| 5 | 5 | 21 |
| 6 | 6 | 22 |
| 7 | 7 | 23 |

*FIG. 35B*

Table 2. 53 Byte Packet Message Data Bits

Many of the bits in the table are intended for iconized keypads and have no significance for the 5839 keypad.

| Byte # | Bit # | Description |
|---|---|---|
| | 7 | not defined - always seems to be zero |
| | 6 | not defined - always seems to be zero |
| | 5 | not defined - always seems to be zero |
| | 4 | not defined - always seems to be zero |
| | 3 | not defined - always seems to be zero |
| | 2 | Low Level Beep Sequence, see table 3 |
| | 1 | Low Level Beep Sequence, see table 3 |
| 8 | 0 | Low Level Beep Sequence, see table 3 |
| | 7 | Arming Level Bit #1 - See table 6 |
| | 6 | BAT icon on (on = low battery) - ignore if alarm packet |
| | 5 | FIRE icon on |
| | 4 | READY TO ARM LED on |
| | 3 | bit 2&3 are set if Panel Status type packet, else 00 |
| | 2 | bit 2&3 are set if Panel Status type packet, else 00 |
| | 1 | CHECK icon on - used for tamper (not sure where else used) |
| 9 | 0 | Fire Alarm beeps sounding |
| | 7 | Arming Level Bit #2 - See table 6 |
| | 6 | Panel in Installer Program Mode - transmitted when entering pgm mode |
| | 5 | CHIME icon on |
| | 4 | BYPASS icon on |
| | 3 | AC icon on (on = ac ok) |
| | 2 | Arming Level Bit #3 - See table 6 |
| | 1 | ALARM icon on |
| 10 | 0 | General alarm Beeps sounding |

Table 3. Low Level Beep Sequence

| Byte 3 | | | |
|---|---|---|---|
| bit 2 | bit 1 | bit 0 | Beep Sequence |
| 0 | 0 | 0 | no beeps |
| 0 | 0 | 1 | 1 beep |
| 0 | 1 | 0 | 2 beeps |
| 0 | 1 | 1 | 3 beeps |
| 1 | 0 | 0 | rapid beeping |
| 1 | 0 | 1 | slow beeping |
| 1 | 1 | 0 | ?? |
| 1 | 1 | 1 | ?? |

*FIG. 35C*

Table 4. CRC1

| | |
|---|---|
| Byte 15 | 0xD5 XOR'd with most significant byte of CRC of transmission bytes 1-14 |
| Byte 16 | 0x80 XOR'd with least significant byte of CRC of ransmission bytes 1-14 |

Table 5. CRC2

| | |
|---|---|
| Byte 53 | Most significant byte of the CRC of transmission bytes 17-51 |
| Byte 53 | Least significant byte of the CRC of transmission bytes 17-51 |

Table 6. Arming Levels

Bit 7 of byte 4, bit 7 of byte 5, and bit 2 of byte 5 are used to indicate arming level.
The following table shows the arming level bit values for each arming level.

| Arming Level | Byte 4, Bit 7 | Byte 5, Bit 7 | Byte 5, Bit 2 |
|---|---|---|---|
| Disarmed | 0 | 0 | 0 |
| Away | 0 | 0 | 1 |
| | 0 | 1 | 0 |
| Maximum | 0 | 1 | 1 |
| Stay | 1 | 0 | 0 |
| | 1 | 0 | 1 |
| Instant | 1 | 1 | 0 |
| | 1 | 1 | 1 |

*FIG. 35D*

Table 7. Display Characters.

The 5839 keypad has a 2x16 display for a total of 32 character segments.
Each 53 byte conains 32 bytes of character data defining what should be displayed in each segment.
Byte 20 corresponds to the upper left segment and byte 51 corresponds to the lower right segment.
The following shows the relationship between the characters displayed on the keypad and the byte values transmitted in bytes 20-51.

| Byte Value | Character |
|---|---|
| 2 | *space* |
| 12 | ! |
| 22 | " |
| 32 | # |
| 42 | $ |
| 52 | % |
| 62 | & |
| 72 | *apostrophe* |
| 82 | ( |
| 92 | ) |
| A2 | * |
| B2 | + |
| C2 | , |
| D2 | - |
| E2 | |
| F2 | / |
| 3 | 0 |
| 13 | 1 |
| 23 | 2 |
| 33 | 3 |
| 43 | 4 |
| 53 | 5 |
| 63 | 6 |
| 73 | 7 |
| 83 | 8 |
| 93 | 9 |
| A3 | : |
| B3 | ; |
| C3 | < |

| Byte Value | Character |
|---|---|
| D3 | = |
| E3 | > |
| F3 | ? |
| 4 | @ |
| 14 | A |
| 24 | B |
| 34 | C |
| 44 | D |
| 54 | E |
| 64 | F |
| 74 | G |
| 84 | H |
| 94 | I |
| A4 | J |
| B4 | K |
| C4 | L |
| D4 | M |
| E4 | N |
| F4 | O |
| 5 | P |
| 15 | Q |
| 25 | R |
| 35 | S |
| 45 | T |
| 55 | U |
| 65 | V |
| 75 | W |
| 85 | X |

| Byte Value | Character |
|---|---|
| 95 | Y |
| A5 | Z |
| 16 | a |
| 26 | b |
| 36 | c |
| 46 | d |
| 56 | e |
| 66 | f |
| 76 | g |
| 86 | h |
| 96 | I |
| A6 | j |
| B6 | k |
| C6 | l |
| D6 | m |
| E6 | n |
| F6 | o |
| 7 | p |
| 17 | q |
| 27 | r |
| 37 | s |
| 47 | t |
| 57 | u |
| 67 | v |
| 77 | w |
| 87 | x |
| 97 | y |
| A7 | z |

*FIG. 35E*

Vista 53 Byte Transmissions

Notes:
The Vista panel transmits 53 byte packets to the 5839 wireless keypad.
Byte 7 of the 53 byte packet is defined the same as byte 2 of the 13 byte packet transmitted to the 5828 keypad.
The lower nibble of Byte 8 and Bytes 9-10 of the 53 byte packet are defined the same as bytes 3-5 of the 13 byte packet.
The 5839 keypad gets beep instructions from bytes 8-10, but I don't think it uses the rest of the information in these bytes.
Bytes 20-51 are display characters. Each byte corresponds to one of the 32 character segments on the 5839 keypad. Therefore each 53 byte packet instructs the 5839 keypad exactly what to display.

The 5883 transceiver transmits it's ID at power up in a 6 byte packet.
Example tx 8E 63 05 02 CS CS (ID = 8E 63 05)

My testing has indicated that the display cycles the zones in numerical order and updates every 20 seconds. System faults are also cycled with the open zones. The display change transmissions last for 2-3 minutes, then stop.
For instance if you have open zones 1,2,3 and a panel low battery you will get the following display transmissions from the Vista:
The following 53 byte display transmissions will be seperated by 20 seconds.
Fault 01
Fault 02
Fault 03
System Low Battery
Fault 01
Fault 02
Fault 03
System Low Battery
Fault 01
no more transmissions How long you need to wait to determine a zone has been restored will depend on how many zones are open. If it is the only zone open, when it closes, the system will indicate ready to arm.

I've noticed the following issues:
New system events do not always cause the 53 byte transmissions to restart (transmitting "*" command on a regular basis should make this a non-issue)
I've noticed the 5839 can be left on a display message such as "Fault 02". If zone 2 is restored after the 53 byte packets have ceased, the 5839 keypad will continue to display "fault 02" even though zone 2 has been restored.
If there is a zone in tamper, the tampered zone information gets transmitted, but not open zone information. The hardwired keypad also displays the tampered zone but not open zones.
Sometimes when zones are open, the 53 byte transmission indicates "Press * for faults". When this occurs, it requires a "*" command before it will transmit the open zone informations. (transmitting "*" command on a regular basis removes this issue).
Sometimes, when the 5839 wireless keypad transmits a "*" command, the Vista only sends back a single display update instead of cycling the display udpates for 20 seconds.

*FIG. 35F*

| | | | |
|---|---|---|---|
| FIG. 36A | FIG. 36B | FIG. 36C | FIG. 36D |
| FIG. 36E | FIG. 36F | FIG. 36G | FIG. 36H |
| FIG. 36I | FIG. 36J | FIG. 36K | FIG. 36L |

FIG. 36

53 Byte Example Data

| Transceiver ID byte #1 | Transceiver ID byte #2 | Transceiver ID byte #3 | always 0x00 except for enrollment? | always 0x03? | always 0x00? | equivalent to byte 2 of Vist 13 byte pkt (for 5828 keypad) | key lower nibble equivalent to byte 3 of Vist 13 byte pkt (for 5828 keypad) | equivalent to byte 4 of Vist 13 byte pkt (for 5828 keypad) | equivalent to byte 5 of Vist 13 byte pkt (for 5828 keypad) | undefined at this time | Low Level Beep Sequence | Low Level Beep Sequence | Low Level Beep Sequence | arming level - see table below | BAT icon - low battery - ignore if alarm packet | fire icon | ready to arm LED | bit 2&3 are set for Panel Status type packet, else 00 | bit 2&3 are set for Panel Status type packet, else 00 |
|---|---|---|---|---|---|---|---|---|---|---|---|---|---|---|---|---|---|---|---|
| | | | | | | | | | | Byte 8 | | | | | | | | | |
| 1 | 2 | 3 | 4 | 5 | 6 | 7 | 8 | 9 | 10 | Low nibble | | | | Byte 9 | | | | | |
| Panel in Arming Level 1(disarmed), panel has low battery, keypad displaying "System Lo Bat" | | | | | | | | | | | | | | | | | | | |
| 8E | 63 | 5 | 0 | 3 | 0 | 8 | 0 | 4C | 8 | 0 | 0 | 0 | 0 | 0 | 1 | 0 | 0 | 1 | 1 |
| Panel in Arming Level 1, panel has low battery, sensor #9 tampered, keypad displaying "Check 09 Front Door" | | | | | | | | | | | | | | | | | | | |
| 8E | 63 | 5 | 0 | 3 | 0 | 9 | 0 | 2 | 8 | 0 | 0 | 0 | 0 | 0 | 0 | 0 | 0 | 0 | 0 |
| Panel in Arming Level 1, panel has low battery, sensor #9 tampered, keypad displaying "Check 09 Front Door" | | | | | | | | | | | | | | | | | | | |
| 8E | 63 | 5 | 0 | 3 | 0 | 9 | 0 | 2 | 8 | 0 | 0 | 0 | 0 | 0 | 0 | 0 | 0 | 0 | 0 |
| Panel in Arming Level 1, panel has low battery, keypad displaying "System Lo Bat" | | | | | | | | | | | | | | | | | | | |
| 8E | 63 | 5 | 0 | 3 | 0 | 8 | 0 | 4C | 8 | 0 | 0 | 0 | 0 | 0 | 1 | 0 | 0 | 1 | 1 |
| Panel in Arming Level 1, panel has low battery, sensor #9 tampered, keypad displaying "Check 09 Front Door" | | | | | | | | | | | | | | | | | | | |
| 8E | 63 | 5 | 0 | 3 | 0 | 9 | 0 | 2 | 8 | 0 | 0 | 0 | 0 | 0 | 0 | 0 | 0 | 0 | 0 |
| Panel in Arming Level 1, system has low battery, keypad displaying "*****DISARMED**** Ready to Arm" | | | | | | | | | | | | | | | | | | | |
| 8E | 63 | 5 | 0 | 3 | 0 | 8 | 0 | 5C | 8 | 0 | 0 | 0 | 0 | 0 | 1 | 0 | 1 | 1 | 1 |

*FIG. 36A*

| check icon - used for tamper(what else?) | sound fire alarm cadence | arming level - see table below | Panel in Installer Program Mode - sent when entering | CHIME icon | bypass icon | ac icon - ac ok | arming level - see table below | alarm icon | sound General alarm beeps | always 0x00 except for enrollment? | always 0x00? | always 0x00? | Trigger Count | CRC#1 high byte | CRC#1 low byte | always 0x02? | always 0x00? | always 0x00? | display character |
|---|---|---|---|---|---|---|---|---|---|---|---|---|---|---|---|---|---|---|---|
| | | | | | | | | | | | | | | | | | | | |
| | | Byte 10 | | | | | | | | 11 | 12 | 13 | 14 | 15 | 16 | 17 | 18 | 19 | 20 |
| | | | | | | | | | | | | | | | | | | | |
| | | | | | | | | | | | | | | | | | | | S |
| 0 | 0 | 0 | 0 | 0 | 0 | 1 | 0 | 0 | 0 | 0 | 0 | 0 | 1A | 89 | B6 | 2 | 0 | 0 | 35 |
| | | | | | | | | | | | | | | | | | | | C |
| 1 | 0 | 0 | 0 | 0 | 0 | 1 | 0 | 0 | 0 | 0 | 0 | 0 | 1B | 49 | FE | 2 | 0 | 0 | 34 |
| | | | | | | | | | | | | | | | | | | | C |
| 1 | 0 | 0 | 0 | 0 | 0 | 1 | 0 | 0 | 0 | 0 | 0 | 0 | 1C | C9 | EF | 2 | 0 | 0 | 34 |
| | | | | | | | | | | | | | | | | | | | S |
| 0 | 0 | 0 | 0 | 0 | 0 | 1 | 0 | 0 | 0 | 0 | 0 | 0 | 1D | 9 | A7 | 2 | 0 | 0 | 35 |
| | | | | | | | | | | | | | | | | | | | C |
| 1 | 0 | 0 | 0 | 0 | 0 | 1 | 0 | 0 | 0 | 0 | 0 | 0 | 1E | 49 | E0 | 2 | 0 | 0 | 34 |
| | | | | | | | | | | | | | | | | | | | |
| 0 | 0 | 0 | 0 | 0 | 0 | 1 | 0 | 0 | 0 | 0 | 0 | 0 | 25 | 9 | 26 | 2 | 0 | 0 | A2 |

*FIG. 36B*

| | | | | | | | | | | | | | | |
|---|---|---|---|---|---|---|---|---|---|---|---|---|---|---|
| display character | | 21 | | y | 95 | h | 84 | h | 84 | y | 95 | h | 84 | | A2 |
| display character | | 22 | | s | 35 | e | 54 | e | 54 | s | 35 | e | 54 | | A2 |
| display character | | 23 | | t | 45 | c | 34 | c | 34 | t | 45 | c | 34 | | A2 |
| display character | | 24 | | e | 54 | k | B4 | k | B4 | e | 54 | k | B4 | | 44 |
| display character | | 25 | | m | D4 | | 2 | | 2 | m | D4 | | 2 | | 94 |
| display character | | 26 | | | 2 | 0 | 3 | 0 | 3 | | 2 | 0 | 3 | | 35 |
| display character | | 27 | | L | C4 | 9 | 93 | 9 | 93 | L | C4 | 9 | 93 | | 14 |
| display character | | 28 | | o | F4 | | 2 | | 2 | o | F4 | | 2 | | 25 |
| display character | | 29 | | | 2 | F | 64 | F | 64 | | 2 | F | 64 | | D4 |
| display character | | 30 | | B | 24 | r | 25 | r | 25 | B | 24 | r | 25 | | 54 |
| display character | | 31 | | a | 14 | o | F4 | o | F4 | a | 14 | o | F4 | | 44 |
| display character | | 32 | | t | 45 | n | E4 | n | E4 | t | 45 | n | E4 | | A2 |
| display character | | 33 | | | 2 | t | 45 | t | 45 | | 2 | t | 45 | | A2 |
| display character | | 34 | | | 2 | | 2 | | 2 | | 2 | | 2 | | A2 |
| display character | | 35 | | | 2 | | 2 | | 2 | | 2 | | 2 | | A2 |
| display character | | 36 | | | 2 | D | 44 | D | 44 | | 2 | D | 44 | | 2 |
| display character | | 37 | | | 2 | o | F4 | o | F4 | | 2 | o | F4 | | 2 |
| display character | | 38 | | | 2 | o | F4 | o | F4 | | 2 | o | F4 | | 25 |
| display character | | 39 | | | 2 | r | 25 | r | 25 | | 2 | r | 25 | | 56 |
| display character | | 40 | | | 2 | | 2 | | 2 | | 2 | | 2 | | 16 |

*FIG. 36C*

| | | | | | | | | | | | | | | | |
|---|---|---|---|---|---|---|---|---|---|---|---|---|---|---|---|
| 46 | | 2 | | 2 | | 2 | | 2 | | 2 | | | 41 | | display character |
| 97 | | 2 | | 2 | | 2 | | 2 | | 2 | | | 42 | | display character |
| 2 | | 2 | | 2 | | 2 | | 2 | | 2 | | | 43 | | display character |
| 47 | | 2 | | 2 | | 2 | | 2 | | 2 | | | 44 | | display character |
| F6 | | 2 | | 2 | | 2 | | 2 | | 2 | | | 45 | | display character |
| 2 | | 2 | | 2 | | 2 | | 2 | | 2 | | | 46 | | display character |
| 14 | | 2 | | 2 | | 2 | | 2 | | 2 | | | 47 | | display character |
| 27 | | 2 | | 2 | | 2 | | 2 | | 2 | | | 48 | | display character |
| D6 | | 2 | | 2 | | 2 | | 2 | | 2 | | | 49 | | display character |
| 2 | | 2 | | 2 | | 2 | | 2 | | 2 | | | 50 | | display character |
| 2 | | 2 | | 2 | | 2 | | 2 | | 2 | | | 51 | | display character |
| D4 | | 8 | | C8 | | 8 | | 8 | | C8 | | | 52 | | CRC#2 high byte |
| D3 | | 9A | | ED | | 9A | | 9A | | ED | | | 53 | | CRC#2 low byte |

FIG. 36D

| | | | | | | | | | | | | | | | | | | | |
|---|---|---|---|---|---|---|---|---|---|---|---|---|---|---|---|---|---|---|---|
| Panel in Arming Level 1, sensor 1 open, keypad displaying "FAULT 01 ABCDEFGHIJ" - ABCDEFGHIJ is the name of sensor #1 | | | | | | | | | | | | | | | | | | | |
| 8E | 63 | 5 | 0 | 3 | 0 | 1 | 0 | 0 | 8 | 0 | 0 | 0 | 0 | 0 | 0 | 0 | 0 | 0 | 0 |
| Panel in Arming Level 1, sensor 2 open, keypad displaying "FAULT 02 KLMNOPQRST" | | | | | | | | | | | | | | | | | | | |
| 8E | 63 | 5 | 0 | 3 | 0 | 2 | 0 | 0 | 8 | 0 | 0 | 0 | 0 | 0 | 0 | 0 | 0 | 0 | 0 |
| Panel in Arming Level 1, sensor 3 open, keypad displaying "FAULT 03 UVWXYZ" | | | | | | | | | | | | | | | | | | | |
| 8E | 63 | 5 | 0 | 3 | 0 | 3 | 0 | 0 | 8 | 0 | 0 | 0 | 0 | 0 | 0 | 0 | 0 | 0 | 0 |
| Panel Power Up Keypad displaying "Busy - Standby D1" | | | | | | | | | | | | | | | | | | | |
| 8E | 63 | 5 | 0 | 3 | 0 | D1 | 0 | 0 | 8 | 0 | 0 | 0 | 0 | 0 | 0 | 0 | 0 | 0 | 0 |
| Panel Power Up Keypad displaying "Busy - Standby D1" | | | | | | | | | | | | | | | | | | | |
| 8E | 63 | 5 | 0 | 3 | 0 | D1 | 0 | 0 | 8 | 0 | 0 | 0 | 0 | 0 | 0 | 0 | 0 | 0 | 0 |
| Panel Armed to Away, keypad displaying "Armed ****AWAY**** May Exit Now 60" | | | | | | | | | | | | | | | | | | | |
| 8E | 63 | 5 | 0 | 3 | 0 | 60 | 2 | 0 | 0C | 0 | 0 | 1 | 0 | 0 | 0 | 0 | 0 | 0 | 0 |
| Panel in Armed to Away exit delay, keypad displaying "Armed ****AWAY**** May Exit Now 27" | | | | | | | | | | | | | | | | | | | |
| 8E | 63 | 5 | 0 | 3 | 0 | 27 | 0 | 0 | 0C | 0 | 0 | 0 | 0 | 0 | 0 | 0 | 0 | 0 | 0 |
| Panel armed to Away, exit delay expired, keypad displaying "Armed ****AWAY**** **ALL SECURE**" | | | | | | | | | | | | | | | | | | | |
| 8E | 63 | 5 | 0 | 3 | 0 | 8 | 0 | 0C | 0C | 0 | 0 | 0 | 0 | 0 | 0 | 0 | 0 | 1 | 1 |
| Zone 1 was breached while armed to Away, Panel in entry delay, keypad displays "Disarm System or Alarm occurs" | | | | | | | | | | | | | | | | | | | |
| 8E | 63 | 5 | 0 | 3 | 0 | 8 | 5 | 0C | 0C | 0 | 1 | 0 | 1 | 0 | 0 | 0 | 0 | 1 | 1 |
| Panel disarmed from entry delay, keypad displays "Disarmed Ready to Arm" | | | | | | | | | | | | | | | | | | | |
| 8E | 63 | 5 | 0 | 3 | 0 | 8 | 1 | 1C | 8 | 0 | 0 | 0 | 1 | 0 | 0 | 0 | 1 | 1 | 1 |
| Panel armed to stay, keypad displays "Armed Stay May exit now 60" | | | | | | | | | | | | | | | | | | | |
| 8E | 63 | 5 | 0 | 3 | 0 | 60 | 3 | 80 | 8 | 0 | 0 | 1 | 1 | 1 | 0 | 0 | 0 | 0 | 0 |
| Panel in armed to stay exit delay, keypad displays "Armed Stay May exit now 43 | | | | | | | | | | | | | | | | | | | |
| 8E | 63 | 5 | 0 | 3 | 0 | 43 | 0 | 80 | 8 | 0 | 0 | 0 | 0 | 1 | 0 | 0 | 0 | 0 | 0 |
| Panel in armed to stay exit delay, keypad displays "Armed Stay May exit now 9" | | | | | | | | | | | | | | | | | | | |
| 8E | 63 | 5 | 0 | 3 | 0 | 9 | 0 | 80 | 8 | 0 | 0 | 0 | 0 | 1 | 0 | 0 | 0 | 0 | 0 |
| Panel armed to Stay, exit delay expired, keypad displaying "Armed ***STAY***" | | | | | | | | | | | | | | | | | | | |
| 8E | 63 | 5 | 0 | 3 | 0 | 8 | 0 | 8C | 8 | 0 | 0 | 0 | 0 | 1 | 0 | 0 | 0 | 1 | 1 |
| Panel armed to Stay, exit delay expired, keypad displaying "Armed ***STAY***" | | | | | | | | | | | | | | | | | | | |
| 8E | 63 | 5 | 0 | 3 | 0 | 8 | 0 | 8C | 8 | 0 | 0 | 0 | 0 | 1 | 0 | 0 | 0 | 1 | 1 |
| Panel armed to INSTANT, keypad displaying "ARMED *INSTANT* May Exit Now 60" | | | | | | | | | | | | | | | | | | | |
| 8E | 63 | 5 | 0 | 3 | 0 | 60 | 3 | 80 | 88 | 0 | 0 | 1 | 1 | 1 | 0 | 0 | 0 | 0 | 0 |
| Panel in armed INSTANT exit delay, keypad displays "ARMED *INSTANT* May Exit Now 47" | | | | | | | | | | | | | | | | | | | |
| 8E | 63 | 5 | 0 | 3 | 0 | 26 | 0 | 80 | 88 | 0 | 0 | 0 | 0 | 1 | 0 | 0 | 0 | 0 | 0 |
| Panel Armed to INSTANT, exit delay expired, keypad displays "ARMED *INSTANT*" | | | | | | | | | | | | | | | | | | | |
| 8E | 63 | 5 | 0 | 3 | 0 | 8 | 0 | 8C | 88 | 0 | 0 | 0 | 0 | 1 | 0 | 0 | 0 | 1 | 1 |
| Panel armed to MAXIMUM, keypad displays "ARMED *MAXIMUM* May exit now 60" | | | | | | | | | | | | | | | | | | | |
| 8E | 63 | 5 | 0 | 3 | 0 | 60 | 2 | 0 | 8C | 0 | 0 | 1 | 0 | 0 | 0 | 0 | 0 | 0 | 0 |
| Panel in armed to MAXIMUM exit delay, keypad displays "ARMED *MAXIMUM* May exit now 26" | | | | | | | | | | | | | | | | | | | |
| 8E | 63 | 5 | 0 | 3 | 0 | 26 | 0 | 0 | 8C | 0 | 0 | 0 | 0 | 0 | 0 | 0 | 0 | 0 | 0 |

*FIG. 36E*

| | | | | | | | | | | | | | | | | | | | |
|---|---|---|---|---|---|---|---|---|---|---|---|---|---|---|---|---|---|---|---|
| 0 | 0 | 0 | 0 | 0 | 0 | 1 | 0 | 0 | 0 | 0 | 0 | 0 | 1 | 39 | 92 | 2 | 0 | 0 | 64 |
| 0 | 0 | 0 | 0 | 0 | 0 | 1 | 0 | 0 | 0 | 0 | 0 | 0 | 0A | 89 | A1 | 2 | 0 | 0 | 64 |
| 0 | 0 | 0 | 0 | 0 | 0 | 1 | 0 | 0 | 0 | 0 | 0 | 0 | 12 | 99 | F7 | 2 | 0 | 0 | 64 |
| 0 | 0 | 0 | 0 | 0 | 0 | 1 | 0 | 0 | 0 | 0 | 0 | 0 | 1 | BB | 5F | 2 | 0 | 0 | 24 |
| 0 | 0 | 0 | 0 | 0 | 0 | 1 | 0 | 0 | 0 | 0 | 0 | 0 | 2 | BB | 55 | 2 | 0 | 0 | 24 |
| 0 | 0 | 0 | 0 | 0 | 0 | 1 | 1 | 0 | 0 | 0 | 0 | 0 | 10 | 2B | 66 | 2 | 0 | 0 | 14 |
| 0 | 0 | 0 | 0 | 0 | 0 | 1 | 1 | 0 | 0 | 0 | 0 | 0 | 12 | D8 | C3 | 2 | 0 | 0 | 14 |
| 0 | 0 | 0 | 0 | 0 | 0 | 1 | 1 | 0 | 0 | 0 | 0 | 0 | 14 | 8 | 35 | 2 | 0 | 0 | 14 |
| 0 | 0 | 0 | 0 | 0 | 0 | 1 | 1 | 0 | 0 | 0 | 0 | 0 | 18 | 0D | 4D | 2 | 0 | 0 | 44 |
| 0 | 0 | 0 | 0 | 0 | 0 | 1 | 0 | 0 | 0 | 0 | 0 | 0 | 19 | 8 | FA | 2 | 0 | 0 | A2 |
| 0 | 0 | 0 | 0 | 0 | 0 | 1 | 0 | 0 | 0 | 0 | 0 | 0 | 20 | AB | BD | 2 | 0 | 0 | 14 |
| 0 | 0 | 0 | 0 | 0 | 0 | 1 | 0 | 0 | 0 | 0 | 0 | 0 | 21 | 98 | 4D | 2 | 0 | 0 | 14 |
| 0 | 0 | 0 | 0 | 0 | 0 | 1 | 0 | 0 | 0 | 0 | 0 | 0 | 23 | 39 | E5 | 2 | 0 | 0 | 14 |
| 0 | 0 | 0 | 0 | 0 | 0 | 1 | 0 | 0 | 0 | 0 | 0 | 0 | 24 | 9 | FD | 2 | 0 | 0 | 14 |
| 0 | 0 | 0 | 0 | 0 | 0 | 1 | 0 | 0 | 0 | 0 | 0 | 0 | 25 | 89 | F8 | 2 | 0 | 0 | 14 |
| 0 | 0 | 1 | 0 | 0 | 0 | 1 | 0 | 0 | 0 | 0 | 0 | 0 | 2A | 17 | 82 | 2 | 0 | 0 | 14 |
| 0 | 0 | 1 | 0 | 0 | 0 | 1 | 0 | 0 | 0 | 0 | 0 | 0 | 2C | F5 | 29 | 2 | 0 | 0 | 14 |
| 0 | 0 | 1 | 0 | 0 | 0 | 1 | 0 | 0 | 0 | 0 | 0 | 0 | 2E | B5 | C2 | 2 | 0 | 0 | 14 |
| 0 | 0 | 1 | 0 | 0 | 0 | 1 | 1 | 0 | 0 | 0 | 0 | 0 | 31 | 97 | A3 | 2 | 0 | 0 | 14 |
| 0 | 0 | 1 | 0 | 0 | 0 | 1 | 1 | 0 | 0 | 0 | 0 | 0 | 33 | 74 | 0 | 2 | 0 | 0 | 14 |

FIG. 36F

| | | | | | | | | | | | | | | | | | | | |
|---|---|---|---|---|---|---|---|---|---|---|---|---|---|---|---|---|---|---|---|
| 14 | 55 | C4 | 45 | 2 | 3 | 13 | 2 | 2 | 2 | 2 | 2 | 2 | 2 | 2 | 14 | 24 | 34 | 44 | 54 |
| | | | | | | | | | | | | | | | | | | | |
| 14 | 55 | C4 | 45 | 2 | 3 | 23 | 2 | 2 | 2 | 2 | 2 | 2 | 2 | 2 | B4 | C4 | D4 | E4 | F4 |
| | | | | | | | | | | | | | | | | | | | |
| 14 | 55 | C4 | 45 | 2 | 3 | 33 | 2 | 55 | 65 | 75 | 85 | 95 | A5 | 2 | 2 | 2 | 2 | 2 | 2 |
| | | | | | | | | | | | | | | | | | | | |
| 57 | 37 | 97 | 2 | D2 | 2 | 35 | 47 | 16 | E6 | 46 | 26 | 97 | 2 | 2 | 2 | 2 | 2 | 2 | 2 |
| | | | | | | | | | | | | | | | | | | | |
| 57 | 37 | 97 | 2 | D2 | 2 | 35 | 47 | 16 | E6 | 46 | 26 | 97 | 2 | 2 | 2 | 2 | 2 | 2 | 2 |
| | | | | | | | | | | | | | | | | | | | |
| 25 | D4 | 54 | 44 | 2 | A2 | A2 | A2 | 14 | 75 | 14 | 95 | A2 | A2 | A2 | D4 | 16 | 97 | 2 | 54 |
| | | | | | | | | | | | | | | | | | | | |
| 25 | D4 | 54 | 44 | 2 | A2 | A2 | A2 | 14 | 75 | 14 | 95 | A2 | A2 | A2 | D4 | 16 | 97 | 2 | 54 |
| | | | | | | | | | | | | | | | | | | | |
| 25 | D4 | 54 | 44 | 2 | A2 | A2 | A2 | 14 | 75 | 14 | 95 | A2 | A2 | A2 | A2 | A2 | 2 | 14 | C4 |
| | | | | | | | | | | | | | | | | | | | |
| 94 | 35 | 14 | 25 | D4 | 2 | 35 | 95 | 35 | 45 | 54 | D4 | 2 | 2 | 2 | F6 | 27 | 2 | 16 | C6 |
| | | | | | | | | | | | | | | | | | | | |
| A2 | A2 | A2 | 44 | 94 | 35 | 14 | 25 | D4 | 54 | 44 | A2 | A2 | A2 | A2 | 2 | 2 | 25 | 56 | 16 |
| | | | | | | | | | | | | | | | | | | | |
| 25 | D4 | 54 | 44 | 2 | A2 | A2 | A2 | 35 | 45 | 14 | 95 | A2 | A2 | A2 | D4 | 16 | 97 | 2 | 54 |
| | | | | | | | | | | | | | | | | | | | |
| 25 | D4 | 54 | 44 | 2 | A2 | A2 | A2 | 35 | 45 | 14 | 95 | A2 | A2 | A2 | D4 | 16 | 97 | 2 | 54 |
| | | | | | | | | | | | | | | | | | | | |
| 25 | D4 | 54 | 44 | 2 | A2 | A2 | A2 | 35 | 45 | 14 | 95 | A2 | A2 | A2 | D4 | 16 | 97 | 2 | 54 |
| | | | | | | | | | | | | | | | | | | | |
| 25 | D4 | 54 | 44 | 2 | A2 | A2 | A2 | 35 | 45 | 14 | 95 | A2 | A2 | A2 | 2 | 2 | 2 | 2 | 2 |
| | | | | | | | | | | | | | | | | | | | |
| 25 | D4 | 54 | 44 | 2 | A2 | A2 | A2 | 35 | 45 | 14 | 95 | A2 | A2 | A2 | 2 | 2 | 2 | 2 | 2 |
| | | | | | | | | | | | | | | | | | | | |
| 25 | D4 | 54 | 44 | 2 | A2 | 94 | E4 | 35 | 45 | 14 | E4 | 45 | A2 | 2 | D4 | 16 | 97 | 2 | 54 |
| | | | | | | | | | | | | | | | | | | | |
| 25 | D4 | 54 | 44 | 2 | A2 | 94 | E4 | 35 | 45 | 14 | E4 | 45 | A2 | 2 | D4 | 16 | 97 | 2 | 54 |
| | | | | | | | | | | | | | | | | | | | |
| 25 | D4 | 54 | 44 | 2 | A2 | 94 | E4 | 35 | 45 | 14 | E4 | | | | | | | | |
| | | | | | | | | | | | | | | | | | | | |
| 25 | D4 | 54 | 44 | 2 | A2 | D4 | 14 | 85 | 94 | D4 | 55 | D4 | A2 | 2 | D4 | 16 | 97 | 2 | 54 |
| | | | | | | | | | | | | | | | | | | | |
| 25 | D4 | 54 | 44 | 2 | A2 | D4 | 14 | 85 | 94 | D4 | 55 | D4 | A2 | 2 | D4 | 16 | 97 | 2 | 54 |

*FIG. 36G*

| | | | | | | | | | | | | |
|---|---|---|---|---|---|---|---|---|---|---|---|---|
| 64 | 74 | 84 | 94 | A4 | 2 | 2 | 2 | 2 | 2 | 2 | D4 | C1 |
| | | | | | | | | | | | | |
| 5 | 15 | 25 | 35 | 45 | 2 | 2 | 2 | 2 | 2 | 2 | E6 | F0 |
| | | | | | | | | | | | | |
| 2 | 2 | 2 | 2 | 2 | 2 | 2 | 2 | 2 | 2 | 2 | 7A | 90 |
| | | | | | | | | | | | | |
| 2 | 2 | 2 | 2 | 2 | 2 | 2 | 2 | 2 | 44 | 13 | 3F | 6C |
| | | | | | | | | | | | | |
| 2 | 2 | 2 | 2 | 2 | 2 | 2 | 2 | 2 | 44 | 13 | 3F | 6C |
| | | | | | | | | | | | | |
| 87 | 96 | 47 | 2 | E4 | F6 | 77 | 2 | 2 | 63 | 3 | 2C | E5 |
| | | | | | | | | | | | | |
| 87 | 96 | 47 | 2 | E4 | F6 | 77 | 2 | 2 | 23 | 73 | 2D | C0 |
| | | | | | | | | | | | | |
| C4 | 2 | 35 | 54 | 34 | 55 | 25 | 54 | 2 | A2 | A2 | 30 | 8D |
| | | | | | | | | | | | | |
| 16 | 27 | D6 | 2 | F6 | 36 | 36 | 57 | 27 | 37 | 2 | 83 | 55 |
| | | | | | | | | | | | | |
| 46 | 97 | 2 | 47 | F6 | 2 | 14 | 27 | D6 | 2 | 2 | D4 | D3 |
| | | | | | | | | | | | | |
| 87 | 96 | 47 | 2 | E4 | F6 | 77 | 2 | 2 | 63 | 3 | 45 | E6 |
| | | | | | | | | | | | | |
| 87 | 96 | 47 | 2 | E4 | F6 | 77 | 2 | 2 | 43 | 33 | 5 | 45 |
| | | | | | | | | | | | | |
| | | | | | | | | | | | | |
| | | | | | | | | | | | | |
| 2 | 2 | 2 | 2 | 2 | 2 | 2 | 2 | 2 | 2 | 2 | 9E | 53 |
| | | | | | | | | | | | | |
| 2 | 2 | 2 | 2 | 2 | 2 | 2 | 2 | 2 | 2 | 2 | 9E | 53 |
| | | | | | | | | | | | | |
| 87 | 96 | 47 | 2 | E4 | F6 | 77 | 2 | 2 | 63 | 3 | AB | C6 |
| | | | | | | | | | | | | |
| 87 | 96 | 47 | 2 | E4 | F6 | 77 | 2 | | | | | |
| | | | | | | | | | | | | |
| | | | | | | | | | | | | |
| | | | | | | | | | | | | |
| 87 | 96 | 47 | 2 | E4 | F6 | 77 | 2 | 2 | 63 | 3 | 48 | 8D |
| | | | | | | | | | | | | |
| 87 | 96 | 47 | 2 | E4 | F6 | 77 | 2 | 2 | 23 | 63 | C9 | CB |

FIG. 36H

| | | | | | | | | | | | | | | | | | | | |
|---|---|---|---|---|---|---|---|---|---|---|---|---|---|---|---|---|---|---|---|
| Panel armed to MAXIMUM, exit delay expired, keypad displays "ARMED *MAXIMUM* **ALL SECURE**" | | | | | | | | | | | | | | | | | | | |
| 8E | 63 | 5 | 0 | 3 | 0 | 8 | 0 | 0C | 8C | 0 | 0 | 0 | 0 | 0 | 0 | 0 | 0 | 1 | 1 |
| Panel armed to MAXIMUM, exit delay expired, keypad displays "ARMED *MAXIMUM* **ALL SECURE**" | | | | | | | | | | | | | | | | | | | |
| 8E | 63 | 5 | 0 | 3 | 0 | 8 | 0 | 0C | 8C | 0 | 0 | 0 | 0 | 0 | 0 | 0 | 0 | 1 | 1 |
| Entered installer program mode, keypad displaying "Installer Code 20" | | | | | | | | | | | | | | | | | | | |
| 8E | 63 | 5 | 0 | 3 | 0 | 20 | 0 | 0 | 48 | 0 | 0 | 0 | 0 | 0 | 0 | 0 | 0 | 0 | 0 |
| Panel disarmed, chime enabled, keypad displays "DISARMED CHIME Ready to Arm" | | | | | | | | | | | | | | | | | | | |
| 8E | 63 | 5 | 0 | 3 | 0 | 8 | 1 | 1C | 28 | 0 | 0 | 0 | 1 | 0 | 0 | 0 | 1 | 1 | 1 |
| Panel disarm, chime enabled, Panel ac removed, keypad displays "AC LOSS" | | | | | | | | | | | | | | | | | | | |
| 8E | 63 | 5 | 0 | 3 | 0 | 8 | 0 | 1C | 20 | 0 | 0 | 0 | 0 | 0 | 0 | 0 | 1 | 1 | 1 |
| Panel disarm, chime enabled, Panel ac removed, keypad displays "DISARMED CHIME Ready to Arm" | | | | | | | | | | | | | | | | | | | |
| 8E | 63 | 5 | 0 | 3 | 0 | 8 | 0 | 1C | 20 | 0 | 0 | 0 | 0 | 0 | 0 | 0 | 1 | 1 | 1 |
| Panel disarmed, sensor 1 bypassed, keypad displays "BYPAS 01 AIR", AIR is the name of sensor #1 | | | | | | | | | | | | | | | | | | | |
| 8E | 63 | 5 | 0 | 3 | 0 | 1 | 1 | 10 | 18 | 0 | 0 | 0 | 1 | 0 | 0 | 0 | 1 | 1 | 1 |
| Panel disarmed, sensor 1 bypassed, keypad displays "DISARMED BYPASS Ready to Arm" | | | | | | | | | | | | | | | | | | | |
| 8E | 63 | 5 | 0 | 3 | 0 | 8 | 0 | 1C | 18 | 0 | 0 | 0 | 0 | 0 | 0 | 0 | 1 | 1 | 1 |
| Test In Progress | | | | | | | | | | | | | | | | | | | |
| 8E | 63 | 5 | 0 | 3 | 0 | DD | 0 | 10 | 18 | 0 | 0 | 0 | 0 | 0 | 0 | 0 | 1 | 0 | 0 |
| ALARM 99 MASTER PANIC | | | | | | | | | | | | | | | | | | | |
| 8E | 63 | 5 | 0 | 3 | 0 | 99 | 0 | 0 | 0B | 0 | 0 | 0 | A3 | 39 | B3 | 2 | 0 | 0 | 14 |
| FIRE 95 | | | | | | | | | | | | | | | | | | | |
| 8E | 63 | 5 | 0 | 3 | 0 | 95 | 0 | 31 | 0A | 0 | 0 | 0 | BC | 1 | 91 | 2 | 0 | 0 | 64 |
| Transmission intended for Keypads with ECN Address #0,1 | | | | | | | | | | | | | | | | | | | |
| 8E | 63 | 5 | 0 | 3 | 0 | 8 | 0 | 4C | 8 | 0 | 0 | 0 | 0 | 0 | 1 | 0 | 0 | 1 | 1 |
| Transmission intended for Keypads with ECN Address #0,1,5 | | | | | | | | | | | | | | | | | | | |
| 81 | A7 | 83 | 0 | 23 | 0 | 8 | 0 | 0C | 0C | | | | | | | | | | |
| Transmission intended for Keypads with ECN Address #2,3,4,6,7 | | | | | | | | | | | | | | | | | | | |
| 81 | A7 | 83 | 0 | DC | 0 | 48 | 0 | 80 | 8 | | | | | | | | | | |
| Transmission intended for Keypads with ECN Address #1 and #5 | | | | | | | | | | | | | | | | | | | |
| 81 | A7 | 83 | 0 | 22 | 0 | 8 | 0 | 0C | 0C | | | | | | | | | | |

FIG. 36I

| | | | | | | | | | | | | | | | | | | | |
|---|---|---|---|---|---|---|---|---|---|---|---|---|---|---|---|---|---|---|---|
| 0 | 0 | 1 | 0 | 0 | 0 | 1 | 1 | 0 | 0 | 0 | 0 | 0 | 35 | B4 | F0 | 2 | 0 | 0 | 14 |
| 0 | 0 | 1 | 0 | 0 | 0 | 1 | 1 | 0 | 0 | 0 | 0 | 0 | 36 | B4 | FA | 2 | 0 | 0 | 14 |
| 0 | 0 | 0 | 1 | 0 | 0 | 1 | 0 | 0 | 0 | 0 | 0 | 0 | 62 | 36 | 12 | 2 | 0 | 0 | 94 |
| 0 | 0 | 0 | 0 | 1 | 0 | 1 | 0 | 0 | 0 | 0 | 0 | 0 | 69 | 6 | DA | 2 | 0 | 0 | 2 |
| 0 | 0 | 0 | 0 | 1 | 0 | 0 | 0 | 0 | 0 | 0 | 0 | 0 | 6C | 4 | 14 | 2 | 0 | 0 | 14 |
| 0 | 0 | 0 | 0 | 1 | 0 | 0 | 0 | 0 | 0 | 0 | 0 | 0 | 71 | 4 | 5A | 2 | 0 | 0 | 2 |
| 0 | 0 | 0 | 0 | 0 | 1 | 1 | 0 | 0 | 0 | 0 | 0 | 0 | 77 | 3E | 27 | 2 | 0 | 0 | 24 |
| 0 | 0 | 0 | 0 | 0 | 1 | 1 | 0 | 0 | 0 | 0 | 0 | 0 | 78 | 8F | 2F | 2 | 0 | 0 | 44 |
| 0 | 0 | 0 | 0 | 0 | 1 | 1 | 0 | 0 | 0 | 10 | 0 | 0 | 98 | 3F | B6 | 2 | 0 | 0 | 45 |
| C4 | 14 | 25 | D4 | 2 | 93 | 93 | 2 | D4 | 14 | 35 | 45 | 54 | 25 | 2 | 5 | 14 | E4 | 94 | 34 |
| 94 | 25 | 54 | 2 | 93 | 53 | 2 | 2 | 2 | 2 | 2 | 2 | 2 | 2 | 2 | 2 | 2 | 2 | 2 | 2 |
| 0 | 0 | 0 | 0 | 0 | 0 | 1 | 0 | 0 | 0 | 0 | 0 | 0 | 1A | 89 | B6 | 2 | 0 | 0 | 35 |
| | | | | | | | | | | 0 | 0 | 0 | 57 | E4 | 1F | 2 | 0 | 0 | 14 |
| | | | | | | | | | | 0 | 0 | 0 | 58 | 68 | 0E | 2 | 0 | 0 | 14 |
| | | | | | | | | | | 0 | 0 | 0 | 61 | 4 | BC | 2 | 0 | 0 | 14 |

*FIG. 36J*

| | | | | | | | | | | | | | | | | | | | |
|---|---|---|---|---|---|---|---|---|---|---|---|---|---|---|---|---|---|---|---|
| | | | | | | | | | | | | | | | | | | | |
| 25 | D4 | 54 | 44 | 2 | A2 | D4 | 14 | 85 | 94 | D4 | 55 | D4 | A2 | 2 | A2 | A2 | 2 | 14 | C4 |
| | | | | | | | | | | | | | | | | | | | |
| 25 | D4 | 54 | 44 | 2 | A2 | D4 | 14 | 85 | 94 | D4 | 55 | D4 | A2 | 2 | A2 | A2 | 2 | 14 | C4 |
| | | | | | | | | | | | | | | | | | | | |
| E6 | 37 | 47 | 16 | C6 | C6 | 56 | 27 | 2 | 34 | F6 | 46 | 56 | 2 | 2 | 2 | 2 | 2 | 2 | 2 |
| | | | | | | | | | | | | | | | | | | | |
| 44 | 94 | 35 | 14 | 25 | D4 | 54 | 44 | 2 | 34 | 84 | 94 | D4 | 54 | 2 | 2 | 2 | 25 | 56 | 16 |
| | | | | | | | | | | | | | | | | | | | |
| 34 | 2 | C4 | F4 | 35 | 35 | 2 | 2 | 2 | 2 | 2 | 2 | 2 | 2 | 2 | 2 | 2 | 2 | 2 | 2 |
| | | | | | | | | | | | | | | | | | | | |
| 44 | 94 | 35 | 14 | 25 | D4 | 54 | 44 | 2 | 34 | 84 | 94 | D4 | 54 | 2 | 2 | 2 | 25 | 56 | 16 |
| | | | | | | | | | | | | | | | | | | | |
| 95 | 5 | 14 | 35 | 2 | 3 | 13 | 2 | 14 | 94 | 25 | 2 | 2 | 2 | 2 | 2 | 2 | 2 | 2 | 2 |
| | | | | | | | | | | | | | | | | | | | |
| 94 | 35 | 14 | 25 | D4 | 54 | 44 | 2 | 24 | 95 | 5 | 14 | 35 | 35 | 2 | 2 | 2 | 25 | 56 | 16 |
| | | | | | | | | | | | | | | | | | | | |
| 56 | 37 | 47 | 2 | 94 | E6 | 2 | 5 | 27 | F6 | 76 | 27 | 56 | 37 | 37 | 2 | 2 | 2 | 2 | 2 |

| | | | | | | | | | | | | |
|---|---|---|---|---|---|---|---|---|---|---|---|---|
| | | | | | | | | | | | | |
| C4 | 2 | 35 | 54 | 34 | 55 | 25 | 54 | 2 | A2 | A2 | 54 | E5 |
| | | | | | | | | | | | | |
| C4 | 2 | 35 | 54 | 34 | 55 | 25 | 54 | 2 | A2 | A2 | 54 | E5 |
| | | | | | | | | | | | | |
| 2 | 2 | 2 | 2 | 2 | 2 | 2 | 2 | 2 | 23 | 3 | 7E | EA |
| | | | | | | | | | | | | |
| 46 | 97 | 2 | 47 | F6 | 2 | 14 | 27 | D6 | 2 | 2 | 88 | 16 |
| | | | | | | | | | | | | |
| 2 | 2 | 2 | 2 | 2 | 2 | 2 | 2 | 2 | 2 | 2 | B7 | B1 |
| | | | | | | | | | | | | |
| 46 | 97 | 2 | 47 | F6 | 2 | 14 | 27 | D6 | 2 | 2 | 88 | 16 |
| | | | | | | | | | | | | |
| 2 | 2 | 2 | 2 | 2 | 2 | 2 | 2 | 2 | 2 | 2 | 62 | 58 |
| | | | | | | | | | | | | |
| 46 | 97 | 2 | 47 | F6 | 2 | 14 | 27 | D6 | 2 | 2 | 92 | 90 |
| | | | | | | | | | | | | |
| 2 | 2 | 2 | 2 | 2 | 2 | 2 | 2 | 2 | 2 | 2 | A9 | CC |

| | | | | | | | | | | | | |
|---|---|---|---|---|---|---|---|---|---|---|---|---|
| 2 | 2 | 2 | 2 | 2 | 2 | 2 | 2 | 2 | 2 | 2 | C8 | ED |
| C4 | 2 | 35 | 54 | 34 | 55 | 25 | 54 | 2 | A2 | A2 | 30 | 8D |
| 87 | 96 | 47 | 2 | E4 | F6 | 77 | 2 | 2 | 43 | 83 | 86 | E6 |
| C4 | 2 | 35 | 54 | 34 | 55 | 25 | 54 | 2 | A2 | A2 | 30 | 8D |

*FIG. 36L*

5800TM 7 Byte Transmissions

Vista 7 Byte Transmission Protocol

| Byte#<br>Packet Type | 1 | 2 | 3 4 5 | 6 7 |
|---|---|---|---|---|
| Panel Status | HouseCode | 8 | Message Data bits - See Table 1 | CRC1 - See Table 3 |
| Zone Packet | HouseCode | zone # | Message Data bits - See Table 1 | CRC1 - See Table 3 |
| Exit Delay | HouseCode | delay time | Message Data bits - See Table 1 | CRC1 - See Table 3 |
| Entry Delay | HouseCode | 8 | Message Data bits - See Table 1 | CRC1 - See Table 3 |
| PowerUp | HouseCode | D1 | Message Data bits - See Table 1 | CRC1 - See Table 3 |
| Program Mode Entry | HouseCode | 20 | Message Data bits - See Table 1 | CRC1 - See Table 3 |
| Alarm cancelled | HouseCode | CA | Message Data bits - See Table 1 | CRC1 - See Table 3 |
| Fail to Communicate | HouseCode | FC | Message Data bits - See Table 1 | CRC1 - See Table 3 |
| test mode go-no-go/walk | HouseCode | dd | Message Data bits - See Table 1 | CRC1 - See Table 3 |
| RF Jam Detect | HouseCode | 90 | Message Data bits - See Table 1 | CRC1 - See Table 3 |
| Fire - initiated by keypad | HouseCode | 95 | Message Data bits - See Table 1 | CRC1 - See Table 3 |
| Panic Alarm - initiated at keypad | HouseCode | 99 | Message Data bits - See Table 1 | CRC1 - See Table 3 |
| | | | | |
| other potential types listed in user manual, but not tested | | | | |
| Modem Comm | | CC | | |
| Bell Failure | | 70 | | |
| Telco Fault | | 94 | | |
| ... | | | | |
| | | | | |

*FIG. 37A*

Table 1. 13 Byte Packet Message Data Bits

| Byte # | Bit # | Description |
|---|---|---|
| 3 | 7 | not defined - always seems to be zero |
| | 6 | not defined - always seems to be zero |
| | 5 | Trigger Count MSB - See Table 5 |
| | 4 | Trigger Count LSB - See Table 5 |
| | 3 | not defined - always seems to be zero |
| | 2 | Low Level Beep Sequence, see table 2 |
| | 1 | Low Level Beep Sequence, see table 2 |
| | 0 | Low Level Beep Sequence, see table 2 |
| 4 | 7 | Arming Level Bit #1 - See table 6 |
| | 6 | BAT icon on (on = low battery) - ignore if alarm packet |
| | 5 | FIRE icon on |
| | 4 | READY TO ARM LED on |
| | 3 | bit 2&3 are set if Panel Status type packet, else 00 |
| | 2 | bit 2&3 are set if Panel Status type packet, else 00 |
| | 1 | CHECK icon on - used for tamper (not sure where else used) |
| | 0 | Fire Alarm beeps sounding |
| 5 | 7 | Arming Level Bit #2 - See table 6 |
| | 6 | Panel in Installer Program Mode - transmitted when entering pgm mode |
| | 5 | CHIME icon on |
| | 4 | BYPASS icon on |
| | 3 | AC icon on (on = ac ok) |
| | 2 | Arming Level Bit #3 - See table 6 |
| | 1 | ALARM icon on |
| | 0 | General alarm Beeps sounding |

*FIG. 37B*

Table 2. Low Level Beep Sequence

| Byte 3 | | | |
|---|---|---|---|
| bit 2 | bit 1 | bit 0 | Beep Sequence |
| 0 | 0 | 0 | no beeps |
| 0 | 0 | 1 | 1 beep |
| 0 | 1 | 0 | 2 beeps |
| 0 | 1 | 1 | 3 beeps |
| 1 | 0 | 0 | rapid beeping |
| 1 | 0 | 1 | slow beeping |
| 1 | 1 | 0 | ?? |
| 1 | 1 | 1 | ?? |

Table 3. CRC1

| | |
|---|---|
| Byte 6 | 0x24 XOR'd with most significant byte of CRC of transmission bytes 1-5 |
| Byte 7 | Least significant byte of the CRC of transmission bytes 1-5. |

Table 5 - Trigger Count

Bits 4 & 5 of Byte #3 increase in value with every new message transmitted.
The value of bit 4 & 5 will go from 0 to 3, then rollover to 0 again.
The table below shows the how the bits increment with each new message.

| | Byte # 3 | |
|---|---|---|
| Message # | bit #5 | bit #4 |
| 1 | 0 | 0 |
| 2 | 0 | 1 |
| 3 | 1 | 0 |
| 4 | 1 | 1 |
| 5 | 0 | 0 |
| 6 | 0 | 1 |

*FIG. 37C*

Table 6. Arming Level
Bit 7 of byte 4, bit 7 of byte 5, and bit 2 of byte 5 are used to indicate arming level.
The following table shows the arming level bit values for each arming level.

| Arming Level | Byte 4, Bit 7 | Byte 5, Bit 7 | Byte 5, Bit 2 |
|---|---|---|---|
| Disarmed | 0 | 0 | 0 |
| Away | 0 | 0 | 1 |
| | 0 | 1 | 0 |
| Maximum | 0 | 1 | 1 |
| Stay | 1 | 0 | 0 |
| | 1 | 0 | 1 |
| Instant | 1 | 1 | 0 |
| | 1 | 1 | 1 |

Notes:

The 5800TM transmitter module connects to the Vista 20P ECP bus.
It is designed to work in conjunction with an RF receiver such as the 5881.
It supports two way transmitters such as: 5802,5802CP,5804,5804BD,5827,5827BD
The housecode of the transmitter should be set to the same housecode as the panel.
The 5800TM is only supported in partition #1.
The 5800TM transmits a 7 byte packet.
The 5800TM packets appear to be identical to the first 7 bytes of the Vista 13 byte packet.

Zone fault packets look similar to exit delay packets. Suggestions for differentiating include:
- Turn off option *197(Exit Time Display Interval)
  - No exit delay tranmissions will be sent with this option off
- Check the arming level. Exit delay packets are never sent when the panel is disarmed.
  - It appears that zone fault packets are never sent when the panel is armed.
- Zone fault packets are never sent when the panel is in exit delay. May be able to
  - detect the start of exit delay by looking for a high byte 2(exit delay/zone #).
  - May be able to detect the end of exit delay by a panel status packet
  - or an increase in the exit delay time.
  - Are there events which reset the exit delay time??

Look at the Vista 13 Byte packet for more notes.

*FIG. 37D*

Wireless Sensor Transmissions

Data below is preceded by 14 synch bits and 1 start bit.
14 Sync bits are all ones.
Start bit is a zero.

Packet format

| byte description | ID Bytes | Data Byte | 16 bit CRC |
|---|---|---|---|
| byte # | 1-3 | 4 | 5-6 |

ID Bytes

Sensor ID. High nibble of byte #0 is always binary 1000 (8h) and is not represented on the bar code/ID label.

Data Byte

| bit # | description |
|---|---|
| 7 | Pin1 input |
| 6 | Pin2 input |
| 5 | Pin3 input |
| 4 | Pin4 input |
| 3 | Low Battery |
| 2 | Supervisory |
| 1 | Power Up |
| 0 | Sends Supervisories |

Pins 1-4 are typically connected to inputs on the sensor. The significants of each input may vary from sensor to sensor.

16 bit CRC

Standard 16 bit CRC with seed value of 0X8005

For a d/w sensor, pin1 = hardwired input state, pin2 = tamper switch state, pin3 = reed switch state. 0 = closed, 1 = open.

*FIG. 38*

COMMUNICATION PROTOCOLS IN INTEGRATED SYSTEMS

CROSS REFERENCE TO RELATED APPLICATIONS

This application is a continuation application of U.S. patent application Ser. No. 16/257,706, filed Jan. 25, 2019, issued as U.S Pat. No. 11,184,322 on Nov. 23, 2021.

U.S. patent application Ser. No. 16/257,706, filed Jan. 25, 2019, now U.S. Pat. No. 11,184,322, is a continuation application of U.S. patent application Ser. No. 14/203,219, filed Mar. 10, 2014, issued as U.S. Pat. No. 10,237,237, is a continuation in part application of U.S. patent application Ser. No. 13/932,837, filed Jul. 1, 2013, issued as U.S. Pat. No. 9,621,408 on Apr. 11, 2017;

and is a continuation in part application of U.S. patent application Ser. No. 13/925,181, filed Jun. 24, 2013;

and claims the benefit of U.S. Patent Application No. 61/782,345, filed Ma. 14, 2013;

and claims the benefit of U.S. Patent Application No. 61/802,077, filed Mar. 15, 2013;

and claims the benefit of U.S. Patent Application No. 61/777,061, filed Mar. 12, 2013;

and claims the benefit of U.S. Patent Application No. 61/778,853, filed Mar. 13, 2013;

and claims the benefit of U.S. Patent Application No. 61/779,028, filed Mar. 13, 2013;

and claims the benefit of U.S. Patent Application No. 61/779,753, filed Mar. 13, 2013;

and claims the benefit of U.S. Patent Application No. 61/780,092, filed Mar. 13, 2013;

and claims the benefit of U.S. Patent Application No. 61/780,290, filed Mar. 13, 2013;

and claims the benefit of U.S. Patent Application No. 61/780,435, filed Mar. 13, 2013;

and claims the benefit of U.S. Patent Application No. 61/780,538, filed Mar. 13, 2013;

and claims the benefit of U.S. Patent Application No. 61/780,637, filed Mar. 13, 2013;

and claims the benefit of U.S. Patent Application No. 61/781,401, filed Mar. 14, 2013;

and claims the benefit of U.S. Patent Application No. 61/781,713, filed Mar. 14, 2013;

and is a continuation in part application of U.S. patent application er. No. 12/197,946, filed Aug. 25, 2008, issued as U.S. Pat. No. 8,612,591 on Dec. 17, 2013;

and is a continuation in part application of U.S. patent application Ser. No. 13/718,851, filed Dec. 18, 2012, issued as U.S. Pat. No. 10,156,831 on Dec. 18, 2018;

and is a continuation in part application of U.S. patent application Ser. No. 11/761,745, filed Jun. 12, 2007, issued as U.S. Pat. No. 8,635,350 on Jan. 21, 2014;

and is a continuation in part application of U.S. patent application Ser. No. 12/019,568, filed on Jan. 24, 2008, issued as U.S. Pat. No. 10,142,392 on Nov. 27, 2018;

and is a continuation in part application of U.S. patent application Ser. No. 13/531,757, filed Jun. 25, 2012;

and is a continuation in part application of U.S. patent application Ser. No. 13/335,279, filed Dec. 22, 2011;

and is a continuation in part application of U.S. patent application Ser. No. 12/539,537, filed Aug. 11, 2009, issued as U.S. Pat. No. 10,156,959 on Dec. 18, 2018;

and is a continuation in part application of U.S. patent application Ser. No. 12/750,470, filed Mar. 30, 2010, issued as U.S. Pat. No. 9,191,228 on Nov. 17, 2015;

and is a continuation in part application of U.S. patent application Ser. No. 13/104,932, filed May 10, 2011; which are each hereby incorporated by reference in their entirety.

U.S. patent application Ser. No. 13/932,837 is a continuation in part application of U.S. patent application Ser. No. 13/311,365, filed Dec. 5, 2011, issued as U.S. Pat. No. 9,141,276 on Sep. 22, 2015;

and is a continuation application of U.S. patent application Ser. No. 12/637,671, filed Dec. 14, 2009, issued as U.S. Pat. No. 8,478,871 on Jul. 2, 2013; each of which are hereby incorporated by reference in their entirety.

U.S. patent application Ser. No. 13/925,181 is a continuation application of U.S. patent application Ser. No. 12/189, 757, filed Aug. 11, 2008, issued as U.S. Pat. No. 8,473,619 on Jun. 25, 2013, which is hereby incorporated by reference in its entirety.

U.S. patent application Ser. No. 12/197,946 claims the benefit of U.S. Provisional Application No. 61/087,967, filed Aug. 11, 2008;

and claims the benefit of U.S. Provisional Application No. 61/023,496, filed Jan. 25, 2008;

and claims the benefit of U.S. Provisional Application No. 61/023,493, filed Jan. 25, 2008;

and claims the benefit of U.S. Provisional Application No. 61/023,489, filed Jan. 25, 2008;

and is a continuation in part application of U.S. patent application Ser. No. 12/019,554, filed Jan. 24, 2008, issued as U.S. Pat. No. 7,911,341 on Mar. 22, 2011;

and claims the benefit of U.S. Provisional Application No. 61/019,162, filed Jan. 4, 2008;

and claims the benefit of U.S. Provisional Application No. 61/019,167, filed Jan. 4, 2008;

and claims the benefit of U.S. Provisional Application No. 60/987,359, filed Nov. 12, 2007;

and claims the benefit of U.S. Provisional Application No. 60/987,366, filed Nov. 12, 2007;

and claims the benefit of U.S. Provisional Application No. 60/968,005, filed Aug. 24, 2007;

and claims the benefit of U.S. Provisional Application No. 60/957,997, filed Aug. 24, 2007;

and is a continuation in part application of U.S. patent application Ser. No. 11/761,718, filed Jun. 12, 2007, issued as U.S. Pat. No. 7,711,796 on May 4, 2010;

and is a continuation in part application of U.S. patent application Ser. No. 11/084,232, filed Mar. 16, 2005, issued as U.S. Pat. No. 8,335,842 on Dec. 18, 2012, which are each hereby incorporated by reference in their entirety.

U.S. patent application Ser. No. 11/761,745 claims the benefit of U.S. Provisional Application No. 60/804,550, filed Jun. 12, 2006, which is hereby incorporated by reference in its entirety.

U.S. patent application Ser. No. 12/019,568 claims the benefit of U.S. Provisional Application No. 60/886,439, filed Jan. 24, 2007, which is hereby incorporated by reference in its entirety.

U.S. patent application Ser. No. 13/531,757 is a continuation in part application of U.S. patent application Ser. No. 12/269,735, filed Nov. 12, 2008, issued as U.S. Pat. No. 8,996,665 on Mar. 31, 2015;

and is a continuation in part application of U.S. patent application Ser. No. 12/197,931, filed Aug. 25, 2008, issued as U.S. Pat. No. 9,172,553 on Oct. 27, 2015;

and is a continuation application of U.S. patent application Ser. No. 12/198,023, filed Aug. 25, 2008, issued as U.S. Pat. No. 8,209,400 on Jun. 26, 2012, which are each hereby incorporated by reference in their entirety.

U.S. patent application Ser. No. 13/335,279 is a continuation application of U.S. patent application Ser. No. 12/269,767, filed Nov. 12, 2008, issued as U.S. Pat. No. 8,086,703 on Dec. 27, 2011;

and is a continuation application of U.S. patent application Ser. No. 12/197,895, filed Aug. 25, 2008, issued as U.S. Pat. No. 8,073,931 on Dec. 6, 2011, which are each hereby incorporated by reference in their entirety.

U.S. patent application Ser. No. 12/539,537 claims the benefit of U.S. Provisional Application No. 61/164,877, filed Mar. 30, 2009;

and is a continuation in part application of U.S. patent application Ser. No. 12/269,585, filed Nov. 12, 2008, issued as U.S. Pat. No. 8,086,702 on Dec. 27, 2011, which are each hereby incorporated by reference in their entirety.

U.S. patent application Ser. No. 13/104,932 claims the benefit of U.S. Provisional Application No. 61/333,130, filed May 10, 2010, which is incorporated by reference in its entirety.

U.S. patent application Ser. No. 12/189,757 claims the benefit of U.S. Provisional Application No. 60/955,172, filed Aug. 10, 2007, which is incorporated by reference in its entirety.

U.S. patent application Ser. No. 12/019,554 claims the benefit of U.S. Provisional Application No. 60/886,435, filed Jan. 24, 2007, which is hereby incorporated by reference in its entirety.

U.S. patent application Ser. No. 11/084,232 claims the benefit of U.S. Provisional Application No. 60/652,475, filed Feb. 11, 2005;

and claims the benefit of U.S. Provisional Application No. 60/553,932, filed Mar. 16, 2004;

and claims the benefit of U.S. Provisional Application No. 60/553,934, filed Mar. 16, 2004, which are each hereby incorporated by reference in their entirety.

TECHNICAL FIELD

The embodiments described herein relate generally to a method and apparatus for improving the capabilities of security systems in home and business applications. More particularly, the embodiments described herein relate to a touchscreen device that integrates security system control and functionality with network content interactivity, management and presentation.

BACKGROUND

The field of home and small business security is dominated by technology suppliers who build comprehensive 'closed' security systems, where the individual components (sensors, security panels, keypads) operate solely within the confines of a single vendor solution. For example, a wireless motion sensor from vendor A cannot be used with a security panel from vendor B. Each vendor typically has developed sophisticated proprietary wireless technologies to enable the installation and management of wireless sensors, with little or no ability for the wireless devices to operate separate from the vendor's homogeneous system. Furthermore, these traditional systems are extremely limited in their ability to interface either to a local or wide area standards-based network (such as an IP network); most installed systems support only a low-bandwidth, intermittent connection utilizing phone lines or cellular (RF) backup systems. Wireless security technology from providers such as GE Security, Honeywell, and DSC/Tyco are well known in the art, and are examples of this proprietary approach to security systems for home and business.

Furthermore, with the proliferation of the internet, ethernet and WiFi local area networks (LANs) and advanced wide area networks (WANs) that offer high bandwidth, low latency connections (broadband), as well as more advanced wireless WAN data networks (e.g. GPRS or CDMA 1×RTT) there increasingly exists the networking capability to extend these traditional security systems to offer enhanced functionality. In addition, the proliferation of broadband access has driven a corresponding increase in home and small business networking technologies and devices. It is desirable to extend traditional security systems to encompass enhanced functionality such as the ability to control and manage security systems from the world wide web, cellular telephones, or advanced function internet-based devices. Other desired functionality includes an open systems approach to interface home security systems to home and small business networks.

Due to the proprietary approach described above, the traditional vendors are the only ones capable of taking advantage of these new network functions. To date, even though the vast majority of home and business customers have broadband network access in their premises, most security systems do not offer the advanced capabilities associated with high speed, low-latency LANs and WANs. This is primarily because the proprietary vendors have not been able to deliver such technology efficiently or effectively. Solution providers attempting to address this need are becoming known in the art, including three categories of vendors: traditional proprietary hardware providers such as Honeywell and GE Security; third party hard-wired module providers such as Alarm.com, NextAlarm, and uControl; and new proprietary systems providers such as InGrid.

A disadvantage of the prior art technologies of the traditional proprietary hardware providers arises due to the continued proprietary approach of these vendors. As they develop technology in this area it once again operates only with the hardware from that specific vendor, ignoring the need for a heterogeneous, cross-vendor solution. Yet another disadvantage of the prior art technologies of the traditional proprietary hardware providers arises due to the lack of experience and capability of these companies in creating open internet and web based solutions, and consumer friendly interfaces.

A disadvantage of the prior art technologies of the third party hard-wired module providers arises due to the installation and operational complexities and functional limitations associated with hardwiring a new component into existing security systems. Moreover, a disadvantage of the prior art technologies of the new proprietary systems providers arises due to the need to discard all prior technologies, and implement an entirely new form of security system to access the new functionalities associated with broadband and wireless data networks. There remains, therefore, a need for systems, devices, and methods that easily interface to and control the existing proprietary security technologies utilizing a variety of wireless technologies.

BRIEF DESCRIPTION OF THE DRAWINGS

FIGS. 25A-E show panel coupling methodologies of the integrated security system, under an embodiment.

FIGS. 26A-L show zone information of the integrated security system, under an embodiment.

FIGS. 27A-G show zone codes of the integrated security system, under an embodiment.

FIGS. 28A-B show report conditions of the integrated security system, under an embodiment.

FIG. 29 shows packet descriptions of the integrated security system, under an embodiment.

FIGS. 30A-C show keypad transmission information of the integrated security system, under an embodiment.

FIGS. 31A-D show keypad transmission information of the integrated security system, under an alternative embodiment.

FIG. 32 shows an enrollment procedure of the integrated security system, under an embodiment.

FIGS. 33A-F show panel byte transmission information of the integrated security system, under an embodiment.

FIG. 34 and FIGS. 34A-T show panel byte example data of the integrated security system, under an embodiment.

FIGS. 35A-F show panel byte transmission information of the integrated security system, under an alternative embodiment.

FIG. 36 and FIGS. 36A-L show panel byte example data of the integrated security system, under an alternative embodiment.

FIGS. 37A-D show transmitter byte transmission information of the integrated security system, under an embodiment.

FIG. 38 shows sensor transmission information of the integrated security system, under an embodiment.

DETAILED DESCRIPTION

Figure 1:
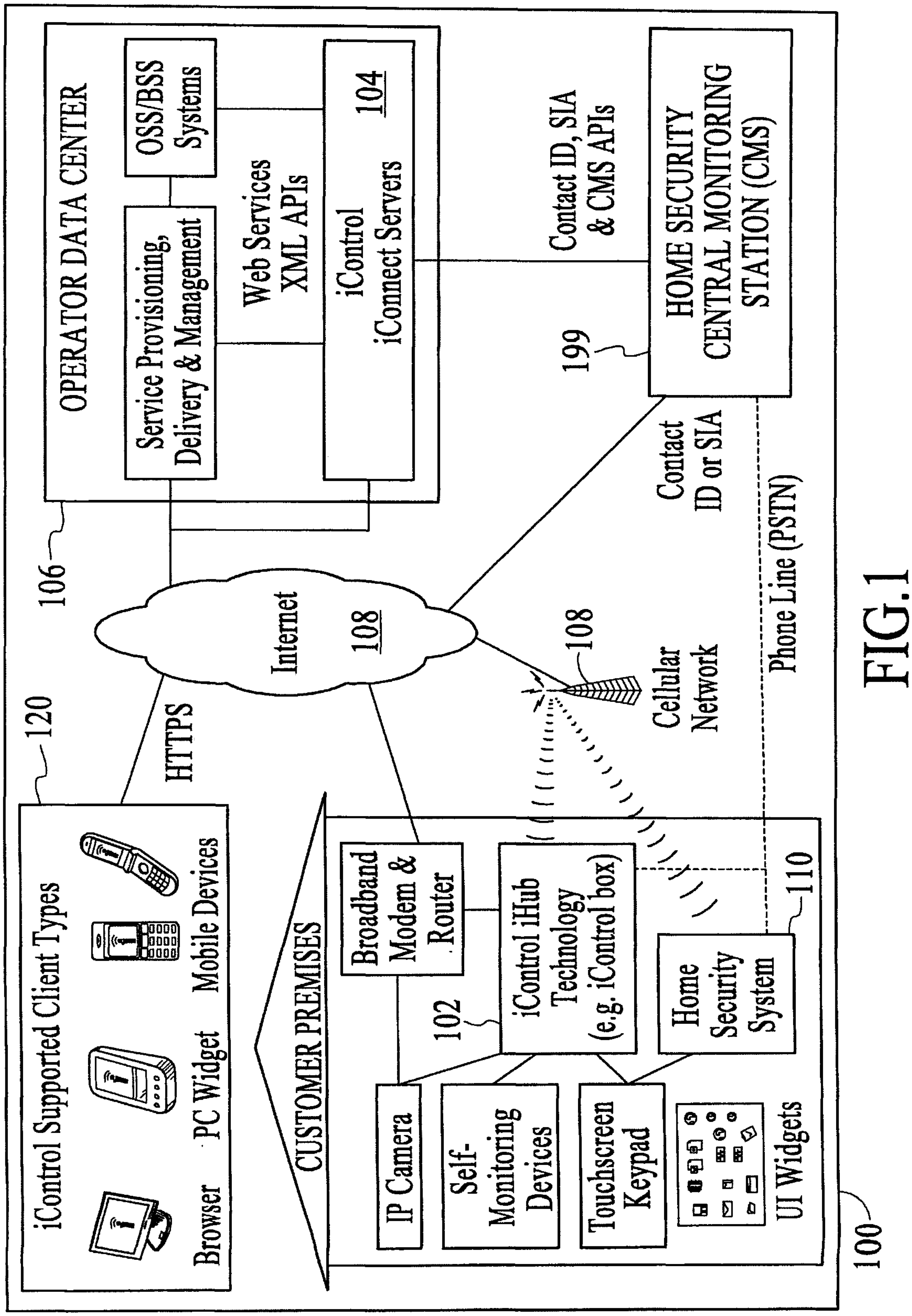
FIG. 1 is a block diagram of the integrated security system, under an embodiment.

An integrated security system is described that integrates broadband and mobile access and control with conventional security systems and premise devices to provide a tri-mode security network (broadband, cellular/GSM, POTS access) that enables users to remotely stay connected to their premises. The integrated security system, while delivering remote premise monitoring and control functionality to conventional monitored premise protection, complements existing premise protection equipment. The integrated security system integrates into the premise network and couples wirelessly with the conventional security panel, enabling broadband access to premise security systems. Automation devices (cameras, lamp modules, thermostats, etc.) can be added, enabling users to remotely see live video and/or pictures and control home devices via their personal web portal or webpage, mobile phone, and/or other remote client device. Users can also receive notifications via email or text message when happenings occur, or do not occur, in their home.

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

As described herein, computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The integrated security system can be a component of a single system, multiple systems, and/or geographically separate systems. The integrated security system can also be a subcomponent or subsystem of a single system, multiple systems, and/or geographically separate systems. The integrated security system can be coupled to one or more other components (not shown) of a host system or a system coupled to the host system.

One or more components of the integrated security system and/or a corresponding system or application to which the integrated security system is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes the integrated security system can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the integrated security system and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the integrated security system and corresponding systems and methods include: microcontrollers with memory (such as electronically erasable programmable read only memory (EEPROM)), embedded microprocessors, firmware, software, etc. Furthermore, aspects of the integrated security system and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the integrated security system and corresponding systems and methods is not intended to be exhaustive or to limit the systems and methods to the precise forms disclosed. While specific embodiments of, and examples for, the integrated security system and corresponding systems and methods are described herein for illustrative purposes, various equivalent modifications are possible within the scope of the systems and methods, as those skilled in the relevant art will recognize. The teachings of the integrated security system and corresponding systems and methods provided herein can be applied to other systems and methods, not only for the systems and methods described above.

The elements and acts of the various embodiments described above can be combined to provide further embodiments. These and other changes can be made to the integrated security system and corresponding systems and methods in light of the above detailed description.

In accordance with the embodiments described herein, a wireless system (e.g., radio frequency (RF)) is provided that enables a security provider or consumer to extend the capabilities of an existing RF-capable security system or a non-RF-capable security system that has been upgraded to support RF capabilities. The system includes an RF-capable Gateway device (physically located within RF range of the RF-capable security system) and associated software operating on the Gateway device. The system also includes a web server, application server, and remote database providing a persistent store for information related to the system.

The security systems of an embodiment, referred to herein as the iControl security system or integrated security system, extend the value of traditional home security by adding broadband access and the advantages of remote home monitoring and home control through the formation of a security network including components of the integrated security system integrated with a conventional premise security system and a premise local area network (LAN). With the integrated security system, conventional home security sensors, cameras, touchscreen keypads, lighting controls, and/or Internet Protocol (IP) devices in the home (or business) become connected devices that are accessible anywhere in the world from a web browser, mobile phone or through content-enabled touchscreens. The integrated security system experience allows security operators to both extend the value proposition of their monitored security systems and reach new consumers that include broadband users interested in staying connected to their family, home and property when they are away from home.

The integrated security system of an embodiment includes security servers (also referred to herein as iConnect servers or security network servers) and an iHub gateway (also referred to herein as the gateway, the iHub, or the iHub client) that couples or integrates into a home network (e.g., LAN) and communicates directly with the home security panel, in both wired and wireless installations. The security system of an embodiment automatically discovers the security system components (e.g., sensors, etc.) belonging to the security system and connected to a control panel of the security system and provides consumers with full two-way access via web and mobile portals. The gateway supports various wireless protocols and can interconnect with a wide range of control panels offered by security system providers. Service providers and users can then extend the system's capabilities with the additional IP cameras, lighting modules or security devices such as interactive touchscreen keypads. The integrated security system adds an enhanced value to these security systems by enabling consumers to stay connected through email and SMS alerts, photo push, event-based video capture and rule-based monitoring and notifications. This solution extends the reach of home security to households with broadband access.

The integrated security system builds upon the foundation afforded by traditional security systems by layering broadband and mobile access, IP cameras, interactive touchscreens, and an open approach to home automation on top of traditional security system configurations. The integrated security system is easily installed and managed by the security operator, and simplifies the traditional security installation process, as described below.

The integrated security system provides an open systems solution to the home security market. As such, the foundation of the integrated security system customer premises equipment (CPE) approach has been to abstract devices, and allows applications to manipulate and manage multiple devices from any vendor. The integrated security system DeviceConnect technology that enables this capability supports protocols, devices, and panels from GE Security and Honeywell, as well as consumer devices using Z-Wave, IP cameras (e.g., Ethernet, wifi, and Homeplug), and IP touchscreens. The DeviceConnect is a device abstraction layer that enables any device or protocol layer to interoperate with integrated security system components. This architecture enables the addition of new devices supporting any of these interfaces, as well as add entirely new protocols. The benefit of DeviceConnect is that it provides supplier flexibility. The same consistent touchscreen, web, and mobile user experience operate unchanged on whatever security equipment selected by a security system provider, with the system provider's choice of IP cameras, backend data center and central station software.

The integrated security system provides a complete system that integrates or layers on top of a conventional host security system available from a security system provider. The security system provider therefore can select different components or configurations to offer (e.g., CDMA, GPRS, no cellular, etc.) as well as have iControl modify the integrated security system configuration for the system provider's specific needs (e.g., change the functionality of the web or mobile portal, add a GE or Honeywell-compatible TouchScreen, etc.).

The integrated security system integrates with the security system provider infrastructure for central station reporting directly via Broadband and GPRS alarm transmissions. Traditional dial-up reporting is supported via the standard panel connectivity. Additionally, the integrated security system provides interfaces for advanced functionality to the CMS, including enhanced alarm events, system installation optimizations, system test verification, video verification, 2-way voice over IP and GSM.

The integrated security system is an IP centric system that includes broadband connectivity so that the gateway augments the existing security system with broadband and GPRS connectivity. If broadband is down or unavailable GPRS may be used, for example. The integrated security system supports GPRS connectivity using an optional wireless package that includes a GPRS modem in the gateway. The integrated security system treats the GPRS connection as a higher cost though flexible option for data transfers. In an embodiment the GPRS connection is only used to route alarm events (e.g., for cost), however the gateway can be configured (e.g., through the iConnect server interface) to act as a primary channel and pass any or all events over GPRS. Consequently, the integrated security system does not interfere with the current plain old telephone service (POTS) security panel interface. Alarm events can still be routed through POTS; however the gateway also allows such events to be routed through a broadband or GPRS connection as well. The integrated security system provides a web application interface to the CSR tool suite as well as XML web services interfaces for programmatic integration between the security system provider's existing call center products. The integrated security system includes, for example, APIs that allow the security system provider to integrate components of the integrated security system into a custom call center interface. The APIs include XML web service APIs for integration of existing security system provider call center applications with the integrated security system service. All functionality available in the CSR Web application is provided with these API sets. The Java and XML-based APIs of the integrated security system support provisioning, billing, system administration, CSR, central station, portal user interfaces, and content management functions, to name a few. The integrated security system can provide a customized interface to the security system provider's billing system, or alternatively can provide security system developers with APIs and support in the integration effort.

The integrated security system provides or includes business component interfaces for provisioning, administration, and customer care to name a few. Standard templates and examples are provided with a defined customer professional services engagement to help integrate OSS/BSS systems of a Service Provider with the integrated security system.

The integrated security system components support and allow for the integration of customer account creation and deletion with a security system. The iConnect APIs provides access to the provisioning and account management system in iConnect and provide full support for account creation, provisioning, and deletion. Depending on the requirements of the security system provider, the iConnect APIs can be used to completely customize any aspect of the integrated security system backend operational system.

The integrated security system includes a gateway that supports the following standards-based interfaces, to name a few: Ethernet IP communications via Ethernet ports on the gateway, and standard)(MIL/TCP/IP protocols and ports are employed over secured SSL sessions; USB 2.0 via ports on the gateway; 802.11b/g/n IP communications; GSM/GPRS RF WAN communications; CDMA 1×RTT RF WAN communications (optional, can also support EVDO and 3G technologies).

The gateway supports the following proprietary interfaces, to name a few: interfaces including Dialog RF network (319.5 MHz) and RS485 Superbus 2000 wired interface; RF mesh network (908 MHz); and interfaces including RF network (345 MHz) and RS485/RS232bus wired interfaces.

Regarding security for the IP communications (e.g., authentication, authorization, encryption, anti-spoofing, etc), the integrated security system uses SSL to encrypt all IP traffic, using server and client-certificates for authentication, as well as authentication in the data sent over the SSL-encrypted channel. For encryption, integrated security system issues public/private key pairs at the time/place of manufacture, and certificates are not stored in any online storage in an embodiment.

The integrated security system does not need any special rules at the customer premise and/or at the security system provider central station because the integrated security system makes outgoing connections using TCP over the standard HTTP and HTTPS ports. Provided outbound TCP connections are allowed then no special requirements on the firewalls are necessary.

FIG. 1 is a block diagram of the integrated security system 100, under an embodiment. The integrated security system 100 of an embodiment includes the gateway 102 and the security servers 104 coupled to the conventional home security system 110. At a customer's home or business, the gateway 102 connects and manages the diverse variety of home security and self-monitoring devices. The gateway 102 communicates with the iConnect Servers 104 located in the service provider's data center 106 (or hosted in integrated security system data center), with the communication taking place via a communication network 108 or other network (e.g., cellular network, internet, etc.). These servers 104 manage the system integrations necessary to deliver the integrated system service described herein. The combination of the gateway 102 and the iConnect servers 104 enable a wide variety of remote client devices 120 (e.g., PCs, mobile phones and PDAs) allowing users to remotely stay in touch with their home, business and family. In addition, the technology allows home security and self-monitoring information, as well as relevant third party content such as traffic and weather, to be presented in intuitive ways within the home, such as on advanced touchscreen keypads.

The integrated security system service (also referred to as iControl service) can be managed by a service provider via browser-based Maintenance and Service Management applications that are provided with the iConnect Servers. Or, if desired, the service can be more tightly integrated with existing OSS/BSS and service delivery systems via the iConnect web services-based XML APIs.

The integrated security system service can also coordinate the sending of alarms to the home security Central Monitoring Station (CMS) 199. Alarms are passed to the CMS 199 using standard protocols such as Contact ID or SIA and can be generated from the home security panel location as well as by iConnect server 104 conditions (such as lack of communications with the integrated security system). In addition, the link between the security servers 104 and CMS 199 provides tighter integration between home security and self-monitoring devices and the gateway 102. Such integration enables advanced security capabilities such as the ability for CMS personnel to view photos taken at the time a burglary alarm was triggered. For maximum security, the gateway 102 and iConnect servers 104 support the use of a mobile network (both GPRS and CDMA options are available) as a backup to the primary broadband connection.

Figure 2:
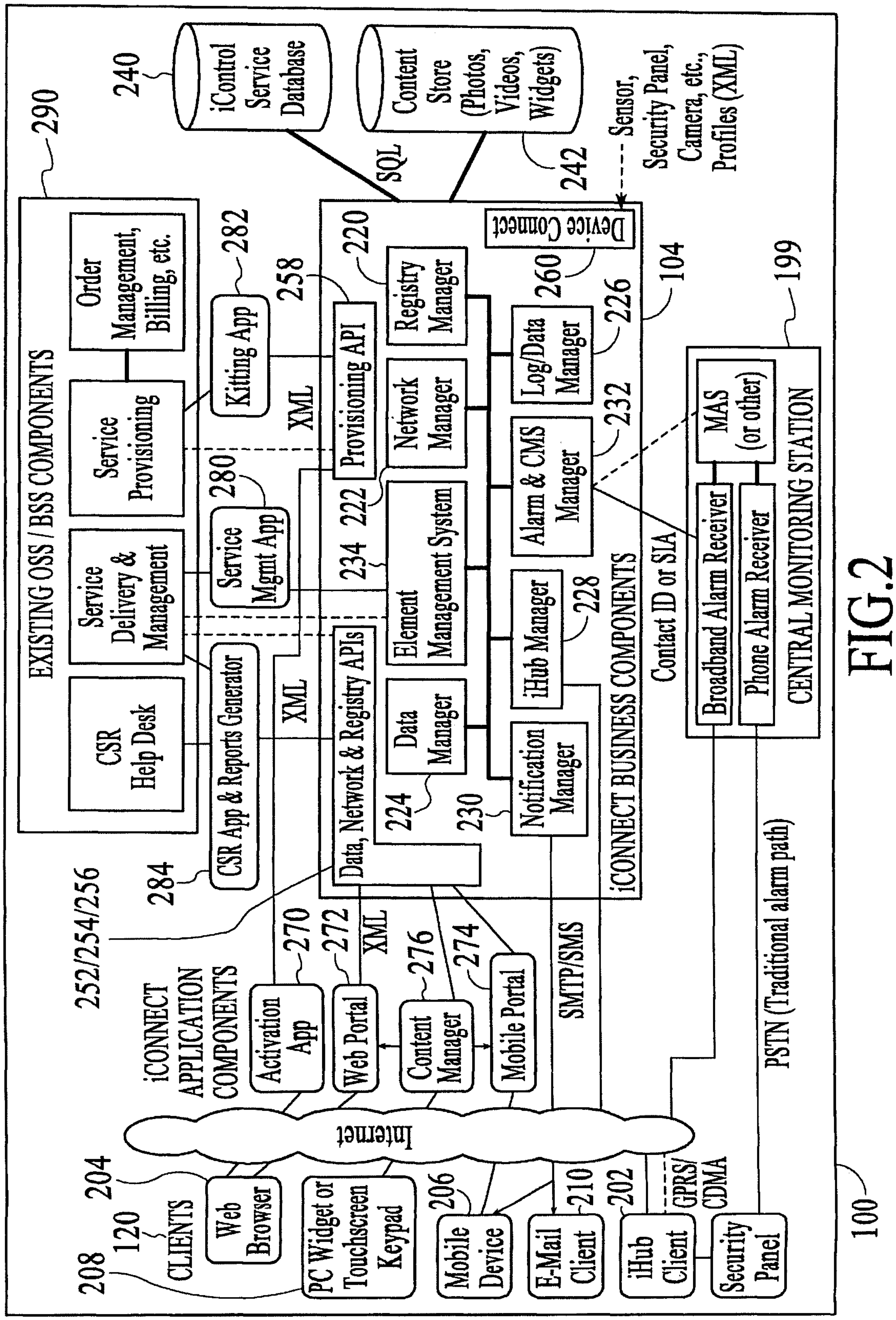
FIG. 2 is a block diagram of components of the integrated security system, under an embodiment.

The integrated security system service is delivered by hosted servers running software components that communicate with a variety of client types while interacting with other systems. FIG. 2 is a block diagram of components of the integrated security system 100, under an embodiment. Following is a more detailed description of the components.

The iConnect servers 104 support a diverse collection of clients 120 ranging from mobile devices, to PCs, to in-home security devices, to a service provider's internal systems. Most clients 120 are used by end-users, but there are also a number of clients 120 that are used to operate the service.

Clients 120 used by end-users of the integrated security system 100 include, but are not limited to, the following:

- Clients based on gateway client applications 202 (e.g., a processor-based device running the gateway technology that manages home security and automation devices).
- A web browser 204 accessing a Web Portal application, performing end-user configuration and customization of the integrated security system service as well as monitoring of in-home device status, viewing photos and video, etc. Device and user management can also be performed by this portal application.
- A mobile device 206 (e.g., PDA, mobile phone, etc.) accessing the integrated security system Mobile Portal. This type of client 206 is used by end-users to view system status and perform operations on devices (e.g., turning on a lamp, arming a security panel, etc.) rather than for system configuration tasks such as adding a new device or user.
- PC or browser-based "widget" containers 208 that present integrated security system service content, as well as other third-party content, in simple, targeted ways (e.g. a widget that resides on a PC desktop and shows live video from a single in-home camera). "Widget" as used herein means applications or programs in the system.

Touchscreen home security keypads 208 and advanced in-home devices that present a variety of content widgets via an intuitive touchscreen user interface.

Notification recipients 210 (e.g., cell phones that receive SMS-based notifications when certain events occur (or don't occur), email clients that receive an email message with similar information, etc.).

Custom-built clients (not shown) that access the iConnect web services XML API to interact with users' home security and self-monitoring information in new and unique ways.

Such clients could include new types of mobile devices, or complex applications where integrated security system content is integrated into a broader set of application features.

In addition to the end-user clients, the iConnect servers 104 support PC browser-based Service Management clients that manage the ongoing operation of the overall service. These clients run applications that handle tasks such as provisioning, service monitoring, customer support and reporting.

There are numerous types of server components of the iConnect servers 104 of an embodiment including, but not limited to, the following: Business Components which manage information about all of the home security and self-monitoring devices; End-User Application Components which display that information for users and access the Business Components via published XML APIs; and Service Management Application Components which enable operators to administer the service (these components also access the Business Components via the XML APIs, and also via published SNMP MIBs).

The server components provide access to, and management of, the objects associated with an integrated security system installation. The top-level object is the "network." It is a location where a gateway 102 is located, and is also commonly referred to as a site or premises; the premises can include any type of structure (e.g., home, office, warehouse, etc.) at which a gateway 102 is located. Users can only access the networks to which they have been granted permission. Within a network, every object monitored by the gateway 102 is called a device. Devices include the sensors, cameras, home security panels and automation devices, as well as the controller or processor-based device running the gateway applications.

Various types of interactions are possible between the objects in a system. Automations define actions that occur as a result of a change in state of a device. For example, take a picture with the front entry camera when the front door sensor changes to "open". Notifications are messages sent to users to indicate that something has occurred, such as the front door going to "open" state, or has not occurred (referred to as an iWatch notification). Schedules define changes in device states that are to take place at predefined days and times. For example, set the security panel to "Armed" mode every weeknight at 11:00 pm.

The iConnect Business Components are responsible for orchestrating all of the low-level service management activities for the integrated security system service. They define all of the users and devices associated with a network (site), analyze how the devices interact, and trigger associated actions (such as sending notifications to users). All changes in device states are monitored and logged. The Business Components also manage all interactions with external systems as required, including sending alarms and other related self-monitoring data to the home security Central Monitoring System (CMS) 199. The Business Components are implemented as portable Java J2EE Servlets, but are not so limited.

The following iConnect Business Components manage the main elements of the integrated security system service, but the embodiment is not so limited:

A Registry Manager 220 defines and manages users and networks. This component is responsible for the creation, modification and termination of users and networks. It is also where a user's access to networks is defined.

A Network Manager 222 defines and manages security and self-monitoring devices that are deployed on a network (site). This component handles the creation, modification, deletion and configuration of the devices, as well as the creation of automations, schedules and notification rules associated with those devices.

A Data Manager 224 manages access to current and logged state data for an existing network and its devices. This component specifically does not provide any access to network management capabilities, such as adding new devices to a network, which are handled exclusively by the Network Manager 222.

To achieve optimal performance for all types of queries, data for current device states is stored separately from historical state data (a.k.a. "logs") in the database. A Log Data Manager 226 performs ongoing transfers of current device state data to the historical data log tables.

Additional iConnect Business Components handle direct communications with certain clients and other systems, for example:

An iHub Manager 228 directly manages all communications with gateway clients, including receiving information about device state changes, changing the configuration of devices, and pushing new versions of the gateway client to the hardware it is running on.

A Notification Manager 230 is responsible for sending all notifications to clients via SMS (mobile phone messages), email (via a relay server like an SMTP email server), etc.

An Alarm and CMS Manager 232 sends critical server-generated alarm events to the home security Central Monitoring Station (CMS) and manages all other communications of integrated security system service data to and from the CMS.

The Element Management System (EMS) 234 is an iControl Business Component that manages all activities associated with service installation, scaling and monitoring, and filters and packages service operations data for use by service management applications. The SNMP MIBs published by the EMS can also be incorporated into any third party monitoring system if desired.

The iConnect Business Components store information about the objects that they manage in the iControl Service Database 240 and in the iControl Content Store 242. The iControl Content Store is used to store media objects like video, photos and widget content, while the Service Database stores information about users, networks, and devices. Database interaction is performed via a JDBC interface. For security purposes, the Business Components manage all data storage and retrieval.

The iControl Business Components provide web services-based APIs that application components use to access the Business Components' capabilities. Functions of application components include presenting integrated security system service data to end-users, performing administrative duties, and integrating with external systems and back-office applications.

The primary published APIs for the iConnect Business Components include, but are not limited to, the following:

A Registry Manager API 252 provides access to the Registry Manager Business Component's functionality, allowing management of networks and users.

A Network Manager API 254 provides access to the Network Manager Business Component's functionality, allowing management of devices on a network.

A Data Manager API 256 provides access to the Data Manager Business Component's functionality, such as setting and retrieving (current and historical) data about device states.

A Provisioning API 258 provides a simple way to create new networks and configure initial default properties.

Each API of an embodiment includes two modes of access: Java API or XML API. The XML APIs are published as web services so that they can be easily accessed by applications or servers over a network. The Java APIs are a programmer-friendly wrapper for the XML APIs. Application components and integrations written in Java should generally use the Java APIs rather than the XML APIs directly.

The iConnect Business Components also have an XML-based interface 260 for quickly adding support for new devices to the integrated security system. This interface 260, referred to as DeviceConnect 260, is a flexible, standards-based mechanism for defining the properties of new devices and how they can be managed. Although the format is flexible enough to allow the addition of any type of future device, pre-defined XML profiles are currently available for adding common types of devices such as sensors (SensorConnect), home security panels (PanelConnect) and IP cameras (CameraConnect).

The iConnect End-User Application Components deliver the user interfaces that run on the different types of clients supported by the integrated security system service. The components are written in portable Java J2EE technology (e.g., as Java Servlets, as JavaServer Pages (JSPs), etc.) and they all interact with the iControl Business Components via the published APIs.

The following End-User Application Components generate CSS-based HTML/JavaScript that is displayed on the target client. These applications can be dynamically branded with partner-specific logos and URL links (such as Customer Support, etc.). The End-User Application Components of an embodiment include, but are not limited to, the following:

An iControl Activation Application 270 that delivers the first application that a user sees when they set up the integrated security system service. This wizard-based web browser application securely associates a new user with a purchased gateway and the other devices included with it as a kit (if any). It primarily uses functionality published by the Provisioning API.

An iControl Web Portal Application 272 runs on PC browsers and delivers the web-based interface to the integrated security system service. This application allows users to manage their networks (e.g. add devices and create automations) as well as to view/change device states, and manage pictures and videos. Because of the wide scope of capabilities of this application, it uses three different Business Component APIs that include the Registry Manager API, Network Manager API, and Data Manager API, but the embodiment is not so limited.

An iControl Mobile Portal 274 is a small-footprint web-based interface that runs on mobile phones and PDAs. This interface is optimized for remote viewing of device states and pictures/videos rather than network management. As such, its interaction with the Business Components is primarily via the Data Manager API.

Custom portals and targeted client applications can be provided that leverage the same Business Component APIs used by the above applications.

A Content Manager Application Component 276 delivers content to a variety of clients. It sends multimedia-rich user interface components to widget container clients (both PC and browser-based), as well as to advanced touchscreen keypad clients. In addition to providing content directly to end-user devices, the Content Manager 276 provides widget-based user interface components to satisfy requests from other Application Components such as the iControl Web 272 and Mobile 274 portals.

A number of Application Components are responsible for overall management of the service. These pre-defined applications, referred to as Service Management Application Components, are configured to offer off-the-shelf solutions for production management of the integrated security system service including provisioning, overall service monitoring, customer support, and reporting, for example. The Service Management Application Components of an embodiment include, but are not limited to, the following:

A Service Management Application 280 allows service administrators to perform activities associated with service installation, scaling and monitoring/alerting. This application interacts heavily with the Element Management System (EMS) Business Component to execute its functionality, and also retrieves its monitoring data from that component via protocols such as SNMP MIBs.

A Kitting Application 282 is used by employees performing service provisioning tasks. This application allows home security and self-monitoring devices to be associated with gateways during the warehouse kitting process.

A CSR Application and Report Generator 284 is used by personnel supporting the integrated security system service, such as CSRs resolving end-user issues and employees enquiring about overall service usage. The push of new gateway firmware to deployed gateways is also managed by this application.

The iConnect servers 104 also support custom-built integrations with a service provider's existing OSS/BSS, CSR and service delivery systems 290. Such systems can access the iConnect web services XML API to transfer data to and from the iConnect servers 104. These types of integrations can compliment or replace the PC browser-based Service Management applications, depending on service provider needs.

As described above, the integrated security system of an embodiment includes a gateway, or iHub. The gateway of an embodiment includes a device that is deployed in the home or business and couples or connects the various third-party cameras, home security panels, sensors and devices to the iConnect server over a WAN connection as described in detail herein. The gateway couples to the home network and communicates directly with the home security panel in both wired and wireless sensor installations. The gateway is configured to be low-cost, reliable and thin so that it complements the integrated security system network-based architecture.

The gateway supports various wireless protocols and can interconnect with a wide range of home security control panels. Service providers and users can then extend the system's capabilities by adding IP cameras, lighting modules and additional security devices. The gateway is configurable to be integrated into many consumer appliances, including set-top boxes, routers and security panels. The small and efficient footprint of the gateway enables this portability and versatility, thereby simplifying and reducing the overall cost of the deployment.

Figure 3:
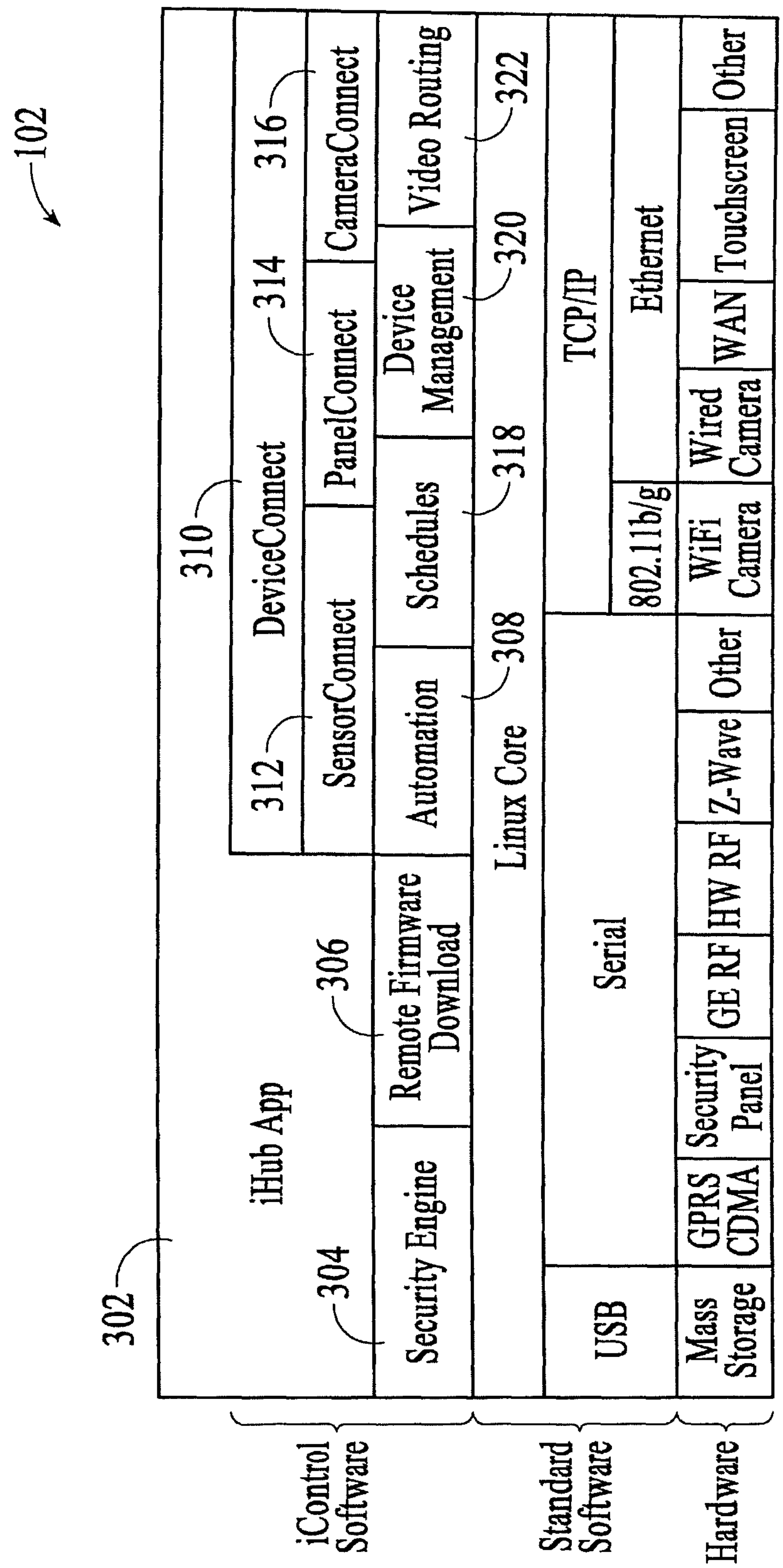
FIG. 3 is a block diagram of the gateway software or applications, under an embodiment.

FIG. 3 is a block diagram of the gateway 102 including gateway software or applications, under an embodiment. The gateway software architecture is relatively thin and efficient, thereby simplifying its integration into other consumer appliances such as set-top boxes, routers, touch screens and security panels. The software architecture also provides a high degree of security against unauthorized access. This section describes the various key components of the gateway software architecture.

The gateway application layer 302 is the main program that orchestrates the operations performed by the gateway. The Security Engine 304 provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

- Encryption including 128-bit SSL encryption for gateway and iConnect server communication to protect user data privacy and provide secure communication.
- Bi-directional authentication between the gateway and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.
- Camera SSL encapsulation because picture and video traffic offered by off-the-shelf networked IP cameras is not secure when traveling over the Internet. The gateway provides for 128-bit SSL encapsulation of the user picture and video data sent over the internet for complete user security and privacy. 802.11b/g/n with WPA-2 security to ensure that wireless camera communications always takes place using the strongest available protection.
- A gateway-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying gateway-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Gateway firmware can be remotely download either for one gateway at a time, a group of gateways, or in batches.

The Automations engine 308 manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application. The Schedules Engine 318 then interfaces with SensorConnect 312 to ensure that scheduled events occur at precisely the desired time.

The Device Management module 320 is in charge of all discovery, installation and configuration of both wired and wireless IP devices (e.g., cameras, etc.) coupled or connected to the system. Networked IP devices, such as those used in the integrated security system, require user configuration of many IP and security parameters—to simplify the user experience and reduce the customer support burden, the device management module of an embodiment handles the details of this configuration. The device management module also manages the video routing module described below.

The video routing engine 322 is responsible for delivering seamless video streams to the user with zero-configuration. Through a multi-step, staged approach the video routing engine uses a combination of UPnP port-forwarding, relay server routing and STUN/TURN peer-to-peer routing.

Figure 4:
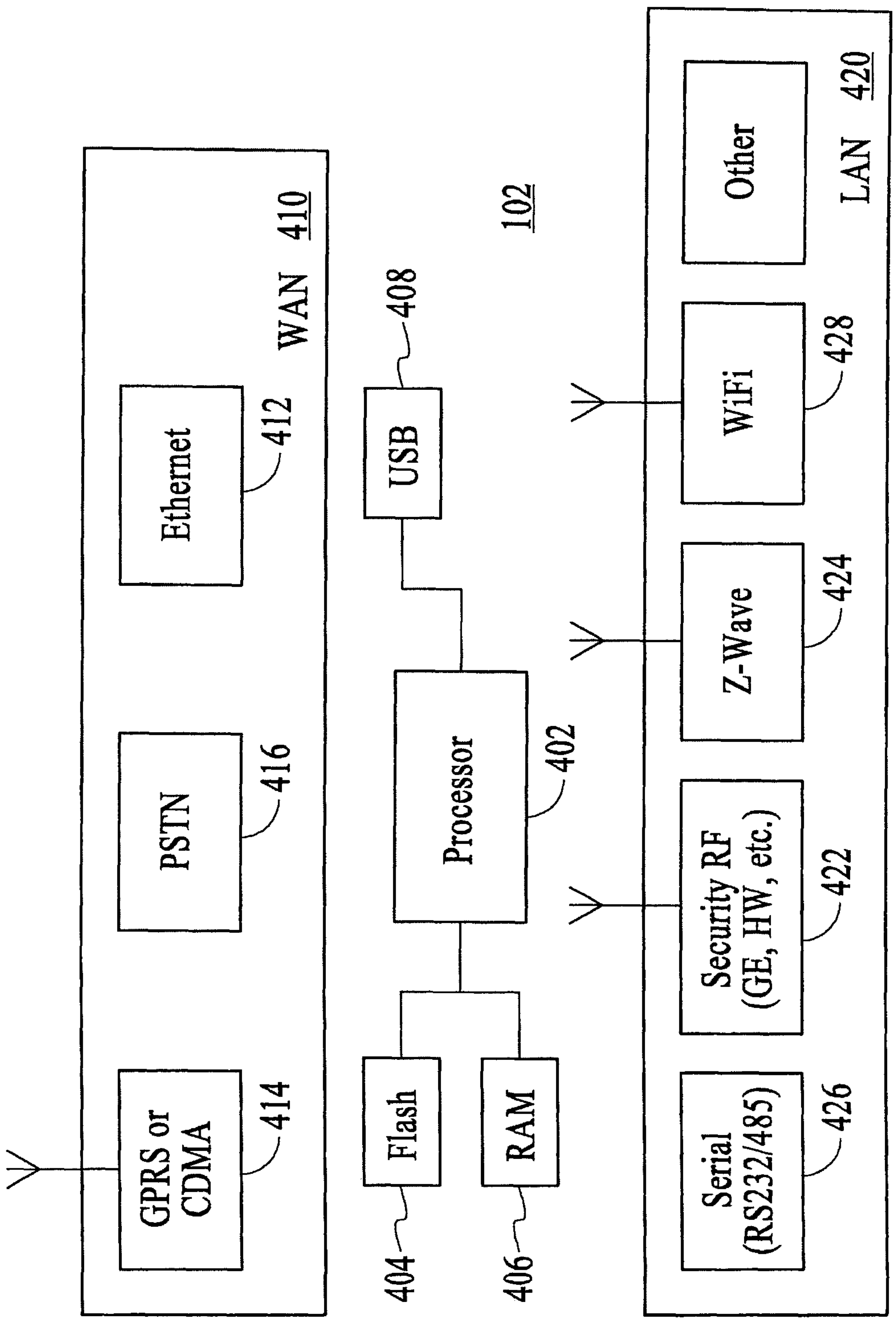
FIG. 4 is a block diagram of the gateway components, under an embodiment.

FIG. 4 is a block diagram of components of the gateway 102, under an embodiment. Depending on the specific set of functionality desired by the service provider deploying the integrated security system service, the gateway 102 can use any of a number of processors 402, due to the small footprint of the gateway application firmware. In an embodiment, the gateway could include the Broadcom BCM5354 as the processor for example. In addition, the gateway 102 includes memory (e.g., FLASH 404, RAM 406, etc.) and any number of input/output (I/O) ports 408.

Referring to the WAN portion 410 of the gatewayl02, the gateway 102 of an embodiment can communicate with the iConnect server using a number of communication types and/or protocols, for example Broadband 412, GPRS 414 and/or Public Switched Telephone Network (PTSN) 416 to name a few. In general, broadband communication 412 is the primary means of connection between the gateway 102 and the iConnect server 104 and the GPRS/CDMA 414 and/or PSTN 416 interfaces acts as back-up for fault tolerance in case the user's broadband connection fails for whatever reason, but the embodiment is not so limited.

Referring to the LAN portion 420 of the gateway 102, various protocols and physical transceivers can be used to communicate to off-the-shelf sensors and cameras. The gateway 102 is protocol-agnostic and technology-agnostic and as such can easily support almost any device networking protocol. The gateway 102 can, for example, support GE and Honeywell security RF protocols 422, Z-Wave 424, serial (RS232 and RS485) 426 for direct connection to security panels as well as WiFi 428 (802.11b/g) for communication to WiFi cameras.

The integrated security system includes couplings or connections among a variety of IP devices or components, and the device management module is in charge of the discovery, installation and configuration of the IP devices coupled or connected to the system, as described above. The integrated security system of an embodiment uses a "sandbox" network to discover and manage all IP devices coupled or connected as components of the system. The IP devices of an embodiment include wired devices, wireless devices, cameras, interactive touchscreens, and security panels to name a few. These devices can be wired via ethernet cable or Wifi devices, all of which are secured within the sandbox network, as described below. The "sandbox" network is described in detail below.

Figure 5:
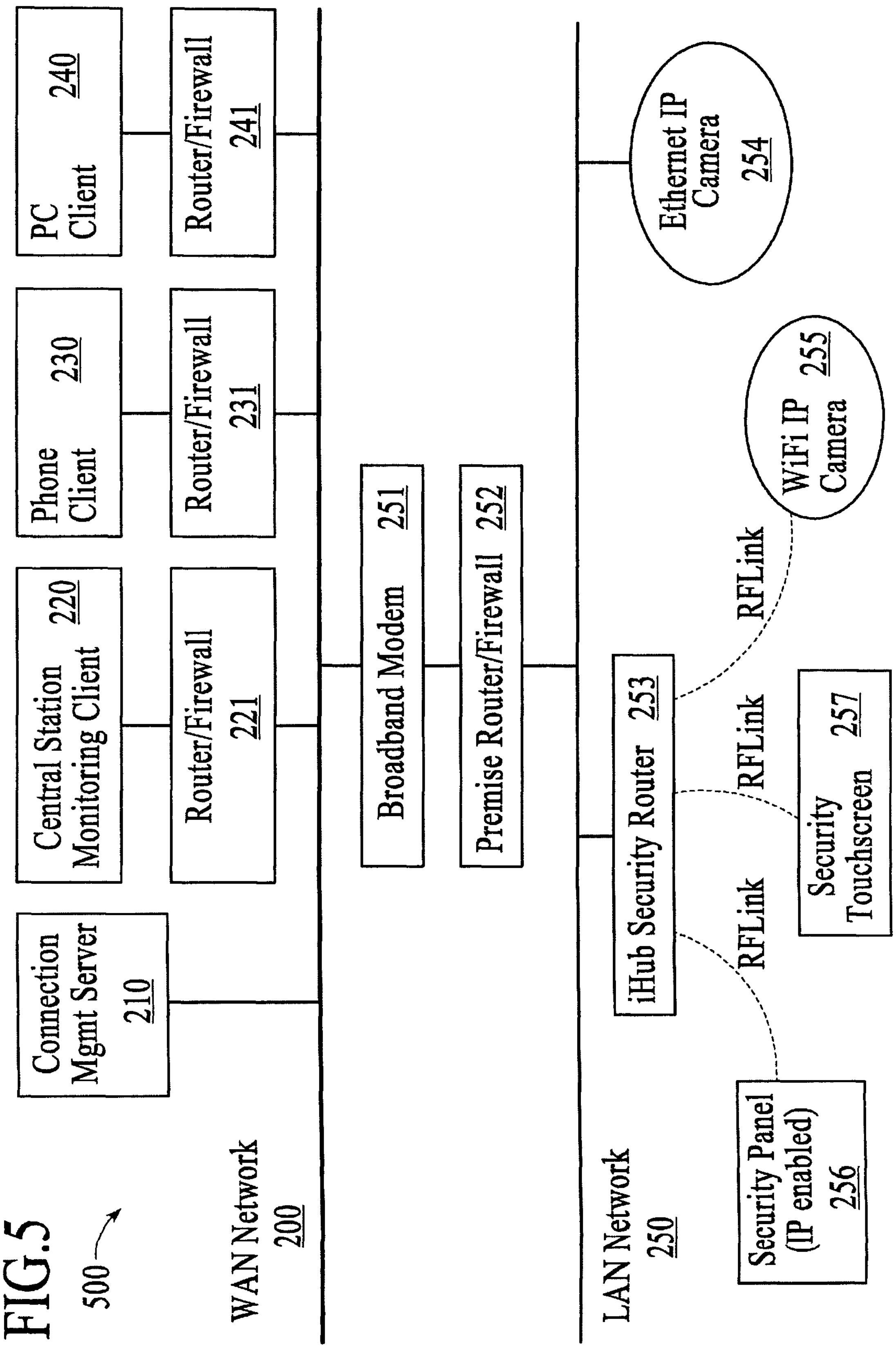
FIG. 5 is a block diagram of IP device integration with a premise network, under an embodiment.

FIG. 5 is a block diagram 500 of network or premise device integration with a premise network 250, under an embodiment. In an embodiment, network devices 255-257 are coupled to the gateway 102 using a secure network coupling or connection such as SSL over an encrypted 802.11 link (utilizing for example WPA-2 security for the wireless encryption). The network coupling or connection between the gateway 102 and the network devices 255-257 is a private coupling or connection in that it is segregated from any other network couplings or connections. The gateway 102 is coupled to the premise router/firewall 252 via a coupling with a premise LAN 250. The premise router/firewall 252 is coupled to a broadband modem 251, and the broadband modem 251 is coupled to a WAN 200 or other network outside the premise. The gateway 102 thus enables or forms a separate wireless network, or sub-network, that includes some number of devices and is coupled or connected to the LAN 250 of the host premises. The gateway sub-network can include, but is not limited to, any number of other devices like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

Figure 6:
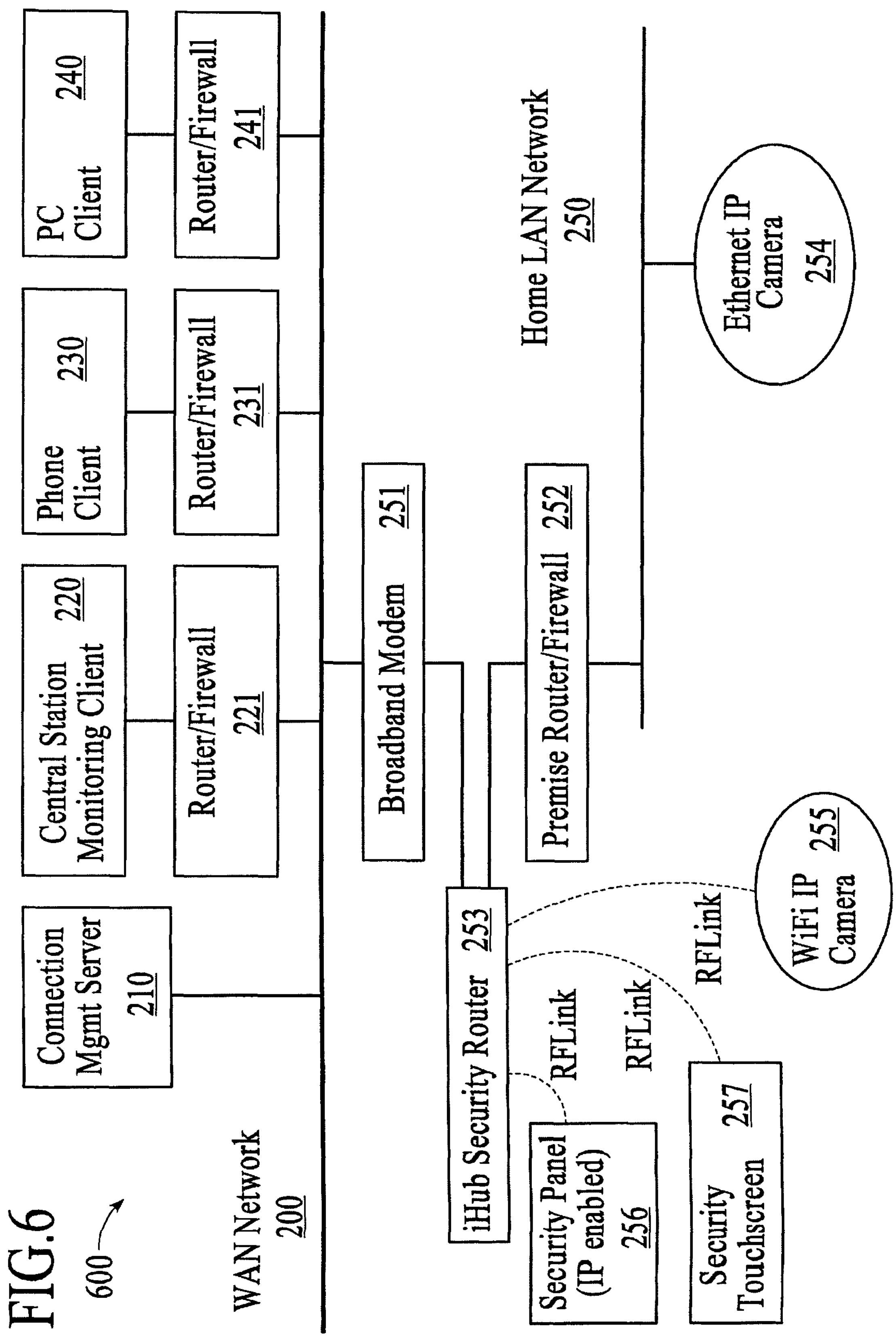
FIG. 6 is a block diagram of IP device integration with a premise network, under an alternative embodiment.

FIG. 6 is a block diagram 600 of network or premise device integration with a premise network 250, under an alternative embodiment. The network or premise devices 255-257 are coupled to the gateway 102. The network coupling or connection between the gateway 102 and the network devices 255-257 is a private coupling or connection in that it is segregated from any other network couplings or connections. The gateway 102 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the gateway 102 can be configured or function as the premise router routing specified data between the outside network (e.g., WAN 200) and the premise router/firewall 252 of the LAN 250. As described above, the gateway 102 in this configuration enables or forms a separate wireless network, or sub-network, that includes the network or premise devices 255-257 and is coupled or connected between the LAN 250 of the host premises and the WAN 200. The gateway sub-network can include, but is not limited to, any number of network or premise devices 255-257 like WiFi IP cameras, security panels (e.g., IP-enabled), and security touchscreens, to name a few. The gateway 102 manages or controls the sub-network separately from the LAN 250 and transfers data and information between components of the sub-network and the LAN 250/WAN 200, but is not so limited. Additionally, other network devices 254 can be coupled to the LAN 250 without being coupled to the gateway 102.

The examples described above with reference to FIGS. 5 and 6 are presented only as examples of IP device integration. The integrated security system is not limited to the type, number and/or combination of IP devices shown and described in these examples, and any type, number and/or combination of IP devices is contemplated within the scope of this disclosure as capable of being integrated with the premise network.

The integrated security system of an embodiment includes a touchscreen (also referred to as the iControl touchscreen or integrated security system touchscreen), as described above, which provides core security keypad functionality, content management and presentation, and embedded systems design. The networked security touchscreen system of an embodiment enables a consumer or security provider to easily and automatically install, configure and manage the security system and touchscreen located at a customer premise. Using this system the customer may access and control the local security system, local IP devices such as cameras, local sensors and control devices (such as lighting controls or pipe freeze sensors), as well as the local security system panel and associated security sensors (such as door/window, motion, and smoke detectors). The customer premise may be a home, business, and/or other location equipped with a wired or wireless broadband IP connection.

The system of an embodiment includes a touchscreen with a configurable software user interface and/or a gateway device (e.g., iHub) that couples or connects to a premise security panel through a wired or wireless connection, and a remote server that provides access to content and information from the premises devices to a user when they are remote from the home. The touchscreen supports broadband and/or WAN wireless connectivity. In this embodiment, the touchscreen incorporates an IP broadband connection (e.g., Wifi radio, Ethernet port, etc.), and/or a cellular radio (e.g., GPRS/GSM, CDMA, WiMax, etc.). The touchscreen described herein can be used as one or more of a security system interface panel and a network user interface (UI) that provides an interface to interact with a network (e.g., LAN, WAN, internet, etc.).

The touchscreen of an embodiment provides an integrated touchscreen and security panel as an all-in-one device. Once integrated using the touchscreen, the touchscreen and a security panel of a premise security system become physically co-located in one device, and the functionality of both may even be co-resident on the same CPU and memory (though this is not required).

The touchscreen of an embodiment also provides an integrated IP video and touchscreen UI. As such, the touchscreen supports one or more standard video CODECs/players (e.g., H.264, Flash Video, MOV, MPEG4, M-JPEG, etc.). The touchscreen UI then provides a mechanism (such as a camera or video widget) to play video. In an embodiment the video is streamed live from an IP video camera. In other embodiments the video comprises video clips or photos sent from an IP camera or from a remote location.

The touchscreen of an embodiment provides a configurable user interface system that includes a configuration supporting use as a security touchscreen. In this embodiment, the touchscreen utilizes a modular user interface that allows components to be modified easily by a service provider, an installer, or even the end user. Examples of such a modular approach include using Flash widgets, HTML-based widgets, or other downloadable code modules such that the user interface of the touchscreen can be updated and modified while the application is running. In an embodiment the touchscreen user interface modules can be downloaded over the internet. For example, a new security configuration widget can be downloaded from a standard web server, and the touchscreen then loads such configuration app into memory, and inserts it in place of the old security configuration widget. The touchscreen of an embodiment is configured to provide a self-install user interface.

Embodiments of the networked security touchscreen system described herein include a touchscreen device with a user interface that includes a security toolbar providing one or more functions including arm, disarm, panic, medic, and alert. The touchscreen therefore includes at least one screen having a separate region of the screen dedicated to a security toolbar. The security toolbar of an embodiment is present in the dedicated region at all times that the screen is active.

The touchscreen of an embodiment includes a home screen having a separate region of the screen allocated to managing home-based functions. The home-based functions of an embodiment include managing, viewing, and/or controlling IP video cameras. In this embodiment, regions of the home screen are allocated in the form of widget icons; these widget icons (e.g. for cameras, thermostats, lighting, etc) provide functionality for managing home systems. So, for example, a displayed camera icon, when selected, launches a Camera Widget, and the Camera widget in turn provides access to video from one or more cameras, as well as providing the user with relevant camera controls (take a picture, focus the camera, etc.)

The touchscreen of an embodiment includes a home screen having a separate region of the screen allocated to managing, viewing, and/or controlling internet-based content or applications. For example, the Widget Manager UI presents a region of the home screen (up to and including the entire home screen) where internet widgets icons such as weather, sports, etc. may be accessed). Each of these icons may be selected to launch their respective content services.

The touchscreen of an embodiment is integrated into a premise network using the gateway, as described above. The gateway as described herein functions to enable a separate wireless network, or sub-network, that is coupled, connected, or integrated with another network (e.g., WAN, LAN of the host premises, etc.). The sub-network enabled by the gateway optimizes the installation process for IP devices, like the touchscreen, that couple or connect to the sub-network by segregating these IP devices from other such devices on the network. This segregation of the IP devices of the sub-network further enables separate security and privacy policies to be implemented for these IP devices so that, where the IP devices are dedicated to specific functions (e.g., security), the security and privacy policies can be tailored specifically for the specific functions. Furthermore, the gateway and the sub-network it forms enables the segregation of data traffic, resulting in faster and more efficient data flow between components of the host network, components of the sub-network, and between components of the sub-network and components of the network.

The touchscreen of an embodiment includes a core functional embedded system that includes an embedded operating system, required hardware drivers, and an open system interface to name a few. The core functional embedded system can be provided by or as a component of a conventional security system (e.g., security system available from GE Security). These core functional units are used with components of the integrated security system as described herein. Note that portions of the touchscreen description below may include reference to a host premise security system (e.g., GE security system), but these references are included only as an example and do not limit the touchscreen to integration with any particular security system.

As an example, regarding the core functional embedded system, a reduced memory footprint version of embedded Linux forms the core operating system in an embodiment, and provides basic TCP/IP stack and memory management functions, along with a basic set of low-level graphics primitives. A set of device drivers is also provided or included that offer low-level hardware and network interfaces. In addition to the standard drivers, an interface to the RS 485 bus is included that couples or connects to the security system panel (e.g., GE Concord panel). The interface may, for example, implement the Superbus 2000 protocol, which can then be utilized by the more comprehensive transaction-level security functions implemented in PanelConnect technology (e.g SetAlarmLevel (int level, int partition, char *accessCode)). Power control drivers are also provided.

Figure 7:
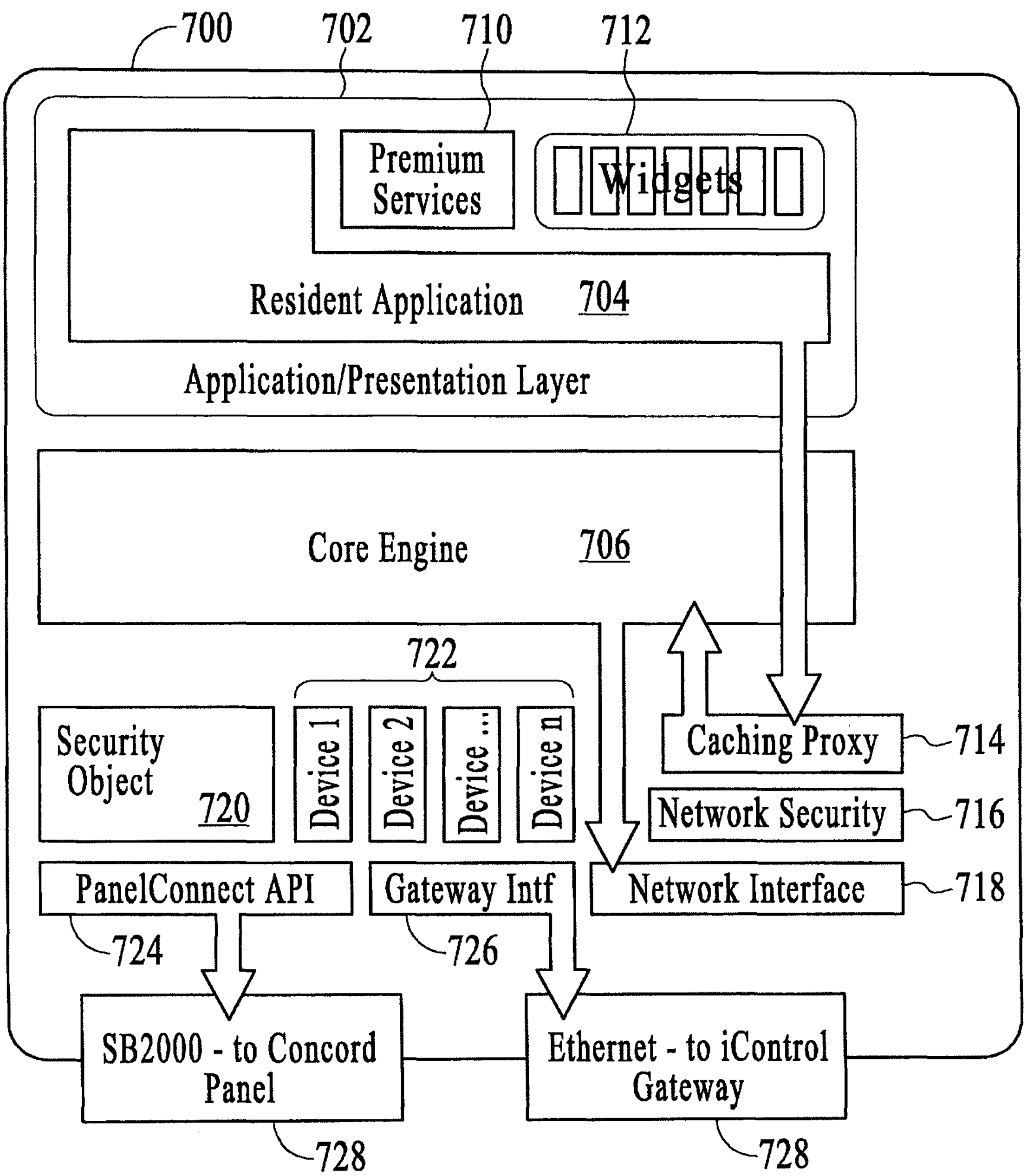
FIG. 7 is a block diagram of a touchscreen, under an embodiment.

FIG. 7 is a block diagram of a touchscreen 700 of the integrated security system, under an embodiment. The touchscreen 700 generally includes an application/presentation layer 702 with a resident application 704, and a core engine 706. The touchscreen 700 also includes one or more of the following, but is not so limited: applications of premium services 710, widgets 712, a caching proxy 714, network security 716, network interface 718, security object 720, applications supporting devices 722, PanelConnect API 724, a gateway interface 726, and one or more ports 728.

More specifically, the touchscreen, when configured as a home security device, includes but is not limited to the following application or software modules: RS 485 and/or RS-232 bus security protocols to conventional home security system panel (e.g., GE Concord panel); functional home security classes and interfaces (e.g. Panel ARM state, Sensor status, etc.); Application/Presentation layer or engine; Resident Application; Consumer Home Security Application; installer home security application; core engine; and System bootloader/Software Updater. The core Application engine and system bootloader can also be used to support other advanced content and applications.

This provides a seamless interaction between the premise security application and other optional services such as weather widgets or IP cameras.

An alternative configuration of the touchscreen includes a first Application engine for premise security and a second Application engine for all other applications. The integrated security system application engine supports content standards such as HTML, XML, Flash, etc. and enables a rich consumer experience for all 'widgets', whether security-based or not. The touchscreen thus provides service providers the ability to use web content creation and management tools to build and download any 'widgets' regardless of their functionality.

As discussed above, although the Security Applications have specific low-level functional requirements in order to interface with the premise security system, these applications make use of the same fundamental application facilities as any other 'widget', application facilities that include graphical layout, interactivity, application handoff, screen management, and network interfaces, to name a few.

Content management in the touchscreen provides the ability to leverage conventional web development tools, performance optimized for an embedded system, service provider control of accessible content, content reliability in a consumer device, and consistency between 'widgets' and seamless widget operational environment. In an embodiment of the integrated security system, widgets are created by web developers and hosted on the integrated security system Content Manager (and stored in the Content Store database). In this embodiment the server component caches the widgets and offers them to consumers through the web-based integrated security system provisioning system. The servers interact with the advanced touchscreen using HTTPS interfaces controlled by the core engine and dynamically download widgets and updates as needed to be cached on the touchscreen. In other embodiments widgets can be accessed directly over a network such as the Internet without needing to go through the iControl Content Manager Referring to FIG. 7, the touchscreen system is built on a tiered architecture, with defined interfaces between the Application/Presentation Layer (the Application Engine) on the top, the Core Engine in the middle, and the security panel and gateway APIs at the lower level. The architecture is configured to provide maximum flexibility and ease of maintenance.

Figure 8:
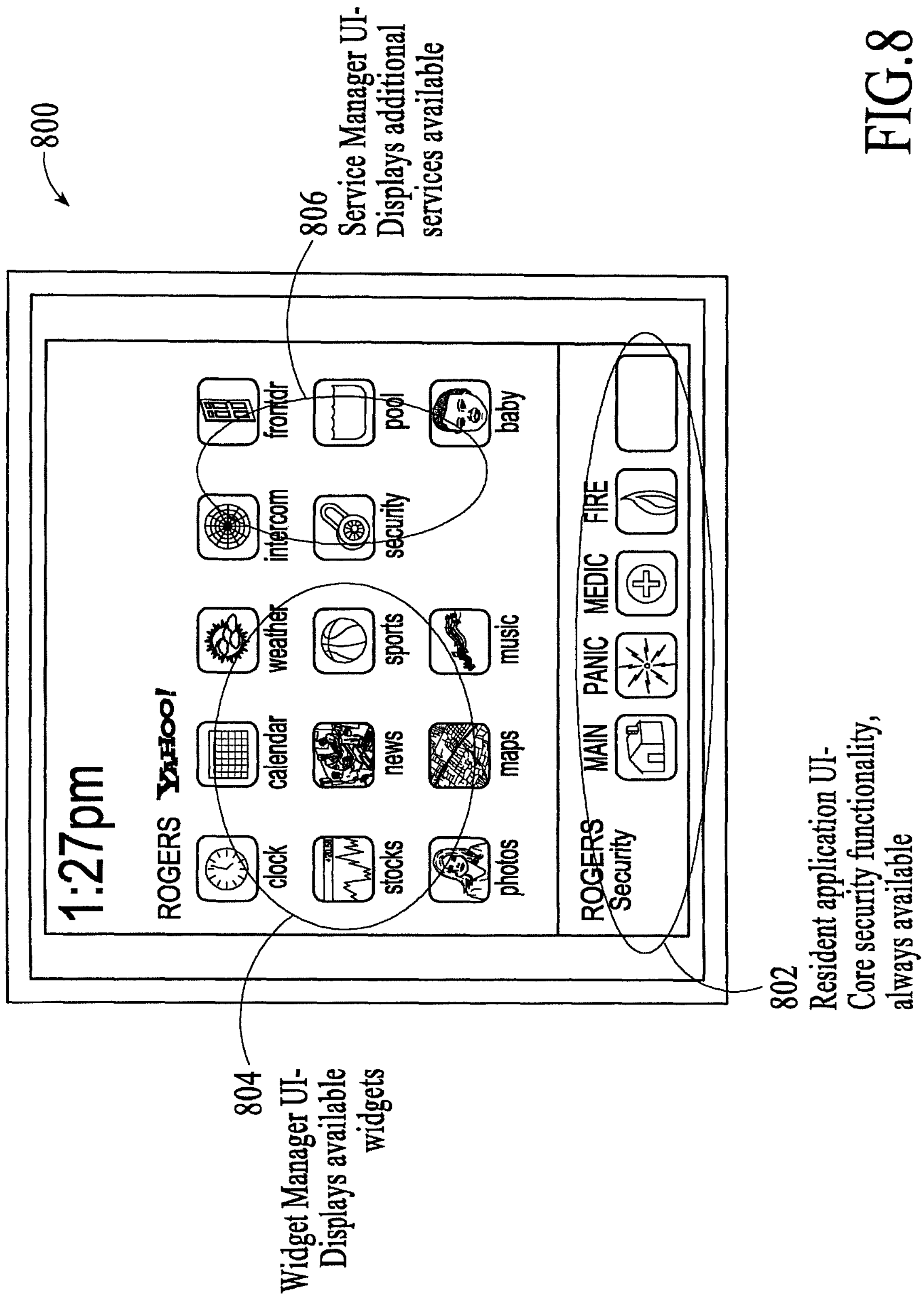
FIG. 8 is an example screenshot of a networked security touchscreen, under an embodiment.

The application engine of the touchscreen provides the presentation and interactivity capabilities for all applications (widgets) that run on the touchscreen, including both core security function widgets and third party content widgets. FIG. 8 is an example screenshot 800 of a networked security touchscreen, under an embodiment. This example screenshot 800 includes three interfaces or user interface (UI) components 802-806, but is not so limited. A first UI 802 of the touchscreen includes icons by which a user controls or accesses functions and/or components of the security system (e.g., "Main", "Panic", "Medic", "Fire", state of the premise alarm system (e.g., disarmed, armed, etc.), etc.); the first UI 802, which is also referred to herein as a security interface, is always presented on the touchscreen. A second UI 804 of the touchscreen includes icons by which a user selects or interacts with services and other network content (e.g., clock, calendar, weather, stocks, news, sports, photos, maps, music, etc.) that is accessible via the touchscreen. The second UI 804 is also referred to herein as a network interface or content interface. A third UI 806 of the touchscreen includes icons by which a user selects or interacts with additional services or componets (e.g., intercom control, security, cameras coupled to the system in particular regions (e.g., front door, baby, etc.) available via the touchscreen.

A component of the application engine is the Presentation Engine, which includes a set of libraries that implement the standards-based widget content (e.g., XML, HTML, JavaScript, Flash) layout and interactivity. This engine provides the widget with interfaces to dynamically load both graphics and application logic from third parties, support high level data description language as well as standard graphic formats. The set of web content-based functionality available to a widget developer is extended by specific touchscreen functions implemented as local web services by the Core Engine.

The resident application of the touchscreen is the master service that controls the interaction of all widgets in the system, and enforces the business and security rules required by the service provider. For example, the resident application determines the priority of widgets, thereby enabling a home security widget to override resource requests from a less critical widget (e.g. a weather widget). The resident application also monitors widget behavior, and responds to client or server requests for cache updates.

The core engine of the touchscreen manages interaction with other components of the integrated security system, and provides an interface through which the resident application and authorized widgets can get information about the home security system, set alarms, install sensors, etc. At the lower level, the Core Engine's main interactions are through the PanelConnect API, which handles all communication with the security panel, and the gateway Interface, which handles communication with the gateway. In an embodiment, both the iHub Interface and PanelConnect API are resident and operating on the touchscreen. In another embodiment, the PanelConnect API runs on the gateway or other device that provides security system interaction and is accessed by the touchscreen through a web services interface.

The Core Engine also handles application and service level persistent and cached memory functions, as well as the dynamic provisioning of content and widgets, including but not limited to: flash memory management, local widget and content caching, widget version management (download, cache flush new/old content versions), as well as the caching and synchronization of user preferences. As a portion of these services the Core engine incorporates the bootloader functionality that is responsible for maintaining a consistent software image on the touchscreen, and acts as the client agent for all software updates. The bootloader is configured to ensure full update redundancy so that unsuccessful downloads cannot corrupt the integrated security system.

Video management is provided as a set of web services by the Core Engine. Video management includes the retrieval and playback of local video feeds as well as remote control and management of cameras (all through iControl CameraConnect technology).

Both the high level application layer and the mid-level core engine of the touchscreen can make calls to the network. Any call to the network made by the application layer is automatically handed off to a local caching proxy, which determines whether the request should be handled locally. Many of the requests from the application layer are web services API requests, although such requests could be satisfied by the iControl servers, they are handled directly by the touchscreen and the gateway. Requests that get through the caching proxy are checked against a white list of acceptable sites, and, if they match, are sent off through the network interface to the gateway. Included in the Network Subsystem is a set of network services including HTTP, HTTPS, and server-level authentication functions to manage the secure client-server interface. Storage and management of certificates is incorporated as a part of the network services layer.

Server components of the integrated security system servers support interactive content services on the touchscreen. These server components include, but are not limited to the content manager, registry manager, network manager, and global registry, each of which is described herein. The Content Manager oversees aspects of handling widget data and raw content on the touchscreen. Once created and validated by the service provider, widgets are 'ingested' to the Content Manager, and then become available as downloadable services through the integrated security system Content Management APIs. The Content manager maintains versions and timestamp information, and connects to the raw data contained in the backend Content Store database. When a widget is updated (or new content becomes available) all clients registering interest in a widget are systematically updated as needed (a process that can be configured at an account, locale, or system-wide level).

The Registry Manager handles user data, and provisioning accounts, including information about widgets the user has decided to install, and the user preferences for these widgets.

The Network Manager handles getting and setting state for all devices on the integrated security system network (e.g., sensors, panels, cameras, etc.). The Network manager synchronizes with the gateway, the advanced touchscreen, and the subscriber database.

The Global Registry is a primary starting point server for all client services, and is a logical referral service that abstracts specific server locations/addresses from clients (touchscreen, gateway 102, desktop widgets, etc.). This approach enables easy scaling/migration of server farms.

The touchscreen of an embodiment operates wirelessly with a premise security system. The touchscreen of an embodiment incorporates an RF transceiver component that either communicates directly with the sensors and/or security panel over the panel's proprietary RF frequency, or the touchscreen communicates wirelessly to the gateway over 802.11, Ethernet, or other IP-based communications channel, as described in detail herein. In the latter case the gateway implements the PanelConnect interface and communicates directly to the security panel and/or sensors over wireless or wired networks as described in detail above.

The touchscreen of an embodiment is configured to operate with multiple security systems through the use of an abstracted security system interface. In this embodiment, the PanelConnect API can be configured to support a plurality of proprietary security system interfaces, either simultaneously or individually as described herein. In one embodiment of this approach, the touchscreen incorporates multiple physical interfaces to security panels (e.g. GE Security RS-485, Honeywell RF, etc.) in addition to the PanelConnect API implemented to support multiple security interfaces. The change needed to support this in PanelConnect is a configuration parameter specifying the panel type connection that is being utilized.

So for example, the setARMState( ) function is called with an additional parameter (e.g., Armstat =setARMState (type="ARM STAY|ARM AWAY|DISARM", Parameters="ExitDelay=30|Lights=OFF", panelType ="GE Concord4 RS485")). The 'panelType' parameter is used by the setARMState function (and in practice by all of the PanelConnect functions) to select an algorithm appropriate to the specific panel out of a plurality of alogorithms.

The touchscreen of an embodiment is self-installable. Consequently, the touchscreen provides a 'wizard' approach similar to that used in traditional computer installations (e.g. Install Shield). The wizard can be resident on the touchscreen, accessible through a web interface, or both. In one embodiment of a touchscreen self-installation process, the service provider can associate devices (sensors, touchscreens, security panels, lighting controls, etc.) remotely using a web-based administrator interface.

The touchscreen of an embodiment includes a battery backup system for a security touchscreen. The touchscreen incorporates a standard Li-ion or other battery and charging circuitry to allow continued operation in the event of a power outage. In an embodiment the battery is physically located and connected within the touchscreen enclosure. In another embodiment the battery is located as a part of the power transformer, or in between the power transformer and the touchscreen.

The example configurations of the integrated security system described above with reference to FIGS. 5 and 6 include a gateway that is a separate device, and the touchscreen couples to the gateway. However, in an alternative embodiment, the gateway device and its functionality can be incorporated into the touchscreen so that the device management module, which is now a component of or included in the touchscreen, is in charge of the discovery, installation and configuration of the IP devices coupled or connected to the system, as described above. The integrated security system with the integrated touchscreen/gateway uses the same "sandbox" network to discover and manage all IP devices coupled or connected as components of the system.

The touchscreen of this alternative embodiment integrates the components of the gateway with the components of the touchscreen as described herein. More specifically, the touchscreen of this alternative embodiment includes software or applications described above with reference to FIG. 3. In this alternative embodiment, the touchscreen includes the gateway application layer 302 as the main program that orchestrates the operations performed by the gateway. A Security Engine 304 of the touchscreen provides robust protection against intentional and unintentional intrusion into the integrated security system network from the outside world (both from inside the premises as well as from the WAN). The Security Engine 304 of an embodiment comprises one or more sub-modules or components that perform functions including, but not limited to, the following:

- Encryption including 128-bit SSL encryption for gateway and iConnect server communication to protect user data privacy and provide secure communication.
- Bi-directional authentication between the touchscreen and iConnect server in order to prevent unauthorized spoofing and attacks. Data sent from the iConnect server to the gateway application (or vice versa) is digitally signed as an additional layer of security. Digital signing provides both authentication and validation that the data has not been altered in transit.
- Camera SSL encapsulation because picture and video traffic offered by off-the-shelf networked IP cameras is not secure when traveling over the Internet. The touchscreen provides for 128-bit SSL encapsulation of the user picture and video data sent over the internet for complete user security and privacy.
- 802.11b/g/n with WPA-2 security to ensure that wireless camera communications always takes place using the strongest available protection.

A touchscreen-enabled device is assigned a unique activation key for activation with an iConnect server. This ensures that only valid gateway-enabled devices can be activated for use with the specific instance of iConnect server in use. Attempts to activate gateway-enabled devices by brute force are detected by the Security Engine. Partners deploying touchscreen-enabled devices have the knowledge that only a gateway with the correct serial number and activation key can be activated for use with an iConnect server. Stolen devices, devices attempting to masquerade as gateway-enabled devices, and malicious outsiders (or insiders as knowledgeable but nefarious customers) cannot effect other customers' gateway-enabled devices.

As standards evolve, and new encryption and authentication methods are proven to be useful, and older mechanisms proven to be breakable, the security manager can be upgraded "over the air" to provide new and better security for communications between the iConnect server and the gateway application, and locally at the premises to remove any risk of eavesdropping on camera communications.

A Remote Firmware Download module 306 of the touchscreen allows for seamless and secure updates to the gateway firmware through the iControl Maintenance Application on the server 104, providing a transparent, hassle-free mechanism for the service provider to deploy new features and bug fixes to the installed user base. The firmware download mechanism is tolerant of connection loss, power interruption and user interventions (both intentional and unintentional). Such robustness reduces down time and customer support issues. Touchscreen firmware can be remotely download either for one touchscreen at a time, a group of touchscreen, or in batches.

The Automations engine 308 of the touchscreen manages the user-defined rules of interaction between the different devices (e.g. when door opens turn on the light). Though the automation rules are programmed and reside at the portal/server level, they are cached at the gateway level in order to provide short latency between device triggers and actions.

DeviceConnect 310 of the touchscreen touchscreen includes definitions of all supported devices (e.g., cameras, security panels, sensors, etc.) using a standardized plug-in architecture. The DeviceConnect module 310 offers an interface that can be used to quickly add support for any new device as well as enabling interoperability between devices that use different technologies/protocols. For common device types, pre-defined sub-modules have been defined, making supporting new devices of these types even easier. SensorConnect 312 is provided for adding new sensors, CameraConnect 316 for adding IP cameras, and PanelConnect 314 for adding home security panels.

The Schedules engine 318 of the touchscreen is responsible for executing the user defined schedules (e.g., take a picture every five minutes; every day at 8 am set temperature to 65 degrees Fahrenheit, etc.). Though the schedules are programmed and reside at the iConnect server level they are sent to the scheduler within the gateway application of the touchscreen. The Schedules Engine 318 then interfaces with SensorConnect 312 to ensure that scheduled events occur at precisely the desired time.

The Device Management module 320 of the touchscreen is in charge of all discovery, installation and configuration of both wired and wireless IP devices (e.g., cameras, etc.) coupled or connected to the system. Networked IP devices, such as those used in the integrated security system, require user configuration of many IP and security parameters, and the device management module of an embodiment handles the details of this configuration. The device management module also manages the video routing module described below.

The video routing engine 322 of the touchscreen is responsible for delivering seamless video streams to the user with zero-configuration. Through a multi-step, staged approach the video routing engine uses a combination of UPnP port-forwarding, relay server routing and STUN/TURN peer-to-peer routing. The video routing engine is described in detail in the Related Applications.

Figure 9:
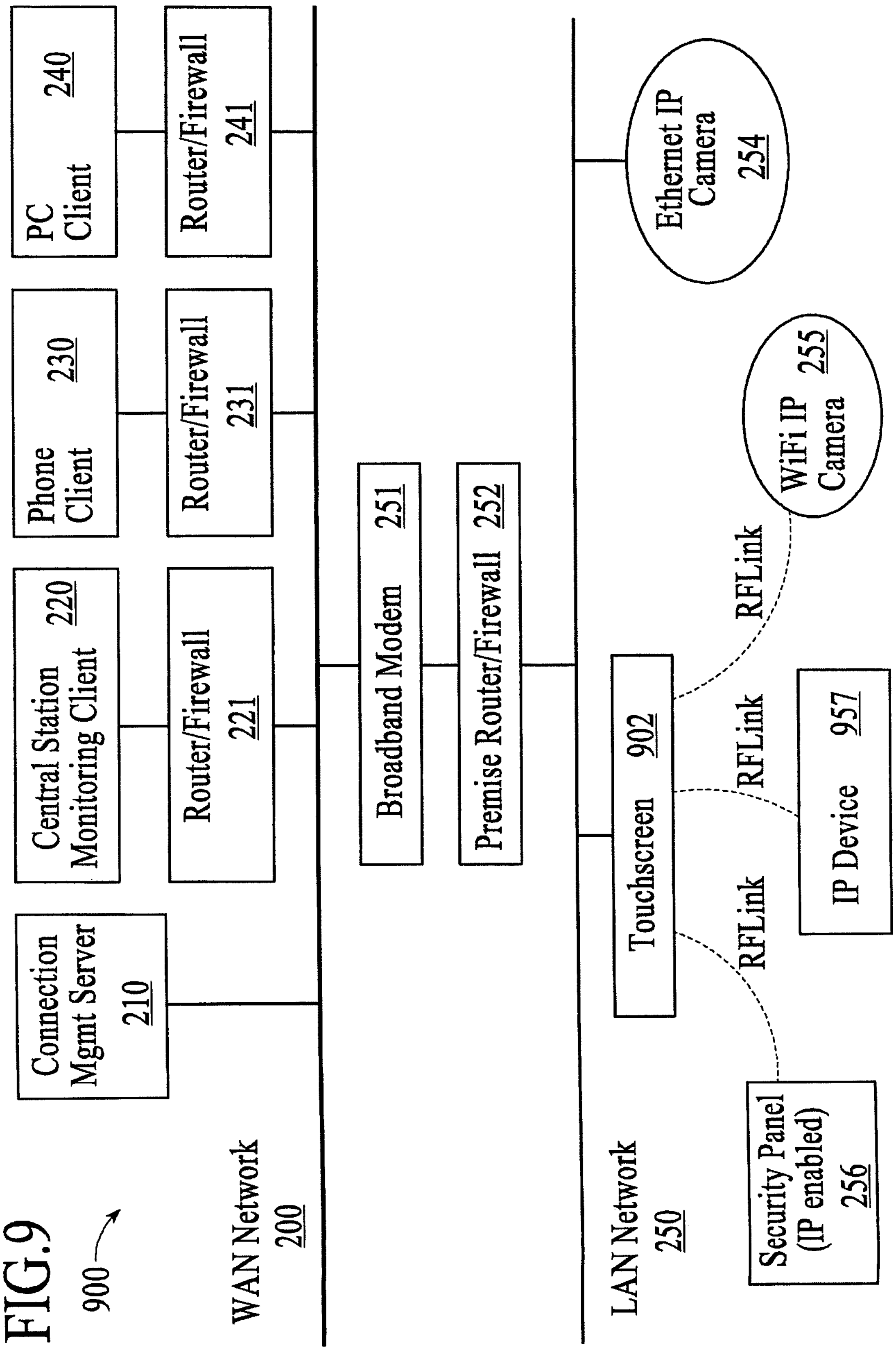
FIG. 9 is a block diagram of network or premise device integration with a premise network, under an embodiment.

FIG. 9 is a block diagram 900 of network or premise device integration with a premise network 250, under an embodiment. In an embodiment, network devices 255, 256, 957 are coupled to the touchscreen 902 using a secure network connection such as SSL over an encrypted 802.11 link (utilizing for example WPA-2 security for the wireless encryption), and the touchscreen 902 coupled to the premise router/firewall 252 via a coupling with a premise LAN 250. The premise router/firewall 252 is coupled to a broadband modem 251, and the broadband modem 251 is coupled to a WAN 200 or other network outside the premise. The touchscreen 902 thus enables or forms a separate wireless network, or sub-network, that includes some number of devices and is coupled or connected to the LAN 250 of the host premises. The touchscreen sub-network can include, but is not limited to, any number of other devices like WiFi IP cameras, security panels (e.g., IP-enabled), and IP devices, to name a few. The touchscreen 902 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 902.

Figure 10:
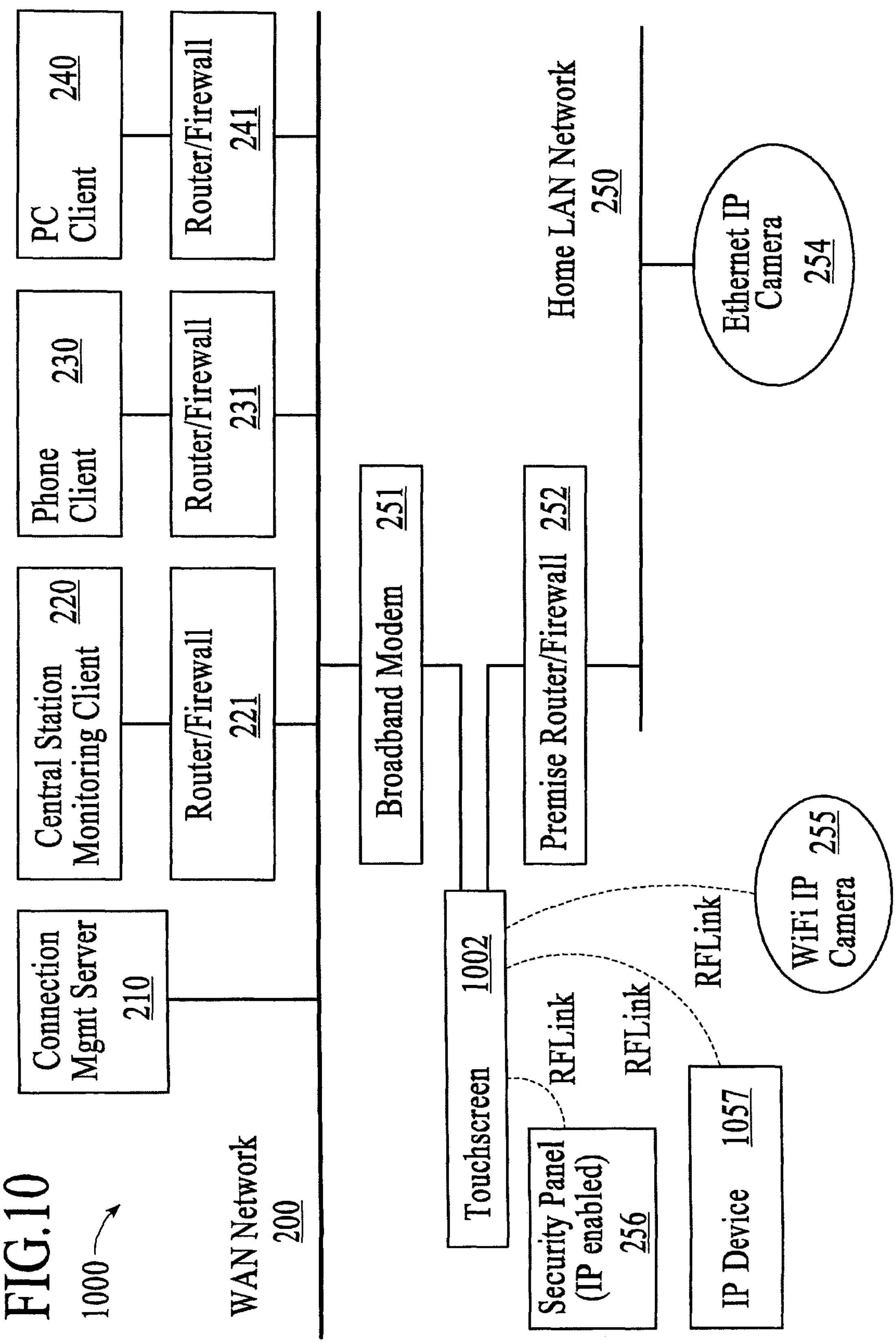
FIG. 10 is a block diagram of network or premise device integration with a premise network, under an alternative embodiment.

FIG. 10 is a block diagram 1000 of network or premise device integration with a premise network 250, under an alternative embodiment. The network or premise devices 255, 256, 1057 are coupled to the touchscreen 1002, and the touchscreen 1002 is coupled or connected between the premise router/firewall 252 and the broadband modem 251. The broadband modem 251 is coupled to a WAN 200 or other network outside the premise, while the premise router/firewall 252 is coupled to a premise LAN 250. As a result of its location between the broadband modem 251 and the premise router/firewall 252, the touchscreen 1002 can be configured or function as the premise router routing specified data between the outside network (e.g., WAN 200) and the premise router/firewall 252 of the LAN 250. As described above, the touchscreen 1002 in this configuration enables or forms a separate wireless network, or sub-network, that includes the network or premise devices 255, 156, 1057 and is coupled or connected between the LAN 250 of the host premises and the WAN 200. The touchscreen sub-network can include, but is not limited to, any number of network or premise devices 255, 256, 1057 like WiFi IP cameras, security panels (e.g., IP-enabled), and security touchscreens, to name a few. The touchscreen 1002 manages or controls the sub-network separately from the LAN 250 and transfers data and information between components of the sub-network and the LAN 250/WAN 200, but is not so limited. Additionally, other network devices 254 can be coupled to the LAN 250 without being coupled to the touchscreen 1002.

The gateway of an embodiment, whether a stand-along component or integrated with a touchscreen, enables couplings or connections and thus the flow or integration of information between various components of the host premises and various types and/or combinations of IP devices, where the components of the host premises include a network (e.g., LAN) and/or a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

The gateway of an embodiment, as described herein, enables couplings or connections and thus the flow of information between various components of the host premises and various types and/or combinations of IP devices, where the components of the host premises include a network, a security system or subsystem to name a few. Consequently, the gateway controls the association between and the flow of information or data between the components of the host premises. For example, the gateway of an embodiment forms a sub-network coupled to another network (e.g., WAN, LAN, etc.), with the sub-network including IP devices. The gateway further enables the association of the IP devices of the sub-network with appropriate systems on the premises (e.g., security system, etc.). Therefore, for example, the gateway can form a sub-network of IP devices configured for security functions, and associate the sub-network only with the premises security system, thereby segregating the IP devices dedicated to security from other IP devices that may be coupled to another network on the premises.

Figure 11:
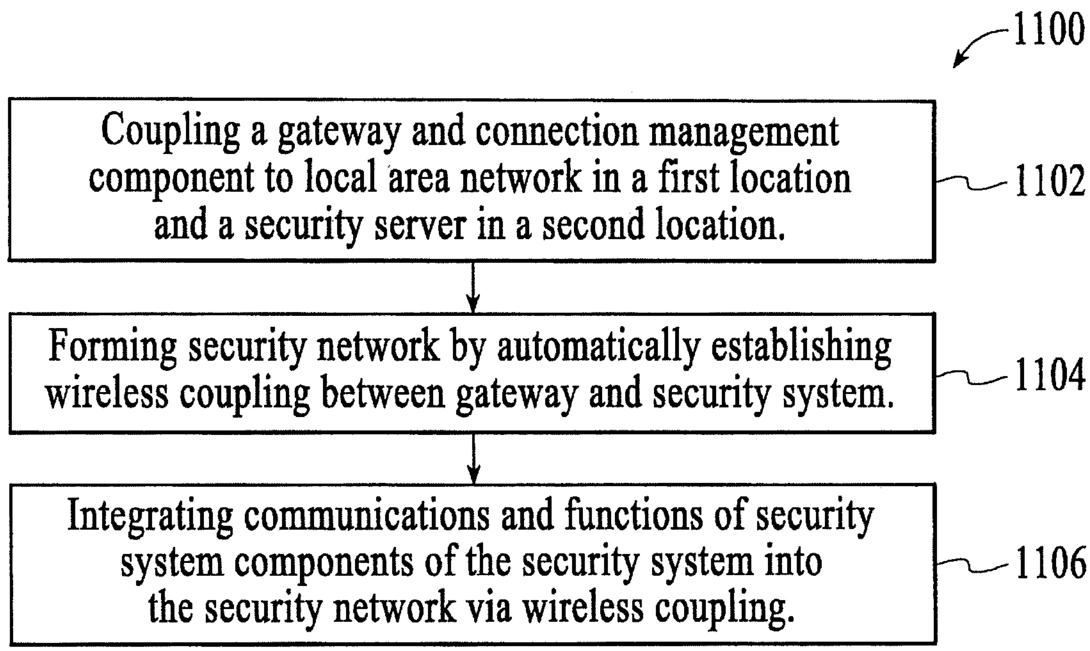
FIG. 11 is a flow diagram for a method of forming a security network including integrated security system components, under an embodiment.

FIG. 11 is a flow diagram for a method 1100 of forming a security network including integrated security system components, under an embodiment. Generally, the method comprises coupling 1102 a gateway comprising a connection management component to a local area network in a first location and a security server in a second location. The method comprises forming 1104 a security network by automatically establishing a wireless coupling between the gateway and a security system using the connection management component. The security system of an embodiment comprises security system components located at the first location. The method comprises integrating 1106 communications and functions of the security system components into the security network via the wireless coupling.

Figure 12:
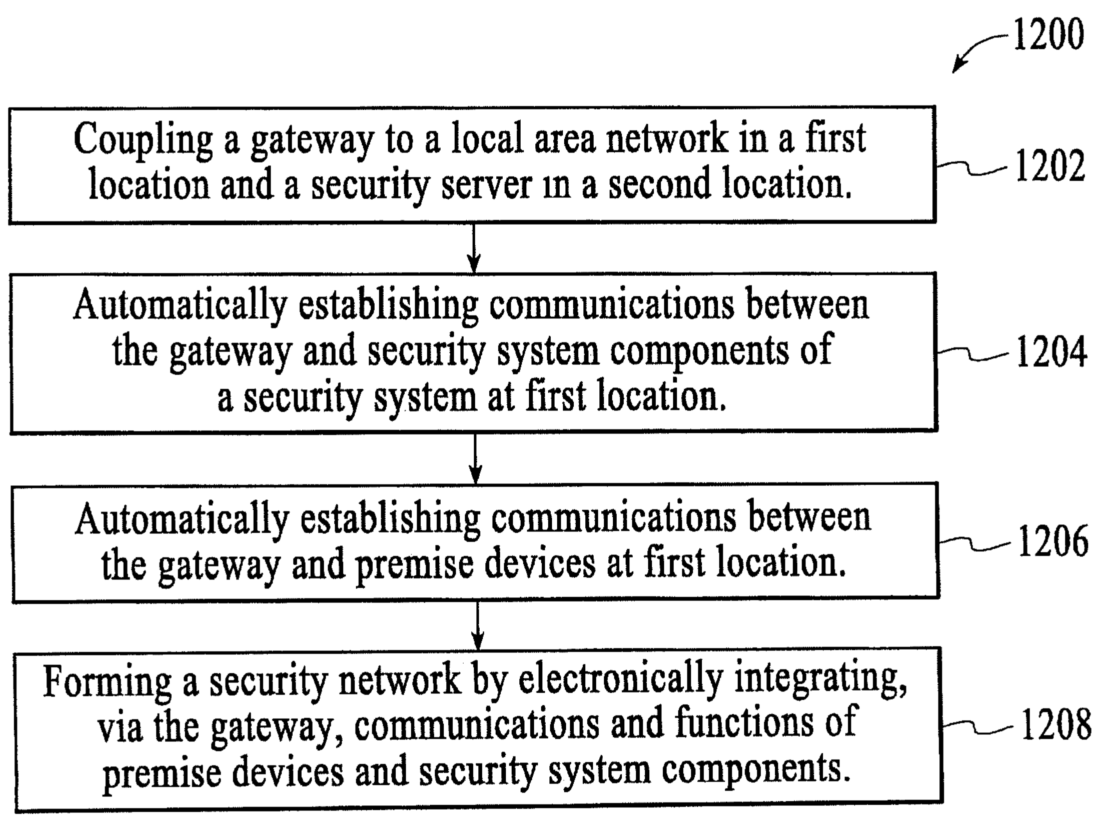
FIG. 12 is a flow diagram for a method of forming a security network including integrated security system components and network devices, under an embodiment.

FIG. 12 is a flow diagram for a method 1200 of forming a security network including integrated security system components and network devices, under an embodiment. Generally, the method comprises coupling 1202 a gateway to a local area network located in a first location and a security server in a second location. The method comprises automatically establishing 1204 communications between the gateway and security system components at the first location, the security system including the security system components. The method comprises automatically establishing 1206 communications between the gateway and premise devices at the first location. The method comprises forming 1208 a security network by electronically integrating, via the gateway, communications and functions of the premise devices and the security system components.

Figure 13:
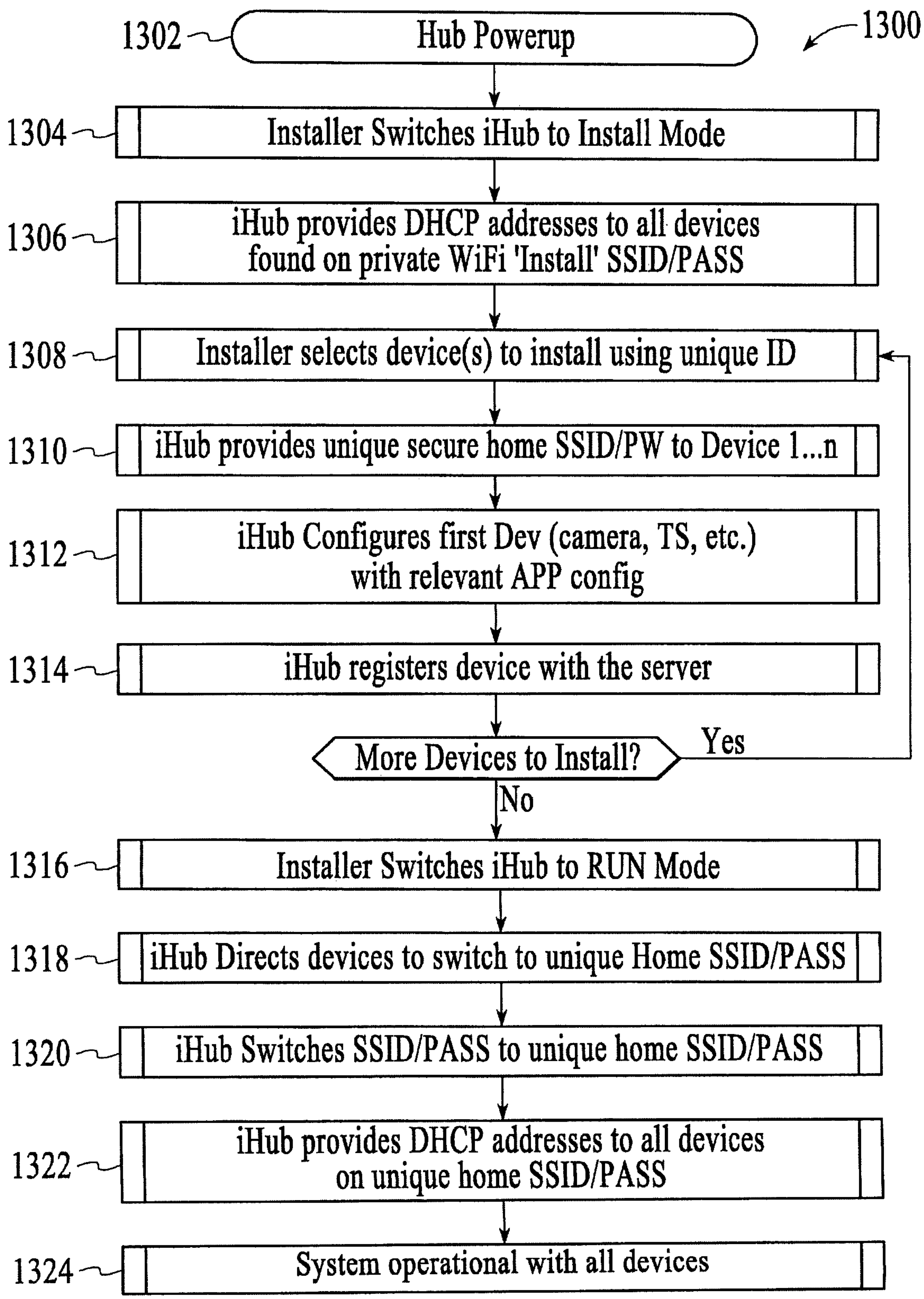
FIG. 13 is a flow diagram for installation of an IP device into a private network environment, under an embodiment.

In an example embodiment, FIG. 13 is a flow diagram 1300 for integration or installation of an IP device into a private network environment, under an embodiment. The IP device includes any IP-capable device that, for example, includes the touchscreen of an embodiment. The variables of an embodiment set at time of installation include, but are not limited to, one or more of a private SSID/Password, a gateway identifier, a security panel identifier, a user account TS, and a Central Monitoring Station account identification.

An embodiment of the IP device discovery and management begins with a user or installer activating 1302 the gateway and initiating 1304 the install mode of the system. This places the gateway in an install mode. Once in install mode, the gateway shifts to a default (Install) Wifi configuration. This setting will match the default setting for other integrated security system-enabled devices that have been pre-configured to work with the integrated security system. The gateway will then begin to provide 1306 DHCP addresses for these IP devices. Once the devices have acquired a new DHCP address from the gateway, those devices are available for configuration into a new secured Wifi network setting.

The user or installer of the system selects 1308 all devices that have been identified as available for inclusion into the integrated security system. The user may select these devices by their unique IDs via a web page, Touchscreen, or other client interface. The gateway provides 1310 data as appropriate to the devices. Once selected, the devices are configured 1312 with appropriate secured Wifi settings, including SSID and WPA/WPA-2 keys that are used once the gateway switches back to the secured sandbox configuration from the "Install" settings. Other settings are also configured as appropriate for that type of device. Once all devices have been configured, the user is notified and the user can exit install mode. At this point all devices will have been registered 1314 with the integrated security system servers.

The installer switches 1316 the gateway to an operational mode, and the gateway instructs or directs 1318 all newly configured devices to switch to the "secured" Wifi sandbox settings. The gateway then switches 1320 to the "secured" Wifi settings. Once the devices identify that the gateway is active on the "secured" network, they request new DHCP addresses from the gateway which, in response, provides 1322 the new addresses. The devices with the new addresses are then operational 1324 on the secured network.

In order to ensure the highest level of security on the secured network, the gateway can create or generate a dynamic network security configuration based on the unique ID and private key in the gateway, coupled with a randomizing factor that can be based on online time or other inputs. This guarantees the uniqueness of the gateway secured network configuration.

To enable the highest level of performance, the gateway analyzes the RF spectrum of the 802.11x network and determines which frequency band/channel it should select to run.

An alternative embodiment of the camera/IP device management process leverages the local ethernet connection of the sandbox network on the gateway. This alternative process is similar to the Wifi discovery embodiment described above, except the user connects the targeted device to the ethernet port of the sandbox network to begin the process. This alternative embodiment accommodates devices that have not been pre-configured with the default "Install" configuration for the integrated security system.

This alternative embodiment of the IP device discovery and management begins with the user/installer placing the system into install mode. The user is instructed to attach an IP device to be installed to the sandbox Ethernet port of the gateway. The IP device requests a DHCP address from the gateway which, in response to the request, provides the address. The user is presented the device and is asked if he/she wants to install the device. If yes, the system configures the device with the secured Wifi settings and other device-specific settings (e.g., camera settings for video length, image quality etc.). The user is next instructed to disconnect the device from the ethernet port. The device is now available for use on the secured sandbox network.

Figure 14:
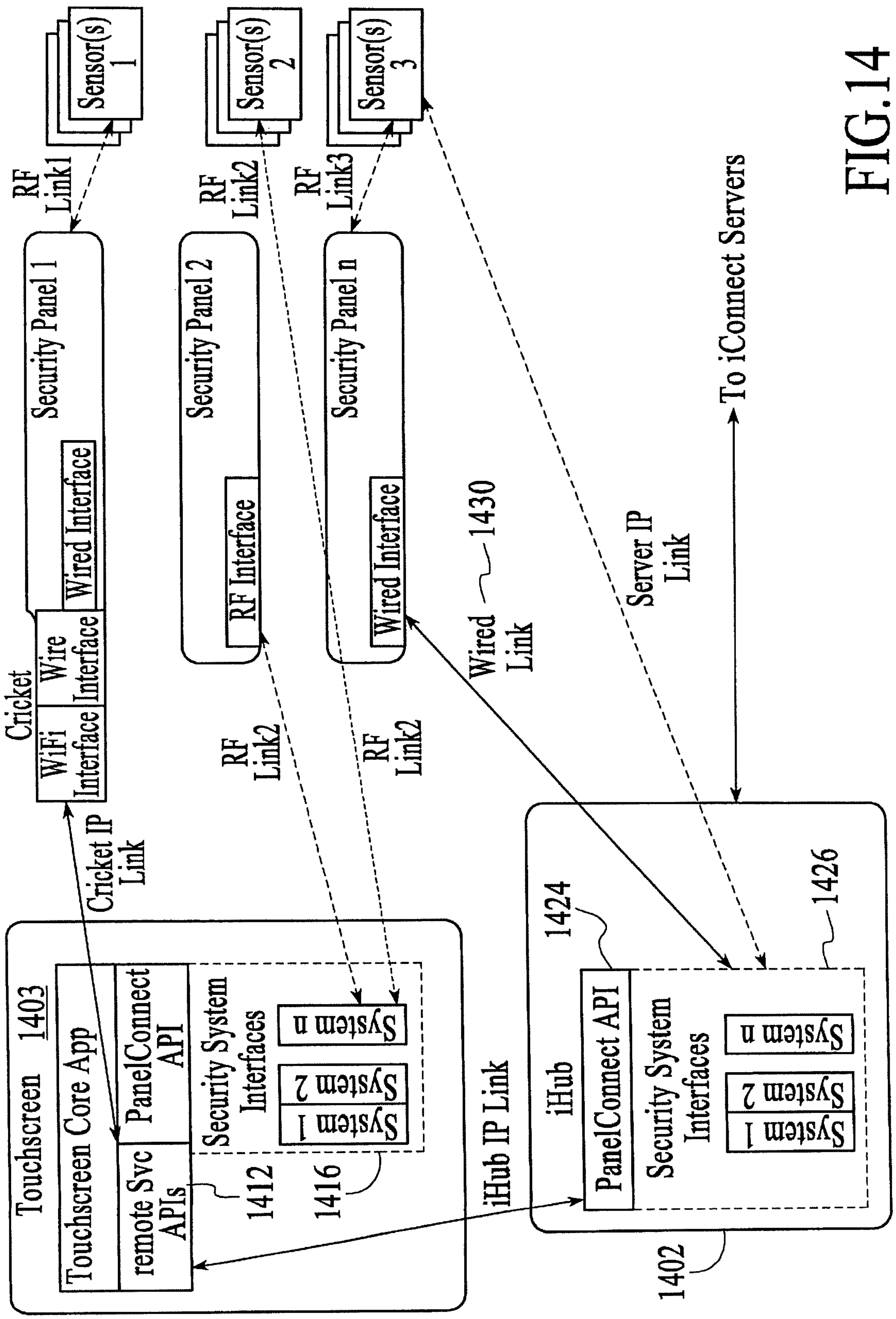
FIG. 14 is a block diagram showing communications among IP devices of the private network environment, under an embodiment.

FIG. 14 is a block diagram showing communications among integrated IP devices of the private network environment, under an embodiment. The IP devices of this example include a security touchscreen 1403, gateway 1402 (e.g., "iHub"), and security panel (e.g., "Security Panel 1", "Security Panel 2", "Security Panel n"), but the embodiment is not so limited. In alternative embodiments any number and/or combination of these three primary component types may be combined with other components including IP devices and/or security system components. For example, a single device that comprises an integrated gateway, touchscreen, and security panel is merely another embodiment of the integrated security system described herein. The description that follows includes an example configuration that includes a touchscreen hosting particular applications. However, the embodiment is not limited to the touchscreen hosting these applications, and the touchscreen should be thought of as representing any IP device.

Referring to FIG. 14, the touchscreen 1403 incorporates an application 1410 that is implemented as computer code resident on the touchscreen operating system, or as a web-based application running in a browser, or as another type of scripted application (e.g., Flash, Java, Visual Basic, etc.). The touchscreen core application 1410 represents this application, providing user interface and logic for the end user to manage their security system or to gain access to networked information or content (Widgets). The touchscreen core application 1410 in turn accesses a library or libraries of functions to control the local hardware (e.g. screen display, sound, LEDs, memory, etc.) as well as specialized librarie(s) to couple or connect to the security system.

In an embodiment of this security system connection, the touchscreen 1403 communicates to the gateway 1402, and has no direct communication with the security panel. In this embodiment, the touchscreen core application 1410 accesses the remote service APIs 1412 which provide security system functionality (e.g. ARM/DISARM panel, sensor state, get/set panel configuration parameters, initiate or get alarm events, etc.). In an embodiment, the remote service APIs 1412 implement one or more of the following functions, but the embodiment is not so limited: Armstate=setARMState (type="ARM STAY|ARM AWAY|DISARM", Parameters="ExitDelay=30|Lights=OFF"); sensorState=getSensors (type="ALL|SensorName|SensorNameList"); result=setSensorState(SensorName, parameters="Option1, Options2, . . . Option n"); interruptHandler=SensorEvent( ); and, interruptHandler=alarmEvent( ).

Functions of the remote service APIs 1412 of an embodiment use a remote PanelConnect API 1424 which which resides in memory on the gateway 1402. The touchscreen 1403 communicates with the gateway 1402 through a suitable network interface such as an Ethernet or 802.11 RF connection, for example. The remote PanelConnect API 1424 provides the underlying Security System Interfaces 1426 used to communicate with and control one or more types of security panel via wired link 1430 and/or RF link 3. The PanelConnect API 1224 provides responses and input to the remote services APIs 1426, and in turn translates function calls and data to and from the specific protocols and functions supported by a specific implementation of a Security Panel (e.g. a GE Security Simon XT or Honeywell Vista 20P). In an embodiment, the PanelConnect API 1224 uses a 345 MHz RF transceiver or receiver hardware/firmware module to communicate wirelessly to the security panel and directly to a set of 345 MHz RF-enabled sensors and devices, but the embodiment is not so limited.

The gateway of an alternative embodiment communicates over a wired physical coupling or connection to the security panel using the panel's specific wired hardware (bus) interface and the panel's bus-level protocol.

In an alternative embodiment, the Touchscreen 1403 implements the same PanelConnect API 1414 locally on the Touchscreen 1403, communicating directly with the Security Panel 2 and/or Sensors 2 over the proprietary RF link or over a wired link for that system. In this embodiment the Touchscreen 1403, instead of the gateway 1402, incorporates the 345 MHz RF transceiver to communicate directly with Security Panel 2 or Sensors 2 over the RF link 2. In the case of a wired link the Touchscreen 1403 incorporates the real-time hardware (e.g. a PIC chip and RS232-variant serial link) to physically connect to and satisfy the specific bus-level timing requirements of the SecurityPanel2.

In yet another alternative embodiment, either the gateway 1402 or the Touchscreen 1403 implements the remote service APIs. This embodiment includes a Cricket device ("Cricket") which comprises but is not limited to the following components: a processor (suitable for handling 802.11 protocols and processing, as well as the bus timing requirements of SecurityPanel1); an 802.11 (WiFi) client IP interface chip; and, a serial bus interface chip that implements variants of RS232 or RS485, depending on the specific Security Panel.

The Cricket also implements the full PanelConnect APIs such that it can perform the same functions as the case where the gateway implements the PanelConnect APIs. In this embodiment, the touchscreen core application 1410 calls functions in the remote service APIs 1412 (such as setArmState( )). These functions in turn couple or connect to the remote Cricket through a standard IP connection ("Cricket IP Link") (e.g., Ethernet, Homeplug, the gateway's proprietary Wifi network, etc.). The Cricket in turn implements the PanelConnect API, which responds to the request from the touchscreen core application, and performs the appropriate function using the proprietary panel interface. This interface uses either the wireless or wired proprietary protocol for the specific security panel and/or sensors.

Figure 15:
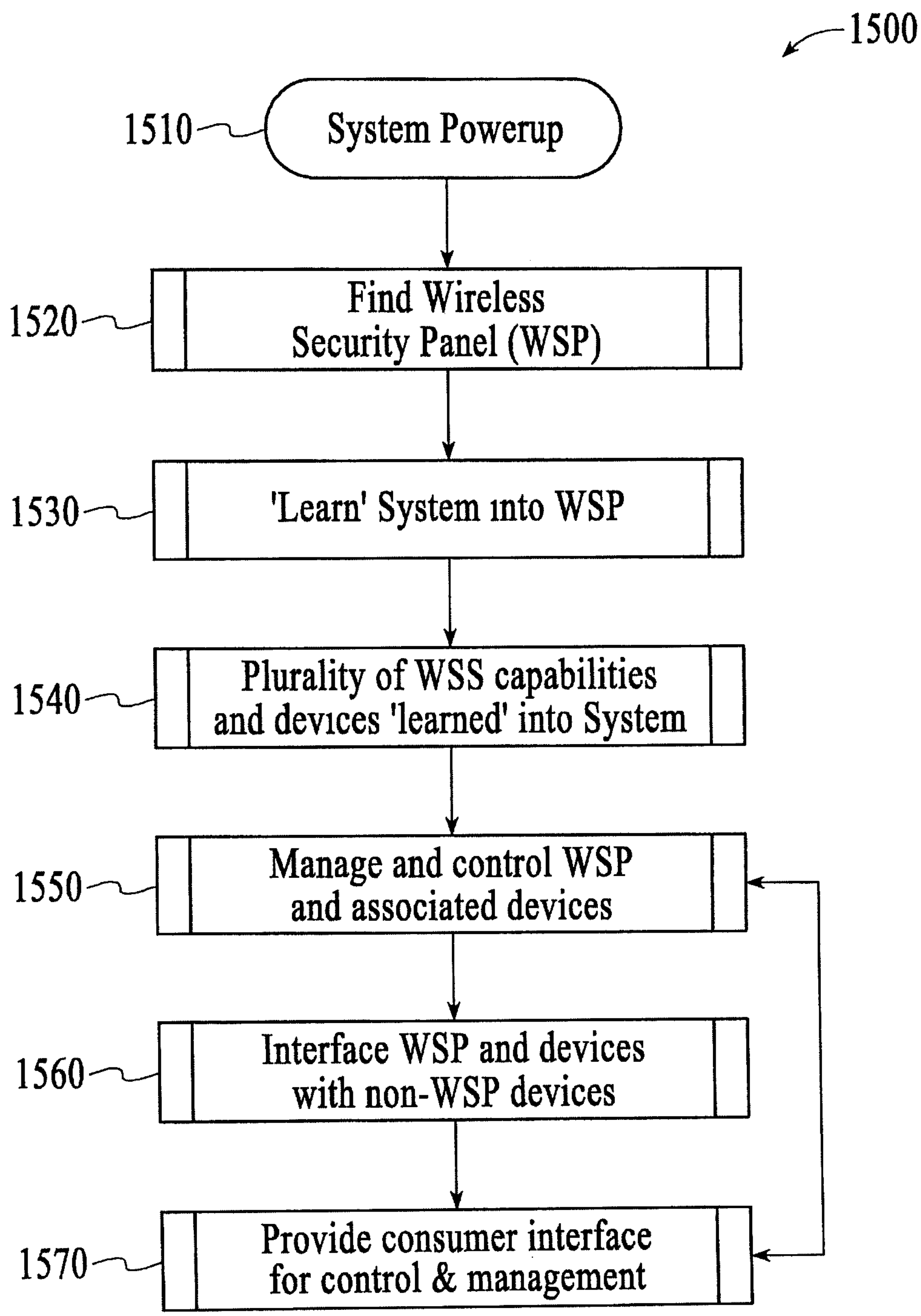
FIG. 15 is a flow diagram of a method of integrating an external control and management application system with an existing security system, under an embodiment.

FIG. 15 is a flow diagram of a method of integrating an external control and management application system with an existing security system, under an embodiment. Operations begin when the system is powered on 1510, involving at a minimum the power-on of the gateway device, and optionally the power-on of the connection between the gateway device and the remote servers. The gateway device initiates 1520 a software and RF sequence to locate the extant security system. The gateway and installer initiate and complete 1530 a sequence to 'learn' the gateway into the security system as a valid and authorized control device. The gateway initiates 1540 another software and RF sequence of instructions to discover and learn the existence and capabilities of existing RF devices within the extant security system, and store this information in the system. These operations under the system of an embodiment are described in further detail below.

Unlike conventional systems that extend an existing security system, the system of an embodiment operates utilizing the proprietary wireless protocols of the security system manufacturer. In one illustrative embodiment, the gateway is an embedded computer with an IP LAN and WAN connection and a plurality of RF transceivers and software protocol modules capable of communicating with a plurality of security systems each with a potentially different RF and software protocol interface. After the gateway has completed the discovery and learning 1540 of sensors and has been integrated 1550 as a virtual control device in the extant security system, the system becomes operational. Thus, the security system and associated sensors are presented 1550 as accessible devices to a potential plurality of user interface subsystems.

The system of an embodiment integrates 1560 the functionality of the extant security system with other non-security devices including but not limited to IP cameras, touchscreens, lighting controls, door locking mechanisms, which may be controlled via RF, wired, or powerline-based networking mechanisms supported by the gateway or servers.

The system of an embodiment provides a user interface subsystem 1570 enabling a user to monitor, manage, and control the system and associated sensors and security systems. In an embodiment of the system, a user interface subsystem is an HTML/WL/Javascript/Java/AJAX/Flash presentation of a monitoring and control application, enabling users to view the state of all sensors and controllers in the extant security system from a web browser or equivalent operating on a computer, PDA, mobile phone, or other consumer device.

In another illustrative embodiment of the system described herein, a user interface subsystem is an HTML/XML/Javascript/Java/AJAX presentation of a monitoring and control application, enabling users to combine the monitoring and control of the extant security system and sensors with the monitoring and control of non-security devices including but not limited to IP cameras, touchscreens, lighting controls, door locking mechanisms.

In another illustrative embodiment of the system described herein, a user interface subsystem is a mobile phone application enabling users to monitor and control the extant security system as well as other non-security devices.

In another illustrative embodiment of the system described herein, a user interface subsystem is an application running on a keypad or touchscreen device enabling users to monitor and control the extant security system as well as other non-security devices.

In another illustrative embodiment of the system described herein, a user interface subsystem is an application operating on a TV or set-top box connected to a TV enabling users to monitor and control the extant security system as well as other non-security devices.

Figure 16:
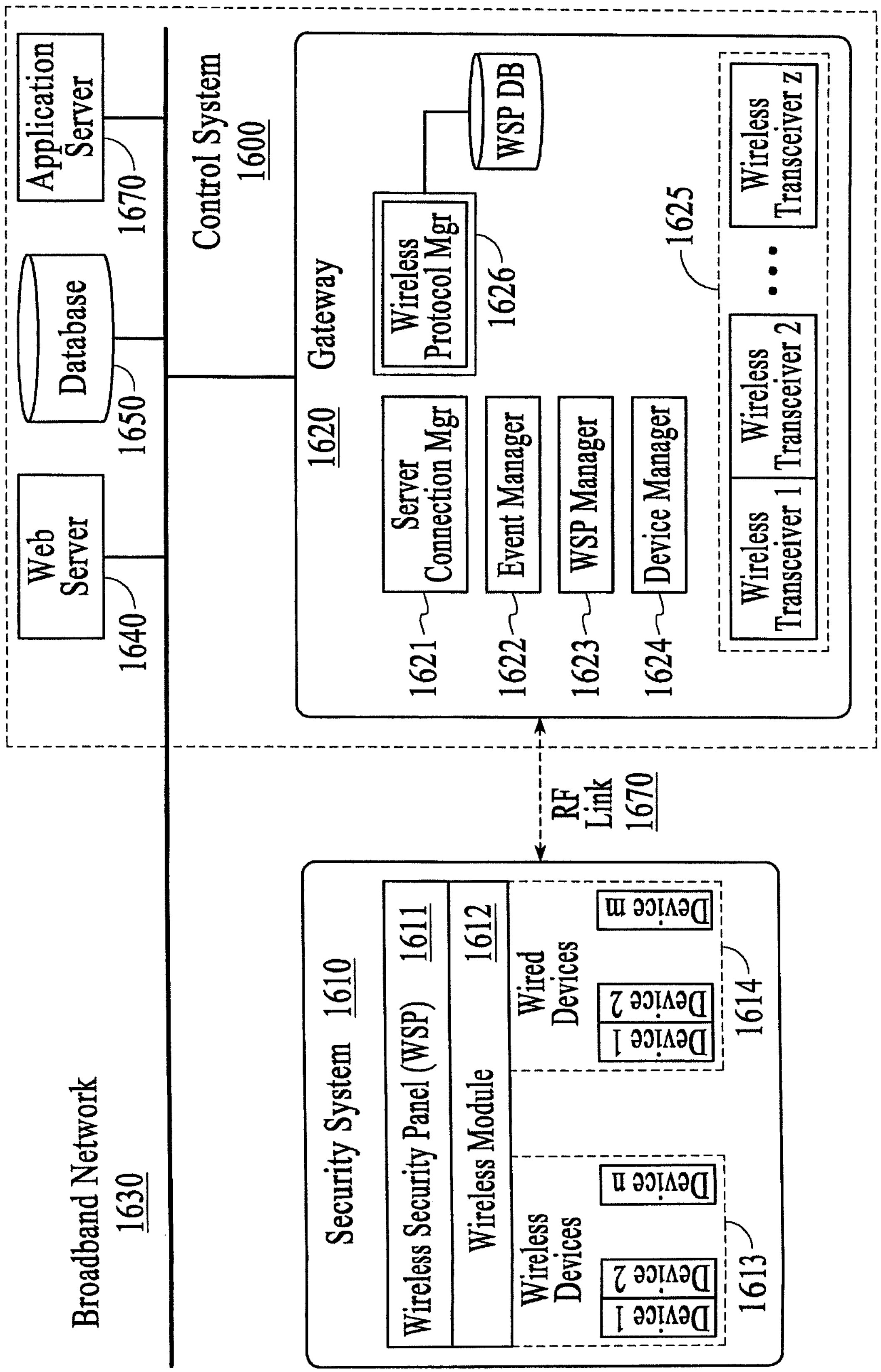
FIG. 16 is a block diagram of an integrated security system wirelessly interfacing to proprietary security systems, under an embodiment.

FIG. 16 is a block diagram of an integrated security system 1600 wirelessly interfacing to proprietary security systems, under an embodiment. A security system 1610 is coupled or connected to a Gateway 1620, and from Gateway 1620 coupled or connected to a plurality of information and content sources across a network 1630 including one or more web servers 1640, system databases 1650, and applications servers 1660. While in one embodiment network 1630 is the Internet, including the World Wide Web, those of skill in the art will appreciate that network 1630 may be any type of network, such as an intranet, an extranet, a virtual private network (VPN), a mobile network, or a non-TCP/IP based network.

Moreover, other elements of the system of an embodiment may be conventional, well-known elements that need not be explained in detail herein. For example, security system 1610 could be any type home or business security system, such devices including but not limited to a standalone RF home security system or a non-RF-capable wired home security system with an add-on RF interface module. In the integrated security system 1600 of this example, security system 1610 includes an RF-capable wireless security panel (WSP) 1611 that acts as the master controller for security system 1610. Well-known examples of such a WSP include the GE Security Concord, Networx, and Simon panels, the Honeywell Vista and Lynx panels, and similar panels from DSC and Napco, to name a few. A wireless module 1614 includes the RF hardware and protocol software necessary to enable communication with and control of a plurality of wireless devices 1613. WSP 1611 may also manage wired devices 1614 physically connected to WSP 1611 with an RS232 or RS485 or Ethernet connection or similar such wired interface.

In an implementation consistent with the systems and methods described herein, Gateway 1620 provides the interface between security system 1610 and LAN and/or WAN for purposes of remote control, monitoring, and management. Gateway 1620 communicates with an external web server 1640, database 1650, and application server 1660 over network 1630 (which may comprise WAN, LAN, or a combination thereof). In this example system, application logic, remote user interface functionality, as well as user state and account are managed by the combination of these remote servers. Gateway 1620 includes server connection manager 1621, a software interface module responsible for all server communication over network 1630. Event manager 1622 implements the main event loop for Gateway 1620, processing events received from device manager 1624 (communicating with non-security system devices including but not limited to IP cameras, wireless thermostats, or remote door locks). Event manager 1622 further processes events and control messages from and to security system 1610 by utilizing WSP manager 1623.

WSP manager 1623 and device manager 1624 both rely upon wireless protocol manager 1626 which receives and stores the proprietary or standards-based protocols required to support security system 1610 as well as any other devices interfacing with gateway 1620. WSP manager 1623 further utilizes the comprehensive protocols and interface algorithms for a plurality of security systems 1610 stored in the WSP DB client database associated with wireless protocol manager 1626. These various components implement the software logic and protocols necessary to communicate with and manager devices and security systems 1610. Wireless Transceiver hardware modules 1625 are then used to implement the physical RF communications link to such devices and security systems 1610. An illustrative wireless transceiver 1625 is the GE Security Dialog circuit board, implementing a 319.5MHz two-way RF transceiver module. In this example, RF Link 1670 represents the 319.5 MHz RF communication link, enabling gateway 1620 to monitor and control WSP 1611 and associated wireless and wired devices 1613 and 1614, respectively.

In one embodiment, server connection manager 1621 requests and receives a set of wireless protocols for a specific security system 1610 (an illustrative example being that of the GE Security Concord panel and sensors) and stores them in the WSP DB portion of the wireless protocol manager 1626. WSP manager 1623 then utilizes such protocols from wireless protocol manager 1626 to initiate the sequence of processes detailed in FIG. 15 and FIG. 16 for learning gateway 1620 into security system 1610 as an authorized control device. Once learned in, as described with reference to FIG. 16 (and above), event manager 1622 processes all events and messages detected by the combination of WSP manager 1623 and the GE Security wireless transceiver module 1625.

In another embodiment, gateway 1620 incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614. For example a wireless sensor from one manufacturer may be utilized to control a device using a different protocol from a different manufacturer.

In another embodiment, gateway 1620 incorporates a wired interface to security system 1610, and incorporates a plurality of wireless transceivers 1625 and associated protocols managed by wireless protocol manager 1626. In this embodiment events and control of multiple heterogeneous devices may be coordinated with WSP 1611, wireless devices 1613, and wired devices 1614.

Of course, while an illustrative embodiment of an architecture of the system of an embodiment is described in detail herein with respect to FIG. 16, one of skill in the art will understand that modifications to this architecture may be made without departing from the scope of the description presented herein. For example, the functionality described herein may be allocated differently between client and server, or amongst different server or processor-based components.

Likewise, the entire functionality of the gateway 1620 described herein could be integrated completely within an existing security system 1610. In such an embodiment, the architecture could be directly integrated with a security system 1610 in a manner consistent with the currently described embodiments.

Figure 17:
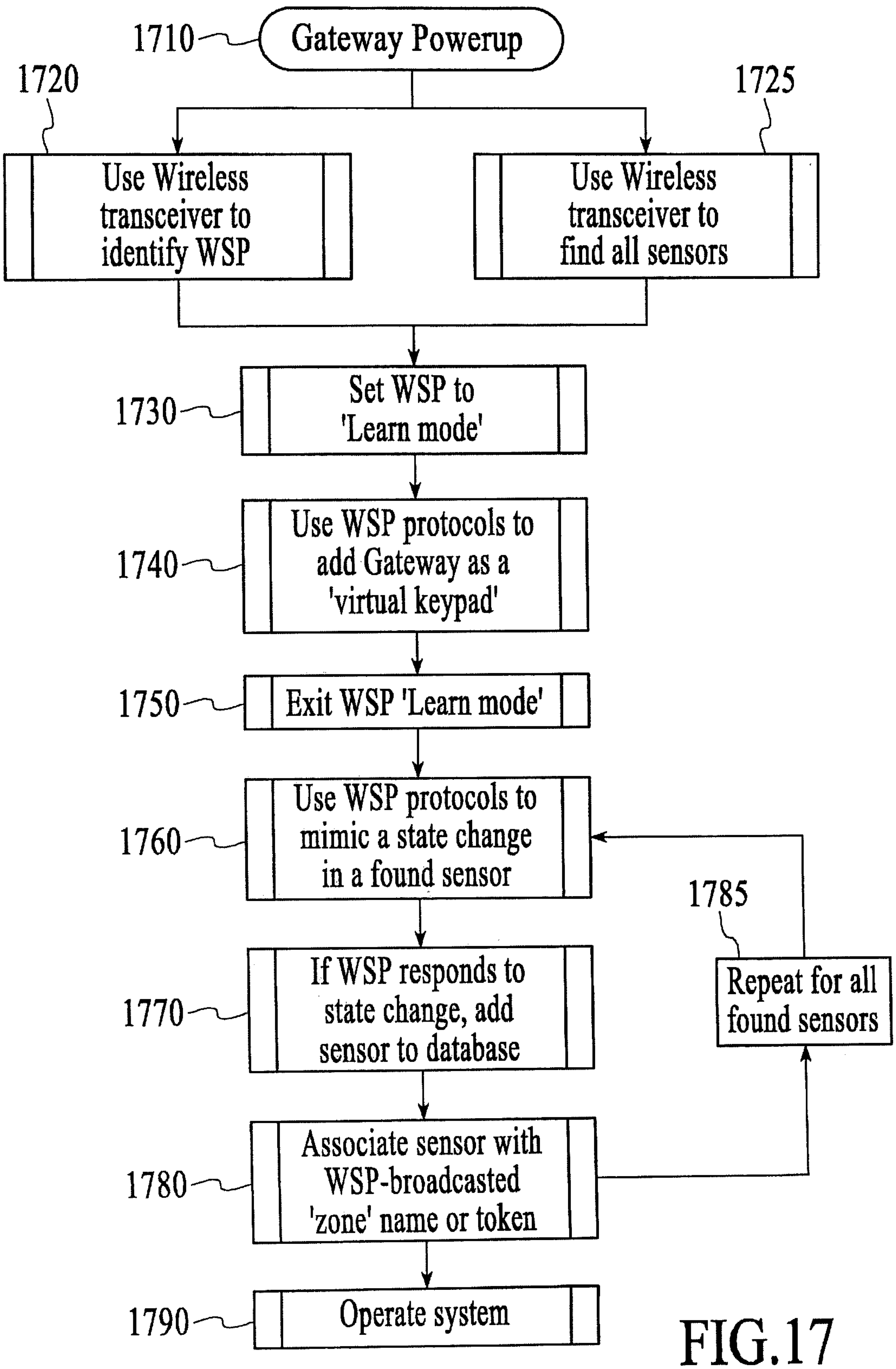
FIG. 17 is a flow diagram for wirelessly 'learning' the gateway into an existing security system and discovering extant sensors, under an embodiment.

FIG. 17 is a flow diagram for wirelessly 'learning' the Gateway into an existing security system and discovering extant sensors, under an embodiment. The learning interfaces gateway 1620 with security system 1610. Gateway 1620 powers up 1710 and initiates software sequences 1720 and 1725 to identify accessible WSPs 1611 and wireless devices 1613, respectively (e.g., one or more WSPs and/or devices within range of gateway 1620). Once identified, WSP 1611 is manually or automatically set into 'learn mode' 1730, and gateway 1620 utilizes available protocols to add 1740 itself as an authorized control device in security system 1610. Upon successful completion of this task, WSP 1611 is manually or automatically removed from 'learn mode' 1750.

Gateway 1620 utilizes the appropriate protocols to mimic 1760 the first identified device 1614. In this operation gateway 1620 identifies itself using the unique or pseudo-unique identifier of the first found device 1614, and sends an appropriate change of state message over RF Link 1670.

In the event that WSP 1611 responds to this change of state message, the device 1614 is then added 1770 to the system in database 1650. Gateway 1620 associates 1780 any other information (such as zone name or token-based identifier) with this device 1614 in database 1650, enabling gateway 1620, user interface modules, or any application to retrieve this associated information.

In the event that WSP 1611 does not respond to the change of state message, the device 1614 is not added 1770 to the system in database 1650, and this device 1614 is identified as not being a part of security system 1610 with a flag, and is either ignored or added as an independent device, at the discretion of the system provisioning rules. Operations hereunder repeat 1785 operations 1760, 1770, 1780 for all devices 1614 if applicable. Once all devices 1614 have been tested in this way, the system begins operation 1790.

In another embodiment, gateway 1620 utilizes a wired connection to WSP 1611, but also incorporates a wireless transceiver 1625 to communicate directly with devices 1614. In this embodiment, operations under 1720 above are removed, and operations under 1740 above are modified so the system of this embodiment utilizes wireline protocols to add itself as an authorized control device in security system 1610.

A description of an example embodiment follows in which the Gateway (FIG. 16, element 1620) is the iHub available from iControl Networks, Palo Alto, Calif., and described in detail herein. In this example the gateway is "automatically" installed with a security system.

The automatic security system installation begins with the assignment of an authorization key to components of the security system (e.g., gateway, kit including the gateway, etc.). The assignment of an authorization key is done in lieu of creating a user account. An installer later places the gateway in a user's premises along with the premises security system. The installer uses a computer to navigate to a web portal (e.g., integrated security system web interface), logs in to the portal, and enters the authorization key of the installed gateway into the web portal for authentication. Once authenticated, the gateway automatically discovers devices at the premises (e.g., sensors, cameras, light controls, etc.) and adds the discovered devices to the system or "network". The installer assigns names to the devices, and tests operation of the devices back to the server (e.g., did the door open, did the camera take a picture, etc.). The security device information is optionally pushed or otherwise propagated to a security panel and/or to the server network database. The installer finishes the installation, and instructs the end user on how to create an account, username, and password. At this time the user enters the authorization key which validates the account creation (uses a valid authorization key to associate the network with the user's account). New devices may subsequently be added to the security network in a variety of ways (e.g., user first enters a unique ID for each device/sensor and names it in the server, after which the gateway can automatically discover and configure the device).

A description of another example embodiment follows in which the security system (FIG. 16, element 1610) is a Dialog system and the WSP (FIG. 16, element 1611) is a SimonXT available from General Electric Security, and the Gateway (FIG. 16, element 1620) is the iHub available from iControl Networks, Palo Alto, Calif., and described in detail herein. Descriptions of the install process for the SimonXT and iHub are also provided below.

GE Security's Dialog network is one of the most widely deployed and tested wireless security systems in the world. The physical RF network is based on a 319.5 MHz unlicensed spectrum, with a bandwidth supporting up to 19 Kbps communications. Typical use of this bandwidth—even in conjunction with the integrated security system—is far less than that. Devices on this network can support either one-way communication (either a transmitter or a receiver) or two-way communication (a transceiver). Certain GE Simon, Simon XT, and Concord security control panels incorporate a two-way transceiver as a standard component. The gateway also incorporates the same two-way transceiver card. The physical link layer of the network is managed by the transceiver module hardware and firmware, while the coded payload bitstreams are made available to the application layer for processing.

Sensors in the Dialog network typically use a 60-bit protocol for communicating with the security panel transceiver, while security system keypads and the gateway use the encrypted 80-bit protocol. The Dialog network is configured for reliability, as well as low-power usage. Many devices are supervised, i.e. they are regularly monitored by the system 'master' (typically a GE security panel), while still maintaining excellent power usage characteristics. A typical door window sensor has a battery life in excess of 5-7 years.

The gateway has two modes of operation in the Dialog network: a first mode of operation is when the gateway is configured or operates as a 'slave' to the GE security panel; a second mode of operation is when the gateway is configured or operates as a 'master' to the system in the event a security panel is not present. In both configurations, the gateway has the ability to 'listen' to network traffic, enabling the gateway to continually keep track of the status of all devices in the system. Similarly, in both situations the gateway can address and control devices that support setting adjustments (such as the GE wireless thermostat).

In the configuration in which the gateway acts as a 'slave' to the security panel, the gateway is 'learned into' the system as a GE wireless keypad. In this mode of operation, the gateway emulates a security system keypad when managing the security panel, and can query the security panel for status and 'listen' to security panel events (such as alarm events). The gateway incorporates an RF Transceiver manufactured by GE Security, but is not so limited. This transceiver implements the Dialog protocols and handles all network message transmissions, receptions, and timing. As such, the physical, link, and protocol layers of the communications between the gateway and any GE device in the Dialog network are totally compliant with GE Security specifications.

At the application level, the gateway emulates the behavior of a GE wireless keypad utilizing the GE Security 80-bit encrypted protocol, and only supported protocols and network traffic are generated by the gateway. Extensions to the Dialog RF protocol of an embodiment enable full control and configuration of the panel, and iControl can both automate installation and sensor enrollment as well as direct configuration downloads for the panel under these protocol extensions.

As described above, the gateway participates in the GE Security network at the customer premises. Because the gateway has intelligence and a two-way transceiver, it can 'hear' all of the traffic on that network. The gateway makes use of the periodic sensor updates, state changes, and supervisory signals of the network to maintain a current state of the premises. This data is relayed to the integrated security system server (e.g., FIG. 2, element 260) and stored in the event repository for use by other server components. This usage of the GE Security RF network is completely non-invasive; there is no new data traffic created to support this activity. The gateway can directly (or indirectly through the Simon XT panel) control two-way devices on the network. For example, the gateway can direct a GE Security Thermostat to change its setting to 'Cool' from 'Off', as well as request an update on the current temperature of the room. The gateway performs these functions using the existing GE Dialog protocols, with little to no impact on the network; a gateway device control or data request takes only a few dozen bytes of data in a network that can support 19 Kbps.

By enrolling with the Simon XT as a wireless keypad, as described herein, the gateway includes data or information of all alarm events, as well as state changes relevant to the security panel. This information is transferred to the gateway as encrypted packets in the same way that the information is transferred to all other wireless keypads on the network.

Because of its status as an authorized keypad, the gateway can also initiate the same panel commands that a keypad can initiate. For example, the gateway can arm or disarm the panel using the standard Dialog protocol for this activity. Other than the monitoring of standard alarm events like other network keypads, the only incremental data traffic on the network as a result of the gateway is the infrequent remote arm/disarm events that the gateway initiates, or infrequent queries on the state of the panel.

The gateway is enrolled into the Simon XT panel as a 'slave' device which, in an embodiment, is a wireless keypad. This enables the gateway for all necessary functionality for operating the Simon XT system remotely, as well as combining the actions and information of non-security devices such as lighting or door locks with GE Security devices. The only resource taken up by the gateway in this scenario is one wireless zone (sensor ID).

The gateway of an embodiment supports three forms of sensor and panel enrollment/installation into the integrated security system, but is not limited to this number of enrollment/installation options. The enrollment/installation options of an embodiment include installer installation, kitting, and panel, each of which is described below.

Under the installer option, the installer enters the sensor IDs at time of installation into the integrated security system web portal or iScreen. This technique is supported in all configurations and installations.

Kits can be pre-provisioned using integrated security system provisioning applications when using the kitting option. At kitting time, multiple sensors are automatically associated with an account, and at install time there is no additional work required.

In the case where a panel is installed with sensors already enrolled (i.e. using the GE Simon XT enrollment process), the gateway has the capability to automatically extract the sensor information from the system and incorporate it into the user account on the integrated security system server.

The gateway and integrated security system of an embodiment uses an auto-learn process for sensor and panel enrollment in an embodiment. The deployment approach of an embodiment can use additional interfaces that GE Security is adding to the Simon XT panel. With these interfaces, the gateway has the capability to remotely enroll sensors in the panel automatically. The interfaces include, but are not limited to, the following: EnrollDevice(ID, type, name, zone, group); SetDeviceParameters(ID, type, Name, zone, group), GetDeviceParameters(zone); and RemoveDevice (zone).

The integrated security system incorporates these new interfaces into the system, providing the following install process. The install process can include integrated security system logistics to handle kitting and pre-provisioning. Pre-kitting and logistics can include a pre-provisioning kitting tool provided by integrated security system that enables a security system vendor or provider ("provider") to offer pre-packaged initial 'kits'. This is not required but is recommended for simplifying the install process. This example assumes a 'Basic' kit is preassembled and includes one (1) Simon XT, three (3) Door/window sensors, one (1) motion sensor, one (1) gateway, one (1) keyfob, two (2)

cameras, and ethernet cables. The kit also includes a sticker page with all Zones (1-24) and Names (full name list).

The provider uses the integrated security system kitting tool to assemble 'Basic' kit packages. The contents of different types of starter kits may be defined by the provider. At the distribution warehouse, a worker uses a bar code scanner to scan each sensor and the gateway as it is packed into the box. An ID label is created that is attached to the box. The scanning process automatically associates all the devices with one kit, and the new ID label is the unique identifier of the kit. These boxes are then sent to the provider for distribution to installer warehouses. Individual sensors, cameras, etc. are also sent to the provider installer warehouse. Each is labeled with its own barcode/ID.

An installation and enrollment procedure of a security system including a gateway is described below as one example of the installation process.

1. Order and Physical Install Process
   a. Once an order is generated in the iControl system, an account is created and an install ticket is created and sent electronically to the provider for assignment to an installer.
   b. The assigned installer picks up his/her ticket(s) and fills his/her truck with Basic and/or Advanced starter kits. He/she also keeps a stock of individual sensors, cameras, iHubs, Simon XTs, etc. Optionally, the installer can also stock homeplug adapters for problematic installations.
   c. The installer arrives at the address on the ticket, and pulls out the Basic kit. The installer determines sensor locations from a tour of the premises and discussion with the homeowner. At this point assume the homeowner requests additional equipment including an extra camera, two (2) additional door/window sensors, one (1) glass break detector, and one (1) smoke detector.
   d. Installer mounts SimonXT in the kitchen or other location in the home as directed by the homeowner, and routes the phone line to Simon XT if available. GPRS and Phone numbers pre-programmed in SimonXT to point to the provider Central Monitoring Station (CMS).
   e. Installer places gateway in the home in the vicinity of a router and cable modem. Installer installs an ethernet line from gateway to router and plugs gateway into an electrical outlet.
2. Associate and Enroll gateway into SimonXT
   a. Installer uses either his/her own laptop plugged into router, or homeowners computer to go to the integrated security system web interface and log in with installer ID/pass.
   b. Installer enters ticket number into admin interface, and clicks 'New Install' button. Screen prompts installer for kit ID (on box's barcode label).
   c. Installer clicks 'Add SimonXT'. Instructions prompt installer to put Simon XT into install mode, and add gateway as a wireless keypad. It is noted that this step is for security only and can be automated in an embodiment.
   d. Installer enters the installer code into the Simon XT. Installer Learns 'gateway' into the panel as a wireless keypad as a group 1 device.
   e. Installer goes back to Web portal, and clicks the 'Finished Adding SimonXT' button.
3. Enroll Sensors into SimonXT via iControl
   a. All devices in the Basic kit are already associated with the user's account.
   b. For additional devices, Installer clicks 'Add Device' and adds the additional camera to the user's account (by typing in the camera ID/Serial #).
   c. Installer clicks 'Add Device' and adds other sensors (two (2) door/window sensors, one (1) glass break sensor, and one (1) smoke sensor) to the account (e.g., by typing in IDs).
   d. As part of Add Device, Installer assigns zone, name, and group to the sensor. Installer puts appropriate Zone and Name sticker on the sensor temporarily.
   e. All sensor information for the account is pushed or otherwise propagated to the iConnect server, and is available to propagate to CMS automation software through the CMS application programming interface (API).
   f. Web interface displays 'Installing Sensors in System . . . . ' and automatically adds all of the sensors to the Simon XT panel through the GE RF link.
   g. Web interface displays 'Done Installing'→all sensors show green.
4. Place and Tests Sensors in Home
   a. Installer physically mounts each sensor in its desired location, and removes the stickers.
   b. Installer physically mounts WiFi cameras in their location and plugs into AC power. Optional fishing of low voltage wire through wall to remove dangling wires. Camera transformer is still plugged into outlet but wire is now inside the wall.
   c. Installer goes to Web interface and is prompted for automatic camera install. Each camera is provisioned as a private, encrypted Wifi device on the gateway secured sandbox network, and firewall NAT traversal is initiated. Upon completion the customer is prompted to test the security system.
   d. Installer selects the 'Test System' button on the web portal—the SimonXT is put into Test mode by the gateway over GE RF.
   e. Installer manually tests the operation of each sensor, receiving an audible confirmation from SimonXT.
   f. gateway sends test data directly to CMS over broadband link, as well as storing the test data in the user's account for subsequent report generation.
   g. Installer exits test mode from the Web portal.
5. Installer instructs customer on use of the Simon XT, and shows customer how to log into the iControl web and mobile portals. Customer creates a username/password at this time.
6. Installer instructs customer how to change Simon XT user code from the Web interface. Customer changes user code which is pushed to SimonXT automatically over GE RF.

An installation and enrollment procedure of a security system including a gateway is described below as an alternative example of the installation process. This installation process is for use for enrolling sensors into the SimonXT and integrated security system and is compatible with all existing GE Simon panels.

The integrated security system supports all pre-kitting functionality described in the installation process above. However, for the purpose of the following example, no kitting is used.

1. Order and Physical Install Process
   a. Once an order is generated in the iControl system, an account is created and an install ticket is created and sent electronically to the security system provider for assignment to an installer.
   b. The assigned installer picks up his/her ticket(s) and fills his/her truck with individual sensors, cameras, iHubs, Simon XTs, etc. Optionally, the installer can also stock homeplug adapters for problematic installations.

c. The installer arrives at the address on the ticket, and analyzes the house and talks with the homeowner to determine sensor locations. At this point assume the homeowner requests three (3) cameras, five (5) door/window sensors, one (1) glass break detector, one (1) smoke detector, and one (1) keyfob.

d. Installer mounts SimonXT in the kitchen or other location in the home. The installer routes a phone line to Simon XT if available. GPRS and Phone numbers are pre-programmed in SimonXT to point to the provider CMS.

e. Installer places gateway in home in the vicinity of a router and cable modem, and installs an ethernet line from gateway to the router, and plugs gateway into an electrical outlet.

2. Associate and Enroll gateway into SimonXT a. Installer uses either his/her own laptop plugged into router, or homeowners computer to go to the integrated security system web interface and log in with an installer ID/pass.

b. Installer enters ticket number into admin interface, and clicks 'New Install' button. Screen prompts installer to add devices.

c. Installer types in ID of gateway, and it is associated with the user's account.

d. Installer clicks 'Add Device' and adds the cameras to the user's account (by typing in the camera ID/Serial #).

e. Installer clicks 'Add SimonXT'. Instructions prompt installer to put Simon XT into install mode, and add gateway as a wireless keypad.

f. Installer goes to Simon XT and enters the installer code into the Simon XT. Learns 'gateway' into the panel as a wireless keypad as group 1 type sensor.

g. Installer returns to Web portal, and clicks the 'Finished Adding SimonXT' button.

h. Gateway now is alerted to all subsequent installs over the security system RF.

3. Enroll Sensors into SimonXT via iControl a. Installer clicks 'Add Simon XT Sensors'—Displays instructions for adding sensors to Simon XT.

b. Installer goes to Simon XT and uses Simon XT install process to add each sensor, assigning zone, name, group. These assignments are recorded for later use.

c. The gateway automatically detects each sensor addition and adds the new sensor to the integrated security system.

d. Installer exits install mode on the Simon XT, and returns to the Web portal.

e. Installer clicks 'Done Adding Devices'.

f. Installer enters zone/sensor naming from recorded notes into integrated security system to associate sensors to friendly names.

g. All sensor information for the account is pushed to the iConnect server, and is available to propagate to CMS automation software through the CMS API.

4. Place and Tests Sensors in Home a. Installer physically mounts each sensor in its desired location.

b. Installer physically mounts Wifi cameras in their location and plugs into AC power. Optional fishing of low voltage wire through wall to remove dangling wires. Camera transformer is still plugged into outlet but wire is now inside the wall.

c. Installer puts SimonXT into Test mode from the keypad.

d. Installer manually tests the operation of each sensor, receiving an audible confirmation from SimonXT.

e. Installer exits test mode from the Simon XT keypad.

f. Installer returns to web interface and is prompted to automatically set up cameras. After waiting for completion cameras are now provisioned and operational.

5. Installer instructs customer on use of the Simon XT, and shows customer how to log into the integrated security system web and mobile portals. Customer creates a username/password at this time.

6. Customer and Installer observe that all sensors/cameras are green.

7. Installer instructs customer how to change Simon XT user code from the keypad. Customer changes user code and stores in SimonXT.

8. The first time the customer uses the web portal to Arm/Disarm system the web interface prompts the customer for the user code, which is then stored securely on the server. In the event the user code is changed on the panel the web interface once again prompts the customer.

The panel of an embodiment can be programmed remotely. The CMS pushes new programming to SimonXT over a telephone or GPRS link. Optionally, iControl and GE provide a broadband link or coupling to the gateway and then a link from the gateway to the Simon XT over GE RF.

In addition to the configurations described above, the gateway of an embodiment supports takeover configurations in which it is introduced or added into a legacy security system. A description of example takeover configurations follow in which the security system (FIG. 2, element 210) is a Dialog system and the WSP (FIG. 2, element 211) is a GE Concord panel (e.g., equipped with POTS, GE RF, and Superbus 2000 RS485 interface (in the case of a Lynx takeover the Simon XT is used) available from General Electric Security. The gateway (FIG. 2, element 220) in the takeover configurations is an iHub (e.g., equipped with built-in 802.11b/g router, Ethernet Hub, GSM/GPRS card, RS485 inteface, and iControl Honeywell-compatible RF card) available from iControl Networks, Palo Alto, Calif. While components of particular manufacturers are used in this example, the embodiments are not limited to these components or to components from these vendors.

The security system can optionally include RF wireless sensors (e.g., GE wireless sensors utilizing the GE Dialog RF technology), IP cameras, a GE-iControl Touchscreen (the touchscreen is assumed to be an optional component in the configurations described herein, and is thus treated separately from the iHub; in systems in which the touchscreen is a component of the base security package, the integrated iScreen (available from iControl Networks, Palo Alto, Calif.) can be used to combine iHub technology with the touchscreen in a single unit), and Z-Wave devices to name a few.

The takeover configurations described below assume takeover by a "new" system of an embodiment of a security system provided by another third party vendor, referred to herein as an "original" or "legacy" system. Generally, the takeover begins with removal of the control panel and keypad of the legacy system. A GE Concord panel is installed to replace the control panel of the legacy system along with an iHub with GPRS Modem. The legacy system sensors are then connected or wired to the Concord panel, and a GE keypad or touchscreen is installed to replace the control panel of the legacy system. The iHub includes the iControl RF card, which is compatible with the legacy system. The iHub finds and manages the wireless sensors of the legacy system, and learns the sensors into the Concord by emulating the corresponding GE sensors. The iHub effectively acts as a relay for legacy wireless sensors.

Once takeover is complete, the new security system provides a homogeneous system that removes the compromises inherent in taking over or replacing a legacy system. For example, the new system provides a modern touchscreen that may include additional functionality, new services, and supports integration of sensors from various manufacturers. Furthermore, lower support costs can be realized because call centers, installers, etc. are only required to support one architecture. Additionally, there is minimal install cost because only the panel is required to be replaced as a result of the configuration flexibility offered by the iHub.

The system takeover configurations described below include but are not limited to a dedicated wireless configuration, a dedicated wireless configuration that includes a touchscreen, and a fished Ethernet configuration. Each of these configurations is described in detail below.

Figure 18:
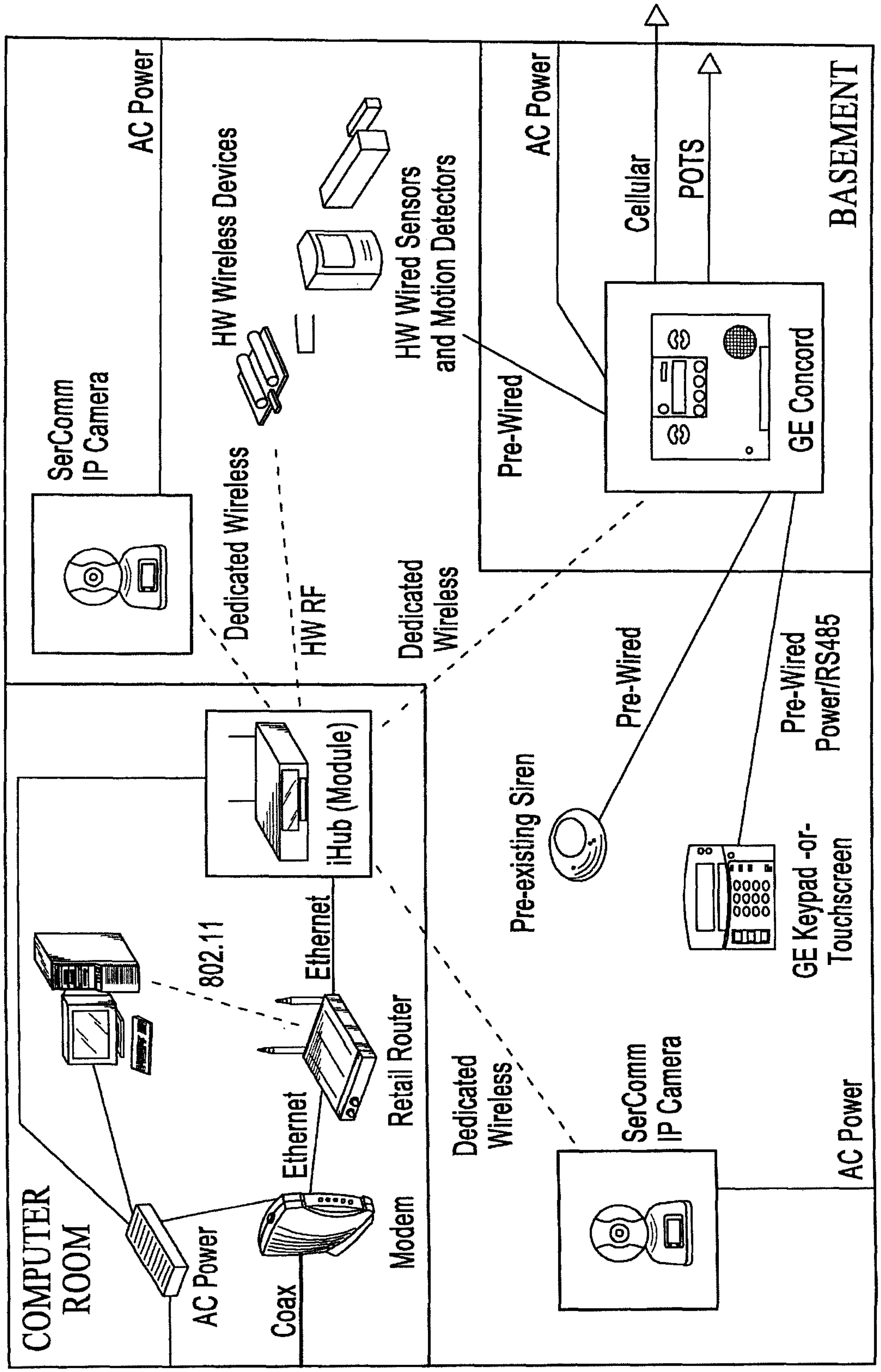
FIG. 18 is a block diagram of a security system in which the legacy panel is replaced with a wireless security panel wirelessly coupled to a gateway, under an embodiment.

FIG. 18 is a block diagram of a security system in which the legacy panel is replaced with a GE Concord panel wirelessly coupled to an iHub, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

Figure 19:
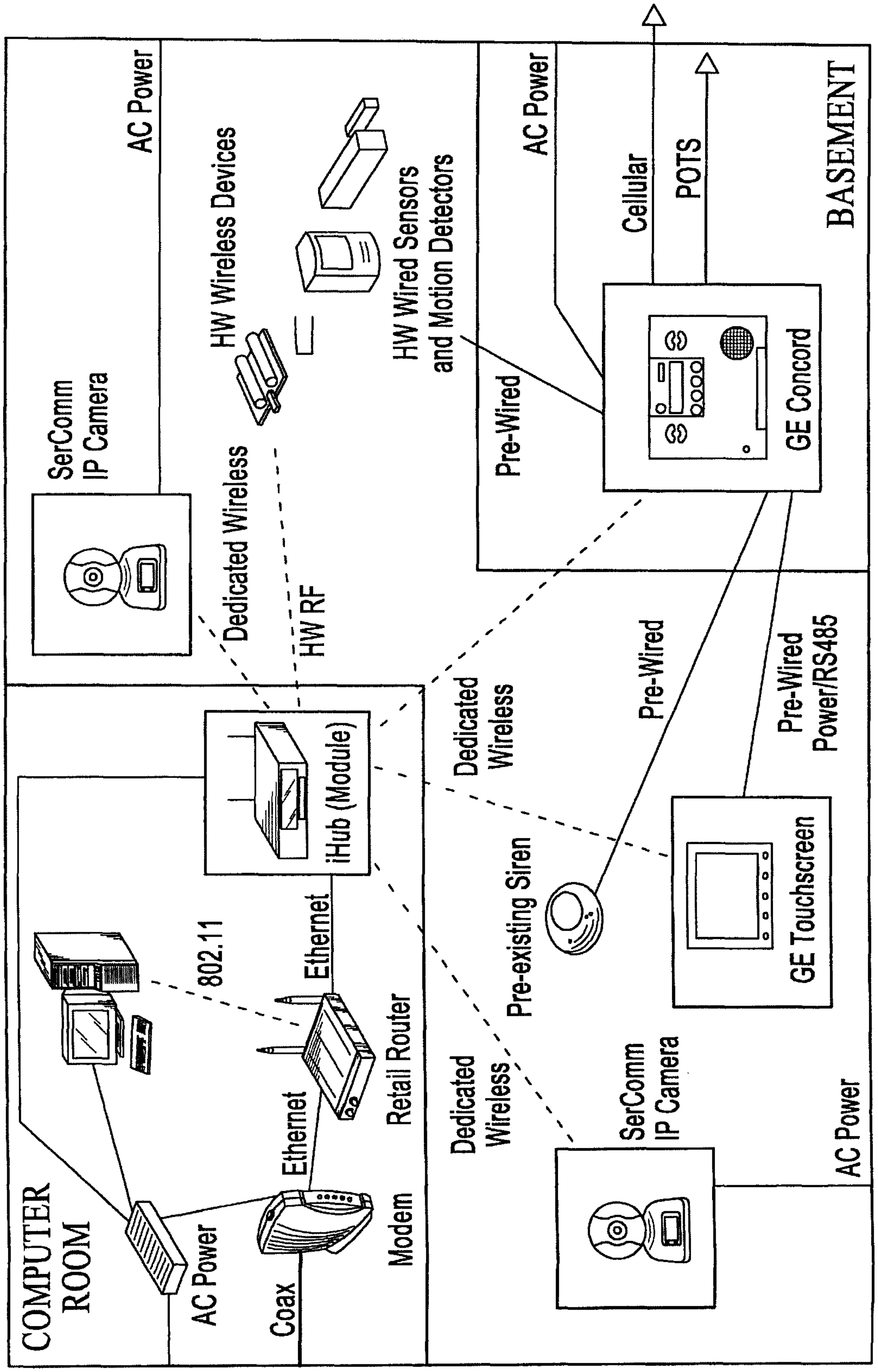
FIG. 19 is a block diagram of a security system in which the legacy panel is replaced with a wireless security panel wirelessly coupled to a gateway, and a touchscreen, under an alternative embodiment.

FIG. 19 is a block diagram of a security system in which the legacy panel is replaced with a GE Concord panel wirelessly coupled to an iHub, and a GE-iControl Touchscreen, under an embodiment. All existing wired and RF sensors remain in place. The iHub is located near the Concord panel, and communicates with the panel via the 802.11 link, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The GE-iControl Touchscreen can be used with either of an 802.11 connection or Ethernet connection with the iHub. Because the takeover involves a GE Concord panel (or Simon XT), the touchscreen is always an option. No extra wiring is required for the touchscreen as it can use the 4-wire set from the replaced keypad of the legacy system. This provides power, battery backup (through Concord), and data link (RS485 Superbus 2000) between Concord and touchscreen. The touchscreen receives its broadband connectivity through the dedicated 802.11 link to the iHub.

Figure 20:
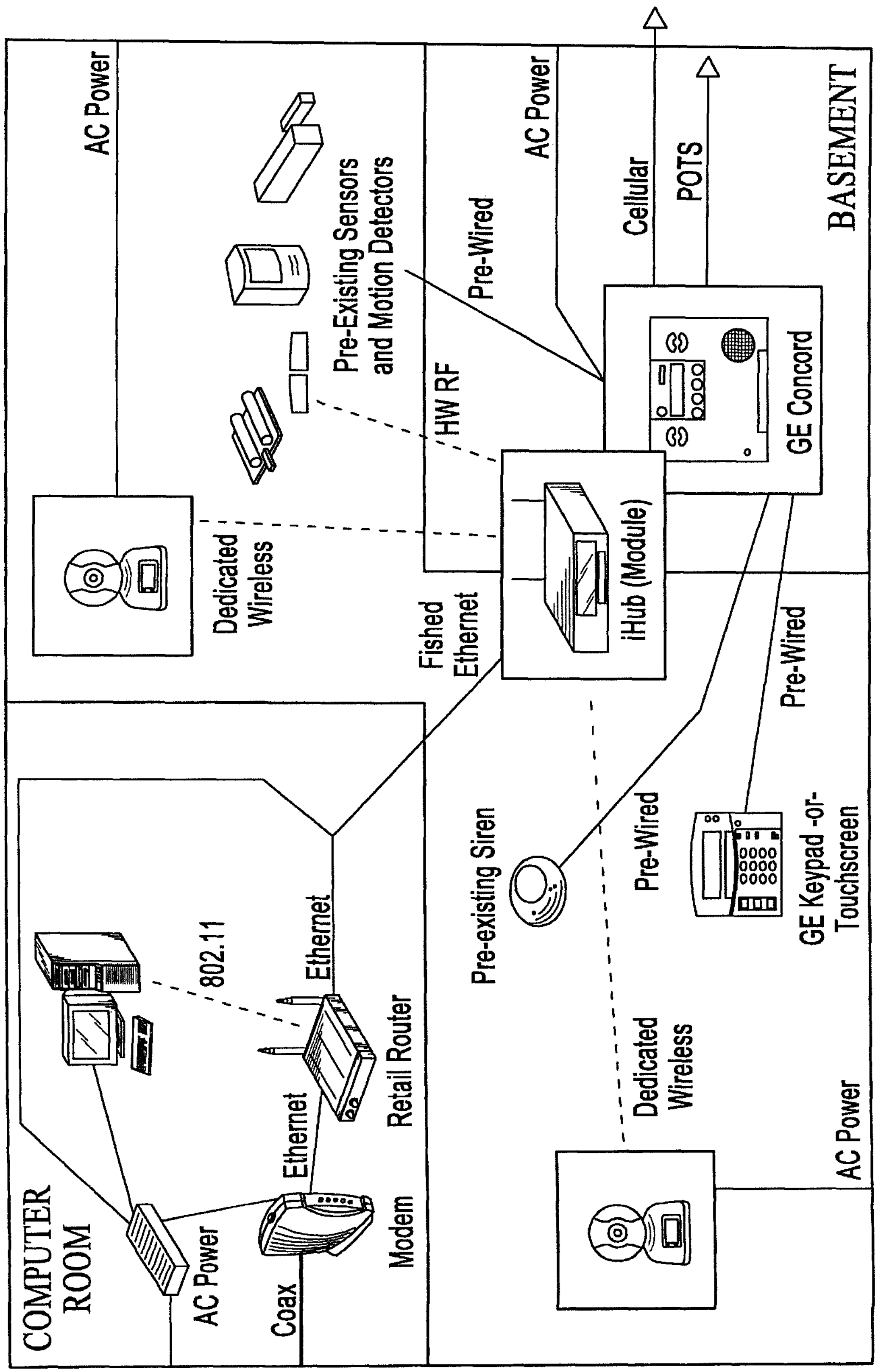
FIG. 20 is a block diagram of a security system in which the legacy panel is replaced with a wireless security panel connected to a gateway via an Ethernet coupling, under another alternative embodiment.

FIG. 20 is a block diagram of a security system in which the legacy panel is replaced with a GE Concord panel connected to an iHub via an Ethernet coupling, under an embodiment. All existing wired and RF sensors remain in place. The iHub is located near the Concord panel, and wired to the panel using a 4-wire SUperbus 2000 (RS485) interface, but is not so limited. The iHub manages cameras through a built-in 802.11 router. The iHub listens to the existing RF HW sensors, and relays sensor information to the Concord panel (emulating the equivalent GE sensor). The wired sensors of the legacy system are connected to the wired zones on the control panel.

The takeover installation process is similar to the installation process described above, except the control panel of the legacy system is replaced; therefore, only the differences with the installation described above are provided here. The takeover approach of an embodiment uses the existing RS485 control interfaces that GE Security and iControl support with the iHub, touchscreen, and Concord panel. With these interfaces, the iHub is capable of automatically enrolling sensors in the panel. The exception is the leverage of an iControl RF card compatible with legacy systems to 'takeover' existing RF sensors. A description of the takeover installation process follows.

During the installation process, the iHub uses an RF Takeover Card to automatically extract all sensor IDs, zones, and names from the legacy panel. The installer removes connections at the legacy panel from hardwired wired sensors and labels each with the zone. The installer pulls the legacy panel and replaces it with the GE Concord panel. The installer also pulls the existing legacy keypad and replaces it with either a GE keypad or a GE-iControl touchscreen. The installer connects legacy hardwired sensors to appropriate wired zone (from labels) on the Concord. The installer connects the iHub to the local network and connects the iHub RS485 interface to the Concord panel. The iHub automatically 'enrolls' legacy RF sensors into the Concord panel as GE sensors (maps IDs), and pushes or otherwise propagates other information gathered from HW panel (zone, name, group). The installer performs a test of all sensors back to CMS. In operation, the iHub relays legacy sensor data to the Concord panel, emulating equivalent GE sensor behavior and protocols.

The areas of the installation process particular to the legacy takeover include how the iHub extracts sensor info from the legacy panel and how the iHub automatically enrolls legacy RF sensors and populates Concord with wired zone information. Each of these areas is described below.

In having the iHub extract sensor information from the legacy panel, the installer 'enrolls' iHub into the legacy panel as a wireless keypad (use install code and house ID—available from panel). The iHub legacy RF Takeover Card is a compatible legacy RF transceiver. The installer uses the web portal to place iHub into 'Takeover Mode', and the web portal the automatically instructs the iHub to begin extraction. The iHub queries the panel over the RF link (to get all zone information for all sensors, wired and RF). The iHub then stores the legacy sensor information received during the queries on the iConnect server.

The iHub also automatically enrolls legacy RF sensors and populates Concord with wired zone information. In so doing, the installer selects 'Enroll legacy Sensors into Concord' (next step in 'Takeover' process on web portal). The iHub automatically queries the iConnect server, and downloads legacy sensor information previously extracted. The downloaded information includes an ID mapping from legacy ID to 'spoofed' GE ID. This mapping is stored on the server as part of the sensor information (e.g., the iConnect server knows that the sensor is a legacy sensor acting in GE mode). The iHub instructs Concord to go into install mode, and sends appropriate Superbus 2000 commands for sensor learning to the panel. For each sensor, the 'spoofed' GE ID is loaded, and zone, name, and group are set based on information extracted from legacy panel. Upon completion, the iHub notifies the server, and the web portal is updated to reflect next phase of Takeover (e.g., 'Test Sensors').

Sensors are tested in the same manner as described above. When a HW sensor is triggered, the signal is captured by the iHub legacy RF Takeover Card, translated to the equivalent GE RF sensor signal, and pushed to the panel as a sensor event on the SuperBus 2000 wires.

In support of remote programming of the panel, CMS pushes new programming to Concord over a phone line, or to the iConnect CMS/Alarm Server API, which in turn pushes the programming to the iHub. The iHub uses the Concord Superbus 2000 RS485 link to push the programming to the Concord panel.

Figure 21:
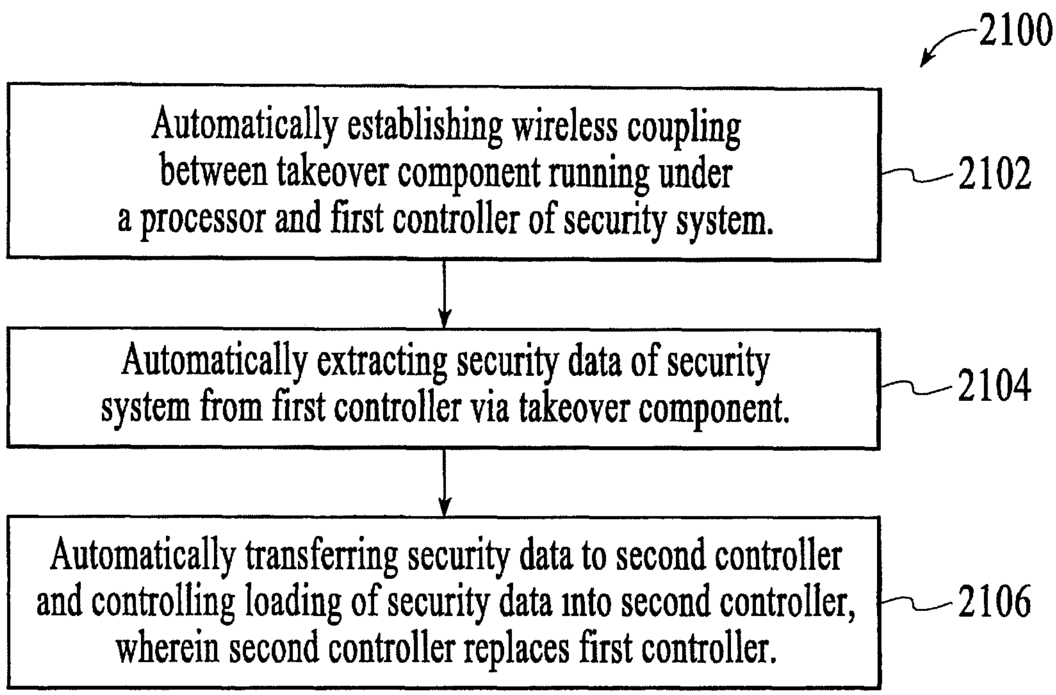
FIG. 21 is a flow diagram for automatic takeover of a security system, under an embodiment.

FIG. 21 is a flow diagram for automatic takeover 2100 of a security system, under an embodiment. Automatic takeover includes establishing 2102 a wireless coupling between a takeover component running under a processor and a first controller of a security system installed at a first location. The security system includes some number of security system components coupled to the first controller. The automatic takeover includes automatically extracting 2104 security data of the security system from the first controller via the takeover component. The automatic takeover includes automatically transferring 2106 the security data to a second controller and controlling loading of the security data into the second controller. The second controller is coupled to the security system components and replaces the first controller.

Figure 22:
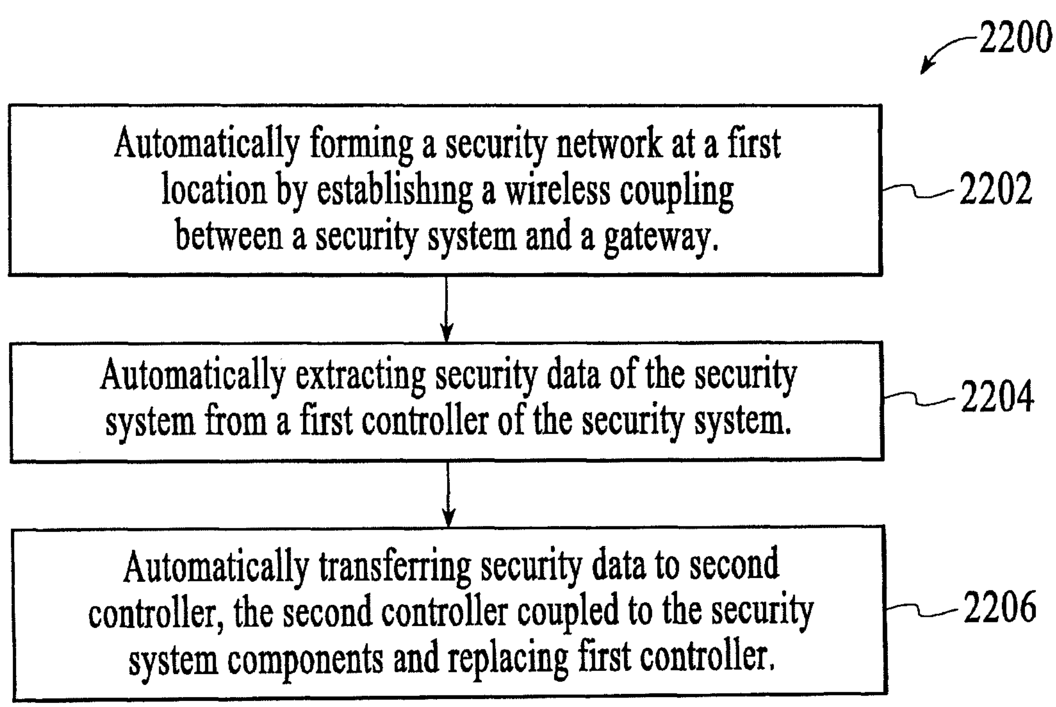
FIG. 22 is a flow diagram for automatic takeover of a security system, under an alternative embodiment.

FIG. 22 is a flow diagram for automatic takeover 2200 of a security system, under an alternative embodiment. Automatic takeover includes automatically forming 2202 a security network at a first location by establishing a wireless coupling between a security system and a gateway. The gateway of an embodiment includes a takeover component. The security system of an embodiment includes security system components. The automatic takeover includes automatically extracting 2204 security data of the security system from a first controller of the security system. The automatic takeover includes automatically transferring 2206 the security data to a second controller. The second controller of an embodiment is coupled to the security system components and replaces the first controller.

Components of the gateway of the integrated security system described herein control discovery, installation and configuration of both wired and wireless IP devices (e.g., cameras, etc.) coupled or connected to the system, as described herein with reference to FIGS. 1-4, as well as management of video routing using a video routing module or engine. The video routing engine initiates communication paths for the transfer of video from a streaming source device to a requesting client device, and delivers seamless video streams to the user via the communication paths using one or more of UPnP port-forwarding, relay server routing and STUN/TURN peer-to-peer routing, each of which is described below.

By way of reference, conventional video cameras have the ability to stream digital video in a variety of formats and over a variety of networks. Internet protocol (IP) video cameras, which include video cameras using an IP transport network (e.g., Ethernet, WiFi (IEEE 802.11 standards), etc.) are prevalent and increasingly being utilized in home monitoring and security system applications. With the proliferation of the internet, Ethernet and WiFi local area networks (LANs) and advanced wide area networks (WANs) that offer high bandwidth, low latency connections (broadband), as well as more advanced wireless WAN data networks (e.g. GPRS or CDMA 1×RTT), there increasingly exists the networking capability to extend traditional security systems to offer IP-based video. However, a fundamental reason for such IP video in a security system is to enable a user or security provider to monitor live or otherwise streamed video from outside the host premises (and the associated LAN).

The conventional solution to this problem has involved a technique known as 'port fowarding', whereby a 'port' on the LAN's router/firewall is assigned to the specific LAN IP address for an IP camera, or a proxy to that camera. Once a port has been 'forwarded' in this manner, a computer external to the LAN can address the LAN's router directly, and request access to that port. This access request is then forwarded by the router directly to the IP address specified, the IP camera or proxy. In this way an external device can directly access an IP camera within the LAN and view or control the streamed video.

The issues with this conventional approach include the following: port forwarding is highly technical and most users do not know how/why to do it; automatic port forwarding is difficult and problematic using emerging standards like UPnP; the camera IP address is often reset in response to a power outage/router reboot event; there are many different routers with different ways/capabilities for port forwarding. In short, although port forwarding can work, it is frequently less than adequate to support a broadly deployed security solution utilizing IP cameras.

Another approach to accessing streaming video externally to a LAN utilizes peer-to-peer networking technology. So-called peer-to-peer networks, which includes networks in which a device or client is connected directly to another device or client, typically over a Wide Area Network (WAN) and without a persistent server connection, are increasingly common. In addition to being used for the sharing of files between computers (e.g., Napster and KaZaa), peer-to-peer networks have also been more recently utilized to facilitate direct audio and media streaming in applications such as Skype. In these cases, the peer-to-peer communications have been utilized to enable telephony-style voice communications and video conferencing between two computers, each enabled with an IP-based microphone, speaker, and video camera. A fundamental reason for adopting such peer-to-peer technology is the ability to transparently 'punch through' LAN firewalls to enable external access to the streaming voice and video content, and to do so in a way that scales to tens of millions of users without creating an untenable server load.

A limitation of the conventional peer-to-peer video transport lies in the personal computer (PC) -centric nature of the solution. Each of the conventional solutions uses a highly capable PC connected to the video camera, with the PC providing the advanced software functionality required to initiate and manage the peer-to-peer connection with the remote client. A typical security or remote home monitoring system requires multiple cameras, each with its own unique IP address, and only a limited amount of processing capability in each camera such that the conventional PC-centric approach cannot easily solve the need. Instead of a typical PC-centric architecture with three components (a "3-way IP Video System") that include a computer device with video camera, a mediating server, and a PC client with video display capability, the conventional security system adds a plurality of fourth components that are standalone IP video cameras (requiring a "4-way IP Video System"), another less-than-ideal solution.

In accordance with the embodiments described herein, IP camera management systems and methods are provided that enable a consumer or security provider to easily and automatically configure and manage IP cameras located at a customer premise. Using this system IP camera management may be extended to remote control and monitoring from outside the firewall and router of the customer premise.

With reference to FIGS. 5 and 6, the system includes a gateway 253 having a video routing component so that the gateway 253 can manage and control, or assist in management and control, or video routing. The system also includes one or more cameras (e.g., WiFi IP camera 254, Ethernet IP camera 255, etc.) that communicate over the LAN 250 using an IP format, as well as a connection management server 210 located outside the premise firewall 252 and connected to the gateway 253 by a Wide Area Network (WAN) 200. The system further includes one or more devices 220, 230, 240 located outside the premise and behind other firewalls 221, 231, 241 and connected to the WAN 200. The other devices 220, 230, 240 are configured to access video or audio content from the IP cameras within the premise, as described above.

Alternatively, with reference to FIGS. 9 and 10, the system includes a touchscreen 902 or 1002 having a video routing component so that the touchscreen 902 or 1002 can manage and control, or assist in management and control, or video routing. The system also includes one or more cameras (e.g., WiFi IP camera 254, Ethernet IP camera 255, etc.) that communicate over the LAN 250 using an IP format, as well as a connection management server 210 located outside the premise firewall 252 and connected to the gateway 253 by a Wide Area Network (WAN) 200. The system further includes one or more devices 220, 230, 240 located outside the premise and behind other firewalls 221, 231, 241 and connected to the WAN 200. The other devices 220, 230, 240 are configured to access video or audio content from the IP cameras within the premise, as described above.

Figure 23:
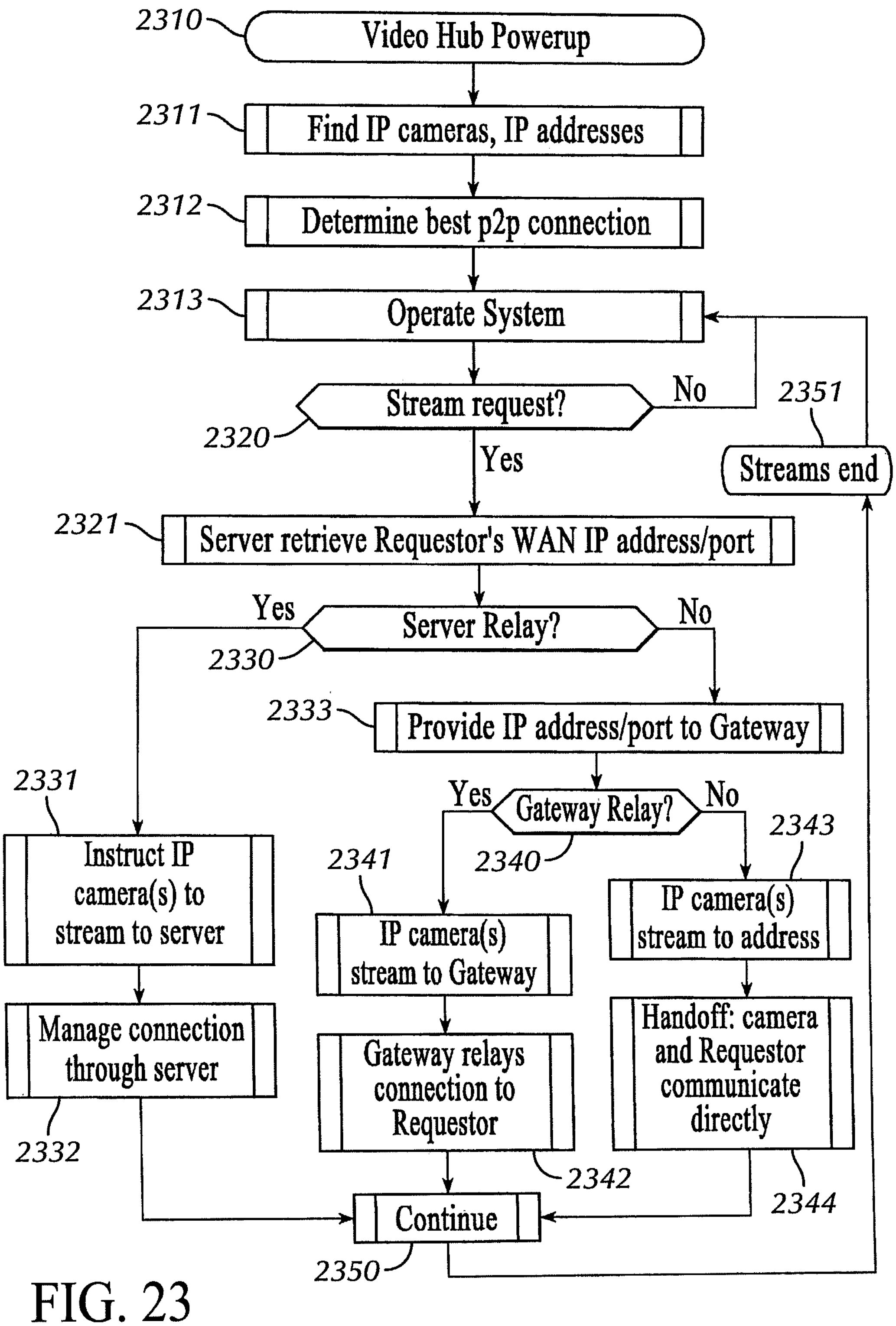
FIG. 23 is a general flow diagram for IP video control, under an embodiment.

FIG. 23 is a general flow diagram for IP video control, under an embodiment. The IP video control interfaces, manages, and provides WAN-based remote access to a plurality of IP cameras in conjunction with a home security or remote home monitoring system. The IP video control allows for monitoring and controlling of IP video cameras from a location remote to the customer premise, outside the customer premise firewall, and protected by another firewall. Operations begin when the system is powered on 2310, involving at a minimum the power-on of the gateway, as well as the power-on of at least one IP camera coupled or connected to the premise LAN. The gateway searches 2311 for available IP cameras and associated IP addresses. The gateway selects 2312 from one or more possible approaches to create connections between the IP camera and a device external to the firewall. Once an appropriate connection path is selected, the gateway begins operation 2313, and awaits 2320 a request for a stream from one of the plurality of IP video cameras available on the LAN. When a stream request is present the server retrieves 2321 the requestor's WAN IP address/port.

When a server relay is present 2330, the IP camera is instructed 2331 to stream to the server, and the connection is managed 2332 through the server. In response to the stream terminating 2351, operations return to gateway operation 2313, and waits to receive another request 2320 for a stream from one of the plurality of IP video cameras available on the LAN.

When a server relay is not present 2330, the requestor's WAN IP address/port is provided 2333 to the gateway or gateway relay. When a gateway relay is present 2340, the IP camera is instructed 2341 to stream to the gateway, and the gateway relays 2342 the connection to the requestor. In response to the stream terminating 2351, operations return to gateway operation 2313, and waits to receive another request 2320 for a stream from one of the plurality of IP video cameras available on the LAN. When a gateway relay is not present 2340, the IP camera is instructed 2343 to stream to an address, and a handoff 2344 is made resulting in direct communication between the camera and the requestor. In response to the stream terminating 2351, operations return to gateway operation 2313, and waits to receive another request 2320 from one of the plurality of IP video cameras available on the LAN.

The integrated security system of an embodiment supports numerous video stream formats or types of video streams. Supported video streams include, but are not limited to, Motion Picture Experts Group (MPEG)-4(MPEG-4)/Real-Time Streaming Protocol (RTSP), MPEG-4 over Hypertext Transfer Protocol (HTTP), and Motion Joint Photographic Experts Group (JPEG) (MJPEG).

The integrated security system of an embodiment supports the MPEG-4/RTSP video streaming method (supported by video servers and clients) which uses RTSP for the control channel and Real-time Transport Protocol (RTP) for the data channel. Here the RTSP channel is over Transmission Control Protocol (TCP) while the data channel uses User Datagram Protocol (UDP). This method is widely supported by both streaming sources (e.g., cameras) and stream clients (e.g., remote client devices, Apple Quicktime, VideoLAN, IPTV mobile phones, etc).

Encryption can be added to the two channels under MPEG-4/RTSP. For example, the RTSP control channel can be encrypted using SSL/TLS. The data channel can also be encrypted. If the camera or video stream source inside the home does not support encryption for either RTSP or RTP channels, the gateway located on the LAN can facilitate the encrypted RTSP method by maintaining separate TCP sessions with the video stream source device and with the encrypted RTSP client outside the LAN, and relay all communication between the two sessions. In this situation, any communication between the gateway and the video stream source that is not encrypted could be encrypted by the gateway before being relayed to the RTSP client outside the LAN. In many cases the gateway is an access point for the encrypted and private Wifi network on which the video stream source device is located. This means that communication between the gateway and the video stream source device is encrypted at the network level, and communication between the gateway and the RTSP client is encrypted at the transport level. In this fashion the gateway can compensate for a device that does not support encrypted RTSP.

The integrated security system of an embodiment also supports reverse RTSP. Reverse RTSP includes taking a TCP-based protocol like RTSP, and reversing the roles of client and server (references to "server" include the iControl server, also referred to as the iConnect server) when it comes to TCP session establishment. For example, in standard RTSP the RTSP client is the one that establishes the TCP connection with the stream source server (the server listens on a port for incoming connections). In Reverse RTSP, the RTSP client listens on a port for incoming connections from the stream source server. Once the TCP connection is established, the RTSP client begins sending commands to the server over the TCP connection just as it would in standard RTSP.

When using Reverse RTSP, the video stream source is generally on a LAN, protected by a firewall. Having a device on the LAN initiate the connection to the RTSP client outside the firewall enables easy network traversal.

If the camera or video stream source inside the LAN does not support Reverse RTSP, then the gateway facilitates the Reverse RTSP method by initiating separate TCP sessions with the video stream source device and with the Reverse RTSP client outside the LAN, and then relays all communication between the two sessions. In this fashion the gateway compensates for a stream source device that does not support Reverse RTSP.

As described in the encryption description above, the gateway can further compensate for missing functionalities on the device such as encryption. If the device does not support encryption for either RTSP or RTP channels, the gateway can communicate with the device using these un-encrypted streams, and then encrypt the streams before relaying them out of the LAN to the RTSP Reverse client.

Servers of the integrated security system can compensate for RTSP clients that do not support Reverse RTSP. In this situation, the server accepts TCP connections from both the RTSP client and the Reverse RTSP video stream source (which could be a gateway acting on behalf of a stream source device that does not support Reverse RTSP). The server then relays the control and video streams from the Reverse RTSP video stream source to the RTSP client. The server can further compensate for the encryption capabilities of the RTSP client; if the RTSP client does not support encryption then the server can provide an unencrypted stream to the RTSP client even though an encrypted stream was received from the Reverse RTSP streaming video source.

The integrated security system of an embodiment also supports Simple Traversal of User Datagram Protocol (UDP) through Network Address Translators (NAT) (STUN)/Traversal Using Relay NAT (TURN) peer-to-peer routing. STUN and Turn are techniques for using a server to help establish a peer-to-peer UDP data stream (it does not apply to TCP streams). The bandwidth consumed by the data channel of a video stream is usually many thousands of times larger than that used by the control channel. Consequently, when a peer-to-peer connection for both the RTSP and RTP channels is not possible, there is still a great incentive to use STUN/TURN techniques in order to achieve a peer-to-peer connection for the RTP data channel.

Here, a method referred to herein as RTSP with STUN/TURN is used by the integrated security system. The RTSP with STUN/TURN is a method in which the video streaming device is instructed over the control channel to stream its UDP data channel to a different network address than that of the other end of the control TCP connection (usually the UDP data is simply streamed to the IP address of the RTSP client). The result is that the RTSP or Reverse RTSP TCP channel can be relayed using the gateway and/or the server, while the RTP UDP data channel can flow directly from the video stream source device to the video stream client.

If a video stream source device does not support RTSP with STUN/TURN, the gateway can compensate for the device by relaying the RTSP control channel via the server to the RTSP client, and receiving the RTP data channel and then forwarding it directly to the RTSP with STUN/TURN enabled client. Encryption can also be added here by the gateway.

The integrated security system of an embodiment supports MPEG-4 over HTTP. MPEG-4 over HTTP is similar to MPEG-4 over RTSP except that both the RTSP control channel and the RTP data channel are passed over an HTTP TCP session. Here a single TCP session can be used, splitting it into multiple channels using common HTTP techniques like chunked transfer encoding. The MPEG-4 over HTTP is generally supported by many video stream clients and server devices, and encryption can easily be added to it using SSL/TLS. Because it uses TCP for both channels, STUN/TURN techniques may not apply in the event that a direct peer-to-peer TCP session between client and server cannot be established.

As described above, encryption can be provided using SSL/TLS taking the form of HTTPS. And as with MPEG-4 over RTSP, a gateway can compensate for a stream source device that does not support encryption by relaying the TCP streams and encrypting the TCP stream between the gateway and the stream client. In many cases the gateway is an access point for the encrypted and private Wifi network on which the video stream source device is located. This means that communication between the gateway and the video stream source device is encrypted at the network level, and communication between the gateway and the video stream client is encrypted at the transport level. In this fashion the gateway can compensate for a device that does not support HTTPS.

As with Reverse RTSP, the integrated security system of an embodiment supports Reverse HTTP. Reverse HTTP includes taking a TCP-based protocol like HTTP, and reversing the roles of client and server when it comes to TCP session establishment. For example, in conventional HTTP the HTTP client is the one that establishes the TCP connection with the server (the server listens on a port for incoming connections). In Reverse HTTP, the HTTP client listens on a port for incoming connections from the server. Once the TCP connection is established, the HTTP client begins sending commands to the server over the TCP connection just as it would in standard HTTP.

When using Reverse HTTP, the video stream source is generally on a LAN, protected by a firewall. Having a device on the LAN initiate the connection to the HTTP client outside the firewall enables easy network traversal.

If the camera or video stream source inside the LAN does not support Reverse HTTP, then the gateway can facilitate the Reverse HTTP method by initiating separate TCP sessions with the video stream source device and with the Reverse HTTP client outside the LAN, and then relay all communication between the two sessions. In this fashion the gateway can compensate for a stream source device that does not support Reverse HTTP.

As described in the encryption description above, the gateway can further compensate for missing functionalities on the device such as encryption. If the device does not support encrypted HTTP (e.g., HTTPS), then the gateway can communicate with the device using HTTP, and then encrypt the TCP stream(s) before relaying out of the LAN to the Reverse HTTP client.

The servers of an embodiment can compensate for HTTP clients that do not support Reverse HTTP. In this situation, the server accepts TCP connections from both the HTTP client and the Reverse HTTP video stream source (which could be a gateway acting on behalf of a stream source device that does not support Reverse HTTP). The server then relays the TCP streams from the Reverse HTTP video stream source to the HTTP client. The server can further compensate for the encryption capabilities of the HTTP client; if the HTTP client does not support encryption then the server can provide an unencrypted stream to the HTTP client even though an encrypted stream was received from the Reverse HTTP streaming video source.

The integrated security system of an embodiment supports MJPEG as described above. MJPEG is a streaming technique in which a series of JPG images are sent as the result of an HTTP request. Because MJPEG streams are transmitted over HTTP, HTTPS can be employed for encryption and most MJPEG clients support the resulting encrypted stream. And as with MPEG-4 over HTTP, a gateway can compensate for a stream source device that does not support encryption by relaying the TCP streams and encrypting the TCP stream between the gateway and the stream client. In many cases the gateway is an access point for the encrypted and private Wifi network on which the video stream source device is located. This means that communication between the gateway and the video stream source device is encrypted at the network level, and communication between the gateway and the video stream client is encrypted at the transport level. In this fashion the gateway can compensate for a device that does not support HTTPS.

The integrated system of an embodiment supports Reverse HTTP. Reverse HTTP includes taking a TCP-based protocol like HTTP, and reversal of the roles of client and server when it comes to TCP session establishment can be employed for MJPEG streams. For example, in standard HTTP the HTTP client is the one who establishes the TCP connection with the server (the server listens on a port for incoming connections). In Reverse HTTP, the HTTP client listens on a port for incoming connections from the server. Once the TCP connection is established, the HTTP client begins sending commands to the server over the TCP connection just as it would in standard HTTP.

When using Reverse HTTP, the video stream source is generally on a LAN, protected by a firewall. Having a device on the LAN initiate the connection to the HTTP client outside the firewall enables network traversal.

If the camera or video stream source inside the LAN does not support Reverse HTTP, then the gateway can facilitate the Reverse HTTP method by initiating separate TCP sessions with the video stream source device and with the Reverse HTTP client outside the LAN, and then relay all communication between the two sessions. In this fashion the gateway can compensate for a stream source device that does not support Reverse HTTP.

As described in the encryption description above, the gateway can further compensate for missing functionalities on the device such as encryption. If the device does not support encrypted HTTP (e.g., HTTPS), then the gateway can communicate with the device using HTTP, and then encrypt the TCP stream(s) before relaying out of the LAN to the Reverse HTTP client.

The servers can compensate for HTTP clients that do not support Reverse HTTP. In this situation, the server accepts TCP connections from both the HTTP client and the Reverse HTTP video stream source (which could be a gateway acting on behalf of a stream source device that does not support Reverse HTTP). The server then relays the TCP streams from the Reverse HTTP video stream source to the HTTP client. The server can further compensate for the encryption capabilities of the HTTP client; if the HTTP client does not support encryption then the server can provide an unencrypted stream to the HTTP client even though an encrypted stream was received from the Reverse HTTP streaming video source.

The integrated security system of an embodiment considers numerous parameters in determining or selecting one of the streaming formats described above for use in transferring video streams. The parameters considered in selecting a streaming format include, but are not limited to, security requirements, client capabilities, device capabilities, and network/system capabilities.

The security requirements for a video stream are considered in determining an applicable streaming format in an embodiment. Security requirements fall into two categories, authentication and privacy, each of which is described below.

Authentication as a security requirement means that stream clients must present credentials in order to obtain a stream. Furthermore, this presentation of credentials should be done in a way that is secure from network snooping and replays. An example of secure authentication is Basic Authentication over HTTPS. Here a username and password are presented over an encrypted HTTPS channel so snooping and replays are prevented. Basic Authentication alone, however, is generally not sufficient for secure authentication.

Because not all streaming clients support SSL/TLS, authentication methods that do not require it are desirable. Such methods include Digest Authentication and one-time requests. A one-time request is a request that can only be made by a client one time, and the server prevents a reuse of the same request. One-time requests are used to control access to a stream source device by stream clients that do not support SSL/TLS. An example here is providing video access to a mobile phone. Typical mobile phone MPEG-4 viewers do not support encryption. In this case, one of the MPEG-4 over RTSP methods described above can be employed to get the video stream relayed to an server. The server can then provide the mobile phone with a one-time request Universal Resource Locator (URL) for the relayed video stream source (via a Wireless Application Protocol (WAP) page). Once the stream ends, the mobile phone would need to obtain another one-time request URL from the server (via WAP, for example) in order to view the stream again.

Privacy as a security requirement means that the contents of the video stream must be encrypted. This is a requirement that may be impossible to satisfy on clients that do not support video stream encryption, for example many mobile phones. If a client supports encryption for some video stream format(s), then the "best" of those formats should be selected. Here "best" is determined by the stream type priority algorithm.

The client capabilities are considered in determining an applicable streaming format in an embodiment. In considering client capabilities, the selection depends upon the supported video stream formats that include encryption, and the supported video stream formats that do not support encryption.

The device capabilities are considered in determining an applicable streaming format in an embodiment. In considering device capabilities, the selection depends upon the supported video stream formats that include encryption, the supported video stream formats that do not support encryption, and whether the device is on an encrypted private Wifi network managed by the gateway (in which case encryption at the network level is not required).

The network/system capabilities are considered in determining an applicable streaming format in an embodiment. In considering network/system capabilities, the selection depends upon characteristics of the network or system across which the stream must travel. The characteristics considered include, for example, the following: whether there is a gateway and/or server on the network to facilitate some of the fancier video streaming types or security requirements; whether the client is on the same LAN as the gateway, meaning that network firewall traversal is not needed.

Streaming methods with the highest priority are peer-to-peer because they scale best with server resources. Universal Plug and Play (UPnP) can be used by the gateway to open ports on the video stream device's LAN router and direct traffic through those ports to the video stream device. This allows a video stream client to talk directly with the video stream device or talk directly with the gateway which can in turn facilitate communication with the video stream device.

Another factor in determining the best video stream format to use is the success of STUN and TURN methods for establishing direct peer-to-peer UDP communication between the stream source device and the stream client. Again, the gateway and the server can help with the setup of this communication.

Client bandwidth availability and processing power are other factors in determining the best streaming methods. For example, due to its bandwidth overhead an encrypted MJPEG stream should not be considered for most mobile phone data networks.

Device bandwidth availability can also be considered in choosing the best video stream format. For example, consideration can be given to whether the upstream bandwidth capabilities of the typical residential DSL support two or more simultaneous MJPEG streams.

Components of the integrated security system of an embodiment, while considering various parameters in selecting a video streaming format to transfer video streams from streaming source devices and requesting client devices, prioritize streaming formats according to these parameters. The parameters considered in selecting a streaming format include, as described above, security requirements, client capabilities, device capabilities, and network/system capabilities. Components of the integrated security system of an embodiment select a video streaming format according to the following priority, but alternative embodiments can use other priorities.

The selected format is UPnP or peer-to-peer MPEG-4 over RTSP with encryption when both requesting client device and streaming source device support this format.

The selected format is UPnP or peer-to-peer MPEG-4 over RTSP with authentication when the requesting client device does not support encryption or UPnP or peer-to-peer MPEG-4 over RTSP with encryption.

The selected format is UPnP (peer-to-peer) MPEG-4 over HTTPS when both requesting client device and streaming source device support this format.

The selected format is UPnP (peer-to-peer) MPEG-4 over HTTP when the requesting client device does not support encryption or UPnP (peer-to-peer) MPEG-4 over HTTPS. The selected format is UPnP (peer-to-peer) MPEG-4 over RTSP facilitated by gateway or touchscreen (including or incorporating gateway components) (to provide encryption), when the requesting client device supports encrypted RTSP and the streaming source device supports MPEG-4 over RTSP.

The selected format is UPnP (peer-to-peer) MPEG-4 over HTTPS facilitated by gateway or touchscreen (including or incorporating gateway components) (to provide encryption) when the requesting client device supports MPEG-4 over HTTPS and the streaming source device supports MPEG-4 over HTTP.

The selected format is UPnP (peer-to-peer) MJPEG over HTTPS when the networks and devices can handle the bandwidth and both requesting client device and streaming source device support MJPEG over HTTPS.

The selected format is Reverse RTSP with STUN/TURN facilitated by the server when the streaming source device initiates SSL/TLS TCP to server, the streaming source device supports Reverse RTSP over SSL/TLS with STUN/TURN, and the requesting client device supports RTSP with STUN/TURN.

The selected format is Reverse RTSP with STUN/TURN facilitated by server and gateway or touchscreen (including or incorporating gateway components) when the gateway initiates SSL/TLS TCP to the server and to the streaming source device, the streaming source device supports RTSP, and the requesting client device supports RTSP with STUN/TURN.

The selected format is Reverse MPEG over RTSP/HTTP facilitated by the server when the streaming source device initiates SSL/TLS TCP to server, the streaming source device supports Reverse RTSP or HTTP over SSL/TLS, and the requesting client device supports MPEG over RTSP/HTTP.

The selected format is Reverse MPEG over RTSP/HTTP facilitated by server and gateway or touchscreen (including or incorporating gateway components) when the gateway initiates SSL/TLS TCP to server and to streaming source device, the streaming source device supports MPEG over RTSP or HTTP, and the requesting client device supports MPEG over RTSP/HTTP.

The selected format is UPnP (peer-to-peer) MJPEG over HTTP when the networks and devices can handle the bandwidth and when the requesting client device does not support encryption and does not support MPEG-4.

The selected format is Reverse MJPEG over HTTPS facilitated by the server when the streaming source device initiates SSL/TLS TCP to server, the streaming source device supports Reverse MJPEG over SSL/TLS, and the requesting client device supports MJPEG.

The selected format is Reverse MJPEG over HTTPS facilitated by server and gateway or touchscreen (including or incorporating gateway components) when the gateway initiates SSL/TLS TCP to the server and to the streaming source device, the streaming source device supports MJPEG, and the requesting client device supports MJPEG.

Figure 24:
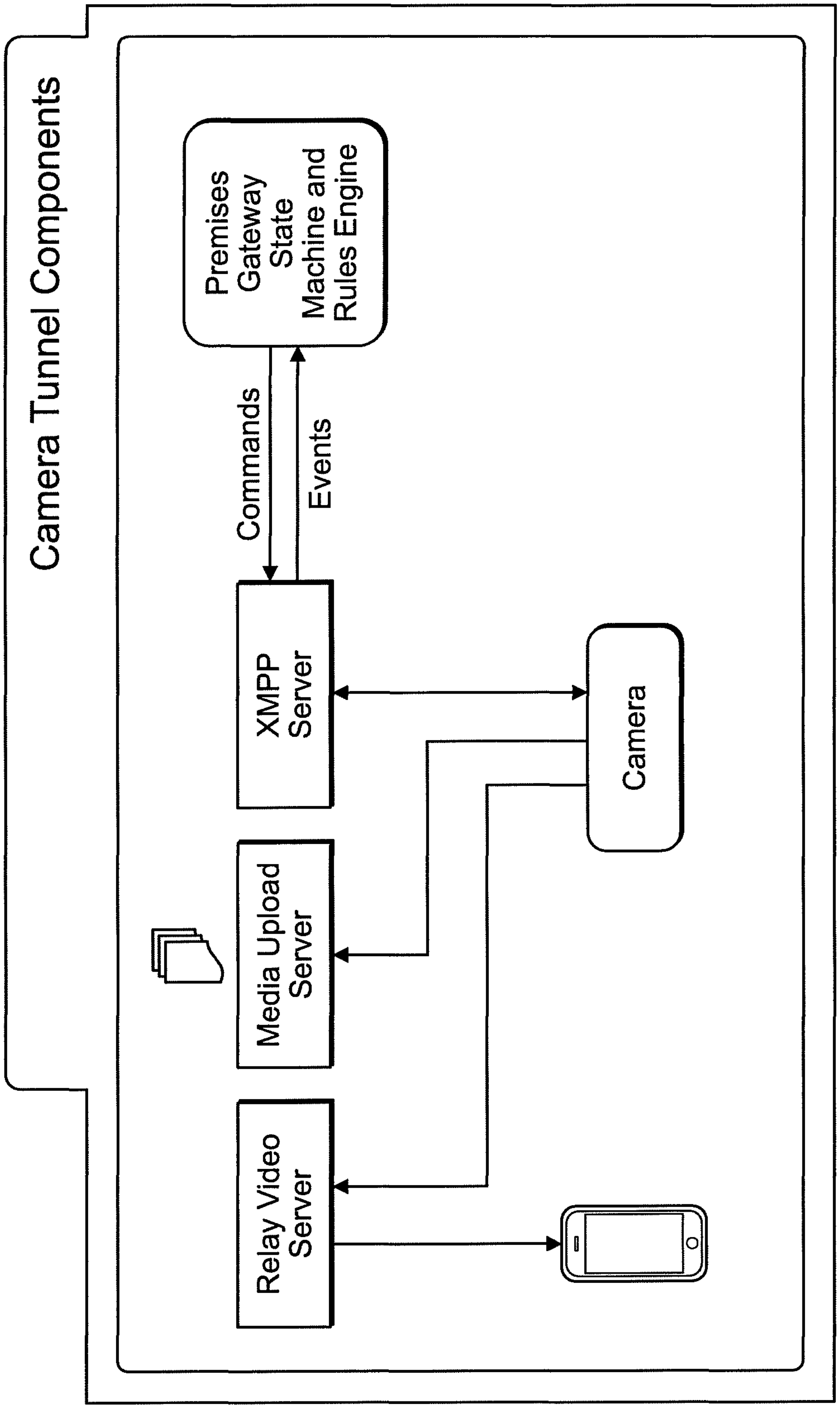
FIG. 24 is a block diagram showing camera tunneling, under an embodiment.
Figure 25E:
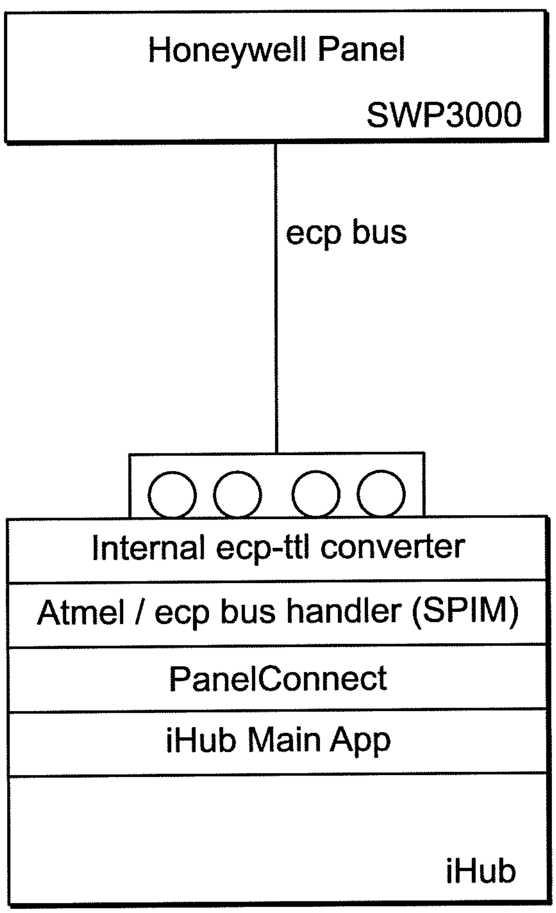

FIG. 24 is a block diagram showing camera tunneling, under an embodiment.

Additional detailed description of camera tunnel implementation details follow.

An embodiment uses XMPP for communication with a remote video camera as a lightweight (bandwidth) method for maintaining real-time communication with the remote camera. More specifically, the remote camera is located on another NAT (e.g., NAT traversal).

An embodiment comprises a method for including a remotely located camera in a home automation system. For example, using XMPP via cloud XMPP server to couple or connect camera to home automation system. This can be used with in-car cameras, cell phone cameras, and re-locatable cameras (e.g., dropped in the office, the hotel room, the neighbor's house, etc.).

Components of an embodiment are distributed so that any one can be offline while system continues to function (e.g., panel can be down while camera still up, motion detection from camera, video clip upload etc. continue to work.

Embodiments extend the PSIA in one or more of the following areas: wifi roaming configuration; video relay commands; wifi connectivity test; media tunnel for live video streaming in the context of a security system; motion notification mechanism and configuration (motion heart-beat) (e.g., helps with scalable server); XMPP for lightweight communication (helps with scalable server, reduced bandwidth, for maintaining persistent connection with a gateway); ping request sent over XMPP as health check mechanism; shared secret authentication bootstrapping process; asynchronous error status delivery by the camera for commands invoked by the gateway if the camera is responsible for delivering errors to the gateway in an asynchronous fashion (e.g., gateway requests a firmware update or a video clip upload).

Embodiments extend the home automation system to devices located on separate networks, and make them useable as general-purpose communication devices. These cameras can be placed in the office, vacation home, neighbor house, software can be put onto a cell phone, into a car, navigation system, etc.

Embodiments use a global device registry for enabling a device/camera to locate the server and home to which it is assigned.

Embodiments include methods for bootstrapping and rebootstrapping of authentication credentials. The methods include activation key entry by installer into the cloud web interface. Activation key generation is based upon mac address and a shared secret between manufacturer and the service provider. Embodiments of the system allow activation of a camera with valid activation key that is not already provisioned in the global registry server.

Embodiments include a web-based interface for use in activating, configuring, remote firmware update, and reconfiguring of a camera.

Embodiments process or locate local wifi access points and provide these as options during camera configuring and re-configuring. Embodiments generate and provide recommendations around choosing a best wifi access point based upon characteristics of the network (e.g., signal strength, error rates, interference, etc.). Embodiments include methods for testing and diagnosing issues with wifi and network access.

Embodiments include cameras able to perform this wifi test using only one physical network interface, an approach that enables the camera to dynamically change this physical interface from wired to wifi. Embodiments are able to change the network settings (wifi etc) remotely using the same process.

Cameras of an embodiment can be configured with multiple network preferences with priority order so that the camera can move between different locations and the camera can automatically find the best network to join (e.g., can have multiple ssid+bssid+password sets configured and prioritized).

Regarding firmware download, embodiments include a mechanism to monitor the status of the firmware update, provide feedback to the end user and improve overall quality of the system.

Embodiments use RTSP over SSL to a cloud media relay server to allow live video NAT traversal to a remote client (e.g., PC, cell phone, etc.) in a secure manner where the camera provides media session authentication credentials to the server. The camera initiates the SSL connection to the cloud and then acts as a RTSP server over this connection.

Embodiments include methods for using NAT traversal for connecting to the cloud for remote management and live video access allows the integrated security components to avoid port forwarding on the local router(s) and as a result maintain a more secure local network and a more secure camera since no ports are required to be open.

Embodiments enable camera sensors (e.g., motion, audio, heat, etc.) to serve as triggers to other actions in the automation system. The capture of video clips or snapshots from the camera is one such action, but the embodiments are not so limited.

A camera of an embodiment can be used by multiple systems.

A detailed description of flows follows relating to the camera tunnel of an embodiment.

A detailed description of camera startup and installation follows as it pertains to the camera tunnel of an embodiment.

Activation Key a. camera to follow same algorithm as ihub where activation key is generated from serial based upon a one-way hash on serial and a per-vendor shared secret.

b. Used com.icontrol.util.ops.activation.ActivationKeyUtil class to validate serialNo↔activationKey.

Registry Request

[partner]/registry/[device type]/[serial]

a. new column in existing registry table for id type; nullable but the application treats null as "gateway".

b. rest endpoints allow adding with the new optional argument.

c. current serial and siteId uniqueness enforcement by application depends upon device type (for any device type, there should be uniqueness on serial; for gateway device type, there should be uniqueness on siteId; for other device types, there need not be uniqueness on siteId).

d. if no activation yet (e.g., no entry) then send dummy response (random but repeatable reply; may include predictable "dummy" so that steps below can infer.

e. add/update registry server endpoints for adding/updating entries.

If Camera has No Password

Camera retrieves "Pending Key" via POST to /<CredentialGatewayURL>/GatewayService/<siteID>/PendingDeviceKey.

a. pending key request (to get password) with serial and activation key.

b. server checks for dummy reply; if dummy then responds with retry backoff response.

c. server invokes pass-through API on gateway to get new pending key.

d. if device is found, then gateway performs validation of serial+activation key, returns error if mismatch.

e. if activation key checks out, then gateway checks pending key status.

f. if device currently has a pending key status, then a new pending password is generated.

g. gateway maintains this authorization information in a new set of variables on the camera device.

h. device-authorization/session-key comprises the current connected password.

i. device-authorization/pending-expiry comprises a UTC timestamp representing the time the current pending password period ends; any value less than the current time or blank means the device is not in a pending password state.

j. device-authorization/pending-session-key comprises the last password returned to the camera in a pending request; this is optional (device may choose to maintain this value in memory).

k. session-key and pending-session-key variables tagged with "encryption" in the device def which causes rest and admin to hide their value from client.

ConnectInfo Request a. returns xmpp host and port to connect to (comes from config as it does for gateway connect info).

b. returns connectInfo with additional <xmpp>parameter.

Start Portal Add Camera Wizard a. user enters camera serial, activation key.
b. addDevice rest endpoint on gateway called
c. gateway verifies activation key is correct.
d. gateway calls addDevice method on gapp server to add LWG_SerComm_iCamera_1000 with given serial to site.
e. Server detects the camera type and populates registry.
f. gateway puts device into pending password state (e.g., updates device-auth/pending-expiry point).
g. rest endpoints on gateway device for managing device pending password state.
h. start pending password state: POST future UTC value to device-auth/pending-expiry; device-auth/pending-expiry set to 30 minutes from time device was added.
i. stop pending password state: POST −1 to device-auth/pending-expiry.
j. check pending password state: GET device-auth/pending-expiry.
k. message returned with "Location" header pointing to relative URI.
l. user told to power on camera (or reboot if already powered on).
m. once camera connects, gateway updates device-auth/pending-expiry to −1 and device-auth/session-key with password and device/connection-status to connected
n. portal polls for device/connection-status to change to connected; if does not connect after X seconds, bring up error page (camera has not connected—continue waiting or start over).
o. user asked if wifi should be configured for this camera.
p. entry fields for wifi ssid and password.
q. portal can pre-populate ssid and password fields with picklist of any from other cameras on the site.
r. get XML, of available SSIDs.
s. non-wifi option is allowed.
t. portal submits options to configure camera (use null values to specify non-wifi); upon success, message is returned with "Location" header pointing to relative URI.
u. checks configuration progress and extracting "status" and "subState" fields.
v. puts device state into "configuring"; upon error, puts device state into "configuration failure".
w. performs firmware upgrade if needed, placing device state into "upgrading"; upon error, puts device state into "upgrade failure".
x. upon configuration success, puts device state of "ok" and applies appropriate configuration for camera (e.g., resolutions, users, etc.).
y. if non-blank wifi parameters, automatically perform "wifi test" method to test wifi without disconnecting Ethernet.
z. portal wizard polls device status until changes to "ok" or "upgrade failure/"configuration failure" in "status" field, along with applicable, if any, with error code reason, in "subState" field; upon error, show details to user, provide options (start over, configure again, reboot, factory reset, etc)

aa. notify user they can move camera to desired location.

Camera Reboots a. gets siteId and server URL from registry.
b. makes pending paid key request to server specifying correct siteId, serial and activation key; gets back pending password.
c. makes connectInfo request to get xmpp server.
d. connects over xmpp with pending password.

If Camera Reboots Again a. get siteId and server URL from registry.
b. already has password (may or may not be pending) so no need to perform pending paid key request.
c. make connectInfo request to get xmpp server.
d. connect over xmpp with password.

xmpp Connect with Password a. xmpp user is of the form [serial]@[server]/[siteId]
b. session server performs authentication by making pass-through API request to gateway for given SiteId.
c. Session xmpp server authenticates new session using DeviceKey received in GET request against received xmpp client credential.
d. If authencation fails or GET receives non-response, server returns to camera XMPP connect retry backoff with long backoff.
e. gateway device performs password management.
f. compares password with current key and pending key (if not expired); if matches pending, then update device-auth/session-key to be pending value, and clear out the device-auth/pending-expiry.
g. gateway device updates the device/connection-status point to reflect that camera is connected.
h. gateway device tracks the xmpp session server this camera is connected to via new point device/proxy-host and updates this info if changed.
i. if deviceConnected returns message, then session server posts connected event containing xmpp user to queue monitored by all session servers.
j. session servers monitor these events and disconnect/cleanup sessions they have for same user.
k. may use new API endpoint on session server for broadcast messages.

xmpp Connect with Bad Password a. Upon receiving a new connection request, session server performs authentication by making passthrough API request to gateway for given SiteId.
b. Session xmpp server authenticates new session using DeviceKey received in above GET request against received xmpp client credential.
c. If authencation fails or GET receives non-response from virtual gateway.
d. Session server rejects incoming connection (is there a backoff/retry XMPP response that can be sent here).
e. Session server logs event.
f. Gateway logs event.

xmpp Disconnect a. session server posts disconnected event to gateway (with session server name).
b. gateway updates the device/connected variable/point to reflect that camera is disconnected.
c. gateway updates the device/connection-status variable/point to reflect that camera is disconnected.
d. gateway clears the device/proxy-host point that contains the session host to this camera is connected.

LWGW Shutdown a. During LWGW shutdown, gateway can broadcast messages to all XMPP servers to ensure all active XMPP sessions are gracefully shutdown.
b. gateways use REST client to call URI, which will broadcast to all XMPP servers.

To Configure Camera During Installation a. applies all appropriate configuration for camera (e.g., resolutions, users, etc).

b. returns message for configuration applied, wifi test passed, all settings taken. returns other response code with error code description upon any failure.

To Reconfigure wifi SSID and Key a. returns message for wifi credentials set.

b. returns other response code with error code description upon any failure.

API Pass-Through Handling for Gateway Fail-Over Case a. When performing passthrough for LWGW, the API endpoint handles the LWGW failover case (e.g., when gateway is not currently running on any session server).

b. passthrough functions in the following way: current session server IP is maintained on the gateway object; server looks up gateway object to get session IP and then sends passthrough request to that session server; if that request returns gateway not found message, server error message, or a network level error (e.g., cannot route to host, etc.), if the gateway is a LWGW then server should lookup the primary/secondary LW Gateway group for this site; server should then send resume message to primary, followed by rest request; if that fails, then server send resume message to secondary followed by rest request c. alternatively, passthrough functions in the following way: rather than lookup session server IP on gateway object, passthrough requests should be posted to a passthrough queue that is monitored by all session servers; the session server with the Gateway on it should consume the message (and pass it to the appropriate gateway); the server should monitor for expiry of these messages, and if the gateway is a LWGW then server should lookup the primary/secondary LW Gateway group for this site; server should then send resume message to primary, followed by rest request; if that fails, then server send resume message to secondary followed by rest request.

A detailed description follows for additional flows relating to the camera tunnel of an embodiment.

Motion Detection a. camera sends openhome motion event to session server via xmpp.

b. session server posts motion event to gateway via passthrough API.

c. gateway updates the camera motion variable/point to reflect the event gateway updates the camera motion variable/point to reflect the event Capture Snapshot a. gateway posts openhome snapshot command to session server with camera connected.

b. gateway sends command including xmpp user id to xmpp command Queue monitored by all session servers.

c. session server with given xmpp user id consumes command and sends command to camera (command contains upload URL on gw webapp).

d. gateway starts internal timer to check if a response is received from camera (e.g., 5 sec wait window).

e. if broadcast RabbitMQ not ready, then gateway will use device/proxy-host value to know which session server to post command to.

f. session server sends command to camera (comprises upload URL on gw webapp)

g. Example XML body:

```
<MediaUpload>
<id>1321896772660</id>
<snapShotImageType>JPEG</snapShotImageType>
<gateway_url>[gatewaysyncUrl]/gw/GatewayService/SPutJpg/s/[siteId]/
[deviceIndex]/[varValue]/[varIndex]/[who]/[ts]/[HMM]/[passCheck]/</
<failure_url>[gatewaysyncUrl]/gw/GatewayService/SPutJpgError/s/
[siteId]/[deviceIndex]/[varValue]/[varIndex]/[who]/[ts]/[HMM]/
[passCheck]/</
</MediaUpload>
```

h. session server receives response to sendRequestEvent from camera and posts response to gateway.

i. camera uploads to upload URL on gw webapp.

j. passCheck can be verified on server (based upon gateway secret); alternatively, the OpenHome spec calls for Digest Auth here.

k. endpoint responds with message digest password if the URI is expected, otherwise returns non-response.

l. gw webapp stores snapshot, logs history event.

m. event is posted to gateway for deltas.

Capture Clip a. gateway posts openhome video clip capture command to session server with camera connected.

b. gateway sends command including xmpp user id to xmpp command Queue monitored by all session servers.

c. session server with given xmpp user id consumes command and sends command to camera (command comprises upload URL on gw webapp).

d. gateway starts internal timer to check if a response is received from camera (e.g., 5 sec wait window).

e. session server sends command to camera (comprises upload URL on gw webapp).

f. Example URI from session server to camera: /openhome/streaming/channels/1/video/upload g. Example XML body:

```
<MediaUpload>
<id>1321898092270</id>
<videoClipFormatType>MP4</videoClipFormatType>
<gateway_url>[gatewaysyncUrl]/gw/GatewayService/SPutMpeg/s/[siteId]/
[deviceIndex]/[varValue]/[varIndex]/[who]/[ts]/[HMM]/[passCheck]/</
<failure_url>[gatewaysyncUrl]/gw/GatewayService/SPutMpegFailed/s/
[siteId]/[deviceIndex]/[varValue]/[varIndex]/[who]/[ts]/[HMM]/
[passCheck]/</
</MediaUpload>
```

h. session server receives response to sendRequestEvent from camera and posts response to gateway.

i. camera uploads to upload URL on gw webapp.

j. passCheck can be verified on server (based upon gateway secret).

k. alternatively, spec calls for Digest Auth here.

l. endpoint responds with message digest password if the URI is expected, otherwise returns non-response.

m. gw webapp stores video clip, logs history event.

n. event is posted to gateway for deltas.

Live Video (Relay)

a. Upon user login to portal, portal creates a media relay tunnel by calling relayAPImanager create.

b. RelayAPImanager creates relays and sends ip-config-relay variable (which instructs gateway to create media tunnel) to gateway.

c. Upon receiving media tunnel create ip-config-relay command, gateway posts openhome media channel create command to session server with camera connected.

d. session server sends create media tunnel command to camera (comprises camera relay URL on relay server).

e. Example URI from session server to camera: /openhome/streaming/mediatunnel/create f. Example XML body:

```
<CreateMediaTunnel>
<sessionID>1</sessionID>
<gatewayURL>TBD</gatewayURL>
<failureURL>TBD</failureURL>
</CreateMediaTunnel>
```

g. GatewayURL is created from relay server, port, and sessionId info included within ip-config-relay variable.

h. camera creates a TLS tunnel to relay server via POST to <gatewayURL>.

i. When user initiates live video, portal determines user is remote and retrieves URL of Relay server from relay-APlmanager.

j. Upon receiving a user pole connection on the relay server (along with valid rtsp request), relay sends streaming command to camera: example: rtsp:://openhome/streaming/channels/1/rtsp k. Upon user portal logout, portals calls relayAPlmanager to terminate media tunnel.

l. RelayAPlmanager send ip-config-relay variable to terminate media tunnel.

m. Gateway sends destroy media tunnel command to camera via XMPP.

Camera Firmware Update a. Gateway checks camera firmware version; if below minimum version, gateway sends command to camera (via session server) to upgrade firmware (command: /openhome/system/updatefirmware).

b. Gateway checks firmware update status by polling: /openhome/system/updatefirmware/status.

c. Gateway informs portal of upgrade status.

d. Camera auto-reboots after firmware update and reconnects to Session server.

Camera First-Contact Configuration a. After a camera is added successfully and is connected to the session server for the first time, gateway performs first contact configuration as follows.

b. Check firmware version.

c. Configure settings by: download config file using /openhome/system/configurationData/configFile; or configure each category individually (configure video input channel settings—/openhome/system/video/inputs/channels; onfigure audio input channel settings (if any)—/openhome/system/audio/inputs/channels; configure video streaming channel settings—/openhome/streaming/channels; configure motion detection settings—example: PUT /openhome/custom/motiondetection/pir/0; configure event trigger settings—example: PUT /openhome/custom/event).

d. Reboot camera (/openhome/system/factoryreset) if camera responds with reboot required.

Embodiments described herein include one or more protocols enabling communications between one or more system components described herein (e.g., gateway, touchscreen, IP devices, security system, etc.). More particularly, details follow of interface specifications in an example embodiment of the integrated security system described herein.

FIGS. 25A-E show panel coupling methodologies of the integrated security system, under an embodiment.

FIGS. 26A-L show zone information of the integrated security system, under an embodiment.

FIGS. 27A-G show zone codes of the integrated security system, under an embodiment.

FIGS. 28A-B show report conditions of the integrated security system, under an embodiment.

FIG. 29 shows packet descriptions of the integrated security system, under an embodiment.

FIGS. 30A-C show keypad transmission information of the integrated security system, under an embodiment.

FIGS. 31A-D show keypad transmission information of the integrated security system, under an alternative embodiment.

FIG. 32 shows an enrollment procedure of the integrated security system, under an embodiment. The following describes how to enroll the 5839 keypad into the Honeywell system. Before attempting to enroll a 5839 keypad into a Vista panel, verify the following: 1) The Vista panel must have a 5839 compatible 2-way RF transceiver module connected, such as the 5883 transceiver module; 2) Verify Dipswitch #6 of the 5883 transceiver is set to 1 (this enables the transmitter); 3) The Vista has an RF HouseCode programmed or a wireless sensor enrolled; and 4) Be sure the keypad partition is assigned for the device address that you plan to learn the keypad into. For example if you want to enroll a partition 1 keypad to device address 17 (ECN Address 01 in keypad), *190 should be set to 01 OX, where X=0-3 to set beep suppression level. To do this, press *1901X from the main programming menu.

To program the 5839 keypad, complete the following steps: 1) Put the panel in go-no-go mode (4112 #4), Instructions indicate this should be done in all partitions, but not sure if necessary in all partitions; 2) Hold down the 1&3 keys on the 5839 keypad to put it in program mode; 3) Press "*" 3 times on the 5839 keypad after it has entered program mode. This gets you to a menu where you select the keypad ECN address #; 4) Select the proper keypad ECN address #. For example, keypad ECN address #1 corresponds to device address #17 in the panel; and 5) Press "*" for "Done". The keypad displays "Waiting for mesg Setup? #=End". This initiates an enrollment handshake process between the keypad and the panel. Within a few seconds the keypad should be enrolled. Press "*" for Done, then press "#" multiple times to exit keypad programming. During the enrollment handshake, the following occurs: 1) The keypad transmits a single message. The ID in the transmission is 00 00 00. The 4th byte contains the keypad ECN # (0-7). Bit 4 of Byte 5 (status byte) is set to indicate this is an initial enrollment packet. Other than the trigger count and CRC, the rest of the packet is zeros. If the panel does not respond to this packet, the keypad will resend it one second later. The keypad will transmit this packet up to 5 times if it does not receive a response from the panel; 2) The panel responds with an enrollment packet that contains its ID. In this packet, the 11th byte, which is normally zero is set to 0x10; 3) Also, the fourth byte of this packet which is typically zero is set to 0x01. I assume that byte 11 being set to 0x10 indicates this is an enrollment type packet and byte 4 being set to 0x01 indicates this is the first enrollment packet. This packet is transmitted two or three times. Typically, it is only transmitted twice because the keypad responds after the second transmission. If the keypad does not respond, it will transmit three times; 3) The keypad transmits a response about 15 mS after receiving the second enrollment packet (which is identical to the first packet) from the panel. The response from the keypad is identical to the initial enrollment packet the keypad transmitted except the ID is changed from 00 00 00 to the panel's transceiver ID and the crc is updated. The trigger count however is identical to the initial enrollment packet; 4) The panel responds with 3 identical transmissions. Like the previous transmissions from the panel, these transmissions have byte 11 set to 0x10, however byte 4 is equal to 0x00; 5) The panel also generates 3 more transmissions like the previous 3, except that the trigger count is different and the CRC is updated for the new trigger count.

FIGS. 33A-F show panel byte transmission information of the integrated security system, under an embodiment.

Vista 13 Byte Transmissions

The Vista panel transmits 13 byte packets to the 5828 wireless keypad. It also transmits longer packets to the 5839 wireless keypad. The data below refers the 13 byte transmissions. The commands within the 13 byte packet instruct the 5828 keypad as to which icons to turn on. Certain bits within the transmission indicate to turn on certain icons. In addition, each transmission can contain up to 3 word tokens, which the 5828 can speak. The word tokens which are transmitted are limited to the list contained within the 5828 keypad instruction manual (and also in Table 7 below). This list is a subset of the complete list of word tokens the Vista panel will support. The 13 byte transmissions do not support custom text. The 5828 keypad will speak other words, such as "ready to arm" or "bypassed" in addition to the word token table.

Notes

General alarm refers to all non-fire alarms (such as burg and auxiliary) in the documentation below. If a zone # and a bypass icon are on, that particular zone may not be bypassed. For example, if you bypass zone 5, then trip fire zone 9, the transmission will indicate that "09" be displayed for the zone # as well as the bypass, fire, and alarm icons be turned on. Fire zone open does not prevent READY TO ARM icon from being turned on. Saw a case where the Low Battery icon bit was set for a zone 9 fire alarm packet. Maybe we should only look at for Panel Status messages.

I would recommend adding logging messages that flag undefined packets. It would be nice if you could get instant feedback of this so you knew what you were doing when this occurred. Only supported word tokens will be transmitted. For a list of supported word tokens, see the Installation and Setup Guide for the Ademco 5828/5828V Keypad. If non-supported word tokens are programmed for the zone between supported word tokens, only the supported word tokens will be transmitted by the Vista panel.

The Exit Delay packet has only been received when using 5839 wireless keypad. If a 5839 keypad is enrolled into the Vista, an arming level message is transmitted by the Vista when the panel is armed. If a status request ("*") is transmitted by the 5839, then another exit delay packet is transmitted with the latest exit delay time. Exit delay packets might only be transmitted when a 5839 keypad is learned into the panel. 5828 wireless keypad doesn't beep for entry delay except quick beeps at the end of the delay enter pgm mode pkt looks like zone 20 alarm Note: We may need to do more testing with different alarm types Various Fire and non-fire types have not been looked at yet and may be different than listed above.

Keep in mind that the information transmitted in the wireless protocol indicates which icons should be turned on, what alphanumeric number should be displayed, which beeps should sound, and zone text. In order to turn this into system status information, you will need to figure out how to process this data.

For instance, if the ALARM icon is on, the keypad is beeping a General alarm cadence, and 09 is displayed, this is likely an alarm on zone 9. However, if the ALARM icon is on, 09 is displayed, but the keypad is not beeping, the panel may be either in alarm or in alarm memory(alarm memory is alarm state after being disarmed).

You may need to track other indicators to determine if the alarm has been cancelled. There are many different cases that can occur. It may help to develop a truth table with the data bits to try to help cover all cases. Regardless, the gateway will probably have to keep track of sensor states and use timers to determine if certain things have restored.

It appears the the 5828 speaks "fault" for a zone packet if there are not other zone indications (check, alarm, . . . )

The 5883 transceiver transmits it's ID at power up in a 6 byte packet. Example tx 8E 63 05 02 CS CS Not confident about significance of bits 0 & 2 of byte 3. Bit zero is always set whenever 5828 emits fast beeps, however, if bit 2 is also set, panel does not emit beeps.

Byte 8, not fully defined, but=5 for exit delay, and 6 for entry delay. Use this to differentiate these packets from zone packets.

Note: The value of byte 2 is displayed by the 5828 for all packet types except Panel Status packet.

Ready to Arm bit never set when burg zone is open, unless it is bypassed.

There doesn't appear to be a bit indicating "fault" should be spoken by 5828 keypad for open zones, but it appears that if the packet is a Zone Packet, and ALARM icon=0 and CHECK icon=0, then fault is spoken.

If CHIME is turned on (1234-9), then all zone opens will automatically be transmitted to the 5828. This could help the systems get more data especially if the system is not chatty enough. This could be particularly helpful for hardwired zones because you cannot monitor them directly. However, all keypads will also beep and display this unless the keypad beeps are disabled.

Alarm Sirens do time out after a few minutes so you cannot use the "Alarm Beeps Sounding" bit to determine if the panel is still in alarm.

Carbon Monoxide zone transmissions set the fire alarm cadence but do not turn on the fire icon.

Fire panic button on keypad is defaulted to zone 95—not sure if this can be changed.

Police panic button on keypad is defaulted to zone 99—nto sure if this can be changed. Packet type determination:

any pkt with byte 8=5 is a EXIT DELAY pkt any pkt with byte 8=6 is an ENTRY DELAY pkt any pkt with byte 8=0x0F is a TEST MODE pkt any pkt with bit 6 of Byte 5 set is a PROGRAM MODE ENTRY pkt any pkt with bits 2&3 of Byte 4 set is a PANEL STATUS pkt any remain pkts with byte 2<65 are sensors zones 1-8 are hardwired sensors zones 9-48 are wireless zones zones 49-64 are RF button zones 95,96,99 are emergency zones (fire, aux, burg panic buttons on keypads)

Other known alarm types are listed in table below.

FIG. 34 and FIGS. 34A-T show panel byte example data of the integrated security system, under an embodiment. FIG. 34 is a matrix showing the order by which FIGS.

34A-T, when put together as shown in FIG. 34, collectively represent FIG. 34 and FIGS. 34A-T.

FIGS. 35A-F show panel byte transmission information of the integrated security system, under an alternative embodiment.

FIG. 36 and FIGS. 36A-L show panel byte example data of the integrated security system, under an alternative embodiment. FIG. 36 is a matrix showing the order by which FIGS. 36A-L, when put together as shown in FIG. 36, collectively represent FIG. 36 and FIGS. 36A-L.

FIGS. 37A-D show transmitter byte transmission information of the integrated security system, under an embodiment.

FIG. 38 shows sensor transmission information of the integrated security system, under an embodiment.

The material that follows in the rest of the specification is a description of FIGS. 25-38.

An investigation on the Honeywell Vista-20P panel was conducted and the goal of the investigation was to reverse engineer the Vista hardwired bus to understand the bus protocol to allow for arming/disarming the panel and retrieving the panel's status and sensor states.

Ademco Vista-20P KeyPad(KP) Address

Each keypad on the Vista 20 must have a unique bus address. Valid keypad bus addresses are 16-23. Bus address 16 is intended only to be a keypad device. Bus addresses 17-23 are multi-use and must be enabled in programming in order to support keypads. Setup fields 190-196 allow you to enable bus addresses 17-23 for a keypad as well as assign a partition. The first keypad connected to the Ademco Vista-20P must be programmed to address 16.

Ademco Vista-20P Hardwired Bus Basics

The bus protocol uses standard 4800-baud RS-232 transmissions with 1 start bit, 8 bits of data, 1 parity bit, and 1 stop bit. The bus uses 0V and 12V logic levels. The bus data signals are inverted from standard RS-232. On the keypad and panel, the bus data signal is inverted from the transmit and receive data signal that is present at the pins of the microprocessor. Parity is even for most bytes, but in some cases is odd.

A keypad is a dumb device. It does not retain or store any knowledge of the system. It only displays what the panel broadcasts for it to display. However, emulating the keypad and transmitting the proper keys and codes will cause desired information to appear on the keypad display. We can decode any information that appears on the keypad display to obtain the desired system information.

Arming/Didsarming

You can control the Vista 20 by transmitting the proper keypad key presses. The keypad is a slave device, so it can only transmit on the bus after being polled by the master (panel). All data values listed below are hexadecimal unless otherwise noted.

General Poll Transmission

This packet is transmitted every 330 mS.

| Source | 1st Byte | 2nd byte | 3rd byte | 4th byte | Parity |
|---|---|---|---|---|---|
| Panel | 00 | 00 | 00 | 00 | even |

"I Have Data" Transmission

When a button is pressed on the KP, the KP sends an "I Have Data" transmission at the same time as a General Poll. The keypad begins its packet within 40 uS of the beginning of the General Poll. Note that the 3rd byte of this transmission has even parity. I suspect that the parity of this byte, (maybe even the whole transmission) can be either even or odd. I also suspect that the timing of this packet may be critical. See the accompanying oscilloscope plot "G2 General Poll_I Have Data". Notice that the "I Have Data" transmission is transmitted right on top of the "General Poll".

| Source | 1st Byte | 2nd byte | 3rd byte | Parity |
|---|---|---|---|---|
| KP Parity | FF Odd | FF odd | Src Addr Even | 3rd byte even, rest odd |

Src Addr is the source address. It corresponds to the following table:

| Bus Address | Src Addr |
|---|---|
| 16 | FE |
| 17 | FD |
| 18 | FB |
| 19 | F7 |
| 20 | EF |
| 21 | DF |
| 22 | BF |
| 23 | 7F |

There are instances where multiple bus devices transmit the "I Have Data" transmission at the same time. This occurs regularly at panel power up. If Bus Address 16 and Bus Address 23 transmit at the same time, the resulting packet comprised of the collision of both keypads transmitting an "I Have Data" transmission is FF FF 7E (FE & 7F=7E). In this case, the parity of the 7E received by the panel is odd.

Data Poll Transmission

After the KP transmits the "I Have Data" transmission, the panel finishes sending it's General Poll and then sends a Data Poll transmission (about 60 mS later).

| Source | 1st Byte | 2nd byte | Parity |
|---|---|---|---|
| Panel | F6 | bus addr | even |

Bus addr is the hexadecimal value of the bus address (i.e. 0x10 for 16, 0x17 for 23).

KP Data Transmission

Within 500 uS of the panel transmitting the Data Poll transmission, the KP responds with the KP Data transmission (Not sure what the max response time for this transmission is). The following data is for a fixed display keypad at address 16. The response might be slightly different for keypads at different addresses.

| Source | 1st Byte | 2nd byte | 3rd byte | 4th byte |
|---|---|---|---|---|
| KP Parity | Sequence # Even | 02 Even | Key Press Even | CSUM Even |

The lower nibble of the Sequence # byte corresponds to the bus address (0 for address 16 thru 7 for address 23). The upper nibble of the Sequence # byte changes with every KP transmission. It cycles thru 1,5,9,D.

The second byte is always 0x02.

The 3rd byte is the key that was pressed (i.e. 00 for zero, 09 for nine).

0x0A is transmitted for "*"

0x0B is transmitted for "#"

CSUM is calculated by adding up the sum of the previous 3 bytes and subtracting from 0xFF.

To control the security system, you will need to send the following key press sequences:

(1,2,3,4 is the user code, the following number is the arming level)

| Action | Key press Sequence |
|---|---|
| Disarm | 1, 2, 3, 4, 1 |
| Arm to Away | 1, 2, 3, 4, 2 |
| Arm to Stay | 1, 2, 3, 4, 3 |

These are all the possible commands the keypad will transmit when the status, 1,2,3, or 4 key is pressed:

| KP Key | Source | Data | Parity |
|---|---|---|---|
| STATUS | KP | 10020AE4 | Even |
| STATUS | KP | 50020AA4 | Even |
| STATUS | KP | 90020A64 | Even |
| STATUS | KP | D0020A24 | Even |
| 1 | KP | 100201ED | Even |
| 1 | KP | 500201AD | Even |
| 1 | KP | 9002016D | Even |
| 1 | KP | D002012D | Even |
| 2 | KP | 100202EC | Even |
| 2 | KP | 500202AC | Even |
| 2 | KP | 9002026C | Even |
| 2 | KP | D002022C | Even |
| 3 | KP | 100203EB | Even |
| 3 | KP | 500203AB | Even |
| 3 | KP | 9002036B | Even |
| 3 | KP | D002032B | Even |
| 4 | KP | 100204EA | Even |
| 4 | KP | 500204AA | Even |
| 4 | KP | 9002046A | Even |
| 4 | KP | D002042A | Even |

Panel Acknowledge Transmission

After the panel successfully receives the KP Data transmission, it will transmit a Panel Acknowledge transmission. The Panel Acknowledge Transmission is the Sequence # that the KP transmitted in it's KP Data Transmission. For a keypad at address 16, the 4 potential Ack signals are listed below:

| Source | Data | Parity |
|---|---|---|
| Panel | 10 | Even |
| Panel | 50 | Even |
| Panel | 90 | Even |
| Panel | D0 | Even |

Panel Data Transmission

When the KP Data transmission is STATUS key, the panel will send a Panel Data Transmission following the Panel Acknowledge Transmission. The Panel Data transmission contains system information such as open sensors. Once a STATUS press is transmitted, the panel continuously broadcasts arming level and system faults or conditions. An individual broadcast is sent for each fault/condition and is cycled every 3 seconds. See Obtaining System Status for information on decoding the broadcasted transmissions.

Obtaining System Status

The Ademco Vista 20 periodically broadcasts system arming level and other conditions, such as panel low battery. The transmission contains ASCII text that is displayed on the alphanumeric keypad. If you use a terminal emulator such as RealTerm to sniff the bus, you can view the ASCII characters contained in the panel broadcasted transmissions. You will need to invert the data before sending it to the pc. I've shown some examples below of byte sequences contained within the broadcasted messages. You should be able to look for these byte sequences to determine the panel's arming level. The parity of these transmissions is even.

Disarmed

| | |
|---|---|
| Hex Value | 2A 2A 2A 44 49 53 41 52 4D 45 44 2A 2A 2A 2A 20 20 52 65 61 64 79 20 74 6F 20 41 72 6D 20 20 |
| ASCII Value | ***DISARMED**** Ready to Arm |

Armed to Stay

| | |
|---|---|
| Hex Value | 41 52 4D 45 44 20 2A 2A 2A 53 54 41 59 2A 2A 2A |
| ASCII Value | ARMED ***STAY*** |

Armed to Away Exit Delay

| | |
|---|---|
| Hex Value | C1 52 4D 45 44 20 2A 2A 2A 41 57 41 59 2A 2A 2A 59 6F 75 20 6D 61 79 20 65 78 69 74 20 6E 6F 77 |
| ASCII Value | ARMED ***AWAY***You may exit now |

Busy—Standby (The Panel Powers Up in this Condition)

| | |
|---|---|
| Hex Value | 42 75 73 79 20 2D 20 53 74 61 6E 64 62 79 |
| ASCII Value | Busy - Standby |

Hit * for Faults—Broadcasted to Keypads when a Fault is Detected

| | |
|---|---|
| Hex Value | 2A 2A 2A 2A 44 49 53 41 52 4D 45 44 2A 2A 2A 2A 48 69 74 20 2A 20 66 6F 72 20 66 61 75 6C 74 73 3A |
| Asci Value | ****DISARMED****Hit * for faults: |

When sensor is open, "**Disarmed**Hit * for faults:" is broadcasted". If we see this broadcast, we should transmit a STATUS key press. Then the trouble conditions will be broadcasted to the keypads.

Fault on Sensor 01, "FRONT DOOR"—Broadcasted After STATUS is Pressed

| | |
|---|---|
| Hex Value | C6 41 55 4C 54 20 30 31 20 46 52 4F 4E 54 20 20 44 4F 4F 52 |
| Asci Value | ÆAULT 01 FRONT DOOR |

Note that sensor text is broadcasted with the zone trouble condition above.

Program Mode Zone Data Field: Zone Number=01, Zone Type=21, Partition=1, Report Code=10, HW type=EOL, Response Time=1

| | |
|---|---|
| Hex Value | DA 6E 20 5A 54 20 50 20 52 43 20 48 57 3A 52 54 30 31 20 32 31 20 31 20 31 30 20 45 4C 3A 31 |
| Asci Value | Ún ZT P RC HW:RT01 21 1 10 EL:1 |

The above packet is transmitted when in installer program mode. We can transmit the proper key presses to enter program mode and view program settings such as shown above.

Panel Power Up

Whenever the keypad is powered up or reset, it sends an “I Have Data” packet to the panel. When the panel responds with the Data Poll packet, the keypad transmits the following data:

“I'm Here” Packet

| Source | 1st Byte | 2nd byte | 3rd byte | 4th byte | 5th byte | 6th byte | 7th byte | 8th byte | 9th byte | Parity |
|---|---|---|---|---|---|---|---|---|---|---|
| TP | Sequence # | 87 | 0 | Type | 4 | 4 | 4 | 0 | CSUM | even |

Notice in the above case, that both KP's transmit the “I Have Data” packet at the same time. One KP attempts to transmit “FE”. The other attempts to transmit “7F”. The resulting transmission is “7E” (7F & FE). This indicates the time of this “I Have Data” packet may be very critical.

Other Notes

The Vista 20 panel does not appear to supervise or randomly poll keypads. I did not do long term testing to verify this.

The lower nibble of the Sequence # byte corresponds to the bus address (0 for address 16 thru 7 for address 23). The upper nibble of the Sequence # byte changes with every KP transmission. It cycles thru 1,5,9,D.

The second byte is always 0x87.

The 3rd byte is always 0x00.

Type is “00” for 6160 Alpha Keypad or “01” for the 6148 or 6150 Fixed English Keypad.

The 5th-7th bytes are always “04”.

The 8th byte is always “0”.

CSUM calculated by adding up the sum of the previous 3 bytes and subtracting from 0xFF.

Examples of above packet:

Panel is powered with a 6160 alpha keypad at address 23:

| Source | 1st Byte | 2nd byte | 3rd byte | 4th byte | 5th byte | 6th byte | 7th byte | 8th byte | 9th byte |
|---|---|---|---|---|---|---|---|---|---|
| TP | 17 | 87 | 0 | 0 | 4 | 4 | 4 | 0 | 56 |

Panel is powered with a 6148 or 6150 fixed English keypad at address 16:

| Source | 1st Byte | 2nd byte | 3rd byte | 4th byte | 5th byte | 6th byte | 7th byte | 8th byte | 9th byte |
|---|---|---|---|---|---|---|---|---|---|
| TP | 10 | 87 | 0 | 10 | 4 | 4 | 4 | 0 | 4D |

Panel is powered with a fixed English keypad at address 16 and an alpha keypad at address 23:

| Source | Data | Notes |
|---|---|---|
| Panel | 00 F2 12 06 00 00 00 00 60 6C 02 45 6C F5 EC 04 01 01 00 00 90 00 00 | Panel power up?? |
| Panel | 00 00 00 | General Poll |
| Keypad | FF FF 7E | “I Have Data” from both keypads |
| Panel | F6 17 | Data Poll address 23 |
| Keypad | 17 87 00 00 04 04 04 00 56 | “I'm Here” from addr 23 |
| Panel | 17 | Ack (addr 23) |
| Panel | F6 10 | Data Poll address 16 |
| Keypad | 10 87 00 10 04 04 04 00 4D | “I'm Here” from addr 16 |
| Panel | 10 | Ack (addr 16) |
| | 00 00 00 | General Poll |
| | 00 00 00 | General Poll |

Arming level is broadcasted every 10 seconds unless the arming level display message is being cycled with another display message. If display messages are being cycled, the display rotates every 3 seconds between the different displays.

There might be an advantage (especially in setup) to emulating a Vista ICM TCP module, which probably has commands to allow us to get programming information such as sensor type. We should however be able to get all this same information if we emulate a keypad and enter program mode by transmitting the installer code. We could then transmit the appropriate keys to view the programming data fields.

Bus Investigation Update

Resolution Engineering has been investigating the Honeywell Vista-20P bus protocol for iControl. Although the investigation is not complete, this document highlights what is currently known about the Honeywell bus protocol. This investigation focused mainly on Vista's communication with the 6160 Custom Alpha Keypad and the 7847i Internet Communication Module.

Ademco Vista Data Bus Basics

The Honeywell Vista data bus is a master/slave bus. The Vista panel is the master and all other devices are slaves. The slave devices do not transmit on the bus unless the master polls them. In this respect, the Vista data bus is similar to the GE Superbus. The Vista bus uses two data wires. One wire is used for the master to transmit to the slaves. The other wire is used for the slaves to transmit to the master. The bus protocol uses standard 4800-baud serial communication with 1 start bit, 8 bits data bits, 1 parity bit, and 1 stop bit.

Parity is usually even, however, in a couple of rare cases, it is odd. The data bus uses 0V and 12V logic levels. The receive and transmit signals found on the data bus are inverted from the transmit and receive data signal that are present at the UART pins of the microprocessor of the devices(i.e. a "one" is transmitted by the microprocessor UART as 5V, but appears on the data bus at 0V and a "zero" is transmitted by the microprocessor UART as 0V, but appear on the data bus at 12V).

The general operation of the bus includes the panel transmitting general polls that any slave device can respond to. If a device has data to respond with, it transmits a "request to speak" transmission, which contains its bus address. The master than polls that device directly. After the device transmits it's data, the panel transmits an ACK to let the device know it received the data. The data bus response times in some cases are very critical and short(on the order of 50 uS).

6160 Keypad

The 6160 keypad is a non-intelligent device. The panel transmits display messages, in ASCII, to the keypad and the keypad displays the messages. The keypad does not retain or store any knowledge of system status. System status can be retrieved from the bus messages to the keypad, however, it is not an efficient way to receive system status. It is similar to using the Ademco wireless keypad transmissions for system status. For example, to determine that a zone has been restored, you would need to wait for the display to cycle thru all of its trouble events and verify the absence of the open zone to know it has been restored. The 6160 keypad can transmit keypresses to the Ademco panel. Any system control or programming that can be done by the 6160 (i.e. arm, disarm, installer programming) could also be done by a device that is emulating the 6160 as long as the emulating device knows the system security codes. The 6160 keypad bus protocol was investigated to the point where the general operation of the keypad is known including transmitting keypresses and receiving display messages.

7847i Internet Communication Module

According to the Honeywell website, the 7847i has the following features:

- Secure IP Reporting
  - Reports signals via Internet or Intranet (7847i-E only)
  - Uses 256-bit Advanced Encryption Standard or optional 1,024 bit encryption with two-way authentication and no key exchange for maximum data protection.
- Dialer Capture Ready
  - Compatible with Dialer Capture Intelligence Device (non-ecp capable LYNX) or DCID-EXT (other control panels). Captures Contact ID messages from the panel's phone line and sends them to the central station via the IP communicator.
- Universal Control Panel Compatibility
  - Flexible modes of operation allow ECP full alarm reporting by Honeywell control panels, 4204 relay mode for Honeywell controls that do not support ECP alarm reporting and zone triggering for use with other control panels.
  - LYNXR-I integration with 7847i-L
- Full Contact ID or ADEMCO High Speed Reporting
  - ECP mode with compatible Honeywell control panels support full Contact ID reporting. All other modes use ADEMCO High Speed reporting format.
- Six Input Zones
  - Each zone can be configured for +V, −V, or EOLR triggering. Each zone can be programmed for inverted operation, delayed reporting and restoral reporting. Zone 1 can distinguish between pulsed and steady inputs (7847i/7847i-E).
- Tamper Protected Enclosure
  - Built-in tamper sends a report when a tamper condition is detected and a restore when cleared.
- Remote Services Capability*
  - Control Honeywell control panels via Internet or mobile device and e-mail notification of system events. * Requires optional Honeywell Total Connect service
- Network Friendly
  - Installs behind firewalls without compromising network security—dynamic or static IP addressing
- Ease of Installation
  - Easy CAT-5 10 BaseT connection to a hub or router-
  - Quick connection to compatible Honeywell series control panels.
  - Simple programming using a 7720P programmer, AlarmNet Direct website or via LYNXR-I (7847i-L).
- Upload/Download
  - With select Honeywell control panels. Requires Compass version 1.5.8.54a or higher.

The features of most interest are:

Secure IP Reporting

Remote Services Capability

Upload/Download

The Secure IP Reporting feature indicates that central station reports are sent to the 7847i bus device and could be received by a device emulating the 7847i. The Remote Services Capability implies the 7847i can be used as an automation module to control the system and track system status. This is likely a much more efficient way to track system status than emulating a keypad. These features of the 7847i have not been investigated.

The upload/download feature has been investigated. Most of the investigation has been focused on the download. Much of the communication is understood. A huge breakthrough was figuring out how the data is encrypted. The data portions of the upload/download transmissions are XOR'd with an encryption byte. This encryption byte changes every time the internet communication is re-established between the 7847i and the Compass pc software. I'm assuming the panel passes this byte to the 7847i or vice versa upon connection, but I'm not 100% sure of that. There are a couple of bytes early in the communication that I have been always able to use to determine the encryption value. The low nibble of one of the bytes has always been equal to the low nibble of the encryption byte. The high nibble of another byte has always been equal to the high nibble of the encryption byte. This probably occurs because these nibbles have a value of zero before being encrypted. If they are always zero (before encryption) in all cases for all systems, then we can use them to determine the encryption value, however, there is a risk that this is not the case. I still have more work to figure out the rest of the bytes in these initial packets. I'm hoping that after I determine the significance of the other bytes, it will be clearer if/where the encryption value is passed between the panel and the 7847i. I'm pretty sure these initial packets also contain the system status information.

Risks/Unknowns

I have not investigated the reporting and remote services capability features of this module. Although a good portion of the downloader communication protocol has been figured out, there is still more to learn. The biggest unknown at this time are where/if the encryption key is passed (hopefully it is not generated by some algorithm that is known by both the panel and the 7847i module).

Vista iSPIM Requirements for a Non-Polling iHub System

Overview

This documents lists the requirements and questions related to implementing an iSPIM that connects directly to the Vista's ECP bus and uses the Vista's radios to transmit data to the iHub. This creates event driven transmissions. The purpose is to nearly eliminate the need for an iHub to poll the Vista panel within FCC guidelines.

Basically we want the system to work at least as well as it does now without the iHub needing to poll the panel.

Requirements

The scope of the requirements is to support the existing functionality available when the iHub polls the Vista panel for status states, zone states and also possibly addressing a few limitations.

Must support existing functionality without requiring iHub polling of panel.

Should work with Chime mode Off (or On)

Cannot interfere with normal Vista panel operation.

iSPIM needs to transmit a heartbeat to the iHub.

Existing Functionality, Ability to detect a Panel's:

When the following events occur the iSPIM will force a packet transmission using the panel's radio:

Arm/Disarm states

Alarm states

Alarm Cancel

Zones faulted

Zone's Alarm state

Zone's tamper, battery low states, bypassed

Panel status including battery low, AC low, tamper, Chime, bypassed

Exit Delay

Miscellaneous packets presently available including Installer Mode, Test Mode, Dialer Failure, Panel Power Up, RF Jam Detect . . . .

Existing Limitations or Possible Improvements:

Zone closure events

Bypassed zones—transmit zones as they are bypassed.

Questions and Comments

FCC

Does a 5800TM transmitter exceed FCC requirements when it transmits for over 5 seconds?

Example with 6 zones open, after querying the panel, the 5800TM will transmit all 6 zones over a period of about 15 seconds.

Will an event driven system as proposed meet FCC requirements?

FCC contact.

ECP Commands

What type of ECP commands can the iSPIM use to control the Vista Operation that will meet the requirements? The following apply to the 5800, 5883, 6150/60RF radios unless states otherwise. If the commands differ between radios please state so in the answers. Also note these are for wired and wireless zones. Some possible examples or related questions:

First assume the bus supports multi-masters, so that the iSPIM can place a command on the bus without interfering with the Vista processors operation.

Bus command that will make a radio transmit zone info?

Bus command where the iSPIM can specify the specific zone number to transmits? Or for 6150/60RF, are we limited to what is displayed on the keypad?

Bus command that will make a radio transmit panel status including arm/disarm/alarm?

Bus command for transmitting any zones health status such as battery low, tamper . . .

Create our own packets?—NO emulate receiver status press—YES wait till proper display is up then do status press then do transmisson—iSPIM Plus emulate a receiver to or create fathom non alarm zones?—NO Behavioral Issues The iHub will still have to query the panel for all panel status and open zone states under certain conditions, for example when the iHub boots.

After a disarm from alarm condition all open zones no longer alarmed must be transmitted to iHub, otherwise they will stay in the portal's breached zone list.

Wired zone closure detection, possible solutions :

a. After first zone open, cause a transmission of status after any zone open/close—for detecting zone closures. Repeat transmission to get all the data out without violating FCC 5 sec rule. maybe get around the 5 sec rule as follows: vista radio transmits zones for 5 sec, if the iHUb has not seen a repeat yet, iHub then requests a new set of zone status immediately after for another 5 sec. Is this OK because it is NOT a periodic poll, but is just a reaction to the event the iHiub got from the panel b. Panel transmits a packet we define that iHub uses to detect zone closure.

c. when zone closes, transmit adjacent packet, like 3,4,5, 4 closes, 3,5 . . . to know zone 4 closed Notes: Commands from vista receiver different than from keypad Other:

U.L approved device not required for non-u.1 installations.

Command and Event Capabilities with the Vista 20 and Vista 20P

The Vista 20 has been around for many years as the Vista 20P is relatively new. I think the Vista 20P has replaced the Vista 20. From what I can tell, they added in support for LRR-ECP Data into the Vista 20P(Vista 10P as well). The Vista 20P allows the panel to support GSM and Internet modules such as the 7847i which allow the better access to the outside world including compatibility with Total Connect. This new support allows LRR devices such as GSM and Internet modules to efficiently retrieve system information from the panel as well as control it. Support for downloading thru the data bus was also added. I have not been able to verify but my guess is that none of the Vista 20's support the LRR-ECP Data devices and all of the Vista 20P's support the LRR-ECP Data devices.

The Vista 21iP is very similar to the Vista 20P, except the internet module has been built onto the Vista 21iP panel. It appears to be similar to a Vista 20P with an added external bus internet module.

On the Vista 20P panels, the most efficient way to gather the information of interest would be to emulate a LRR device. On the older Vista 20 panel, much of this same information could be gathered, although less efficiently by emulating a keypad. I have not found any indications that would suggest that the Vista 20 could be downloaded thru the data bus.

Emulating a keypad would allow the ihub to receive the keypad displays in ASCII. The ihub would need to parse thru the ascii strings to figure out what information is present. Then it would need to apply logic, sometimes based on previous panel states to determine the current panel state. If there are many events, it can be slow to receive information because each keypad message is displayed for multiple seconds before moving onto the next. This is similar to the wireless application that iControl is currently implementing, with the exception that the communication from the panel will be more consistent with the bus application. Zone restorals cannot be detected immediately because they can only be detected by an absence of the zone open message.

Emulating a GSM or Internet module would be much more straightforward to implement. For example, if there is a change in the state of the zones, the Vista 20P panel transmits a message indicating a zone state change has occurred. The GSM or internet module will then send the following 5 query requests to the panel: list all the faulted/open zones, list all the tampered zones, list all the alarm zones, list all zones in RF supervisory, and list all zones with low batteries. The GSM or Internet module is able to gather all this information very quickly. Also note that the GSM or Internet module can obtain information such as sensor lists and user codes without the system going into program mode.

Below is a list of the events/commands contained in the iControl API document. In the columns to the right is information as to whether or not the event/command can be detected/executed by emulating either a keypad or a 7847i Internet module.

Security System Events

| Events/Commands from API document | Emulating Keypad | Emulating 7847i Internet module | Notes |
|---|---|---|---|
| Security Panel Interface | Can this be detected or executed. | | |
| Asynchronous Events | | | |
| ALARM event | YES | YES | |
| ALARM Restore | | | Not sure what this is? |
| ALARM Cancel | YES | YES | |
| CMS REPORT event | | | Cannot directly tell. |
| TROUBLE event | YES | YES | |
| TROUBLE RESTORE event | YES | YES | |
| ARM PROTEST START event | YES | YES | |
| ARM PROTEST END event | | | Not sure? |
| ARM STATE CHANGE event | YES | YES | |
| DELAY START event | YES | YES | |
| DELAY END event | YES | YES | |
| PROGRAMMING MODE START event | YES | YES | |
| PROGRAMMING MODE END event | YES | YES | |
| PANEL DOWN event | YES | YES | |
| PANEL READY event | YES | YES | |
| SENSOR ADD event | YES if done w/keypad, but may be tricky | YES if done w/keypad, but may be tricky | |
| SENSOR STATE CHANGE event | YES, but may not be instant | YES | |
| SENSOR DELETE event | YES if done w/keypad, but may be tricky | YES if done w/keypad, but may be tricky | |
| SENSOR MODIFY event | YES if done w/keypad, but may be tricky | YES if done w/keypad, but may be tricky | |
| TEXT DISPLAY event | YES | YES | |
| SECURITY CODE ADD event | YES if done w/keypad, but may be tricky | YES if done w/keypad, but may be tricky | |
| SECURITY CODE DELETE event | YES if done w/keypad, but may be tricky | YES if done w/keypad, but may be tricky | |
| SECURITY CODE MODIFY event | YES if done w/keypad, but may be tricky | YES if done w/keypad, but may be tricky | |
| MASTER CODE CHANGE event | YES if done w/keypad, but may be tricky | YES if done w/keypad, but may be tricky | |
| Commands | | | |
| Arm | YES | YES | |
| Panic Alarm | YES | YES | |
| Cancel Panic Alarm | YES | YES | |
| Force arm (indirect bypass) | YES | YES | |
| Cancel Protest | YES | YES | |
| Bypass sensor | YES | YES | |
| Cancel sensor bypass | YES | YES | |
| Enter programming mode | YES | No, but could also emulate keypad. | 7847i can up/download |
| Leave programming mode | YES | No, but could also emulate keypad. | |
| Enter User programming mode | YES | Not sure, but could also emulate keypad. | |

-continued

| Events/Commands from API document | Emulating Keypad | Emulating 7847i Internet module | Notes |
|---|---|---|---|
| Leave User programming mode | YES | Not sure, but could also emulate keypad. | |
| Change master code | YES | YES | |
| Learn sensor | YES | No, but could also emulate keypad. | 7847i can up/download |
| Add Sensor | YES | No, but could also emulate keypad. | 7847i can up/download |
| Learn sensor abort | YES | No, but could also emulate keypad. | 7847i can up/download |
| Delete sensor | YES | No, but could al so emulate keypad. | 7847i can up/download |
| Modify Sensor | YES | No, but could also emulate keypad. | 7847i can up/download |
| Get sensor list | YES, but involves going into pgm mode | YES, can do without enter program mode. | |
| Get sensor information | YES, but involves going into pgm mode | YES, can do without enter program mode. | |
| Get panel arm state | YES | YES | |
| Begin keypad emulation mode | YES | YES | |
| End keypad emulation mode | YES | YES | |
| Simulate keypress | YES | YES | |
| Get list of supported tokens | Not Sure | Not Sure | |
| Get system version Information | Not Sure | YES | |
| Get security code list | YES | YES | |
| Add security code | YES | YES | |
| Delete security code | YES | YES | |
| Modify user | YES | YES | |
| Quick Exit | YES | YES | |
| Set Chime Mode | YES | YES | |
| Get Security Options | | | |
| Home Automation Interface | | | |
| Commands | | | |
| Get Registered Devices | | | |
| Get Unregistered Devices | | | |
| Get Extended Device Information | | | |
| Get Device State | | | |
| Register Device | | | |
| Modify Device | | | |
| UnRegister Device | | | |
| Get Cameras | | | |
| GetDeviceHistory | | | |
| GetSecurityHistory | | | |
| GetSensorHistory | | | |
| GetSecurityCodes | | | |
| GetSensors | | | |
| Events | | | |
| DEVICE ADD event | | | |
| DEVICE MODIFY event | | | |
| DEVICE STATE CHANGE event | | | |
| DEVICE DELETE event | | | |
| Local client APIs | | | |
| Commands | | | |
| Set backlight | | | |
| Get value of backlight | | | |
| Set volume | | | |
| Get value of volume | | | |
| Set Timezone | | | |
| The Preference APIs | | | |
| Commands | | | |
| Get Named Preference | | | |
| Set Named Preference | | | |
| Delete Named Preference | | | |
| Get Preference Names | | | |

Reliably Receiving Zone State Changes by Listening on HW Bus:

RF sensors enrolled into HW panel

Panel could monitor receiver bus transmissions which contain all RF packets received so all wireless state changes received by panel would also be received by listener module.

Hardwire sensors enrolled into HW panel

SUMMARY

When listening to Vista 20P bus messages, there is a danger of missing quick zone faults. There is even a bigger danger of missing the event of a faulted zone being restored and then quickly faulted again. There are some things that can be done to improve this, but not make it bulletproof.

Details:

When a single zone is faulted, the panel immediately sends a bus message to the keypad indicating the open zone. However, if multiple zones are tripped at the same time, the panel immediately sends a bus message for only one of the zones to the keypad. It will then cycle thru sending the rest of the open zones to the keypad, one every couple seconds, so it could a couple seconds to get notice that the 2nd sensor is open. This time could be longer if there are more open zones. There is also a chance the sensor could be restored before the panel gets around to sending the bus message indicating the zone is faulted. If this happens, the zone fault indication will never be sent on the bus. One thing that could significantly reduce the chance of missing a zone fault would be to have the listening device constantly send a keypad "*" key bus message which requests system status. Everytime this occurs, the keypad broadcasts the next system state rather than waiting a couple of seconds. If there are many sensors open, there is still a chance of missing a zone fault in the event of two zones faulting at the same time.

To determine a faulted zone has been restored, you need to detect that the panel is no longer transmitting a faulted zone message for that zone. In order to do this, you must wait for the panel to cycle thru its list of open sensors. If a sensor is restored and faulted again, the listening device may fail to catch these zone transitions.

Emulating a Honeywell Advanced User Interface (AUI) bus device is a more reliable way to monitor these devices, but I don't think it is supported on all versions of the Vista 20P.

See FIGS. 25A-E.

6150RF

As previously believed, there are no signals from the panel instructing the 6150RF to transmit RF. The panel sends hardwired bus keypad display commands about every 4 seconds to the hardwired keypads. These keypad display commands instruct the keypad what to display as well as the 6150RF what to transmit to the RF keypad. However, the 6150RF determines whether or not to transmit them. Normally, these messages are not transmitted wirelessly by the 615RF keypad. However in certain cases they are.

The hardwired bus keypad display messages have bytes that indicate the state of the fixed display icons and whether or not the keypad should beep.

The 6150RF keypad wirelessly transmits all hardwire bus keypad commands for 5 seconds after one of the following events occur:

1. A hardwired bus keypad display message indicates a change in panel status(panel status bytes are included in each keypad transmission. The 6150RF tracks these states and transmits based on a change in status)
   This includes the transmitting when the first open zone is opened because it changes the panel state from ready to arm to not ready to arm.
      However, the second zone opened will not be transmitted unless it occurs within 5 seconds of the first.
2. Bytes 7,8,9 of the keypad message indicate the keypad should beep. This is why there are RF transmissions for chime zones and also for a panel disarm when the panel was already disarmed.
3. The 6150RF receives a "*" command from a wireless keypad.

It appears that most/all panel status changes are transmitted by the 6150RF independent of iHUB polling.

Note:

A Hardwired keypad "*" keypress will cause the panel to increment immediately to the next open zone rather than waiting for 3-4 seconds. This will allow more status transmissions to transmit in the 5 second window.

Other Directions

1. We could possibly add a 5800TM module along with the iSPIM

Not sure if 5800TM transmits the same RF data we are setup to receive since it supports only lower end keypads 2. We could use Partition 2 for iHUB communication. We could program non-alarm zones into the panel that mirror the real zones. Each real zone could have a Partition 2 zone programmed that would indicate the real zone has been opened and a Partition 2 zone that would indicate the zone has been restored. The non-alarm zones would be triggered by the iSPIM which would emulate a bus zone expander module and trip them at the appropriate times.

more programming for installers not sure if the 6150RF will transmit RF for Partition #2(Can't get it to on my system)

a 5839 wireless keypad is supported in partition #2, but requires the panel to use a 5883 transceiver.

I can't get the 5828 keypad to work in partition 2. I can't find any documentation indicating whether or not it will. I tried calling Safemart for the answer, but they are closed today.

maybe the 5800TM will transmit in Partition #2??

3. We could emulate a hardwired keypad and do one of the events that causes the start of the 5 minute transmit window. We can then press hardwired keypad "*" presses to advance the keypad display thru the list of troubles. All the troubles that are displayed on the hardwired keypad within 5 seconds will be transmitted.

For example, we transmit the hardwired keypad keypresses on the bus to toggle the chime feature on/off, then transmit multiple hardwired "*" kepresses to cause panel to advance to thru many display messages which will cause the 6150RF keypad transmit all the displayed messages that occur within 5 seconds of the chime being re-enabled.

The number of events that can be transmitted in the 5 second window is limited. Every time a panel status event occurs(such as chime on/off), it resets the list back to the beginning, so we may never be able to transmit the upper zone openings if too many zones are open. One way around this is to enroll extra non-alarm zones every 2 or 3 zones (controlled by the iSPIM). To the panel the zones would be enrolled thru a zone expander module, but it would actually be an iSPIM emulating a zone expander module. We would then have control of where we are in the zone list by tripping these phantom zones. Will be more work for installers, ihub, and iSPIM.

If we were to use chime on and chime off, the transmissions may exceed the 5 second window because the first transmission will be sent when the chime on command is received, but the 5 second timer will be reset when the chime off command is received.

If we use chime on/off, the keypads will beep.

Most events that will cause a transmission will also cause a keypad beep

If the beep (chime or arming) is disabled at the 6150RF keypad, then the 6150RF keypad does not send any transmissions for disarm or opening of chime sensors.

Panel state changes that will cause transmissions from the 6150RF

Arming level change
Battery icon on/off
AC icon on/off
Check icon on/off
Ready to Arm LED on/off
Chime icon on/off
Bypass icon on/off
Alarm icon on/off
Panel beeps 4. We could do the wireless iSPIM. There are many less variables and unknowns if we do the wireless iSPIM. All the required commands an panel behavior is known. We would also greatly increase our ability to accurately detect the zone states when many zones are open. To meet the initial order demand, we could marry the current iSPIM to the current Honeywell Transceiver. We would need an enclosure, but I have an off the shelf enclosure that might work. The iSPIM would track panel conditions and transmit any changes directly to the iHUB using the HW transceiver. The iSPIM transmissions would match the transmissions the Vista normally transmits so that no changes would be required on the iHUB side. To indicate a zone closure, the iSPIM would transmit the zone preceding the closed zone and the zone following the closed zone. The iHUB could infer the zone has been closed based on it' absence.

See FIG. 26.

---

```
AC OK, Battery OK, Faults on zones 1-8
Level 1
01 01 00 22 08 7C 4B 00 A0 A0 A0 CB 4A
01 02 10 00 08 0D 08 00 A0 A0 A0 CB 4A
01 03 20 00 08 9A CB 00 00 A0 A0 C3 CA
01 04 30 00 08 F7 8B 00 A0 A0 A0 CB 4A
01 05 00 00 08 60 48 00 77 78 A0 95 69
01 06 10 00 08 DD 0B 00 45 46 88 12 71
01 07 20 00 08 4A C8 00 17 A0 A0 C2 E6
01 08 30 00 08 07 8B 00 A0 A0 A0 CB 4A
///////////////////////////////////////////////////
Fault on zone 25 (wireless) - (fault = open)
01 25 30 00 08 E3 84 00 A0 A0 A0 CB 4A
Alarm on zone 25 (RF)
01 25 20 00 0F E2 D6 00 A0 A0 A0 CB 4A
After first disarm
01 25 11 00 0A 61 1F 00 A0 A0 A0 CB 4A
After 2nd disarm
01 08 21 0C 08 2E DF 00 A0 A0 A0 CB 4A
after status press on wireless kp
01 08 30 0C 08 2F 8B 00 A0 A0 A0 CB 4A
after next status press on wireless kp
01 25 00 00 08 E0 44 00 A0 A0 A0 CB 4A
//////////////////////////////////////////////////////////////
//////////////////////////////////////////////////////////////
AC OK, Battery OK (Level 2)
zone 8 alarm
01 08 30 00 0F 87 9A 00 A0 A0 A0 CB 4A
zone 8 alarm, disarmed
01 08 01 00 0A 04 53 00 A0 A0 A0 CB 4A
zone 8 disarmed again(really disarmed this time)
01 08 11 0C 08 2D 1F 00 A0 A0 A0 CB 4A
zone 7 alarm
01 07 00 00 0F 48 5A 00 17 A0 A0 C2 E6
zone 7 alarm, disarmed
01 07 01 00 0A C8 53 00 17 A0 A0 C2 E6
zone 7 disarmed again(really disarmed this time)
01 08 11 0C 08 2D 1F 00 A0 A0 A0 CB 4A
/////////////////////////////////////////////////////////
////////////////////////////////////////////////////////////////////
AC OK, Battery OK
Level 1
01 08 00 1C 08 CC 48 00 A0 A0 A0 CB 4A
01 08 10 1C 08 4D 0B 00 A0 A0 A0 CB 4A
01 08 20 1C 08 4E CB 00 A0 A0 A0 CB 4A
01 08 30 1C 08 CF 88 00 A0 A0 A0 CB 4A
Level 2(AWAY), exit delay
01 45 00 00 0C 60 4E 05 A0 A0 A0 8F 4A
01 40 10 00 0C A5 0D 05 A0 A0 A0 8F 4A
01 35 20 00 0C A2 DA 05 A0 A0 A0 8F 4A
01 47 30 00 0C CB 8D 05 A0 A0 A0 8F 4A
01 60 32 00 0C 27 A9 05 A0 A0 A0 8F 4A
```

-continued

Level 2
01 08 00 0C 0C AC 50 00 A0 A0 A0 CB 4A
01 08 10 0C 0C 2D 13 00 A0 A0 A0 CB 4A
01 08 20 0C 0C 2E D3 00 A0 A0 A0 CB 4A
01 08 30 0C 0C AF 90 00 A0 A0 A0 CB 4A
Level 3, exit delay
01 51 10 80 08 71 1A 05 A0 A0 A0 8F 4A
01 47 20 80 08 4A DC 05 A0 A0 A0 8F 4A
01 44 30 80 08 F7 9F 05 A0 A0 A0 8F 4A
01 42 00 80 08 8C 5F 05 A0 A0 A0 8F 4A
Level 3
01 08 00 8C 08 AC 42 00 A0 A0 A0 CB 4A
01 08 10 8C 08 2D 01 00 A0 A0 A0 CB 4A
01 08 20 8C 08 2E C1 00 A0 A0 A0 CB 4A
Fire 01, Garage Heat
01 01 00 31 0A 16 47 00 17 A0 A0 C2 E6
01 01 10 31 0A 97 04 00 17 A0 A0 C2 E6
01 01 20 31 0A 94 C4 00 17 A0 A0 C2 E6
01 01 30 31 0A 15 87 00 17 A0 A0 C2 E6
Fault 08, Tamper(Resistor shorted)("Tamper" was zone 8 text)
01 08 30 00 08 07 8B 00 A0 A0 A0 CB 4A
Fault 08, Tamper(Resistor opened) ("Tamper" was zone 8 text)
01 08 30 00 08 07 8B 00 A0 A0 A0 CB 4A
Alarm 99 Master Panic (press * and # on kp)
01 99 00 00 0B 50 7B 00 90 0D A0 A6 83
01 99 10 00 0B D1 38 00 90 0D A0 A6 83
01 99 20 00 0B D2 F8 00 90 0D A0 A6 83
01 99 30 00 0B 53 BB 00 90 0D A0 A6 83
Fire Trouble 01
01 01 14 32 08 9D 58 00 A0 A0 A0 CB 4A
Fire Trouble 01 (after disarmed)
01 01 30 32 08 9F 88 00 A0 A0 A0 CB 4A
Hit * for Faults(Fault 08, Tamper) ("Tamper" was zone 8 text)
01 08 10 0C 08 AD 08 00 A0 A0 A0 CB 4A
AC Fail, Battery OK
Level 1
01 08 00 1C 00 4C 7B 00 A0 A0 A0 CB 4A
01 08 10 1C 00 CD 38 00 A0 A0 A0 CB 4A
01 08 20 1C 00 CE F8 00 A0 A0 A0 CB 4A
01 08 30 1C 00 4F BB 00 A0 A0 A0 CB 4A
Level 2, exit delay
01 35 00 00 04 A0 6A 05 A0 A0 A0 8F 4A
01 08 10 0C 04 AD 20 00 A0 A0 A0 CB 4A
01 49 20 00 04 92 FE 05 A0 A0 A0 8F 4A
01 42 30 00 04 0F BE 05 A0 A0 A0 8F 4A
Level 2
01 08 00 0C 04 2C 63 00 A0 A0 A0 CB 4A
01 08 10 0C 04 AD 20 00 A0 A0 A0 CB 4A
01 08 20 0C 04 AE E0 00 A0 A0 A0 CB 4A
01 08 30 0C 04 2F A3 00 A0 A0 A0 CB 4A
Level 3, exit delay
01 49 00 80 00 10 6F 05 A0 A0 A0 8F 4A
01 45 10 80 00 61 2C 05 A0 A0 A0 8F 4A
01 42 20 80 00 8E EF 05 A0 A0 A0 8F 4A
01 08 30 8C 00 2F B1 00 A0 A0 A0 CB 4A
Level 3
01 08 30 8C 00 2F B1 00 A0 A0 A0 CB 4A
AC OK, Low Battery
Level 1
01 08 00 5C 08 4C 4E 00 A0 A0 A0 CB 4A
01 08 10 5C 08 CD 0D 00 A0 A0 A0 CB 4A
01 08 20 5C 08 CE CD 00 A0 A0 A0 CB 4A
01 08 30 5C 08 4F 8E 00 A0 A0 A0 CB 4A
Level 2, exit delay
01 55 30 00 0C 23 88 05 A0 A0 A0 8F 4A
01 50 00 00 0C 64 48 05 A0 A0 A0 8F 4A
01 46 10 00 0C DD 0D 05 A0 A0 A0 8F 4A
01 42 20 00 0C 0E CE 05 A0 A0 A0 8F 4A
Level 2
01 08 30 4C 0C 2F 96 00 A0 A0 A0 CB 4A
01 08 00 4C 0C 2C 56 00 A0 A0 A0 CB 4A
01 08 10 4C 0C AD 15 00 A0 A0 A0 CB 4A
01 08 20 4C 0C AE D5 00 A0 A0 A0 CB 4A
Level 3, exit delay
01 08 10 CC 08 AD 07 00 A0 A0 A0 CB 4A
01 38 20 80 08 C6 CB 05 A0 A0 A0 8F 4A
01 33 30 80 08 5B 8B 05 A0 A0 A0 8F 4A
01 30 00 80 08 64 4B 05 A0 A0 A0 8F 4A -continued Level 3
01 08 10 CC 08 AD 07 00 A0 A0 A0 CB 4A
01 08 20 CC 08 AE C7 00 A0 A0 A0 CB 4A
////////////////////
Power up
01 D1 10 00 08 71 2C 00 A0 A0 A0 CB 4A Power Up
01 08 20 1C 08 4E CB 00 A0 A0 A0 CB 4A Disarmed, AC/Battery OK
Pressed "1" key which causes status press
01 08 10 1C 08 4D 0B 00 A0 A0 A0 CB 4A
Armed to Level 2
01 59 20 00 0C 52 CB 05 A0 A0 A0 8F 4A
01 32 30 00 0C CF 9A 05 A0 A0 A0 8F 4A
01 25 00 00 0C 60 5F 05 A0 A0 A0 8F 4A
01 22 10 00 0C 0D 1F 05 A0 A0 A0 8F 4A
01 19 20 00 0C D2 D6 05 A0 A0 A0 8F 4A
01 17 30 00 0C 0B 96 05 A0 A0 A0 8F 4A
01 14 00 00 0C 34 56 05 A0 A0 A0 8F 4A
01 11 10 00 0C F1 15 05 A0 A0 A0 8F 4A
01 09 20 00 0C 92 D0 05 A0 A0 A0 8F 4A
01 06 30 00 0C DF 93 05 A0 A0 A0 8F 4A
01 03 00 00 0C 98 53 05 A0 A0 A0 8F 4A
01 01 10 00 0C B1 13 05 A0 A0 A0 8F 4A
status press after arming complete
01 08 20 0C 0C 2E D3 00 A0 A0 A0 CB 4A
Disarmed
xxxxxxxxxxxxxxxxxxxxxxx
AC removed
01 08 10 1C 00 CD 38 00 A0 A0 A0 CB 4A disarmed, No AC
Armed level 2 (armed from panel, then status repeatedly pushed on keypad)
01 60 32 00 04 A7 9A 05 A0 A0 A0 8F 4A
01 08 00 0C 04 2C 63 00 A0 A0 A0 CB 4A
01 48 10 00 04 05 3D 05 A0 A0 A0 8F 4A
01 45 20 00 04 62 FE 05 A0 A0 A0 8F 4A
01 39 30 00 04 53 AA 05 A0 A0 A0 8F 4A
01 37 00 00 04 08 69 05 A0 A0 A0 8F 4A
01 34 10 00 04 B5 2A 05 A0 A0 A0 8F 4A
01 32 20 00 04 CE EA 05 A0 A0 A0 8F 4A
01 29 30 00 04 13 AC 05 A0 A0 A0 8F 4A
01 26 00 00 04 DC 6C 05 A0 A0 A0 8F 4A
01 24 10 00 04 F5 2C 05 A0 A0 A0 8F 4A
01 21 20 00 04 B2 EC 05 A0 A0 A0 8F 4A
01 18 30 00 04 47 A5 05 A0 A0 A0 8F 4A
01 16 00 00 04 1C 66 05 A0 A0 A0 8F 4A
01 13 10 00 04 D9 25 05 A0 A0 A0 8F 4A
01 11 20 00 04 72 E6 05 A0 A0 A0 8F 4A
01 08 30 00 04 07 A3 05 A0 A0 A0 8F 4A
01 05 00 00 04 60 60 05 A0 A0 A0 8F 4A
01 03 10 00 04 99 23 05 A0 A0 A0 8F 4A
01 01 20 00 04 32 E0 05 A0 A0 A0 8F 4A
01 08 30 0C 04 2F A3 00 A0 A0 A0 CB 4A
Disarmed from panel
01 08 01 1C 00 CC 6C 00 A0 A0 A0 CB 4A
01 08 11 1C 00 4D 2F 00 A0 A0 A0 CB 4A
01 08 21 1C 00 4E EF 00 A0 A0 A0 CB 4A
01 08 31 1C 00 CF AC 00 A0 A0 A0 CB 4A
01 08 01 1C 00 CC 6C 00 A0 A0 A0 CB 4A
Armed to level 2 (armed from Panel, status not pressed)
01 60 22 00 04 26 D9 05 A0 A0 A0 8F 4A
Disarmed(from panel)
01 08 31 1C 00 CF AC 00 A0 A0 A0 CB 4A
Armed to level 2 (armed from Panel, status not pressed)
01 08 02 0C 04 AC 48 00 A0 A0 A0 CB 4A
////////////////////////
power cycle, AC OK, Battery OK
/////////////////////////
Armed to level 2(at panel)
01 60 32 00 0C 27 A9 05 A0 A0 A0 8F 4A
Disarmed(at panel)
01 08 01 1C 08 4C 5F 00 A0 A0 A0 CB 4A
Armed to level 2(at panel)
01 60 12 00 0C A5 2A 05 A0 A0 A0 8F 4A
Status pressed on kp, Disarmed(at panel), status pressed on kp
Armed to level 2(at panel)
01 08 11 1C 08 CD 1C 00 A0 A0 A0 CB 4A
Disarmed (at panel)
Armed to level 2(at panel)
01 60 22 00 0C A6 EA 05 A0 A0 A0 8F 4A -continued Disarmed (at panel)
01 08 31 1C 08 4F 9F 00 A0 A0 A0 CB 4A
Status pressed at keypad
01 08 00 1C 08 CC 48 00 A0 A0 A0 CB 4A
Wait 30 seconds
Armed to level 2(at panel)
01 60 12 00 0C A5 2A 05 A0 A0 A0 8F 4A
Disarmed (at panel)
01 08 21 1C 08 CE DC 00 A0 A0 A0 CB 4A
Armed to level 3(at panel)
01 60 33 80 08 A7 AC 05 A0 A0 A0 8F 4A
////////////////////////
No AC, Battery OK
//////////////////////////
Panel disarmed
01 08 01 1C 08 4C 5F 00 A0 A0 A0 CB 4A
AC removed
01 08 10 1C 00 CD 38 00 A0 A0 A0 CB 4A
Armed to level 2(at panel)
01 08 22 0C 04 2E CB 00 A0 A0 A0 CB 4A
Disarmed(from panel)
01 08 31 1C 00 CF AC 00 A0 A0 A0 CB 4A
Armed to level 3(at panel)
01 60 03 80 00 24 5F 05 A0 A0 A0 8F 4A
Sensor 25 Alarm
01 25 30 80 03 E3 B4 00 A0 A0 A0 CB 4A
////////////////////////
AC OK, No Battery
///////////////////////
Armed to Level 2(from panel)
01 08 12 4C 0C 2D 3E 00 A0 A0 A0 CB 4A
AC removed
01 08 20 4C 04 2E E6 00 A0 A0 A0 CB 4A
//////////////////////////
Recorded what is naturally transmitted from panel
///////////////////////////
Powered Up in Level 2
01 D1 10 00 0C F1 37 00 A0 A0 A0 CB 4A
// no indication of arming level
Test again with LB and then with No AC
How do you tell difference between packet below and zone 8 packet (low nibble of byte 4? 00 for zone pkt?)
Restore a sensor before disarming and see how that effects data
Tripped sensor #4
01 04 20 00 0F F6 D9 00 A0 A0 A0 CB 4A //sensor 4, trig count 2, Batt OK, AC OK, arm level 2,
01 04 30 00 0F 77 9A 00 A0 A0 A0 CB 4A
01 04 00 00 0F 74 5A 00 A0 A0 A0 CB 4A
01 04 10 00 0F F5 19 00 A0 A0 A0 CB 4A
01 04 20 00 0F F6 D9 00 A0 A0 A0 CB 4A
01 04 30 00 0F 77 9A 00 A0 A0 A0 CB 4A
01 04 30 00 0F 77 9A 00 A0 A0 A0 CB 4A
01 04 00 00 0F 74 5A 00 A0 A0 A0 CB 4A
01 04 10 00 0F F5 19 00 A0 A0 A0 CB 4A
01 04 20 00 0F F6 D9 00 A0 A0 A0 CB 4A
01 04 30 00 0F 77 9A 00 A0 A0 A0 CB 4A
Disarmed
01 04 01 00 0A F4 53 00 A0 A0 A0 CB 4A
Disarmed again
01 08 11 0C 08 2D 1F 00 A0 A0 A0 CB 4A
Repeatedly disarmed
01 04 21 00 08 F6 DF 00 A0 A0 A0 CB 4A
01 04 31 00 08 77 9C 00 A0 A0 A0 CB 4A
01 04 01 00 08 74 5C 00 A0 A0 A0 CB 4A
Fault removed from Zone 4
01 08 10 1C 08 4D 0B 00 A0 A0 A0 CB 4A
Zone fault zone 25 (no alarm)
01 25 20 00 08 62 C7 00 A0 A0 A0 CB 4A
/////////////////////////////
Power cycled
/////////////////////////////
Armed to level 2
01 60 32 00 0C 27 A9 05 A0 A0 A0 8F 4A
Remove AC power
01 08 00 0C 04 2C 63 00 A0 A0 A0 CB 4A
Trip sensor #4
01 08 10 0C 05 2D 25 00 A0 A0 A0 CB 4A
01 04 20 00 07 76 EA 00 A0 A0 A0 CB 4A
01 04 20 00 07 76 EA 00 A0 A0 A0 CB 4A -continued

```
01 08 30 0C 05 AF A6 00 A0 A0 A0 CB 4A
01 04 11 00 02 F5 23 00 A0 A0 A0 CB 4A
Disarmed
01 04 11 00 02 F5 23 00 A0 A0 A0 CB 4A
Disarmed again
01 08 31 0C 00 2F AF 00 A0 A0 A0 CB 4A
Removed Zone #4 fault
01 08 00 1C 00 4C 7B 00 A0 A0 A0 CB 4A
AC restored
01 08 10 1C 08 4D 0B 00 A0 A0 A0 CB 4A
////////////////////////////////
/////////////////////////////////////
Armed to Level 2
01 60 02 00 0C 24 69 05 A0 A0 A0 8F 4A
Tripped Sensor 4, immediately restored it
01 04 10 00 0F F5 19 00 A0 A0 A0 CB 4A
01 04 20 00 0F F6 D9 00 A0 A0 A0 CB 4A
01 04 30 00 0F 77 9A 00 A0 A0 A0 CB 4A
01 04 20 00 0F F6 D9 00 A0 A0 A0 CB 4A
Disarmed
01 04 00 00 0F 74 5A 00 A0 A0 A0 CB 4A
Disarmed again
////////////////////////////////
/////////////////////////////////
Armed Level 2
01 60 12 00 0C A5 2A 05 A0 A0 A0 8F 4A
Tripped Sensor 4, immediately restored it
01 04 20 00 0F F6 D9 00 A0 A0 A0 CB 4A
01 04 30 00 0F 77 9A 00 A0 A0 A0 CB 4A
01 04 00 00 0F 74 5A 00 A0 A0 A0 CB 4A
01 04 10 00 0F F5 19 00 A0 A0 A0 CB 4A
01 04 20 00 0F F6 D9 00 A0 A0 A0 CB 4A
Panel Disarmed
01 04 31 00 0A F7 93 00 A0 A0 A0 CB 4A
Panel LB
01 08 04 4C 08 2C 1E 00 A0 A0 A0 CB 4A
///////////////////////////////////////////
Panel power cycle
/////////////////////////////////////////////
01 D1 10 00 08 71 2C 00 A0 A0 A0 CB 4A          //Power up Message
01 08 20 1C 08 4E CB 00 A0 A0 A0 CB 4A
///////////////////////////////////////////
Panel power cycle in level 3
/////////////////////////////////////////////
01 D1 10 80 08 F1 25 00 A0 A0 A0 CB 4A
///////////////////////////////////////////
Panel power cycle in level 2
////////////////////////////////////////////
01 D1 10 00 0C F1 37 00 A0 A0 A0 CB 4A
////////////////////////////////////////////
Panel power cycle in level 1
/////////////////////////////////////////////
01 D1 10 00 08 71 2C 00 A0 A0 A0 CB 4A
01 08 20 1C 08 4E CB 00 A0 A0 A0 CB 4A
////////////////////////////////////////////
Panel power cycle in NIGHT STAY mode
/////////////////////////////////////////////
01 D1 10 80 08 F1 25 40 A0 A0 A0 4B 57
/////////////////////////////////////////
Panel power cycle in INSTANT mode
////////////////////////////////////////////
01 D1 10 80 88 72 26 00 A0 A0 A0 CB 4A
/////////////////////////////////////////
Panel power cycle in MAXIMUM mode
/////////////////////////////////////////////
01 D1 10 00 8C 72 34 00 A0 A0 A0 CB 4A
////////////////////////////////////////////////
///////////////////////////////////////////////
//////////////////////////////////////////////
01 08 21 1C 08 CE DC 00 A0 A0 A0 CB 4A          1
01 60 32 00 0C 27 A9 05 A0 A0 A0 8F 4A          2
01 08 01 1C 08 4C 5F 00 A0 A0 A0 CB 4A          1
01 60 13 80 08 25 2F 05 A0 A0 A0 8F 4A          3
01 60 32 00 8C A4 AA 05 A0 A0 A0 8F 4A                4
01 08 01 1C 08 4C 5F 00 A0 A0 A0 CB 4A          1
01 60 13 80 08 25 2F 05 A0 A0 A0 8F 4A          3-3
01 08 21 1C 08 CE DC 00 A0 A0 A0 CB 4A                1
01 60 33 80 88 24 AF 05 A0 A0 A0 8F 4A          7
01 08 00 8C 88 2F 41 00 A0 A0 A0 CB 4A          7
```

-continued

| | | |
|---|---|---|
| 01 08 10 8C 88 AE 02 00 A0 A0 A0 CB 4A | 7 | |
| 01 08 21 1C 08 CE DC 00 A0 A0 A0 CB 4A | | 1 |
| 01 08 30 1C 08 CF 88 00 A0 A0 A0 CB 4A | 1 | |
| 01 60 02 00 0C 24 69 05 A0 A0 A0 8F 4A | 2 | |
| 01 57 10 00 0C 09 08 05 A0 A0 A0 8F 4A | 2 | |
| 01 60 33 80 08 A7 AC 05 A0 A0 A0 8F 4A | 3 | |
| 01 53 00 80 08 58 5A 05 A0 A0 A0 8F 4A | 3 | |
| 01 08 11 1C 08 CD 1C 00 A0 A0 A0 CB 4A | 1 | |
| 01 60 22 00 8C 25 E9 05 A0 A0 A0 8F 4A | 4 | |
| 01 54 30 00 8C 34 88 05 A0 A0 A0 8F 4A | 4 | |
| 01 60 13 80 08 25 2F 45 A0 A0 A0 0F 57 | 3-3 | |
| 01 53 20 80 08 DA D9 45 A0 A0 A0 0F 57 | 3-3 | |
| Disarm | | |
| 01 08 31 1C 08 4F 9F 00 A0 A0 A0 CB 4A | | |
| Level 3 | | |
| 01 60 03 80 08 A4 6C 05 A0 A0 A0 8F 4A | | |
| status press on wl kp | | |
| 01 08 10 8C 08 2D 01 00 A0 A0 A0 CB 4A | | |
| Level 4 | | |
| 01 60 32 00 8C A4 AA 05 A0 A0 A0 8F 4A | | |
| status press on wl kp | | |
| 01 08 00 0C 8C 2F 53 00 A0 A0 A0 CB 4A | | |
| from above | | |
| 01 60 32 00 8C A4 AA 05 A0 A0 A0 8F 4A | | 4 |
| 01 60 22 00 8C 25 E9 05 A0 A0 A0 8F 4A | | 4 |
| 01 54 30 00 8C 34 88 05 A0 A0 A0 8F 4A | | 4 |
| ////////////////////// | | |
| 01 60 32 00 8C A4 AA 05 A0 A0 A0 8F 4A | | |
| 01 60 32 00 8C A4 AA 05 A0 A0 A0 8F 4A | | |
| 01 60 22 00 8C 25 E9 05 A0 A0 A0 8F 4A | | |
| 01 08 00 0C 8C 2F 53 00 A0 A0 A0 CB 4A | | |
| 01 54 30 00 8C 34 88 05 A0 A0 A0 8F 4A | | |
| Level 7 | | |
| After arming | | |
| 01 60 23 80 88 A5 EC 05 A0 A0 A0 8F 4A | | |
| status press during exit delay | | |
| 01 38 30 80 88 C4 8B 05 A0 A0 A0 8F 4A | | |
| status press after armed | | |
| 01 08 00 8C 88 2F 41 00 A0 A0 A0 CB 4A | | |
| ////////////////////////////// | | |
| 01 60 33 80 88 24 AF 05 A0 A0 A0 8F 4A | | |
| 01 60 23 80 88 A5 EC 05 A0 A0 A0 8F 4A | | |
| 01 38 30 80 88 C4 8B 05 A0 A0 A0 8F 4A | | |
| 01 08 00 8C 88 2F 41 00 A0 A0 A0 CB 4A | | |
| 01 08 10 8C 88 AE 02 00 A0 A0 A0 CB 4A | | |
| 01 08 00 8C 88 2F 41 00 A0 A0 A0 CB 4A | | |
| //////////////////////////////////////////////// | | |
| AC OK, Battery OK, Faults on zones 1-8 | | |
| Level 1 | | |
| 01 01 00 22 08 7C 4B 00 A0 A0 A0 CB 4A | | |
| 01 02 10 00 08 0D 08 00 A0 A0 A0 CB 4A | | |
| 01 03 20 00 08 9A CB 00 00 A0 A0 C3 CA | | |
| 01 04 30 00 08 F7 8B 00 A0 A0 A0 CB 4A | | |
| 01 05 00 00 08 60 48 00 77 78 A0 95 69 | | |
| 01 06 10 00 08 DD 0B 00 45 46 88 12 71 | | |
| 01 07 20 00 08 4A C8 00 17 A0 A0 C2 E6 | | |
| 01 08 30 00 08 07 8B 00 A0 A0 A0 CB 4A | | |
| //////////////////////////////////////////////// | | |
| //////////////////////////////////////////////// | | |
| //////////////////////////////////////////////// | | |
| Other transceiver | | |
| //////////////////////////////////////////////// | | |
| //////////////////////////////////////////////// | | |
| PWR UP Level 1 | | |
| //////////////////////////////////////////////// | | |
| 01 D1 10 00 08 71 2C 00 A0 A0 A0 CB 4A | | |
| 01 08 20 1C 08 4E CB 00 A0 A0 A0 CB 4A | | |
| Armed to level 2 | | |
| 01 60 32 00 0C 27 A9 05 A0 A0 A0 8F 4A | | |
| Disarmed | | |
| 01 08 01 1C 08 4C 5F 00 A0 A0 A0 CB 4A | | |
| //////////////////////////////////////////////////////////////////// | | |
| //////////////////////////////////////////////////////////////////// | | |
| Zone 08 Fault | | |
| 01 08 30 00 08 07 8B 00 A0 A0 A0 CB 4A | | |
| AC OK, Battery OK (Level 2) | | |
| zone 8 alarm | | |
| 01 08 30 00 0F 87 9A 00 A0 A0 A0 CB 4A | | |

```
zone 8 alarm, disarmed
01 08 01 00 0A 04 53 00 A0 A0 A0 CB 4A
zone 8 disarmed again(really disarmed this time)
01 08 11 0C 08 2D 1F 00 A0 A0 A0 CB 4A
zone 7 disarmed again(really disarmed this time)
01 08 11 0C 08 2D 1F 00 A0 A0 A0 CB 4A
AC OK, Battery OK
Level 1
01 08 00 1C 08 CC 48 00 A0 A0 A0 CB 4A
01 08 10 1C 08 4D 0B 00 A0 A0 A0 CB 4A
01 08 20 1C 08 4E CB 00 A0 A0 A0 CB 4A
01 08 30 1C 08 CF 88 00 A0 A0 A0 CB 4A
Level 2
01 08 00 0C 0C AC 50 00 A0 A0 A0 CB 4A
01 08 10 0C 0C 2D 13 00 A0 A0 A0 CB 4A
01 08 20 0C 0C 2E D3 00 A0 A0 A0 CB 4A
01 08 30 0C 0C AF 90 00 A0 A0 A0 CB 4A
Power up
01 D1 10 00 08 71 2C 00 A0 A0 A0 CB 4A Power Up
01 08 20 1C 08 4E CB 00 A0 A0 A0 CB 4A Disarmed, AC/Battery OK
Pressed "1" key which causes status press
01 08 10 1C 08 4D 0B 00 A0 A0 A0 CB 4A
Disarmed from panel
01 08 01 1C 00 CC 6C 00 A0 A0 A0 CB 4A
01 08 11 1C 00 4D 2F 00 A0 A0 A0 CB 4A
01 08 21 1C 00 4E EF 00 A0 A0 A0 CB 4A
01 08 31 1C 00 CF AC 00 A0 A0 A0 CB 4A
01 08 01 1C 00 CC 6C 00 A0 A0 A0 CB 4A
Disarmed(at panel)
01 08 01 1C 08 4C 5F 00 A0 A0 A0 CB 4A
///////////////////////////////
Power up with all 8 zones faulted
///////////////////////////////
01 D1 10 00 0C F1 37 00 A0 A0 A0 CB 4A  //pwr up
01 01 20 22 0D FE D6 00 A0 A0 A0 CB 4A //
01 02 30 00 0F 0F 9A 00 A0 A0 A0 CB 4A
01 01 01 22 08 FC 5C 00 A0 A0 A0 CB
/////////////////////////////
With Panel armed to Level 2, fault Z8
01 08 00 00 0F 84 5A 00 A0 A0 A0 CB 4A
01 08 10 00 0F 05 19 00 A0 A0 A0 CB 4A
01 08 20 00 0F 06 D9 00 A0 A0 A0 CB 4A
Disarmed panel
01 08 31 00 0A 07 93 00 A0 A0 A0 CB 4A
Disarmed panel
01 08 01 1C 08 4C 5F 00 A0 A0 A0 CB 4A
Restore Z8
01 08 10 0C 08 AD 08 00 A0 A0 A0 CB 4A
Zone 5 Manually Bypassed
01 05 31 10 18 83 FF 00 A0 A0 A0 CB 4A
Alarms
///////////////////
99 Master Panic Alarm
///////////////////////////
01 08 20 1C 08 4E CB 00 A0 A0 A0 CB 4A
01 99 30 00 0B 53 BB 00 90 0D A0 A6 83
01 99 00 00 0B 50 7B 00 90 0D A0 A6 83
Disarmed once
01 99 11 00 0A D1 2A 00 90 0D A0 A6 83
Disarmed again (everything ok)
01 08 21 1C 08 CE DC 00 A0 A0 A0 CB 4A
/////////////////////
Fire 95 master panic
//////////////////////
01 95 30 31 0A 05 BD 00 90 28 A0 F8 80
01 95 00 31 0A 06 7D 00 90 28 A0 F8 80
Disarmed
01 95 11 30 0A 81 2A 00 90 28 A0 F8 80
Disarmed again
01 08 21 1C 08 CE DC 00 A0 A0 A0 CB 4A
/////////////////////////////
Level 7 (instant) zone 7 alarm
/////////////////////////////
01 60 32 00 0C 27 A9 05 A0 A0 A0 8F 4A
01 08 01 1C 08 4C 5F 00 A0 A0 A0 CB 4A
01 60 13 80 88 A6 2C 05 A0 A0 A0 8F 4A
01 07 20 80 8B 49 C8 00 17 A0 A0 C2 E6
01 07 30 80 8B C8 8B 00 17 A0 A0 C2 E6
01 07 00 80 8B CB 4B 00 17 A0 A0 C2 E6
```

-continued

```
01 07 10 80 8B 4A 08 00 17 A0 A0 C2 E6
01 07 20 80 8B 49 C8 00 17 A0 A0 C2 E6
01 07 30 80 8B C8 8B 00 17 A0 A0 C2 E6
Disarmed
01 07 01 00 0A C8 53 00 17 A0 A0 C2 E6
Disarmed again
01 08 11 0C 08 2D 1F 00 A0 A0 A0 CB 4A
////////////////////////////////
Level 3 zone8 alarm
////////////////////////////////
01 08 10 80 0B 05 0B 00 A0 A0 A0 CB 4A
01 08 20 80 0B 06 CB 00 A0 A0 A0 CB 4A
"1" key hit to silence sirens and start disarm???
01 08 30 80 0B 87 88 00 A0 A0 A0 CB 4A
Disarmed again
01 08 01 00 0A 04 53 00 A0 A0 A0 CB 4A
Disarmed again
01 08 11 0C 08 2D 1F 00 A0 A0 A0 CB 4A
///////////////////////////////////
//bypassed
Zone 5 Manually Bypassed
01 05 31 10 18 83 FF 00 A0 A0 A0 CB 4A
Zone 5 Manually Bypassed (Panel had LB)
01 05 01 50 18 00 3900 A0 A0 A0 CB 4A
Zone 8 Quick Bypassed
01 08 21 10 18 66 BF 00 A0 A0 A0 CB 4A
Zone 8 Manually Bypassed (with Z8 open)
01 08 01 10 18 E4 3C 00 A0 A0 A0 CB 4A
Zone 8 Manually Bypassed (with Z8 restored)
01 08 21 10 18 66 BF 00 A0 A0 A0 CB 4A
Zone 8 Manually Bypassed (with panel LB)
01 08 21 50 18 E6 B9 00 A0 A0 A0 CB 4A
Zone 7 Quick Bypassed
01 07 21 10 18 AA BF 00 A0 A0 A0 CB 4A
After WL KP status press (with zone 7 bypassed
1 08 30 1C 18 4F EB 00 A0 A0 A0 CB 4A
RF Zone 25 open
01 08 10 0C 08 AD 08 00 A0 A0 A0 CB 4A
Pwrd then Zone 25 restored (panel did not know it was open)
01 25 14 02 08 6D 57 00 A0 A0 A0 CB 4A
01 25 21 02 08 6E D3 00 A0 A0 A0 CB 4A
RF Zone 25 open
01 08 10 0C 08 AD 08 00 A0 A0 A0 CB 4A
RF Zone 25 restored
01 08 20 1C 08 4E CB 00 A0 A0 A0 CB 4A
RF Zone 25 open
01 08 00 0C 08 2C 4B 00 A0 A0 A0 CB 4A
Response to Status Press on WL KP
01 08 10 0C 08 AD 08 00 A0 A0 A0 CB 4A
Response to Status Press on WL KP
01 25 20 00 08 62 C7 00 A0 A0 A0 CB 4A
Bypassed Zone 25
01 25 01 10 18 00 33 00 A0 A0 A0 CB 4A
//////////////////////////
01 07 20 00 1F 4A BA 00 17 A0 A0 C2 E6
01 07 30 00 1F CB F9 00 17 A0 A0 C2 E6
01 07 01 00 0A C8 53 00 17 A0 A0 C2 E6
01 08 11 0C 08 2D 1F 00 A0 A0 A0 CB 4A
01 08 21 0C 08 2E DF 00 A0 A0 A0 CB 4A
01 08 30 1C 08 CF 88 00 A0 A0 A0 CB 4A
01 25 00 00 08 E0 44 00 A0 A0 A0 CB 4A     //Z25 Faulted
01 08 10 1C 08 4D 0B 00 A0 A0 A0 CB 4A             //L1, zone fault exists
01 60 22 00 0C A6 EA 05 A0 A0 A0 8F 4A     //L2
01 25 30 00 0F 63 95 00 A0 A0 A0 CB 4A     //Z25 Alarm
01 25 00 00 0F 60 55 00 A0 A0 A0 CB 4A     //Z25 Alarm
01 25 10 00 0F E1 16 00 A0 A0 A0 CB 4A     //Z25 Alarm
01 25 20 00 0F E2 D6 00 A0 A0 A0 CB 4A     //Z25 Alarm
01 25 30 00 0F 63 95 00 A0 A0 A0 CB 4A     //Z25 Alarm
01 25 01 00 0A E0 5C 00 A0 A0 A0 CB 4A     //Z25 Alarm Memory
01 08 11 1C 08 CD 1C 00 A0 A0 A0 CB 4A     //L1, no zone Faults
////////////
01 07 30 00 0F 4B 9A 00 17 A0 A0 C2 E6     Z7 tripped and immediately restored putting
panel into alarm
01 07 00 00 0F 48 5A 00 17 A0 A0 C2 E6
01 07 10 00 0F C9 19 00 17 A0 A0 C2 E6     disarmed
01 07 20 00 0F CA D9 00 17 A0 A0 C2 E6
01 07 30 00 0F 4B 9A 00 17 A0 A0 C2 E6
01 07 01 00 0A C8 53 00 17 A0 A0 C2 E6
```

-continued 01 08 11 1C 08 CD 1C 00 A0 A0 A0 CB 4A disarmed again
/////////////
Armed to Level 2
01 07 24 22 0C 86 80 00 A0 A0 A0 CB 4A Fire Alarm Z7
01 07 31 32 08 67 9F 00 A0 A0 A0 CB 4A Disarmed
01 07 01 32 08 64 5F 00 A0 A0 A0 CB 4A Disarmed again
01 08 11 1C 08 CD 1C 00 A0 A0 A0 CB 4A Restored Zone
Armed to Level 2
01 07 34 22 0C 07 C3 00 A0 A0 A0 CB 4A Fire Alarm Z7(zone immediately restored)
01 07 01 32 08 64 5F 00 A0 A0 A0 CB 4A Disarmed
01 08 11 1C 08 CD 1C 00 A0 A0 A0 CB 4A Disarmed again
///////////////////Z7 Fire alarm Level 1
01 07 24 32 08 E6 98 00 A0 A0 A0 CB 4A
01 07 31 32 08 67 9F 00 A0 A0 A0 CB 4A
///////////////////Z7 Fire alarm Level 2
01 07 14 22 0C 85 40 00 A0 A0 A0 CB 4A
01 07 21 32 08 E6 DC 00 A0 A0 A0 CB 4A
01 08 31 1C 08 4F 9F 00 A0 A0 A0 CB 4A
///////////////////Z7 Fire alarm Level 3
01 07 14 A2 08 85 52 00 A0 A0 A0 CB 4A
01 07 21 32 08 E6 DC 00 A0 A0 A0 CB 4A
01 08 31 1C 08 4F 9F 00 A0 A0 A0 CB 4A
/////////////
Arm to Level 3 with intererior sensor #7 open
01 60 23 80 08 26 EF 05 A0 A0 A0 8F 4A
Press WL KP Status
01 08 30 8C 08 AF 82 00 A0 A0 A0 CB 4A
01 60 00 80 08 A4 50 05 A0 A0 A0 8F 4A
Restored Zone 7 (still at Level 3)
01 08 10 8C 08 2D 01 00 A0 A0 A0 CB 4A
01 60 20 80 08 26 D3 05 A0 A0 A0 8F 4A
//////////////////////////////////////////////////////////////////////////////////////////
//////////////////////////////////////////////////////////////////////////////////////////
//below is a summary of data exchanges between the Vista 20 and the 7847i (general polls and keypad //communication stripped out)
// "S" before the byte indicates it is a slave message
//////////////////////////////////////////////////////////////////////////////////////////
//////////////////////////////////////////////////////////////////////////////////////////
//////////////////////////////////////////////////////////////////////////////////////////
//Connecting to 7847i
// somewhere in these packets are partion #1 - disarmed, Panel LB - as well as other info
//////////////////////////////////////////////////////////////////////////////////////////
SF7 00 00 00 00
F9 83 00 00
SC3 S02 S72 SC9
C3 00
F9 03 03 67 58 42 00
S03
F9 03 02 53 AF 00
S03 S04 S00 S00 S00 SF9
03 00
SF7 00 00 00 00
F9 03 00 00
S43 S02 S62 S59
43 00
F9 83 04 64 10 34 D8 00
S83
00 00 00 00
SF7
F9 83 00 00
S83 S13 S64 S10 S02 S85 S00 S15 S05 S06 S06 S02 S00 S00 S00 S00 SDF S14 S10 S03 S41
83 00
//similar to to other downloads up to 01 E7 E7..., E7 XOR'd with 18 = FF, Other download values XOR'd with XOR value = FF for the E7 locations, but not for the 22 locations.
F9 C3 2D 64 10 02 80 00 20 05 06 06 02 FF 02 05 01 E7 E7 E7 E7 E7 E7 E7 E7 01 61 60 00 FF 22 22 22 22 22 22 22 22 22 22 00 20 02 9C 51 10 03 78 00
SC3
//identical packet in other download
F9 C3 04 64 10 34 98 00
SC3
SF7 00 00 00 00
F9 C3 00 00
//similar message in other download except for SE8 SE8 ... SEC SBE
//SEC SBE is the crc of the previous 11 bytes
SC3 S13 S64 S10 S02 S84 S00 S20 SE8 SE8 SE8 SE8 SE8 SE8 SE8 SE8 SEC SBE S10 S03 S13
C3 00

-continued

```
//identical message in another download
F9 C3 0A 64 10 02 80 04 00 12 10 03 1B 00
SC3
//identical message in another download
F9 C3 04 64 10 34 98 00
SC3
SF7 00 00 00 00
F9 C3 00 00
//identical message in another download
S03 S0D S64 S10 S02 S81 S00 S2C S01 S45 SB9 S95 S10 S03 S26
03 00
//XOR value is always contained in this packet. In this case, it is 0x18, however, data previous to
this has already been XOR'd with 0x18
//red shows data that repeats 3 times (last byte of 3rd time is different) - partition status?
(1,2, common)
//test out with paritions in different states to see if this indicates status
//parition states are XOR'd with 18 so partition # = decodes to 00 00 08 08 00 00 40
F9 C3 22 64 10 02 95 00 28 0B 1B 58 18 18 10 10 18 18 58 18 18 10 10 18 18 58 18 18 10 10 18 18
E4 6D 10 03 DD 00
SC3
//conversation over???
//F9 - source
//c3 - destination/seq #
//04 - byte count
//64 10 - ?? common # in these messages (command?) same value in other downloads
//34 - conversation complete????
//98 - checksum
//00 - not real
F9 C3 04 64 10 34 98 00
SC3
/////////////////////////////////////////////////////////////////////////
/////////////////////////////////////////////////////////////////////////////////////////////////
//      Downloading the 7847i
//      7847i download to Vista panel. The following fields were updated:
//          PABX Access Code: 222222
//          Primary Phone Number: 33333333333333333333
//          Secondary Phone Number: 44444444444444444444
//          Download Phone Number: 55555555555555555555
/////////////////////////////////////////////////////////////
/////////////////////////////////////////////////////////////
00 00 00 00
S83
F9 83 04 64 10 34 D8 00
SF7 00 00 00 00
F9 83 00 00
//I'm guessing this is a request for info about segment #1
    //BYTES in yellow do not change from sequence 1-10
    //SC3 - source/seq #
//S10 - byte count
//S64 S10 S02 - ?? common in many of these packets and for other downloads as well
    //S90 - alternates from 90 to 95, have seen it alternate from 91 to 94 for other downloads
    //S00 - appears to be common with other downloads (which have a different XOR value)
//S34 S19 S30 - = 2C 01 28 after XOR with XOR value, other downloads translated to same value
//S98 - is the sequence # XOR'd w/XOR value (0x18), result = (80-89) for seq 1-10
//SE7 S18 - = FF FF after XOR'd with XOR value, other downloads translate to same value
    //SFE SEE - is the CRC over the previous 8 bytes
    //S10 S03 - ?? same value appears with other downloads
    //S14 - is the checksum.(add up all previous bytes, AND with 0x00FF, subract from 0xFF,
add 1)
//#1 of 10 memory segments
SC3 S10 S64 S10 S02 S90 S00 S34 S19 S30 S98 SE7 S18 SFE SEE S10 S03 S14
C3 00
//???????????????? - one of these packets somehow indicates we should download the values for
this memory
//segment. Maybe the CRC of this memory segment is passed?
    //yellow is common to all of these types of packets, also common to this type of packet in
other
//downloads
    //F9 - source
    //C3 - destination
    //1C - byte count, is either 1C or 1D for these packets
    //64 10 02 - ?? common, same value in other downloads
    //91 - alternates from 91 to 94, may be the S90 above XOR's with 01?
    //00 - commom for all this type and for other downloads
```

//28 08 - = 30 10 when XOR'd with XOR value, same for other downloads
//2C 46 F1 34 9B 17 8F 3C C3 E7 18 18 9A D8 11 A2 2A A9 - many of these values translate to the same
//value as other downloads if XOR'd with XOR value, may be a CRC in here as well?
//10 03 - commom for all this type and for other downloads
//F8 - ?? may be the require value to make the checksum = 00, is the 00 real? Mayb F8 is the checksum
and 00 not real, check the math???
//00 - checksum - always calculates to zero for this type of packet
F9 C3 1C 64 10 02 91 00 28 08 2C 46 F1 34 9B 17 8F 3C C3 E7 18 18 9A D8 11 A2 2A A9 10 03
F8 00
SC3
F9 C3 04 64 10 34 98 00
SC3
SF7 00 00 00 00
F9 C3 00 00
//dump of first part of segment #1 values
//S03 - source/seq #
//S31 - byte count
//S64 S10 S02 - ?? common
//S90 S00 S34 S19 S31 S18 S18 S19 S19 S18 S19 - ??
//S3A S3A S3A - PABX Access Code (XOR'd with XOR value)
//S2B S2B S2B S2B S2B S2B S2B S2B S2B S2B - Primary Phone Number
//S5C S5C S5C S5C S5C S5C S5C S5C S5C S5C - Secondary Phone Number
// S7D S3E S18 S18 S18 SE7 SE7 S74 S0D - ?? more data?? likely a CRC in here
//S10 S03 - ?? common, found in other downloads
//S5C - checksum - verify
S03 S31 S64 S10 S02 S90 S00 S34 S19 S31 S18 S18 S19 S19 S18 S19 S3A S3A S3A S2B S2B
S2B S2B S2B S2B S2B S2B S2B S2B S5C S5C S5C S5C S5C S5C S5C S5C S5C S5C S7D S3E
S18 S18 S18 SE7 SE7 S74 S0D S10 S03 S5C
03 00
F9 C3 09 64 10 02 84 03 18 10 03 13 00
SC3
F9 C3 04 64 10 34 98 00
SC3
SF7 00 00 00 00
F9 C3 00 00
//dump of second part of segment #1 values
//S43 - source/seq #
//S32 - byte count
//S64 S10 S02 - ?? common
//S95 S00 S34 S19 S31 S18 S18 S1B S18 S18 S18 - ??
//S18 S18 S18 S18 S18 S18 S18 S18 SBC S49 S1B S18 S19 S18 S18 S1B S10 S10 S18 S19
- ?? values
//S4D S4D S4D S4D S4D S4D S4D S4D S4D S4D - Download Phone Number
//S17 S3B S07 - ?? more data?? likely a CRC in here
//S10 S03 - ?? common, found in other downloads
//S54 - checksum - verify
S43 S32 S64 S10 S02 S95 S00 S34 S19 S31 S18 S18 S1B S18 S18 S18 S18 S18 S18 S18 S18 S18
S18 S18 SBC S49 S1B S18 S19 S18 S18 S1B S10 S10 S18 S19 S4D S4D S4D S4D S4D S4D S4D
S4D S4D S4D S17 S3B S07 S10 S03 S54
43 00
F9 C3 09 64 10 02 81 03 06 10 03 28 00
SC3
F9 C3 04 64 10 34 98 00
SC3
SF7 00 00 00 00
F9 C3 00 00
//#2 of 10 memory segments
S83 S10 S64 S10 S02 S95 S00 S34 S19 S30 S99 SE7 S18 S2E SE7 S10 S03 S25
83 00
SC3
F9 C3 1C 64 10 02 94 00 28 08 62 5B DE E7 F7 8E 18 18 7C 63 D2 ED 21 6F B8 88 9C 99 10 03
01 00
F9 C3 04 64 10 34 98 00
SC3
SF7 00 00 00 00
F9 C3 00 00
//#3 of 10 memory segments
SC3 S10 S64 S10 S02 S90 S00 S34 S19 S30 S9A SE7 S18 S7E SC5 S10 S03 SBB
C3 00
F9 C3 1C 64 10 02 91 00 28 08 18 18 39 9A 1C 1A 3F 3C 18 18 F3 6D AC D7 B8 BB 06 70 10 03
2E 00
SC3
SC3
F9 C3 04 64 10 34 98 00
SF7 00 00 00 00
F9 C3 00 00
//#4 of 10 memory segments -continued

```
S03 S10 S64 S10 S02 S95 S00 S34 S19 S30 S9B SE7 S18 SAE SCC S10 S03 S3E
03 00
SC3
F9 C3 1C 64 10 02 94 00 28 08 B8 BB B8 BB 17 9D 39 A5 18 18 18 18 18 18 18 18 DB 9D 10 03
2B 00
SC3
F9 C3 04 64 10 34 98 00
00 00 00 00
F7 00 00 01 10 08 00 5C 08 02 00 00 53 59 53 54 45 4D 20 4C 4F 20 42 41 54 20 20 20 20 20 20
20 20 20 20 20 20 20 20 20 20 20 20 20 93 00 00 00 00
00 00 00 00
00 00 00 00
F9 C3 02 53 EF 00
S43 S04 S00 S00 S00 SB9
43 00
SF7 00 00 00 00
F9 43 00 00
//#5 of 10 memory segments
S83 S10 S64 S10 S02 S90 S00 S34 S19 S30 S9C SE7 S18 S7E SBD S10 S03 S01
83 00
SC3
F9 C3 1C 64 10 02 91 00 28 08 7D 7E 92 D6 F7 B0 18 18 18 18 9A 14 17 B5 35 1A 3F C3 10 03
A9 00
SC3
F9 C3 04 64 10 34 98 00
SF7 00 00 00 00
F9 C3 00 00
//#6 of 10 memory segments
SC3 S10 S64 S10 S02 S95 S00 S34 S19 S30 S9D SE7 S18 SAE SB4 S10 S03 S94
C3 00
SC3
F9 C3 1C 64 10 02 94 00 28 08 9A 14 28 B7 18 18 18 18 18 18 18 18 18 18 18 18 DF 85 10 03 CA
00
SC3 F9 C3 04 64 10 34 98 00
SF7 00 00 00 00
F9 C3 00 00
//#7 of 10 memory segments
S03 S10 S64 S10 S02 S90 S00 S34 S19 S30 S9E SE7 S18 SFE S96 S10 S03 S26
03 00
F9 C3 1C 64 10 02 91 00 28 08 18 18 18 18 18 18 18 18 18 18 18 18 1D 98 4D 9C 74 37 10 03 75
00
SC3
SC3
F9 C3 04 64 10 34 98 00
SF7 00 00 00 00
F9 C3 00 00
//#8 of 10 memory segments
S43 S10 S64 S10 S02 S95 S00 S34 S19 S30 S9F SE7 S18 S2E S9F S10 S03 SA7
43 00
SC3
F9 C3 1C 64 10 02 94 00 28 08 1F 93 11 E6 60 0D 0F 9E 18 18 18 18 18 18 18 18 1C 4C 10 03 F0
00
SC3
F9 C3 04 64 10 34 98 00
SF7 00 00 00 00
F9 C3 00 00
//#9 of 10 memory segments
S83 S10 S64 S10 S02 S90 S00 S34 S19 S30 S90 SE7 S18 S7E S4D S10 S03 S7D
83 00
SC3
F9 C3 1C 64 10 02 91 00 28 08 18 18 18 18 18 18 18 18 18 18 18 18 18 18 18 18 C7 29 10 03 6E
00
SC3
F9 C3 04 64 10 34 98 00
SF7 00 00 00 00
F9 C3 00 00
//#10 of 10 memory segments
SC3 S10 S64 S10 S02 S95 S00 S34 S19 S30 S91 SE7 S18 SAE S44 S10 S03 S10
C3 00
SC3
F9 C3 1C 64 10 02 94 00 28 08 18 18 18 18 18 18 18 18 18 18 18 18 18 18 18 18 DE B4 10 03 C9
00
F9 C3 04 64 10 34 98 00
SC3
SF7 00 00 00 00
F9 C3 00 00
S03 S0A S64 S10 S02 S85 S05 S9E S17 S10 S03 S2B
03 00
```

-continued

```
SC3
F9 C3 09 64 10 02 85 83 1D 10 03 8D 00
SC3
F9 C3 04 64 10 34 98 00
```

See FIGS. 27-38.

Online website to verify CRC values

Go to http://www.zorc.breitbandkatze.de/crc.html

Enter 16 for order, 8005 for polynom, O for init value, 0 for final XOR value.

check the direct box, uncheck the reverse data bytes box and the reverse CRC result box Enter data sequence, put % before each hex byte value.

Click on the "COMPUTE!" button

This document contains all the known available Honeywell ECP data bus commands between the Vista-20P and the 7847i internet module which will be referred to as "internet module". These commands were discovered by exercising the features of the Total Connect system with the Vista-20P while monitoring and deciphering the bus data between the Vista-20P and the internet module.

Refer to TotalConnectDescriptionl .doc to see how the Honeywell Total Connect system works.

Worksheet Descriptions

The Total_Connect_Commands worksheet of this document contains a list of all the internet module commands that are used by the Total Connect interface. Commands are listed in the order they are used by the Total Connect System. This was done to show how the Total Connect system uses these commands.

The IM_Command_Summary worksheet of this document contains a list of all the known available internet module commands.

The IM Command Details worksheet defines the bytes within the commands. This whole document, particulary the IM Co~mand Details worksheet will be a living document that will be continually updated as we test more panel cases, see more data, and define more bytes of the commands.

The KP_Commands worksheet describes the KP bus commands.

The RF Receiver worksheet lists the commands the Vista panel transmits to the RF Receiver. For the iHUB, development, these commands will not be used. They are listed in this document because they will be received by the iSPIM. The iSPIM will ignore these transmissions.

The Relay Module worksheet contains bus communication between the Vista Panel and the bus relay module. The internet module emulates the bus relay module when used with the Total Connect System. The Total Connect System uses the programmable relay outputs to trigger text messages and emails. It is undecided at this time whether the iHUB will make use of these programmable outputs. The bus relay module communication is not fully defined at this time.

The HW_Low_Leve_info worksheet describes the lower level bus communication details that will be handled by the iSPIM.

Dan's view of how this functionality should be implemented using the iSPIM is listed below:

1 ISPIM will handle all normal supervisory activity with the panel.

2 The iSPIM will "ACK" all panel messages that require "ACK"s.

3 The iSPIM will pass all messages of interest from the Vista panel to the iHUB.

4 When bus messages of interest are passed to the iHUB, the complete message will be passed (nothing stripped).

5 The iSPIM will pass all keypad display messages to the iHUB.

6 Generally, the iSPIM will act as a pass thru device. With few exceptions, it will not decode non-supervision internet module or keypad bus messages. Exceptions include:

Supervision bus activity iSPIM will automatically request a Zone List of open zones anytime a partition status message is received.

7 When the iHUB wants to transmit a command on the HW bus, it will pass the complete transmit packet to the iSPIM.

8 The iSPIM will handle the handshaking and timing requirements needed to transmit the packet on the HW bus.

9 The iHUB should poll the panel on a regular basis for system status. Zone state and arming level changes cause a status update message, but system status changes (i.e. panel LB, AC fail, bus device supv) do not cause a status update message.

10 Status update messages contain system status, but not detailed zone status. The iHUB will be responsible for requesting Zone Lists of the various sensor conditions (all open sensors, all troubled sensors, . . . ) when appropriate.

11 For debugging purposes, we should have a way to monitor and log the bus traffic between the iHUB and iSPIM.

Listed herein are the known available Honeywell ECP data bus commands between the Vista-20P and the 7847i internet module which will be referred to as "automation module". These commands were discovered by exercising the features of the Total Connect system with the Vista-20P while monitoring and deciphering the bus data between the Vista-20P and the automation module.

Refer to TotalConnectDescriptionl.doc to see how the Honeywell Total Connect system works.

The Command Summary tab of this document contains a list of all the known available automation module commands. Commands are organized similar to the way that they are accessed thru the Total Connect System.

The Command Details tab of this document contains a breakdown of the commands. Not all the commands are broken down at this time. This tab will become more complete as more information about the commands are realized.

The KP_Commands tab describes the KP bus commands.

The HW_Low_Level_info tab describes the lower level bus communication details that will be handled by the iSPIM.

Dan's view of how this functionality should be implemented using the iSP1M is listed below:

1 ISPIM will handle all normal supervisory activity with the panel.

2 The iSPIM will "ACK" automation messages from the Vista panel and pass the complete(nothing stripped) messages to the iHUB.

3 The iSPIM will pass all broadcast keypad messages to the iHUB.

4 Except for the supervisory bus activity, the iSPIM will act as a pass thru device. It will not decode non-supervision automation or keypad bus messages.

5 When the iHUB wants to transmit a command on the HW bus, it will pass the complete transmit packet to the iSPIM. The iSPIM will handle the handshaking and timing requirements needed to transmit the packet on the HW bus.

6 The iHUB should poll the panel on a regular basis for status.(zone state changes cause a status update message, but system status changes(i.e. panel LB, AC fail, bus device supervisory) do not cause a status update message.

7 Status update messages contain system status, but not detailed zone status. Anytime, a status update message is received, the panel should poll the HW panel for the various lists of sensor conditions(all open sensors, all troubled sensors, . . . )

8 For debugging purposes, we should have a way to monitor and log the iHUB to iSPIM bus traffic.

The invention claimed is:

1. A method comprising:

receiving, by a computing device located at a premises and from a gateway device, data associated with one or more of a premises management system located at the premises or one or more network devices located at the premises; and causing output, via at least one of a plurality of user interfaces, of an indication of the data, wherein the plurality of user interfaces comprises:

a first user interface associated with the premises management system; and a second interface associated with the one or more network devices.

2. The method of claim 1, wherein the network devices comprise at least one of an intercom, a radio frequency (RF) device, or an internet protocol (IP) device; and wherein the premises management system comprises at least one of a security system or a home automation system.

3. The method of claim 1, wherein the causing output of the indication of the data comprises causing a user interface to display the indication of the data.

4. The method of claim 1, wherein the data is associated with a premises event; and wherein the causing output of the indication of the data comprises causing output of an alert indicative of the data.

5. The method of claim 1, further comprising causing the gateway device to send the data to a device located external to the premises.

6. The method of claim 1, wherein the gateway device is configured to cause a device located external to the premises to send, to at least one user device, an indication of the data.

7. The method of claim 1, wherein the first user interface is configured to output one or more widgets associated with the premises management system; and the second interface is configured to output one or more widgets associated with the one or more network devices.

8. A computing device located at a premises and comprising:

one or more processors; and memory storing instructions that, when executed by the one or more processors, cause the computing device to:

receive, from a gateway device, data associated with one or more of a premises management system located at the premises or one or more network devices located at the premises; and cause output, via at least one of a plurality of user interfaces, of an indication of the data, wherein the plurality of user interfaces comprises:

a first user interface associated with the premises management system; and a second interface associated with the one or more network devices.

9. The computing device of claim 8, wherein the network devices comprise at least one of an intercom, a radio frequency (RF) device, or an internet protocol (IP) device; and wherein the premises management system comprises at least one of a security system or a home automation system.

10. The computing device of claim 8, wherein the instructions that cause the computing device to cause output of the indication of the data cause the computing device to cause a user interface to display the indication of the data.

11. The computing device of claim 8, wherein the data is associated with a premises event; and wherein the instructions that cause the computing device to cause output of the indication of the data cause the computing device to cause output of an alert indicative of the data.

12. The computing device of claim 8, wherein the instructions further cause the computing device to send the data to a device located external to the premises.

13. The computing device of claim 8, wherein the gateway device is configured to cause a device located external to the premises to send, to at least one user device, an indication of the data.

14. A non-transitory computer-readable medium storing instructions that, when executed, cause:

receiving, by a computing device located at a premises and from a gateway device, data associated with one or more of a premises management system located at the premises or one or more network devices located at the premises; and causing output, via at least one of a plurality of user interfaces, of an indication of the data, wherein the plurality of user interfaces comprises:

a first user interface associated with the premises management system; and a second interface associated with the one or more network devices.

15. The non-transitory computer-readable medium of claim 14, wherein the network devices comprise at least one of an intercom, a radio frequency (RF) device, or an internet protocol (IP) device; and wherein the premises management system comprises at least one of a security system or a home automation system.

16. The non-transitory computer-readable medium of claim 14, wherein the causing output of the indication of the data comprises causing a user interface to display the indication of the data.

17. The non-transitory computer-readable medium of claim 14, wherein the data is associated with a premises event; and wherein the causing output of the indication of the data comprises causing output of an alert indicative of the data.

18. The non-transitory computer-readable medium of claim 14, wherein the instructions further cause causing the gateway device to send the data to a device located external to the premises.

19. The non-transitory computer-readable medium of claim 14, wherein the gateway device is configured to cause a device located external to the premises to send, to at least one user device, an indication of the data.

20. The non-transitory computer-readable medium of claim 14, wherein the first user interface is configured to output one or more widgets associated with the premises management system; and the second interface is configured to output one or more widgets associated with the one or more network devices.

* * * * *